Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 1

MYRON J. BAUER
ROBERT E. CARLBERG
RICHARD C. WILSON
INVENTORS
BY W. O. Quesenberry
Walter G. Finch
ATTORNEYS

LOADER MECHANISM FOR GUIDED MISSILE LAUNCHING SYSTEM

Filed July 6, 1960 134 Sheets-Sheet 2

LOADER MECHANISM FOR GUIDED MISSILE LAUNCHING SYSTEM

Filed July 6, 1960 134 Sheets-Sheet 3

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 20

LOADER MECHANISM FOR GUIDED MISSILE LAUNCHING SYSTEM

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 23

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 25

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 27

LOADER MECHANISM FOR GUIDED MISSILE LAUNCHING SYSTEM

LOADER MECHANISM FOR GUIDED MISSILE LAUNCHING SYSTEM

Filed July 6, 1960 134 Sheets-Sheet 32

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 34

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 35

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 36

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 38

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 41

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 43

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 46

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 50

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 51

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 55

LOADER MECHANISM FOR GUIDED MISSILE LAUNCHING SYSTEM

LOADER MECHANISM FOR GUIDED MISSILE LAUNCHING SYSTEM

Filed July 6, 1960 134 Sheets-Sheet 58

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 59

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 60

LOADER MECHANISM FOR GUIDED MISSILE LAUNCHING SYSTEM

Filed July 6, 1960 134 Sheets-Sheet 61

LOADER MECHANISM FOR GUIDED MISSILE LAUNCHING SYSTEM

LOADER MECHANISM FOR GUIDED MISSILE LAUNCHING SYSTEM

Jan. 26, 1965 M. J. BAUER ET AL 3,166,976

LOADER MECHANISM FOR GUIDED MISSILE LAUNCHING SYSTEM

Filed July 6, 1960 134 Sheets-Sheet 66

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 71

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 74

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 76

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 77

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 82

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 83

LOADER MECHANISM FOR GUIDED MISSILE LAUNCHING SYSTEM

LOADER MECHANISM FOR GUIDED MISSILE LAUNCHING SYSTEM

Filed July 6, 1960 134 Sheets-Sheet 86

LOADER MECHANISM FOR GUIDED MISSILE LAUNCHING SYSTEM

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 96

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 97

LOADER MECHANISM FOR GUIDED MISSILE LAUNCHING SYSTEM

Filed July 6, 1960 134 Sheets-Sheet 98

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 109

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 111

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 113

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 117

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 121

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 126

Jan. 26, 1965 M. J. BAUER ETAL 3,166,976

LOADER MECHANISM FOR GUIDED MISSILE LAUNCHING SYSTEM

Filed July 6, 1960 134 Sheets-Sheet 128

United States Patent Office 3,166,976

Patented Jan. 26, 1965

3,166,976
LOADER MECHANISM FOR GUIDED MISSILE LAUNCHING SYSTEM

Myron J. Bauer, St. Paul, Minn., Robert E. Carlberg, McLean, Va., and Richard C. Wilson, Champlin, Minn., assignors, by direct and mesne assignments, to the United States of America as represented by the Secretary of the Navy Filed July 6, 1960, Ser. No. 41,219
7 Claims. (Cl. 89—1.7)

This invention is well adapted for use with a launching system of the character disclosed in U.S. patent application, Serial Number 848,163, entitled "Guided Missile Launching System," which discloses but does not specifically claim the subject matter of this application. The aforementioned invention of Myron J. Bauer et al. filed on October 22, 1959 includes all of the joint inventors of this continuation-in-part application and is assigned to the same assignee.

This invention relates generally to a handling and launching system for launching surface-to-air guided missile weapons against high speed air targets or missiles approaching a target at supersonic velocities within predetermined intercept parameters.

More particularly, this invention relates generally to ordnance weapon handling and launching systems for handling large or small type missile weapons from movable installations, such as naval vessels.

It is to be pointed out, however, that the handling and launching system of the present invention is not limited to use with naval ship installations, as it most readily can be adapted for use in fixed installations, such as land base missile launching system.

Modern naval vessels, such as cruisers, destroyers, and aircraft carriers, are no longer able to adequately defend themselves from attacks by guided missile weapons launched from enemy aircraft solely through the use of anti-aircraft guns because of the limited ranges of such ordnance armament.

Guided missile weapons of a supersonic type serve well as defensive weapons. Such supersonic missile weapons are capable of seeking and destroying attacking aircrafts or missiles by use of either conventional or atomic warheads. However, some means must be provided for rapidly and accurately launching these supersonic missile weapons in order that they can destroy the incoming and attacking aircrafts or missiles.

For a long time, there has been a demand for an automatic dual feeder for a missile weapon handling and launching system located completely above deck of a naval vessel so as to provide a tactical installation, with a limited number of missile weapons in ready service at a substantially lower installation cost than a missile handling and launching system having below-deck stowage of the missile weapons. In addition, such demand requires that the system be capable of repetitive use and be tactically capable of operating as an optimum system.

Any handling and launching system for ordnance missile weapons which is designed for repetitive use is made up of several major components, including a launcher, a magazine, and a feeder mechanism for transporting the missile weapons from the magazine to the launcher. There may be two types of magazines, that is, a ready service magazine hereinafter referred to broadly as a ready service mechanism, from which missile weapons (with or without their aerodynamic surfaces) can be removed at the firing rate of the system, and stowage magazines, usually used used to replenish the ready service mechanisms during lulls in operation. The present invention makes use of both magazines.

It is an important object of the present invention to provide a feeder mechanism for a handling and launching system for ordnance weapons which can be used to automatically handle and convey missile weapons, either singly or in pairs from ready service mechanisms to a launcher for launching at incoming attacking aircrafts or missiles.

Another object of the present invention is to provide feeder mechanism positioned adjacent selectively cycling ready service mechanisms for receiving and moving selected articles for further disposition thereof.

Still another important object of this invention is to provide an article handling system having a feeder mechanism positioned adjacent a station which includes mechanism for selectively transferring one of an assortment of articles to the feeder mechanism for engagement thereby and for transportation of the selected article of said assortment of articles for further disposition thereof.

Another object of this invention is to provide a feeder system for feeding any one of a selected ordnance weapon from a ready service mechanism to a launcher for launching therefrom.

Another object of the present invention is to provide a dual feeder system for feeding a plurality of missile weapons of the same or different types from a pair of ready service mechanisms individual to each thereof to separate launcher arms thereof a dual launcher for launching therefrom.

Still another object of this invention is to provide a guided missile launching system comprising a dual feeder system for feeding a plurality of missile weapons of the same or different types to a dual launcher for launching therefrom, either singly or in pairs. In connection with the foregoing object it is a further object to provide automatic mechanical, hydraulic and electrical sequence control mechanism for controlling the loading operations of the missile weapons simultaneously in the dual feeder system.

Still another object of the present invention is to provide an arrangement for use with the dual feeder system mentioned in the foregoing object for automatic mechanical, hydraulic and electrical sequence control of all load operations on either rail of the feeder system independently of the other except for manual assembly of aerodynamic surfaces to the missile weapons and except for remote fire control of the missile weapons.

Another object of the present invention, in combination with the feeder system mentioned above, is to provide an arrangement for step control of the individual load functions of the feeder system by an operator at a remote control console servicing both of the feeder systems, with the console being provided with manually operated electrical switches for operating each individual load function.

Another object of the present invention is to provide for step control of the dual feeder system by providing means for returning an unfired missile weapon from a launcher guide arm structure to ready service compartment stowage trays.

Another object of the present invention resides in the provision of a loading mechanism for a missile launching system which provides substantially all of the desired functions of systems heretofore or now in general use and which overcomes most, if not substantially all, of the shortcomings of missile launcher systems of the prior art.

In accordance with the invention, an A-side loader and a B-side loader, together with A-side assembler equipment and B-side assembler equipment are provided as part of a dual feeder for a guided missile launching system. An A-side ready service mechanism and a B-side ready service mechanism, which are also part of the dual feeder, are fully disclosed in a copending U.S. patent application, Serial Number 31,785 entitled "A Ready Service Mechanism for a Guided Missile Launching System," invented by Lewis Hagbo et al., filed May 25, 1960.

The function of each loader, which functions are identical, is to receive missile booster combinations from a pair of ready service mechanisms hereinafter referred to as being in Area 2 and transfer these missile-booster combinations to wing and fin assembly compartments hereinafter referred to as being in Area 1 for assembly of wings and fins to the missile, and fins to the booster to form theretogether complete weapons together, with other such preliminary flight preparations, such as arming and automatic warmup thereof being carried out at this Area 1. From Area 1, the weapons are then transferred to the respective arms of a launcher.

Each loader is principally comprised of a loader trunk, a chain, a saddle cart, a chain storage track, a loader power drive, a drive sprocket, a power-off brake, an Area 2 positioner, a forward floating track, an aft floating track, a rammer, an Area 1 warmup contactor, Areas 1 and 2 interlock valves, a floating span track assembly described in detail in a copending U.S. patent application, Serial Number 16,108, now U.S. Patent No. 3,095,780, entitled Blast Doors and Span Track Arrangement for Guided Missile Launching System invented by Myron J. Bauer and Richard C. Wilson, filed on March 18, 1960, a flametight door described in copending U.S. patent application Serial Number 856,318 filed November 30, 1959, and which matured into U.S. Patent 3,064,963 on November 20, 1962, an Area 1 positioner, an area 1 accumulator, and a set of spaced blast doors.

The previously mentioned rammer moves the missile-booster combination forward a small distance from the fitted mechanism to the saddle cart to disengage the lower booster shoes from the shoe receptacles in a tray in the ready service mechanism, and to engage the upper booster shoes with a loader rail and the saddle cart specifically described and claimed in copending U.S. Patent 3,072,019. The loader, synonymous with the term "conveyer," horizontally transfers the missile-booster combinations from Area 2 to Area 1, and as weapons to the launcher.

The floating span track assembly is attached to the upper blast door, and it provides the necessary connection between a loader trunk section and the launcher guide arm for transferring a weapon from Area 1 to the launcher.

Each set of spaced blast doors for each loader comprises lower and upper blast doors for the purpose of sealing off Area 1 from the launcher during firing of the booster of the weapon. The upper blast door of each set of blast doors also provides a convenient arrangement for supporting the floating span track assembly which spans the gap between the loader trunk section and the guide arm of the launcher. This structure is disclosed and claimed in the copending U.S. patent application Serial Number 16,108, filed May 18, 1960.

All of the major subassemblies of each loader are interlocked for synchronized operation as a single unit, the primary function of which is to transfer the missile-booster combination from the ready service trays positioned in the ready service mechanisms in Area 2 into Area 1 for assembling of wings and fins to the missile-booster combination to complete the weapon, and accomplish preliminary warmup and arming thereof, and then to transfer the weapon onto the launcher where it is subjected to further warmup and if desired further arming prior to launching. Another function of each loader is to return weapons to Area 1 in the event of misfiring of the booster or during exercising cycles using either dummy or actual weapons.

The loader trunk for each loader, which is the principal part of the loader, is attached to spaced overhead beams of the structure of the deckhouse. The loader trunk extends from the forward end of Area 2 to the aft end of Area 1 where the retractable floating span track assembly is provided for bridging the gap between the loader trunk and the launcher guide arm. The guide arm of the launcher and the span track assembly actually form an extension of the loader.

Each loader has the same degree of automation as described in U.S. patent application, Serial Number 506,392, filed May 5, 1955, by Fred H. Allen et al., for "Method and Apparatus for Handling a Missile." The normal load cycle for the guided missile launching system is handled in the automatic phase of control therefor. However, in the other phase thereof the system can be operated manually or step control thereof can be performed. Each loader can be used for unloading the weapons from the launcher back to the ready service mechanisms but preferably as carried out through step control only.

Except for a forward support of the missile by the ready service trays, all handling contact of the missile-booster combinations is with the forward and aft booster shoes. The forward booster shoes, with a broad "wheel base," are provided for vertical support and lateral stability of the missile-booster combination. The aft shoes give little support in this manner but all longitudinal transfer of the missile-booster combination is through engagement with the aft shoes.

The loader trunk is provided with a pair of skid tracks to engage the broad upper forward booster shoe of the booster. Rather than provide separate skid tracks for the narrow upper aft shoe, the saddle cart, which is attached to the engaging end of the loader chain, is used to support the upper aft shoe. This saddle cart, in turn, is guided by the skid tracks provided for the forward shoe. In addition, the loader trunk is provided with an additional set of tracks for guiding the loader drive chain.

The upper forward booster shoe is guided in the skid tracks and the saddle cart is also guided by the same tracks. Horizontal guide rollers give the saddle cart lateral stability, while vertical rollers provided for contacting the bottom surfaces of the skid tracks give roller support to the saddle cart only when there is a vertical load from the bottom.

Many other objects and attendant advantages of this invention mentioned above will become more readily appreciated as the same becomes better understood by reference to the following detailed description when considered in connection with the accompanying drawings wherein.

Figure 19:
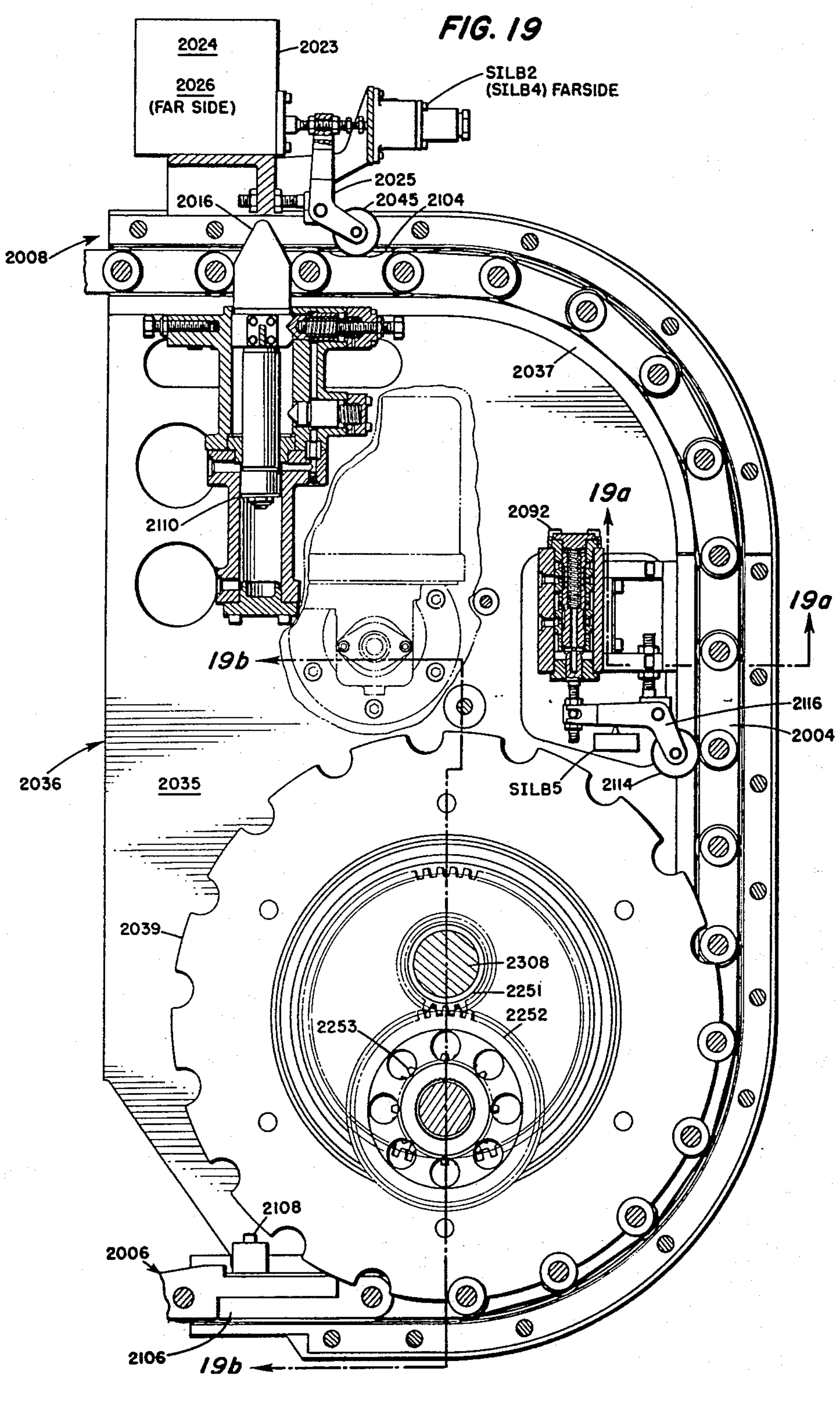
FIG. 19 is a vertical sectional view of a sprocket and track housing, showing the location of hydraulic components therein.
Figure 19A:
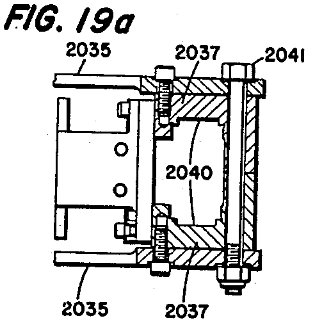
Figure 19B:
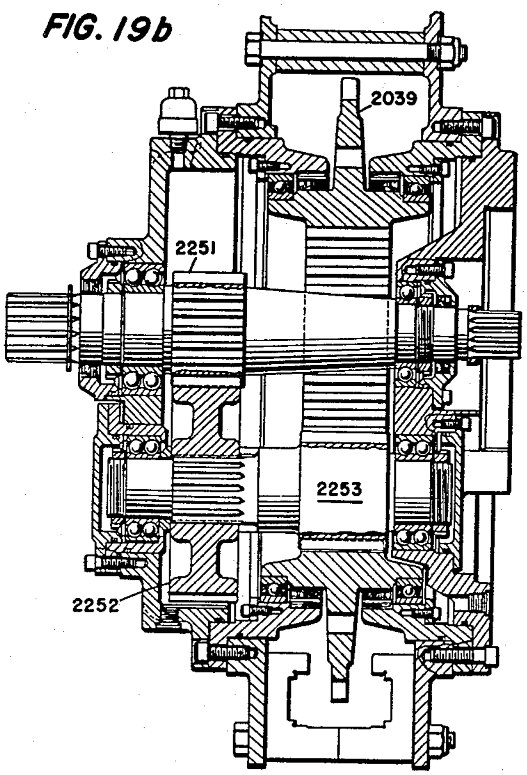
Figure 20:
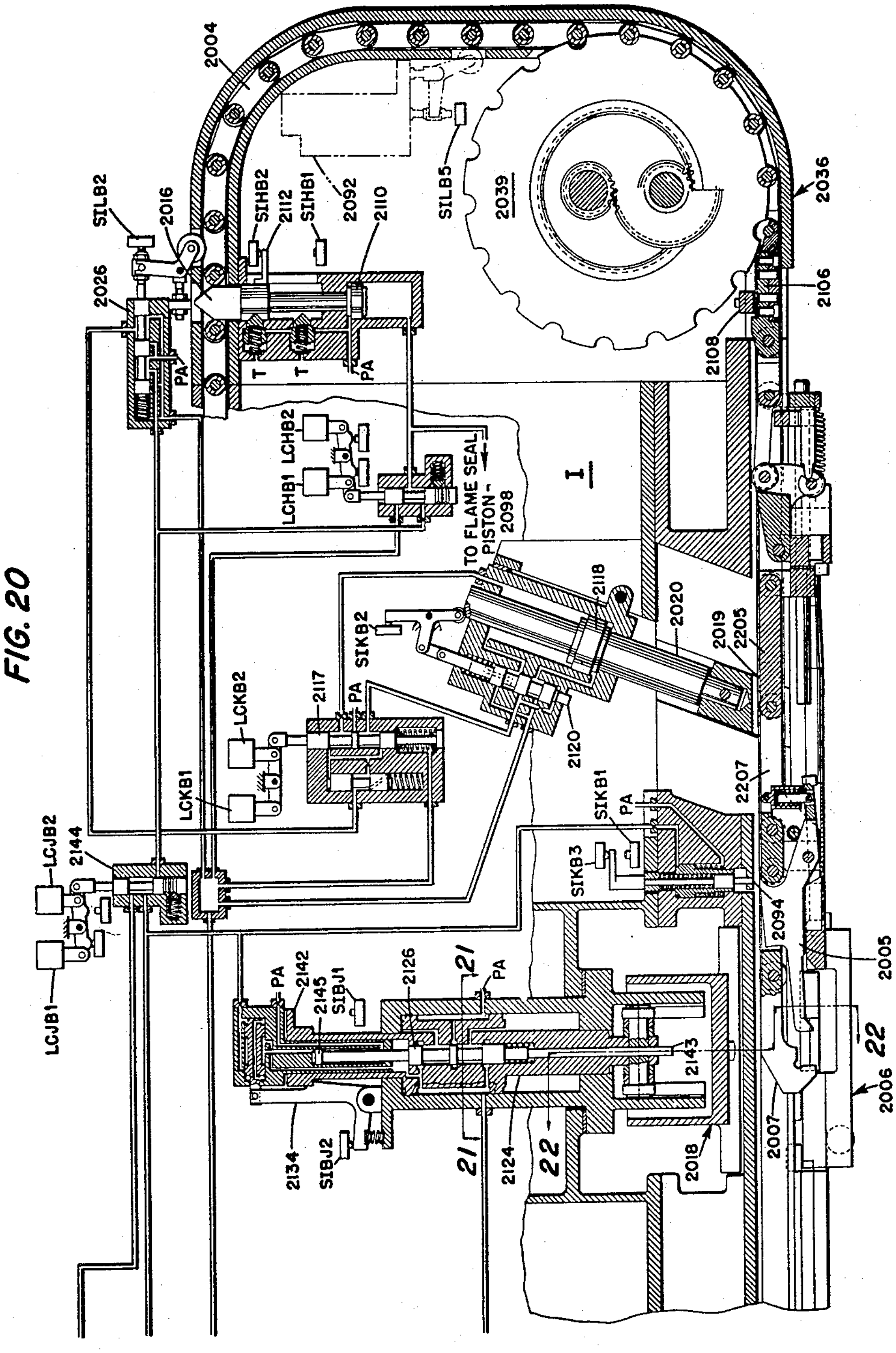
Figures 20A, 21:
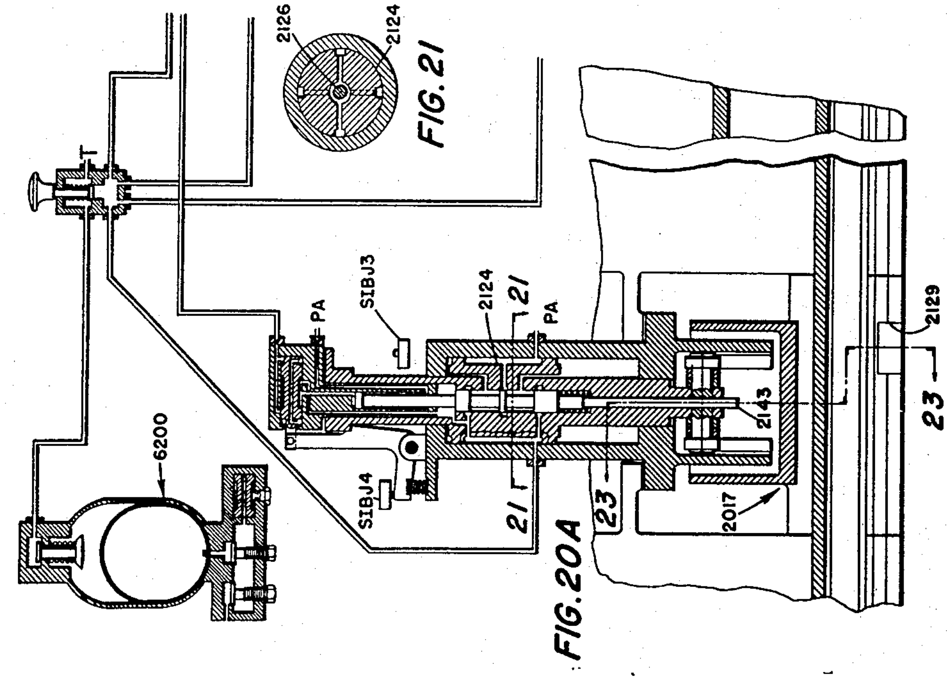
Figure 22:
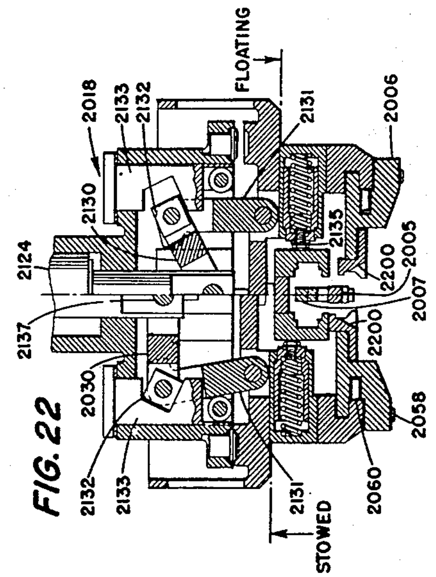
Figure 23:
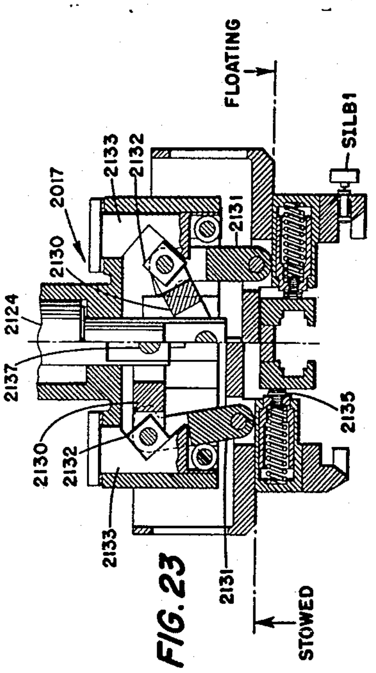
Figure 24:
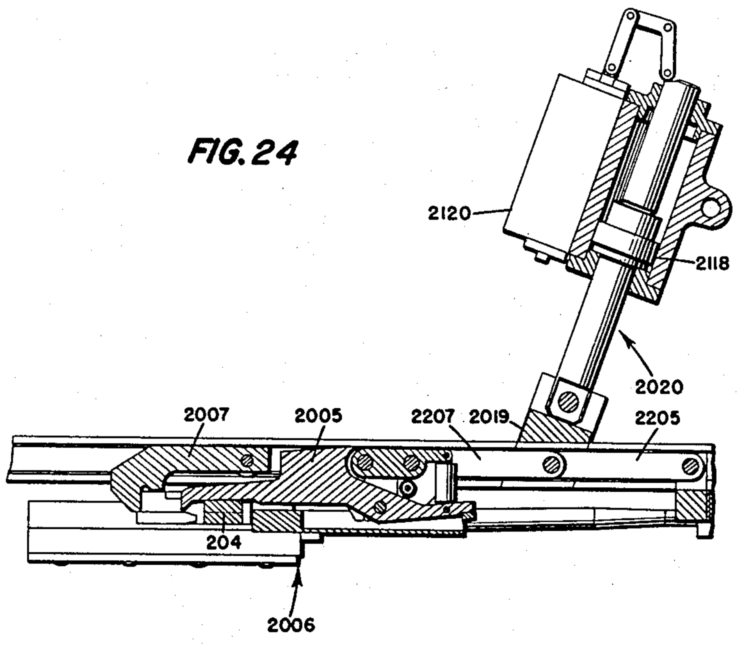
Figure 25:
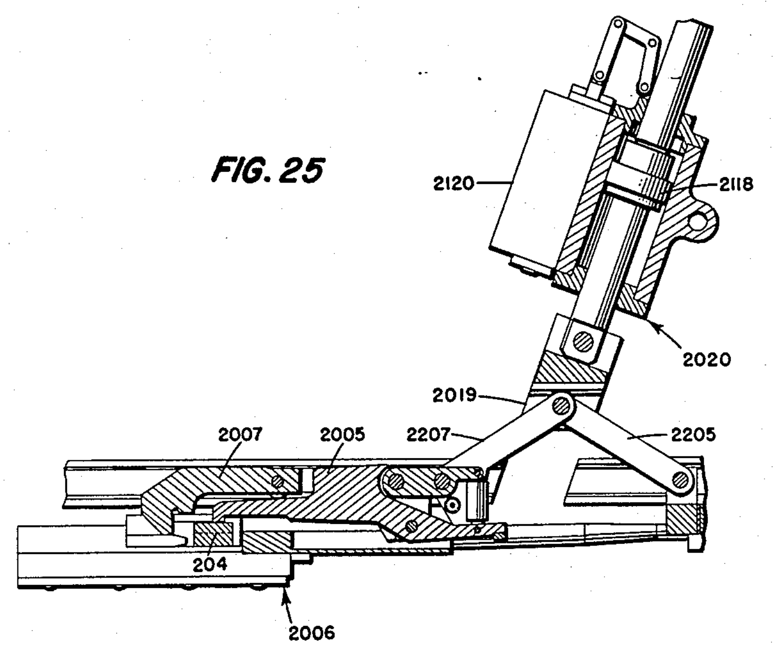
Figure 26:
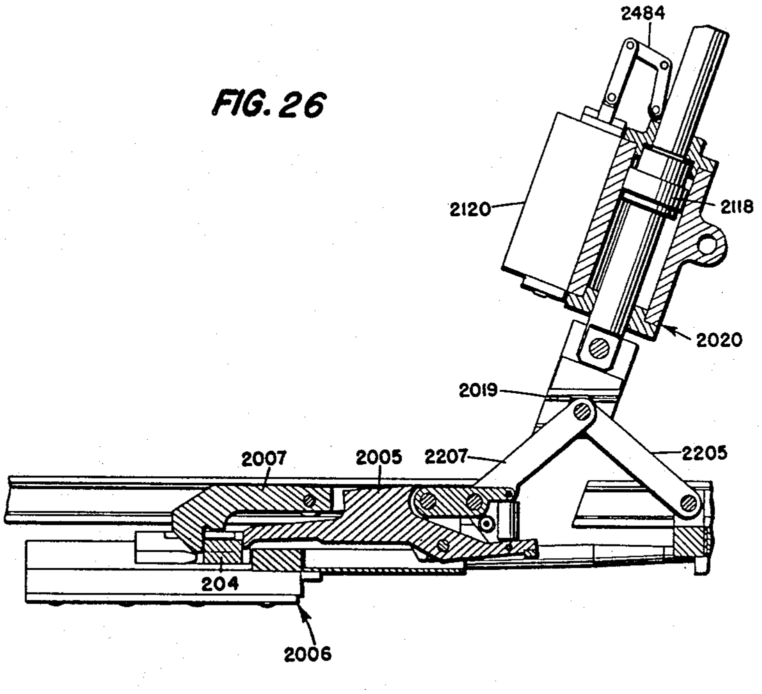
Figure 27:
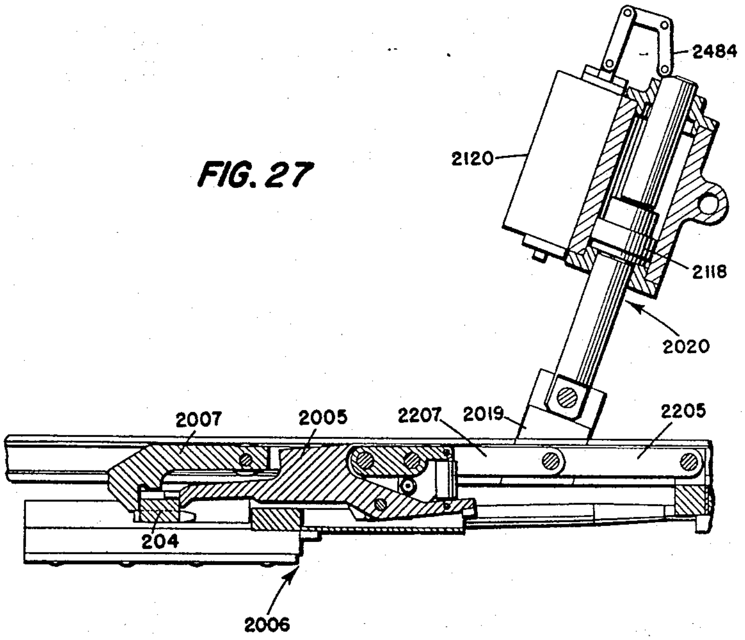
Figure 28:
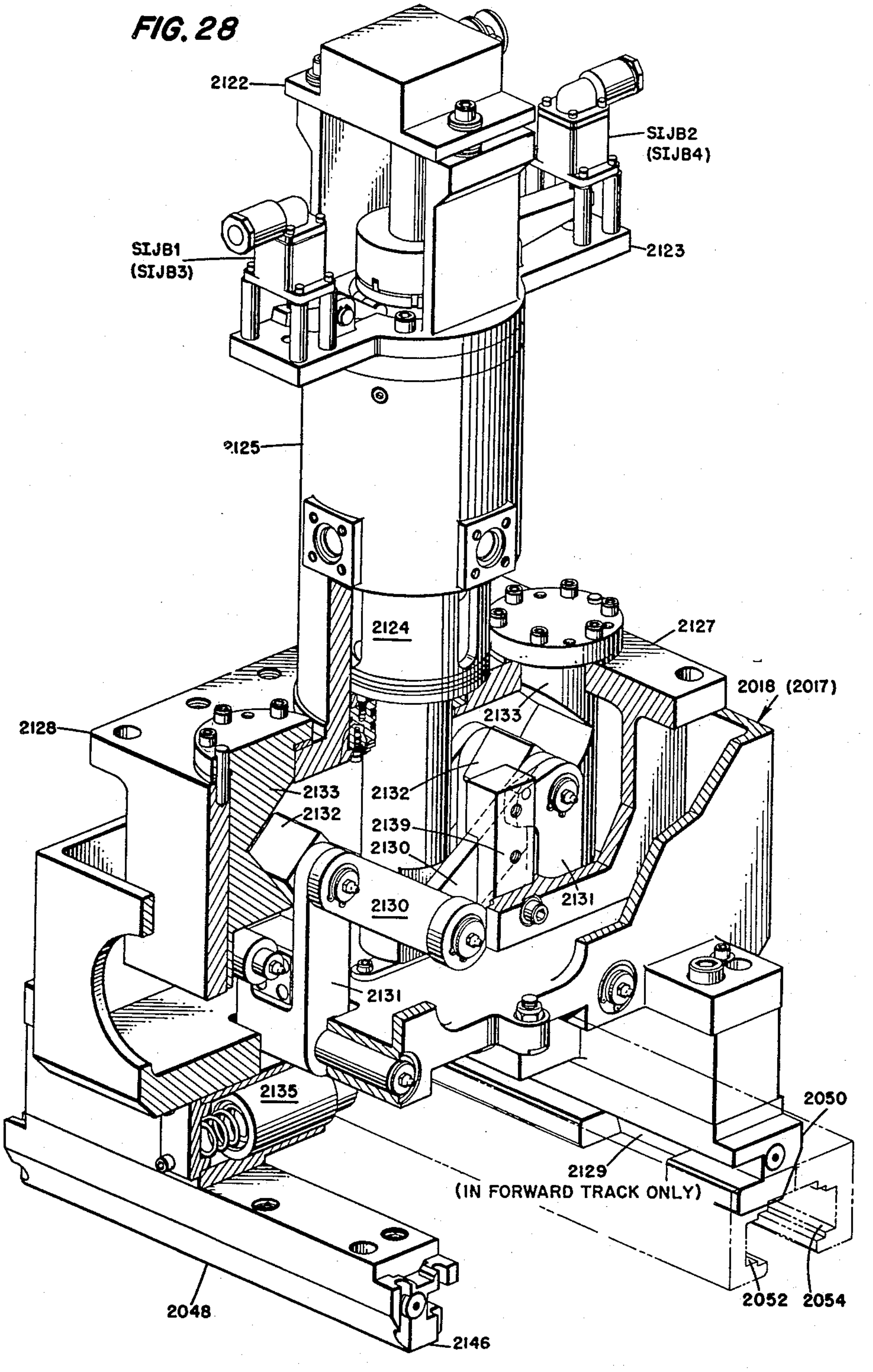
Figure 29:
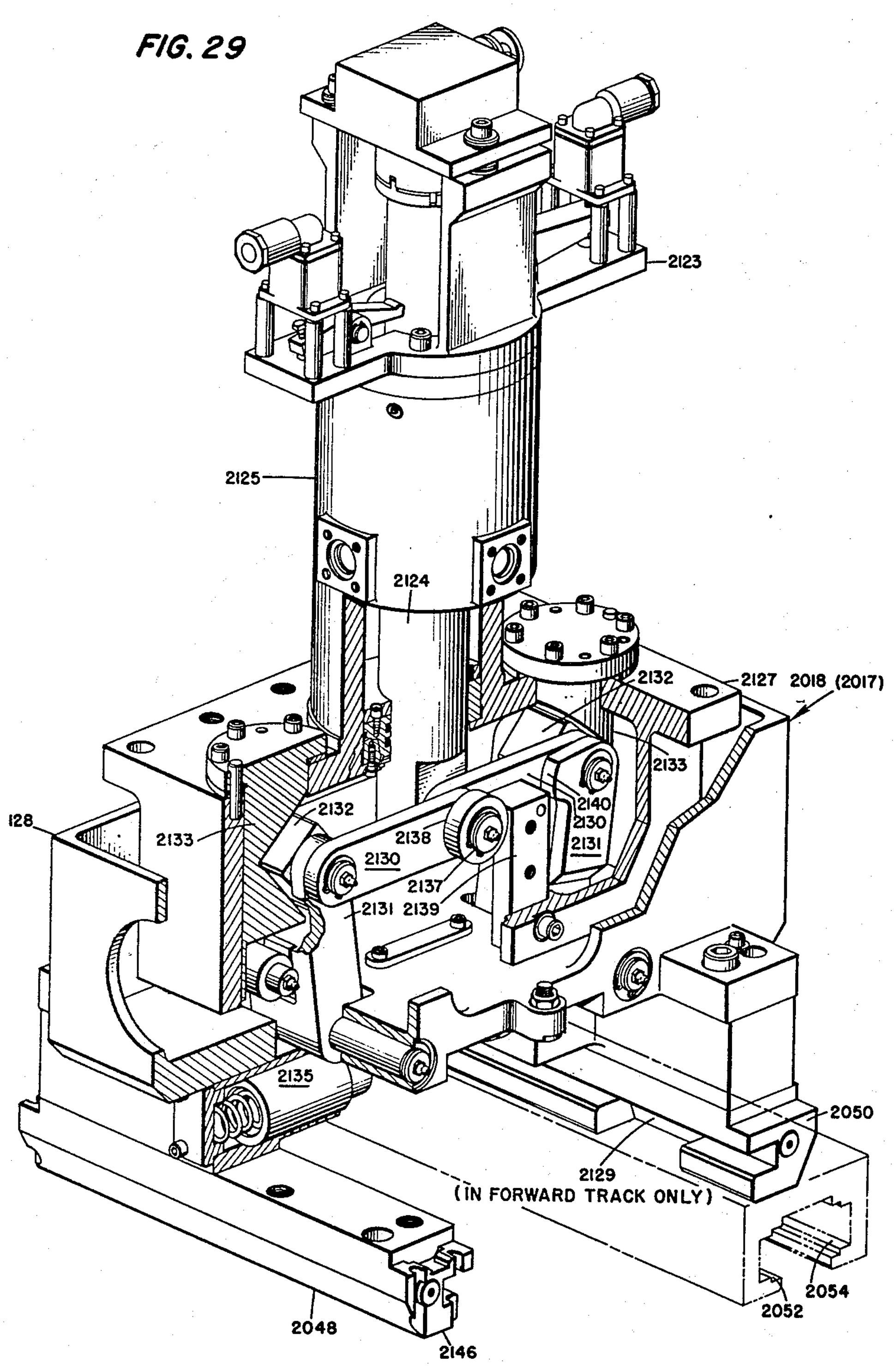
Figure 30:
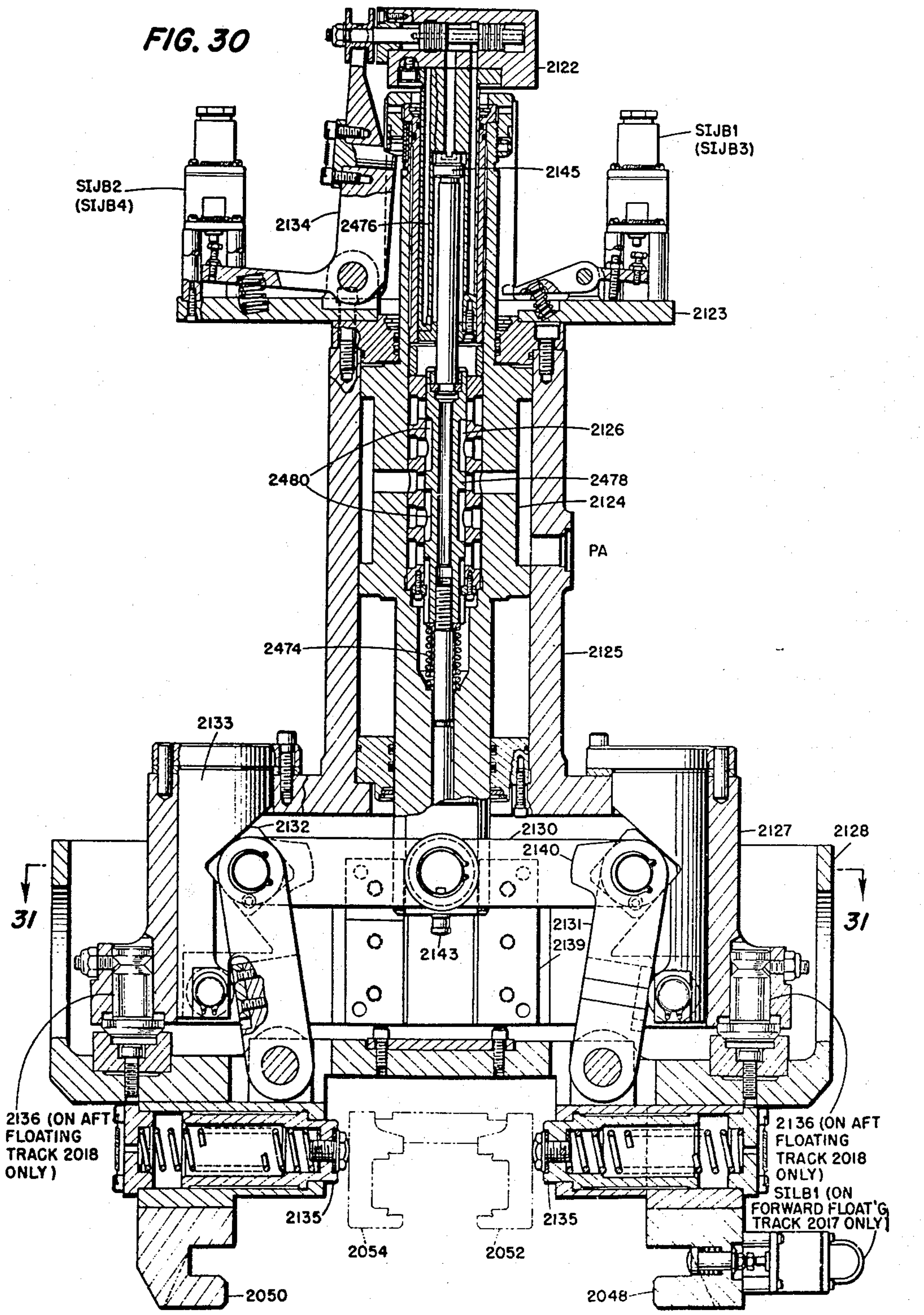
Figure 32:
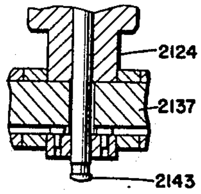
Figure 31:
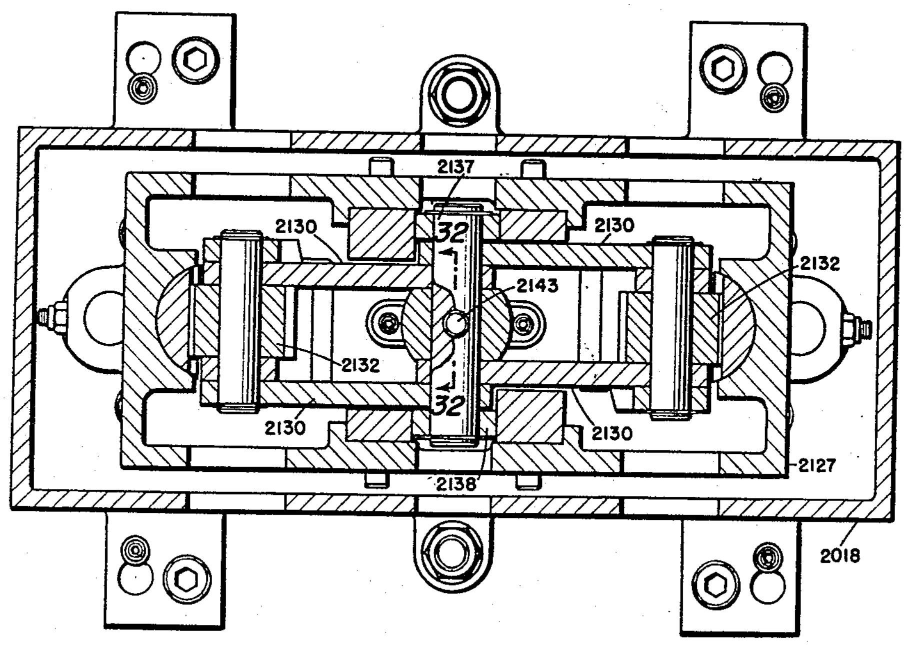
Figure 33:
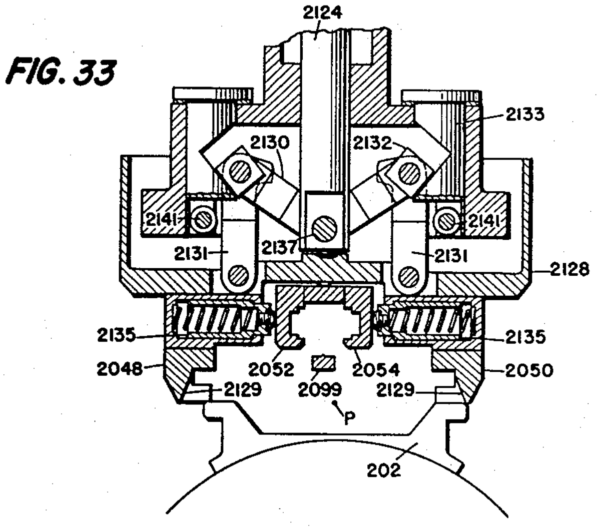
Figure 34:
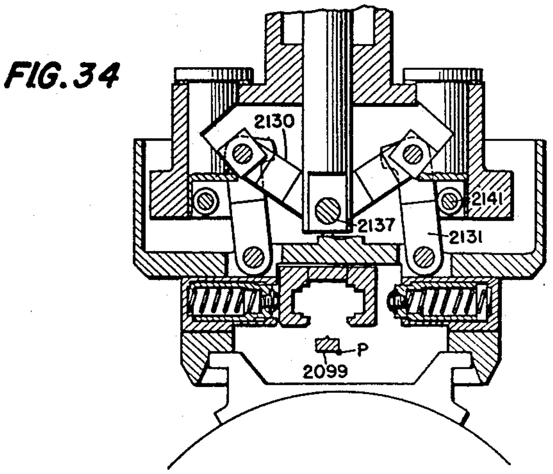
Figure 35:
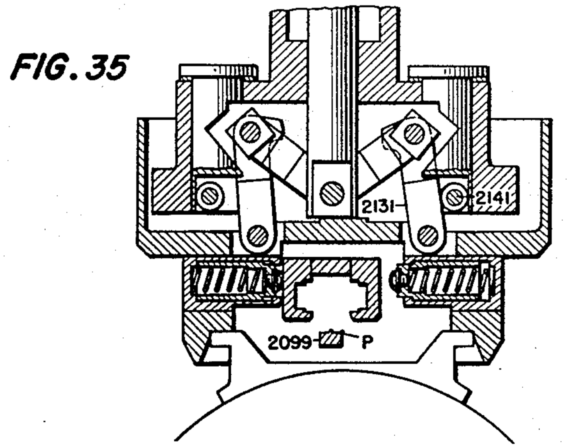
Figure 36:
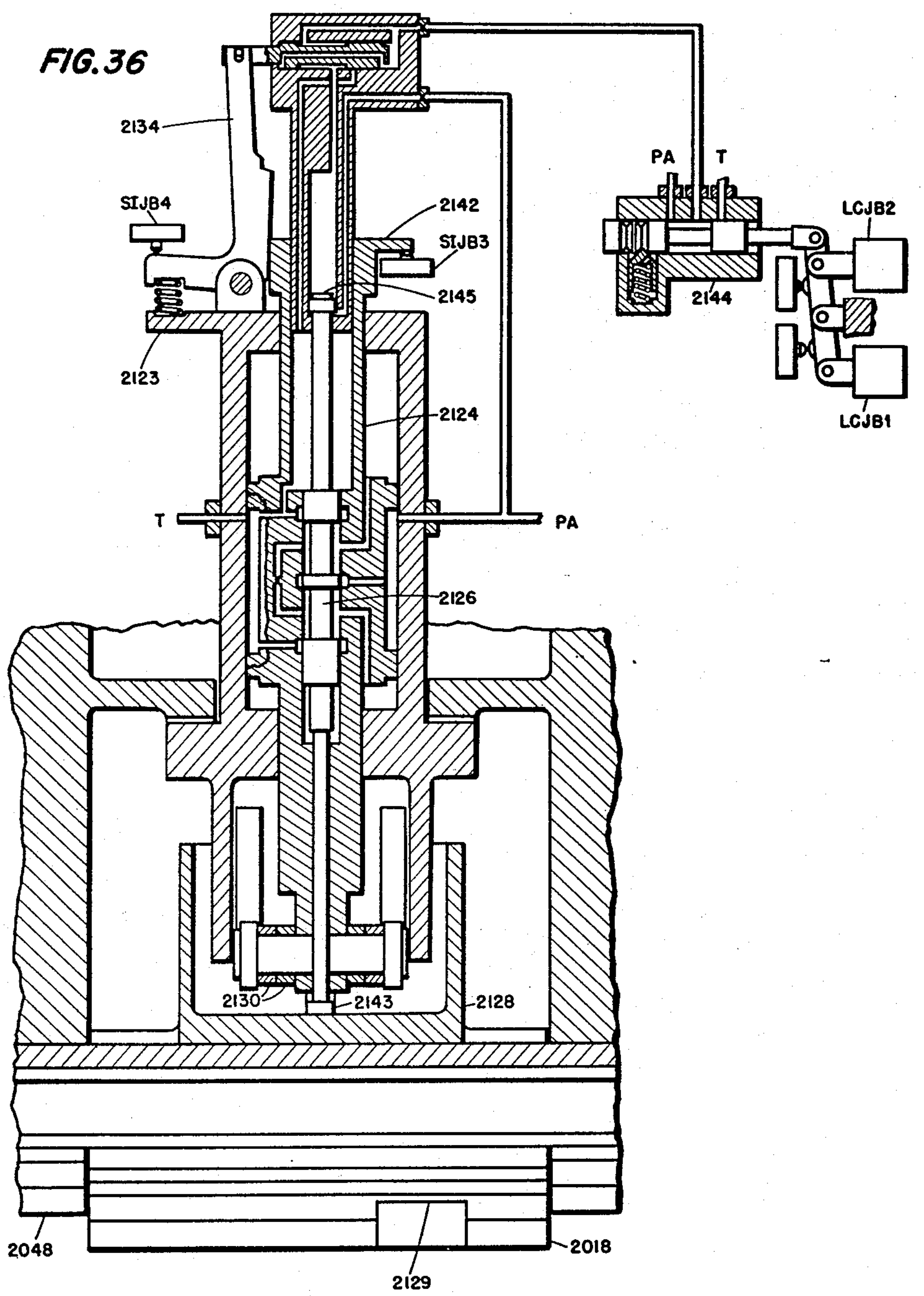
Figure 37:
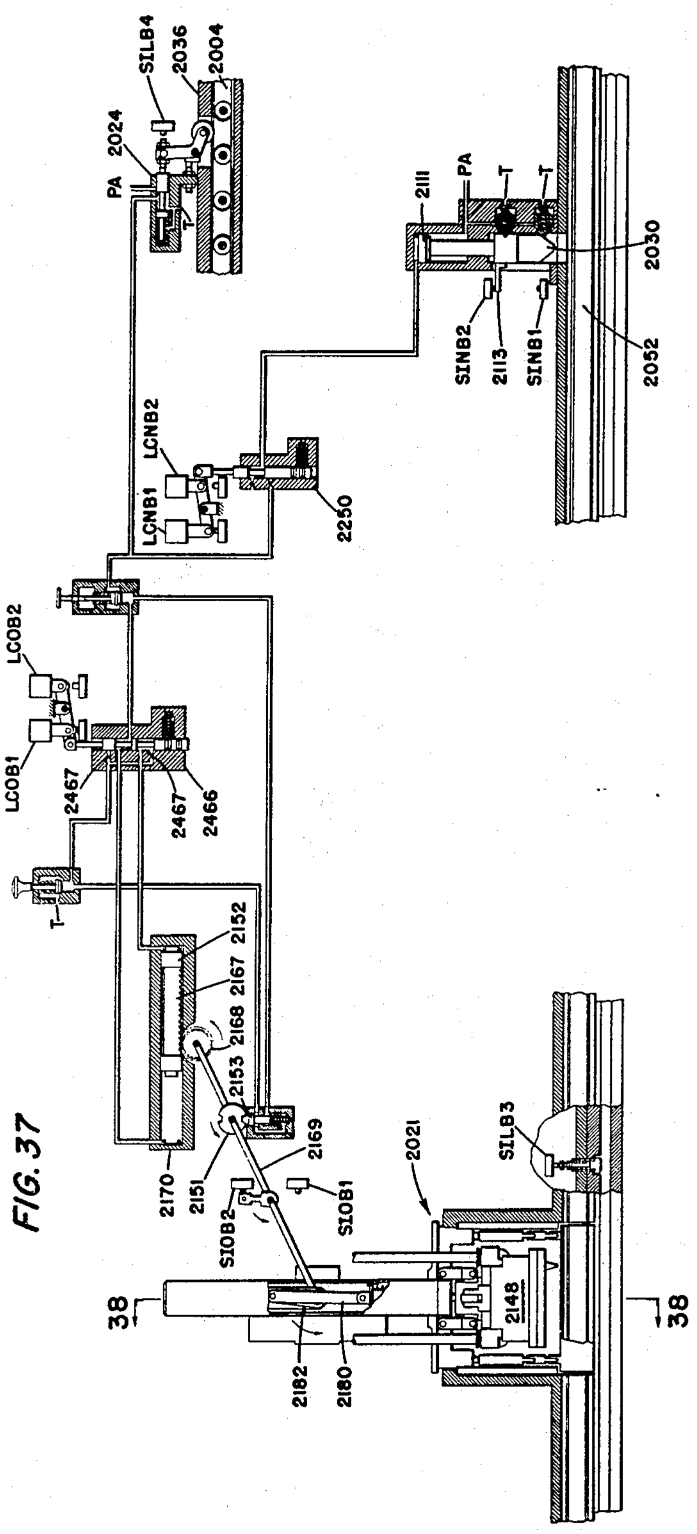
Figures 38, 74:
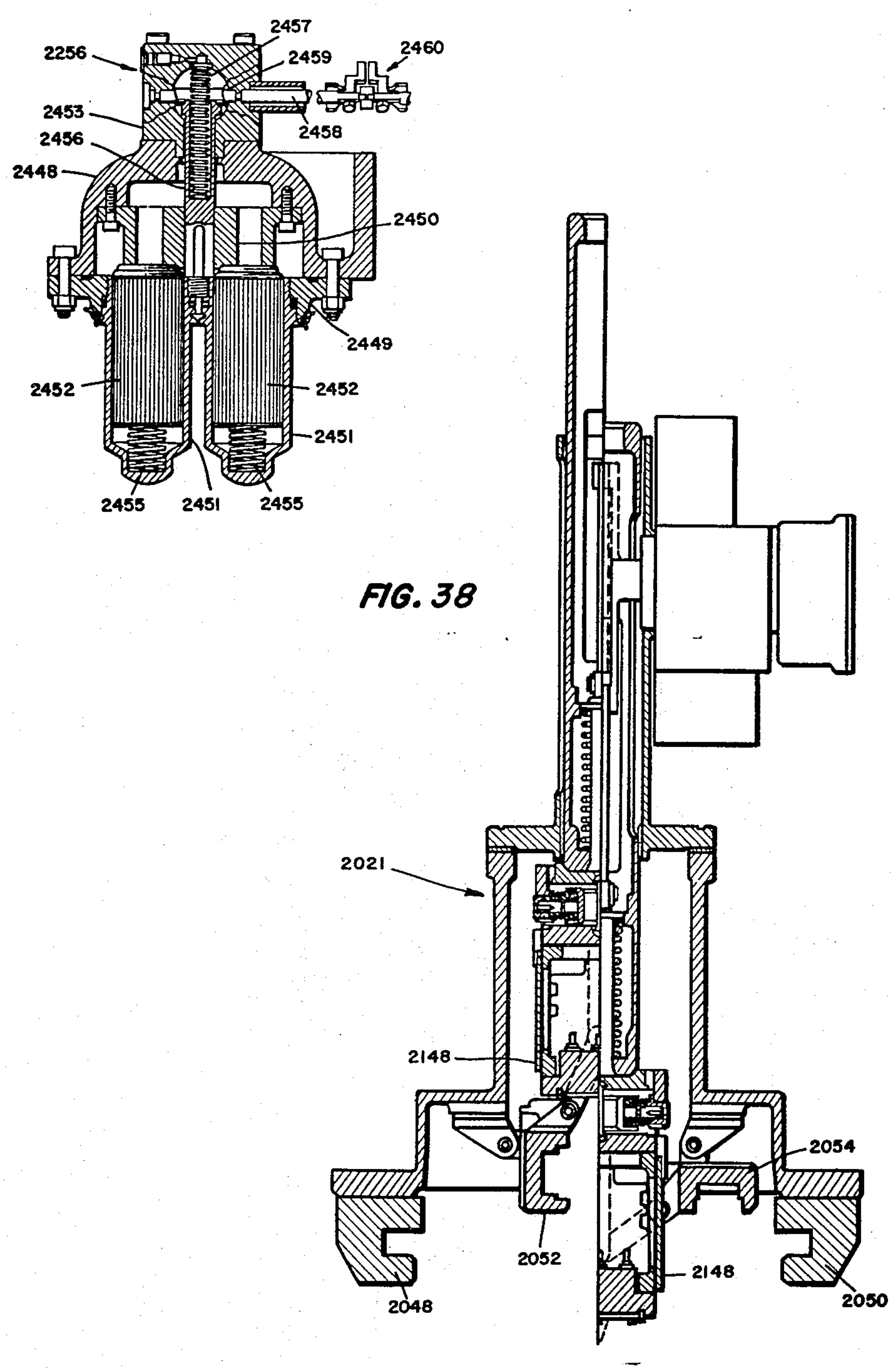
Figure 39:
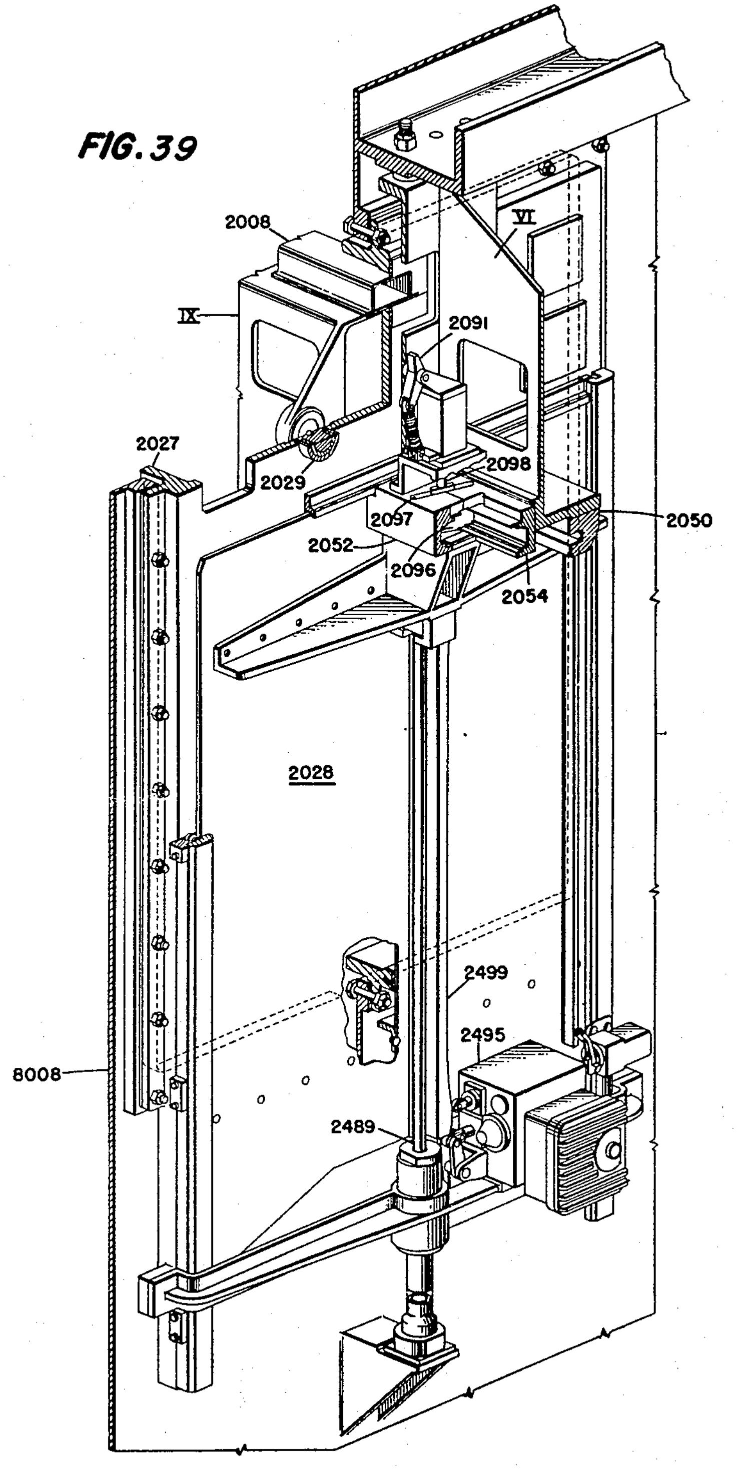
Figure 40:
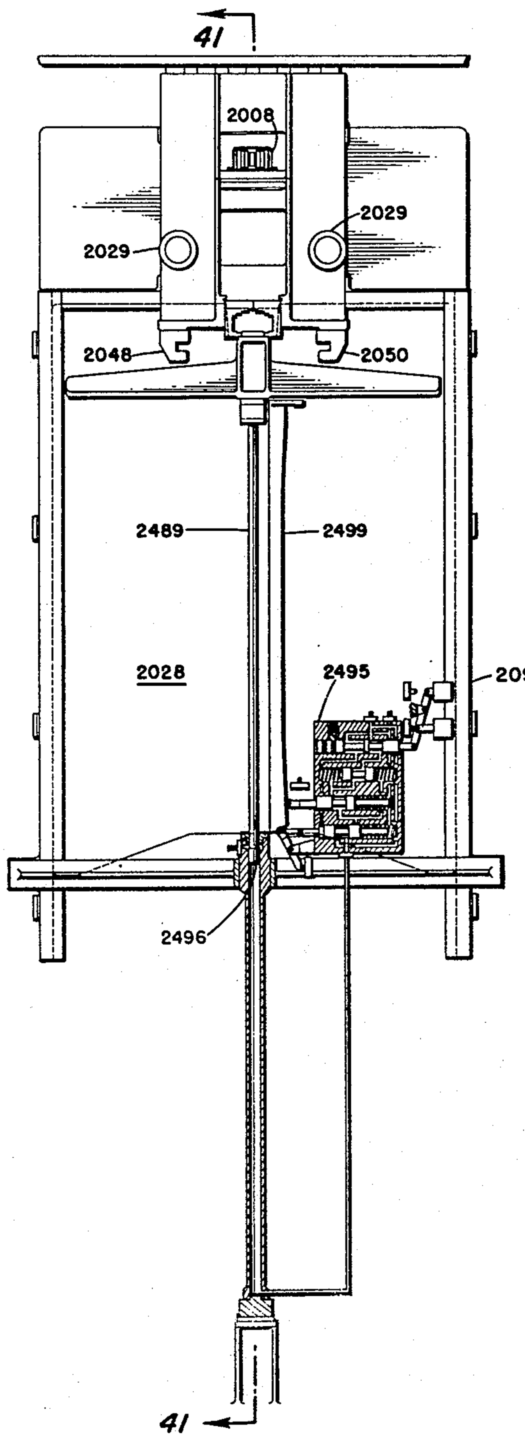
Figure 41:
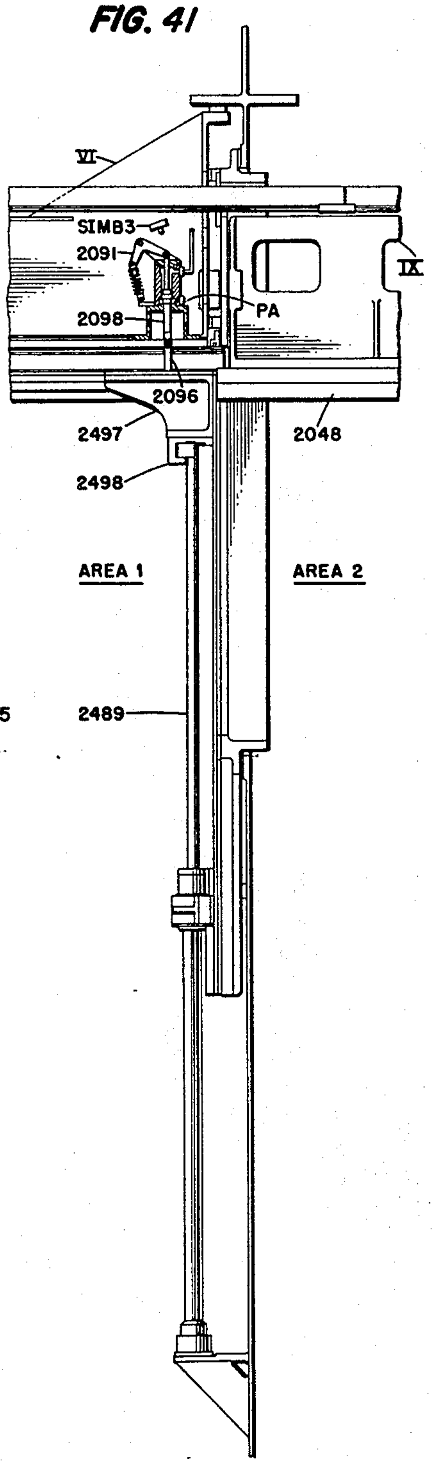
Figure 42:
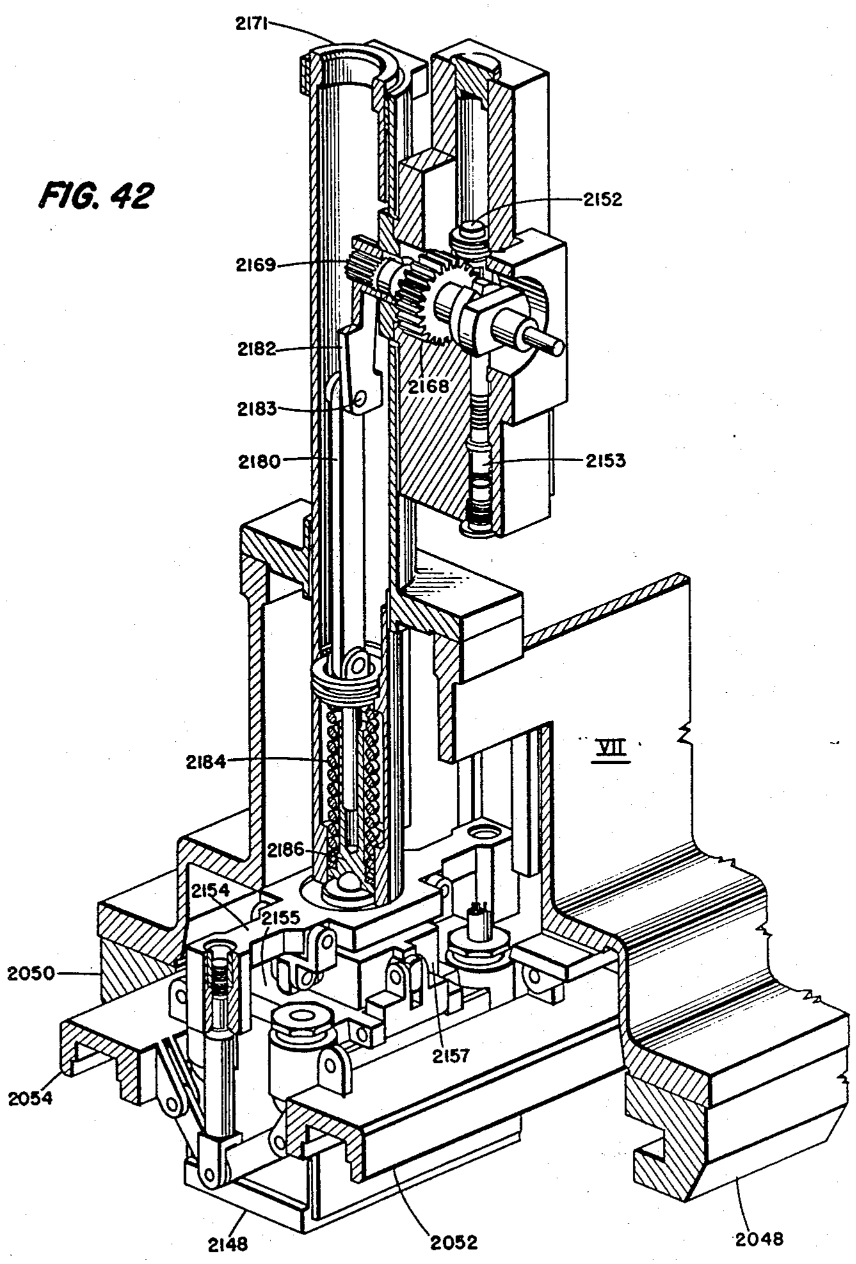
Figure 43:
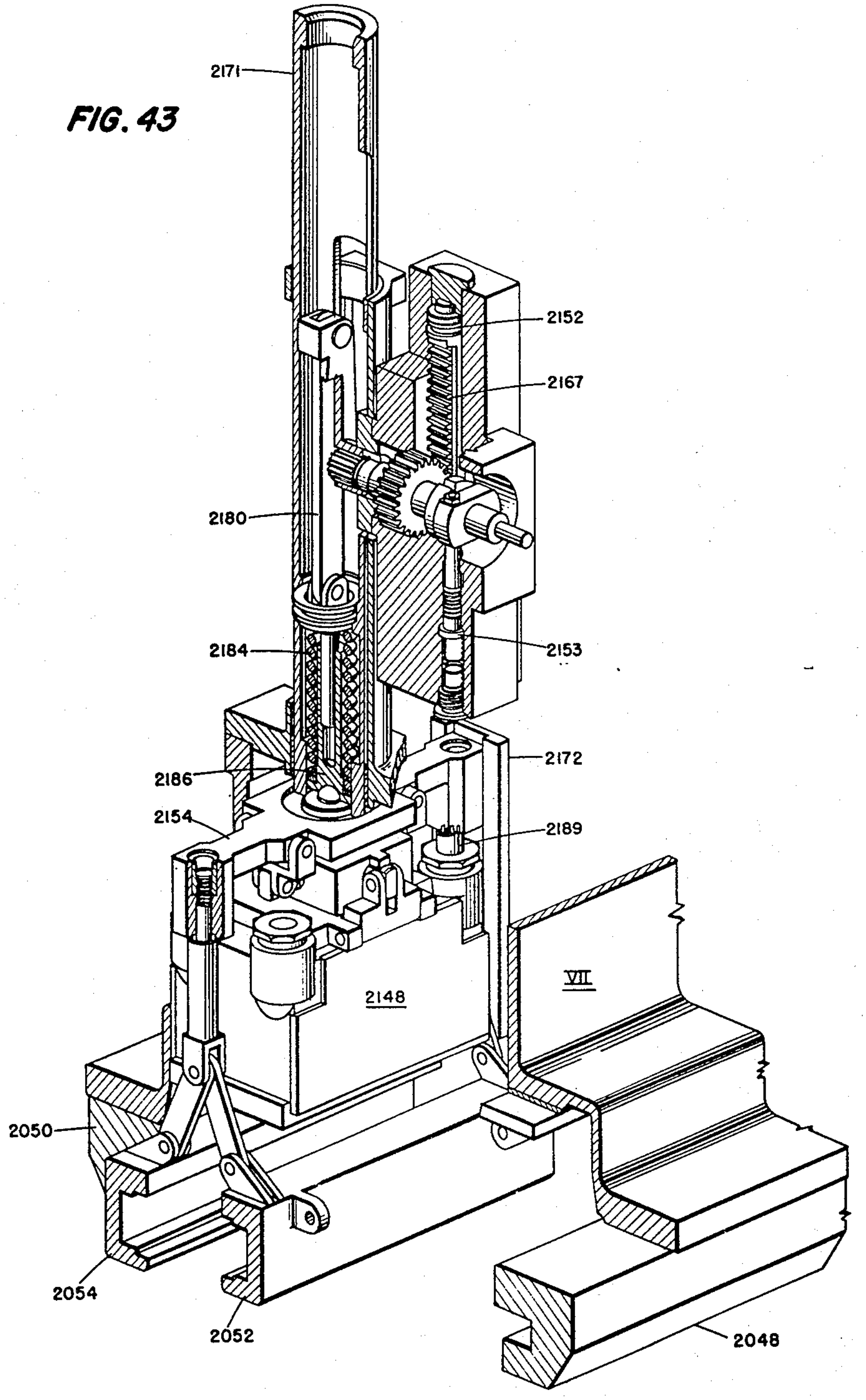
Figure 44:
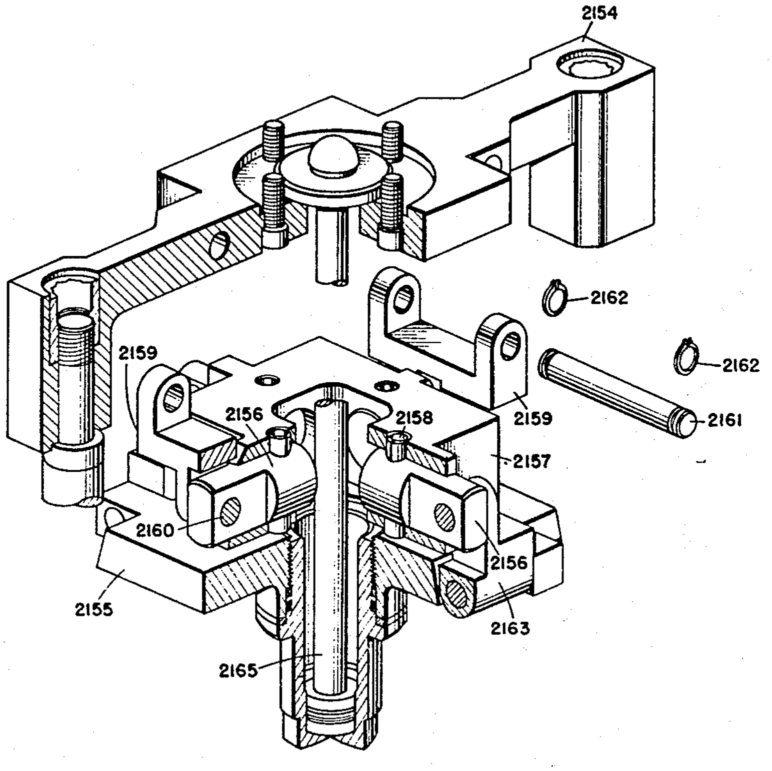
Figure 45:
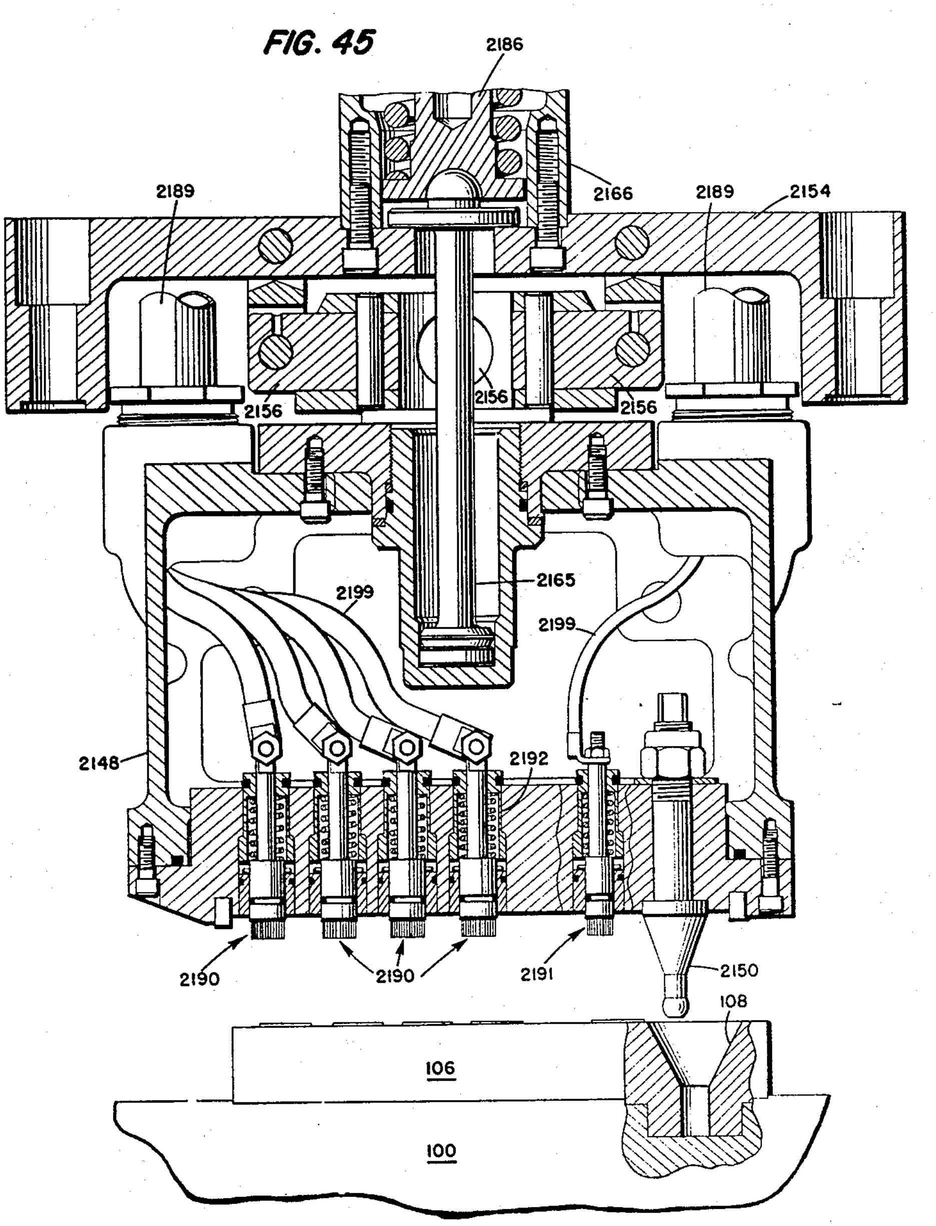
Figure 46:
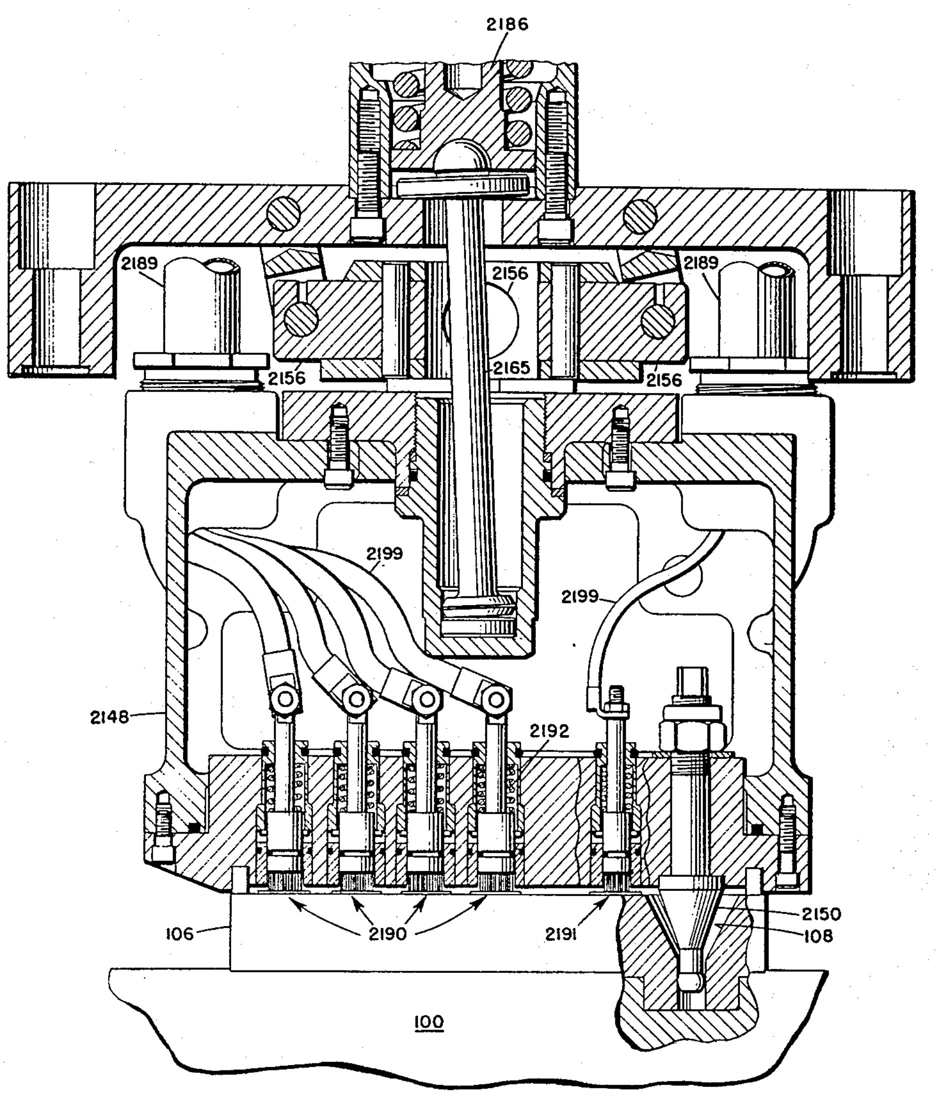
Figure 47:
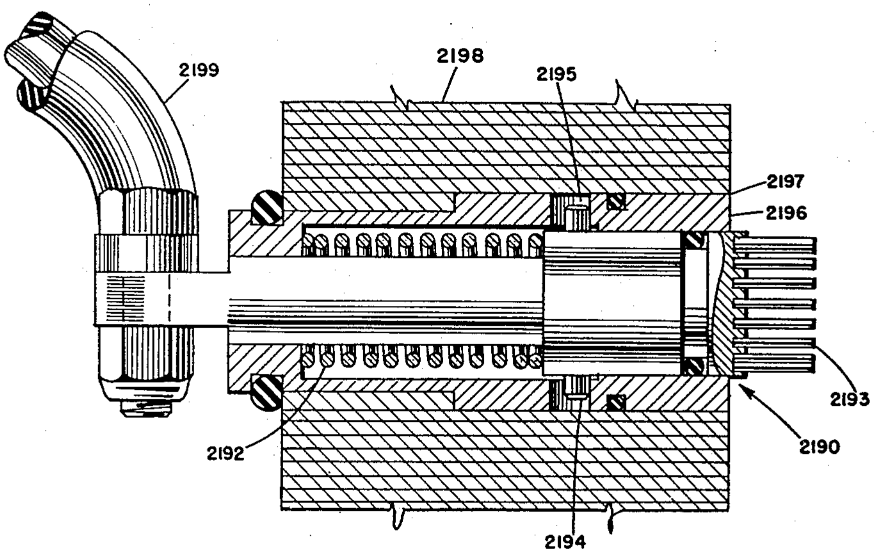
Figure 48:
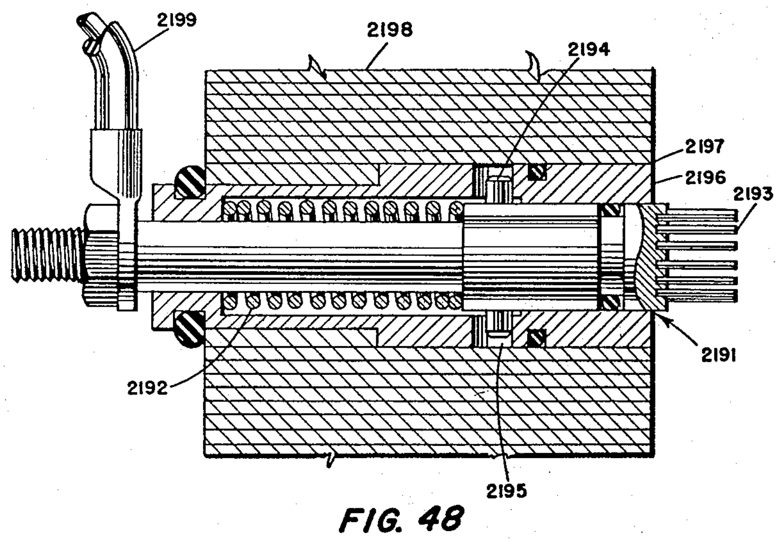
Figures 49, 50:
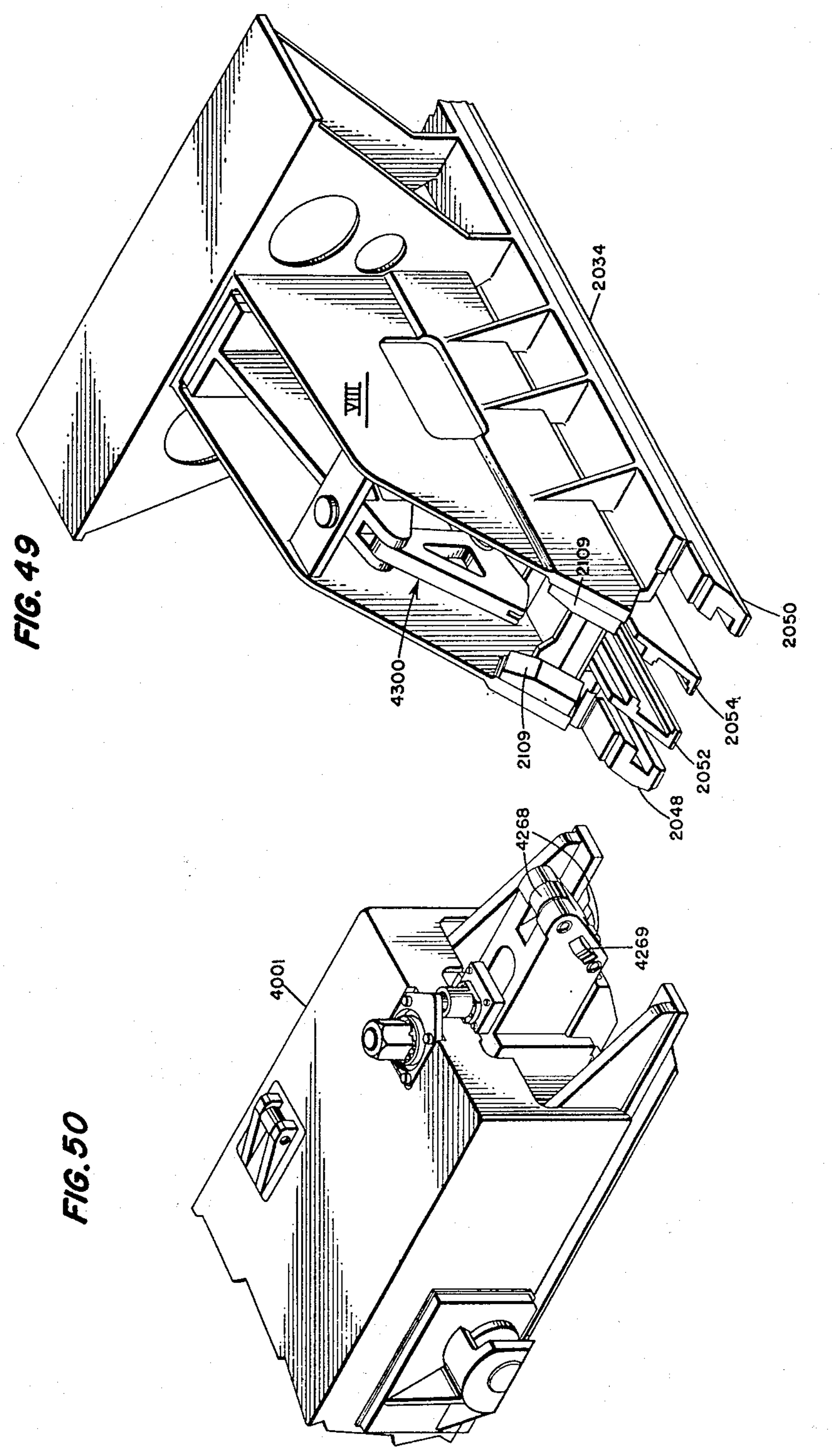
Figure 51:
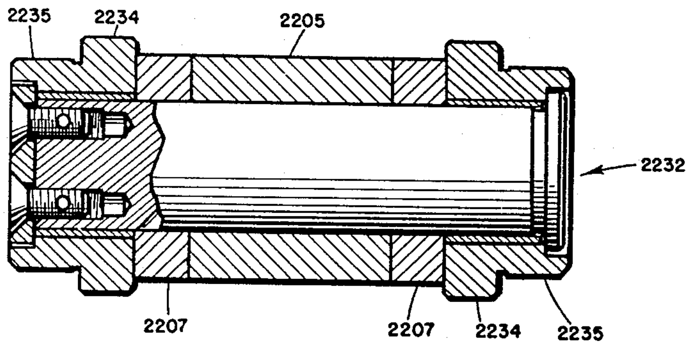
Figure 52:
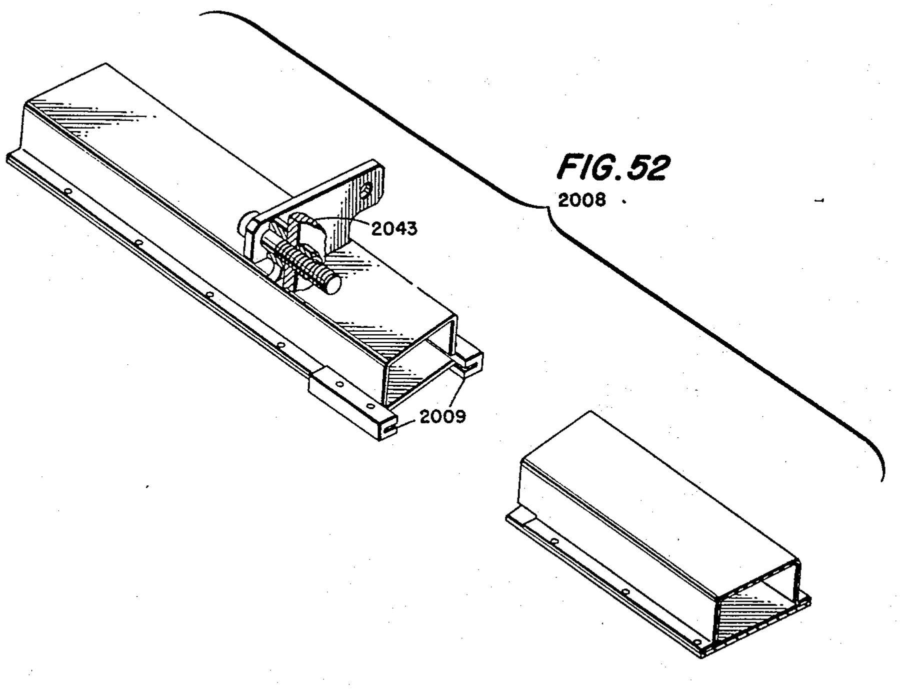
Figures 53, 54, 55:
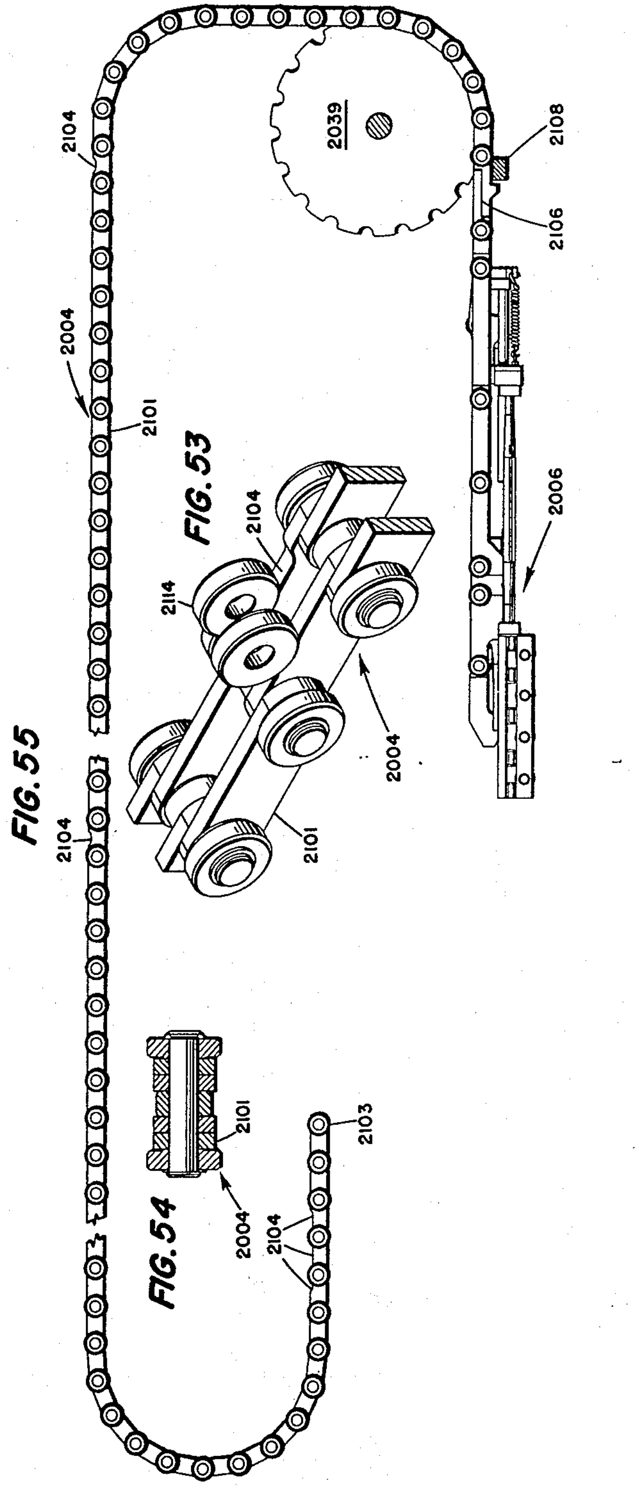
Figure 56:
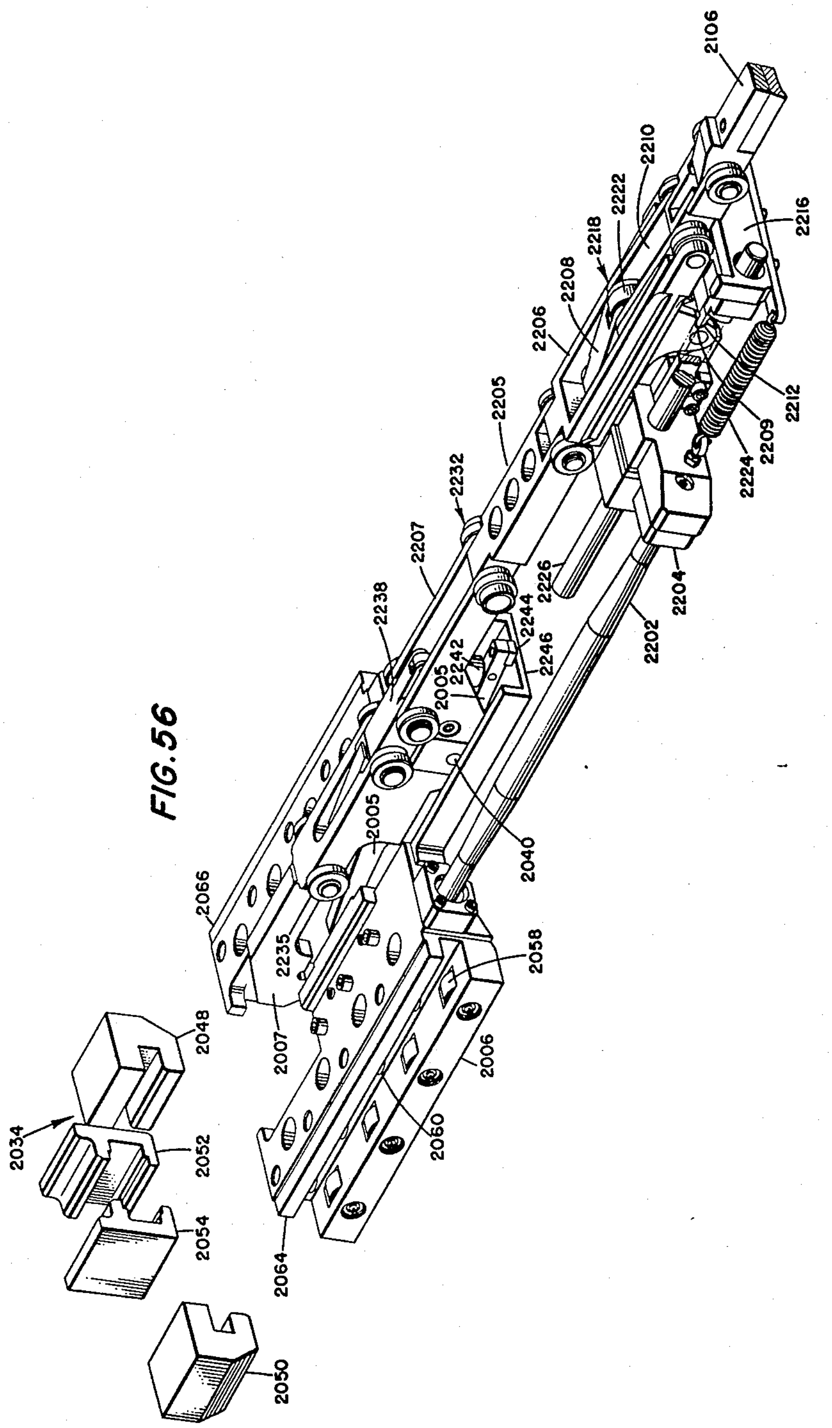
Figure 57:
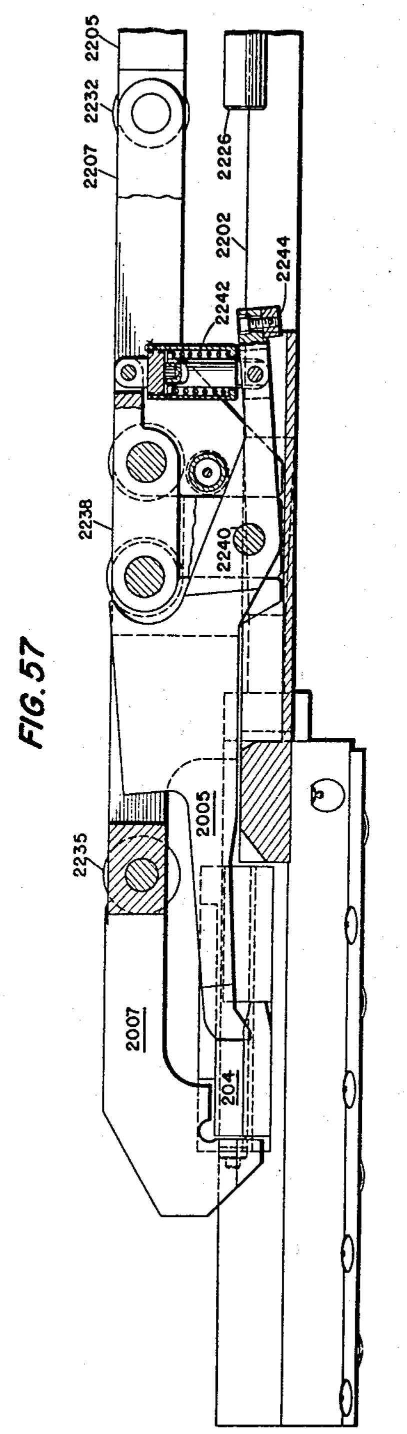
Figure 57A:
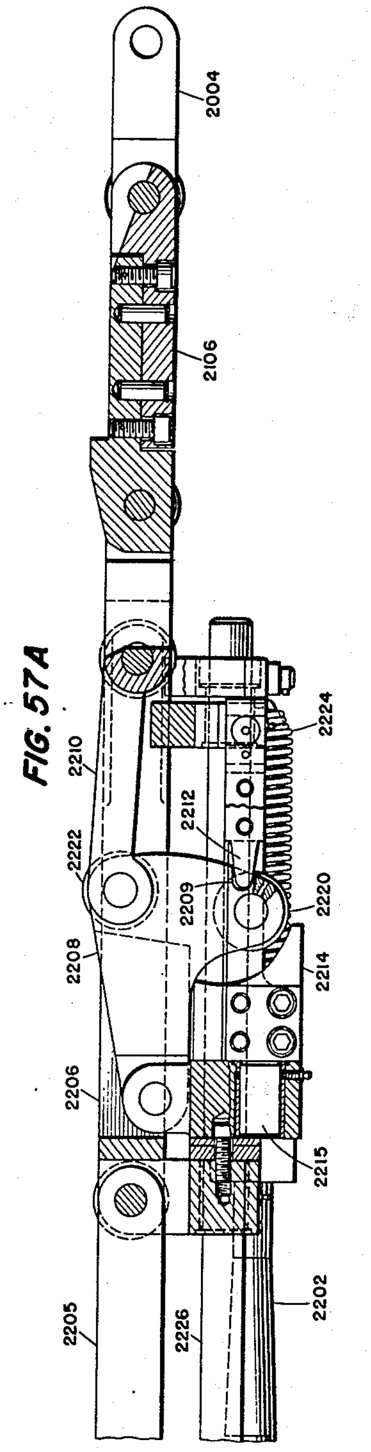
Figure 58:
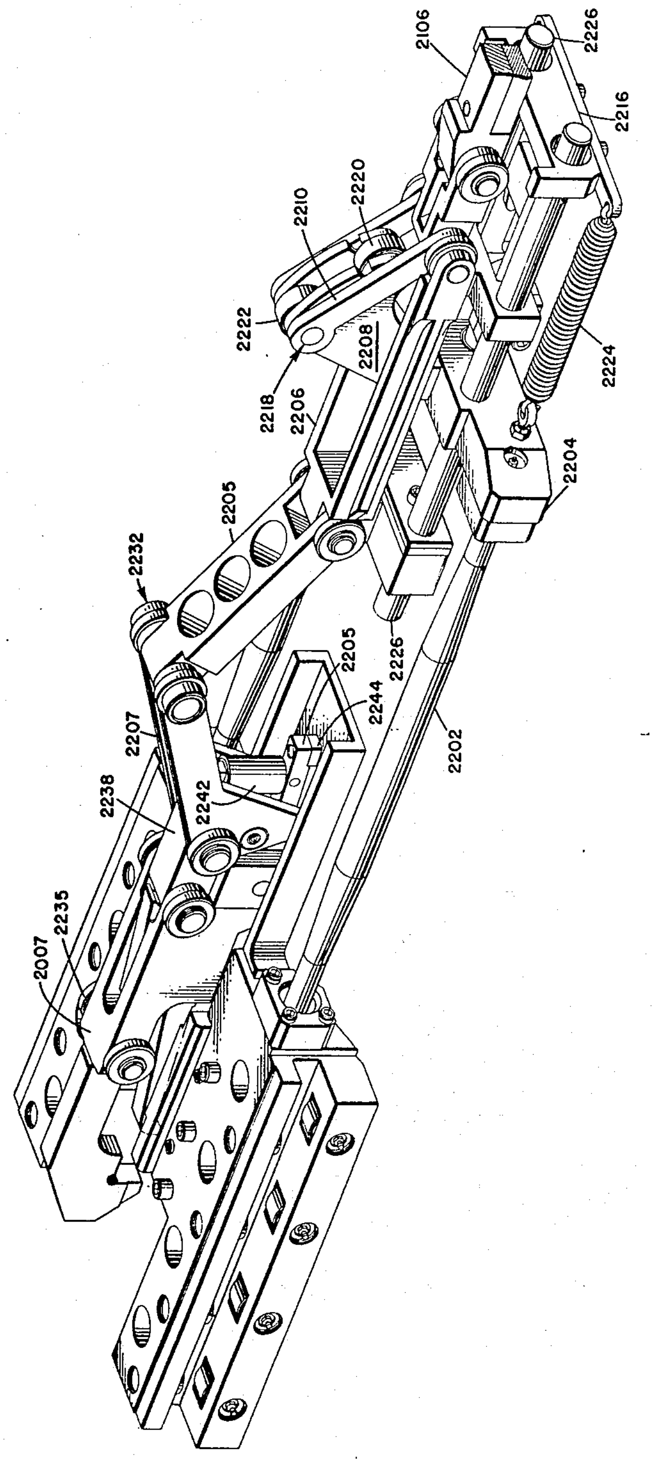
Figure 59:
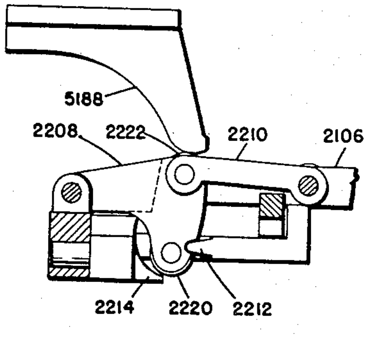
Figure 60:
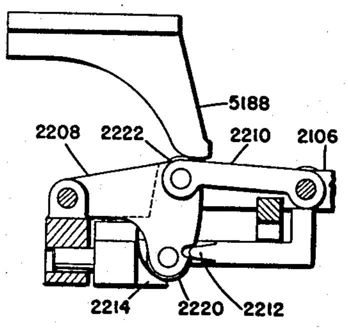
Figure 61:
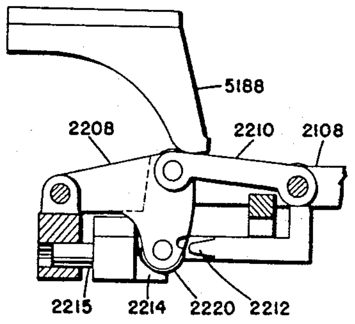
Figure 62:
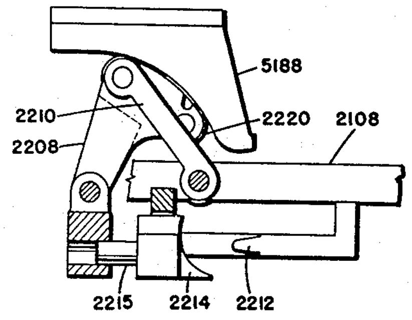
Figure 63:
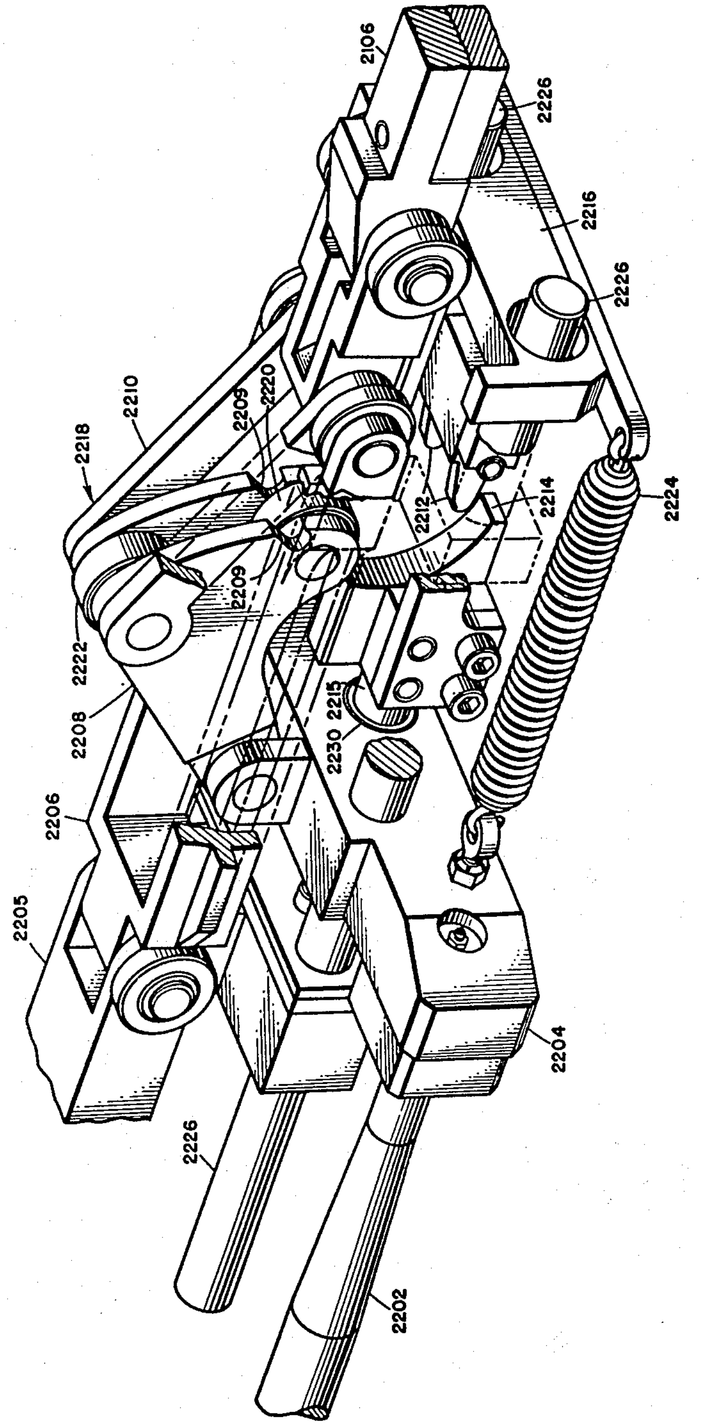
Figure 64:
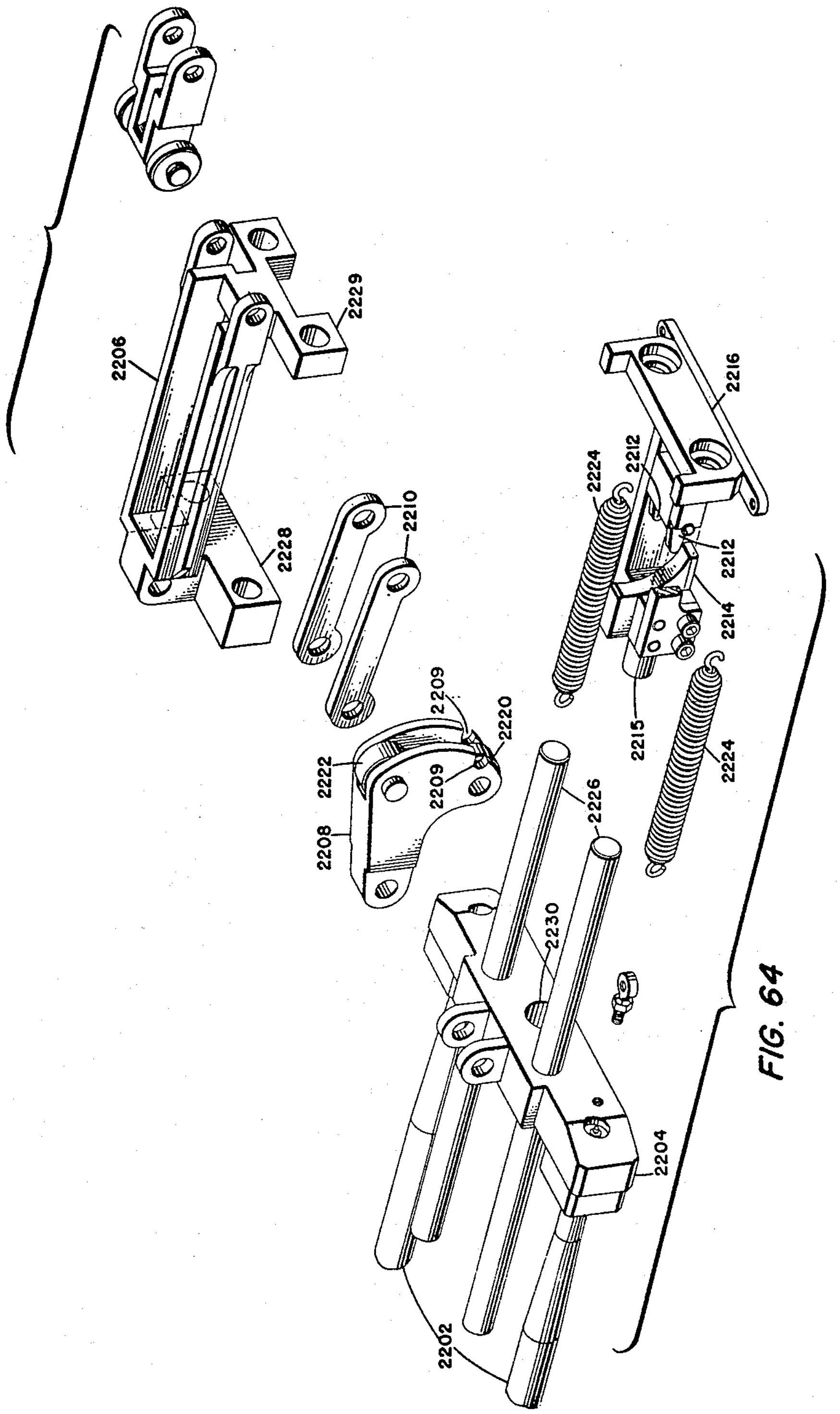
Figure 65:
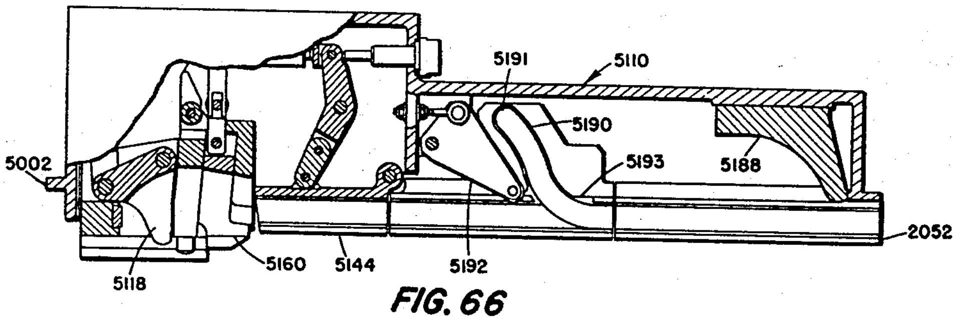
Figure 66:
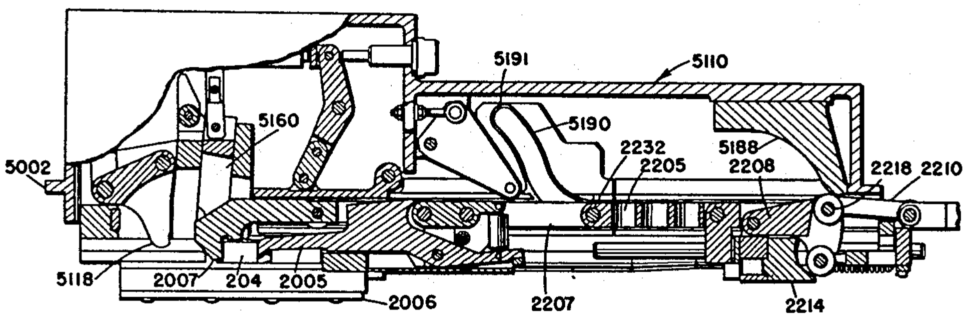
Figure 67:
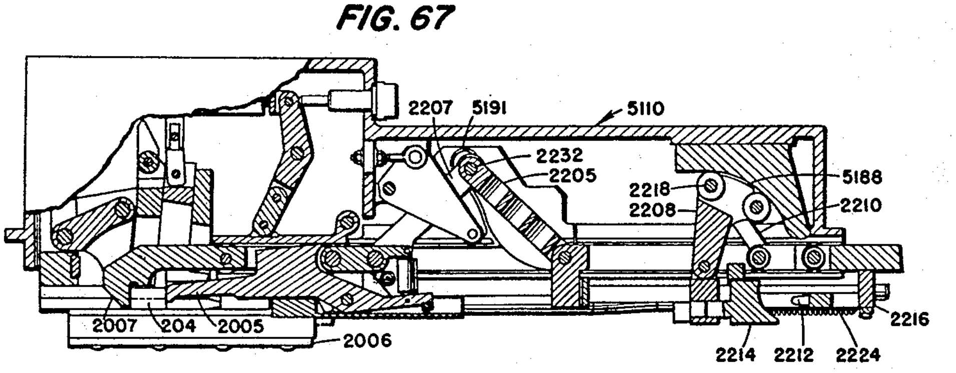
Figure 68:
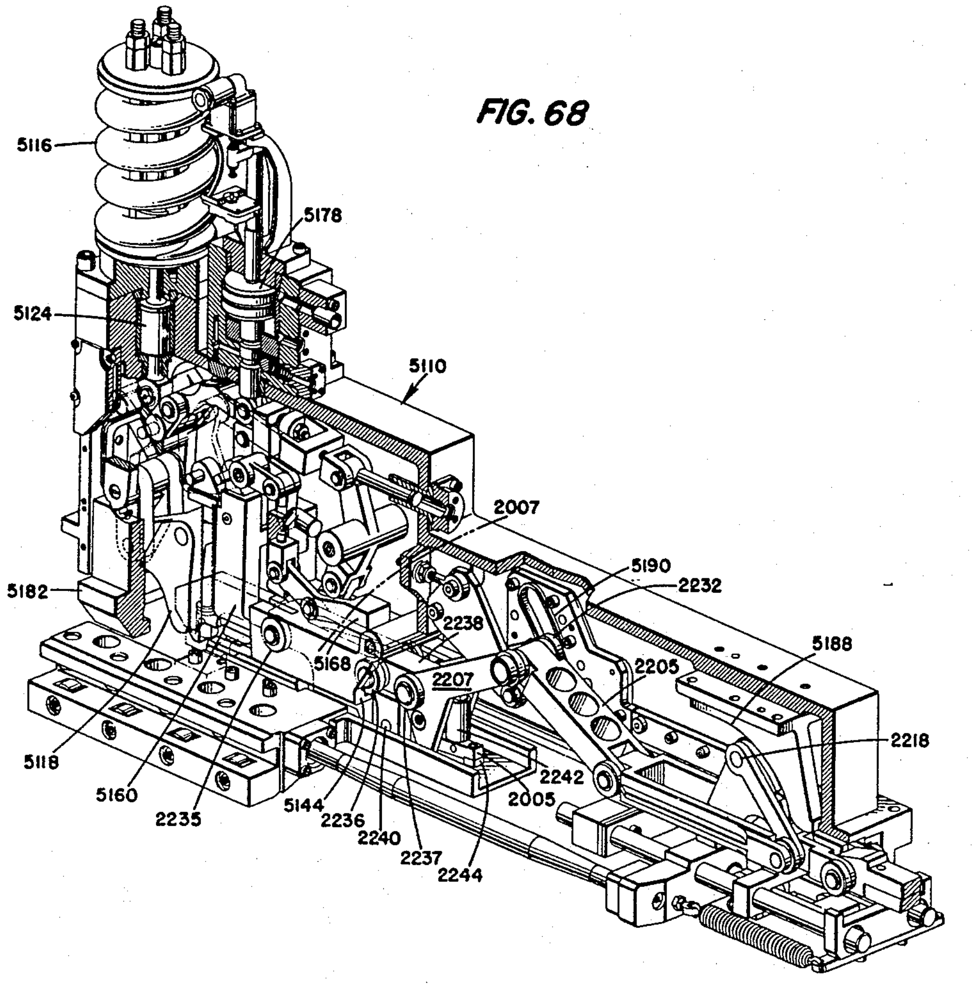
Figure 69:
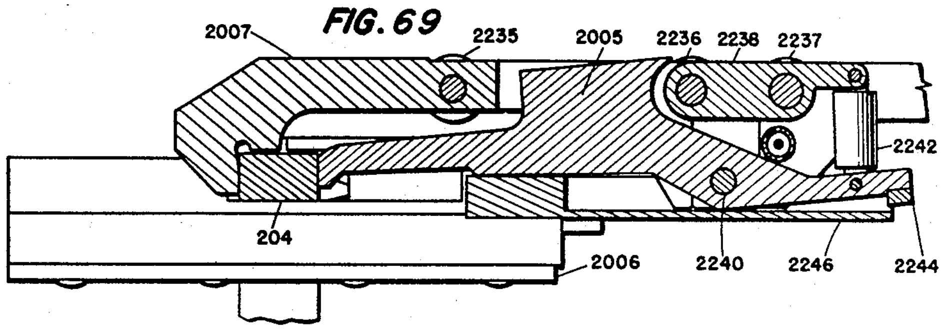
Figure 70:
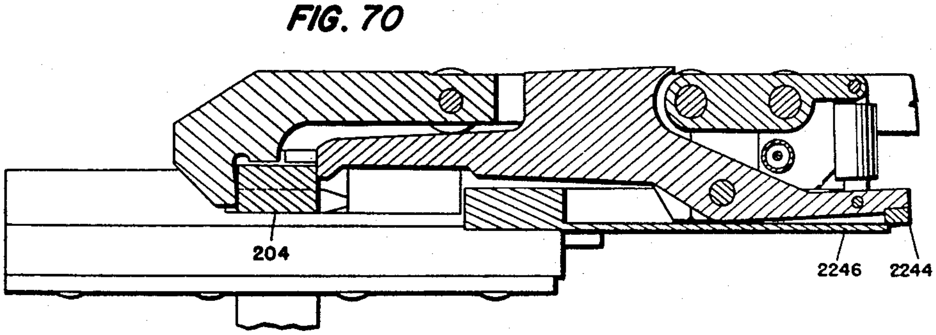
Figure 71:
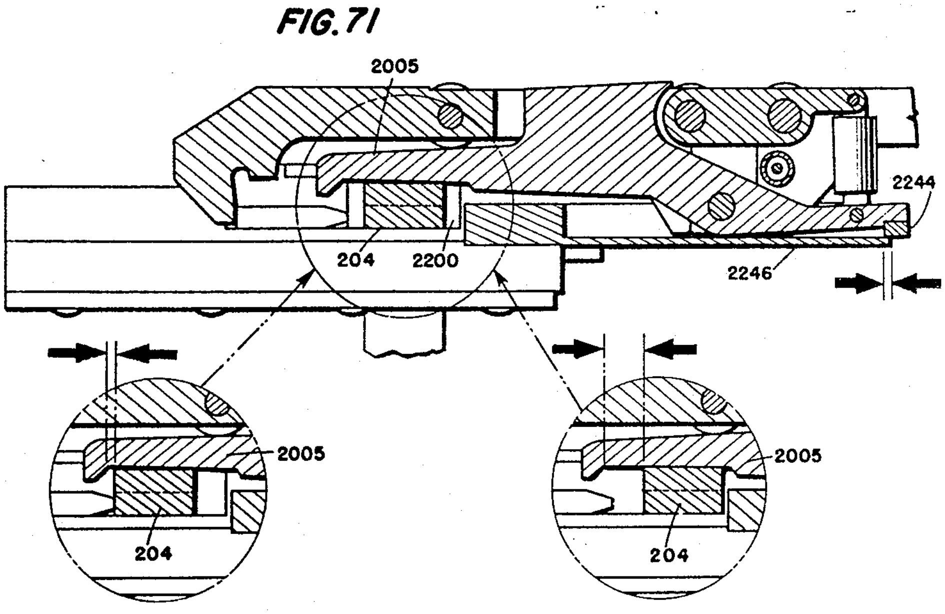
Figures 72, 72A:
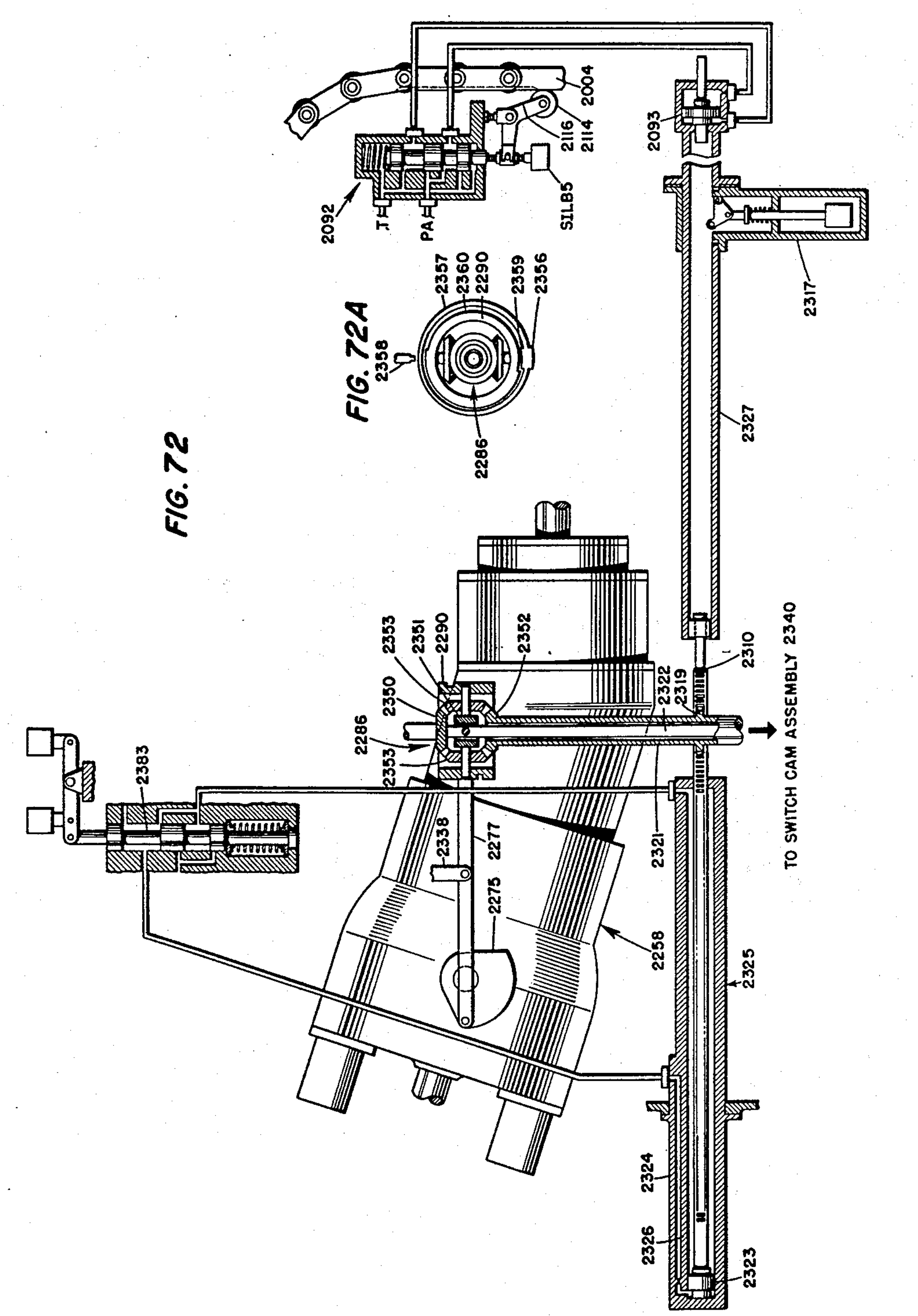
Figures 73, 106:
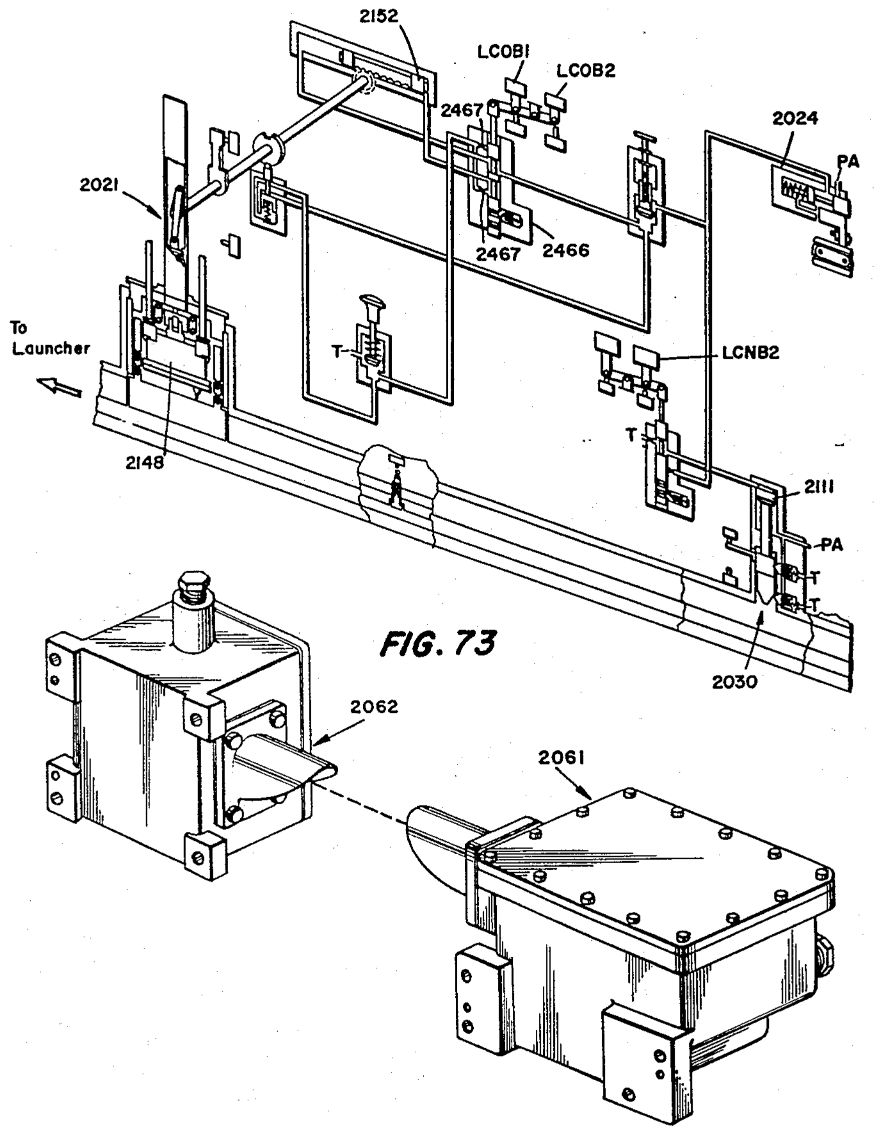
Figure 75:
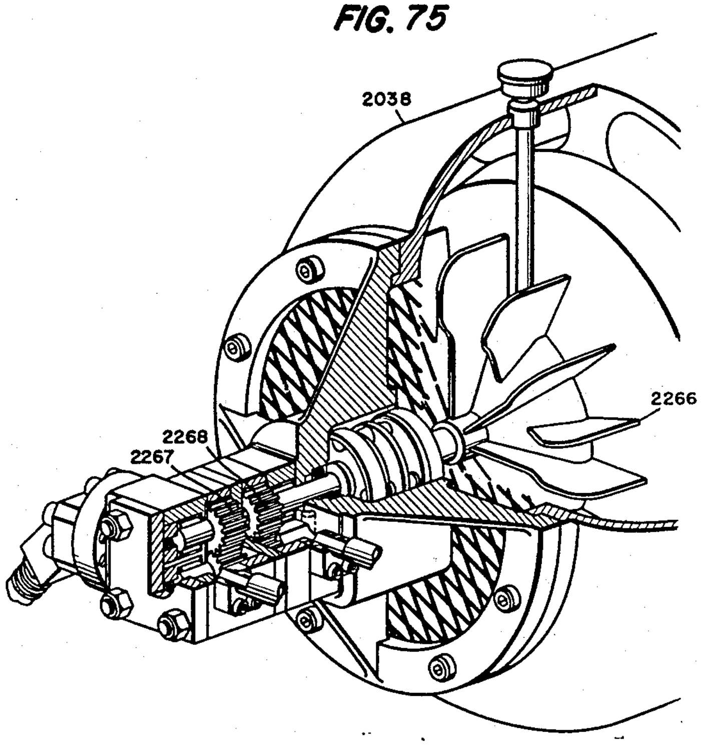
Figure 76:
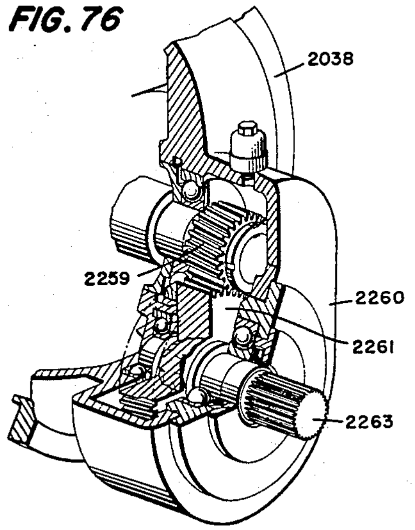
Figure 77:
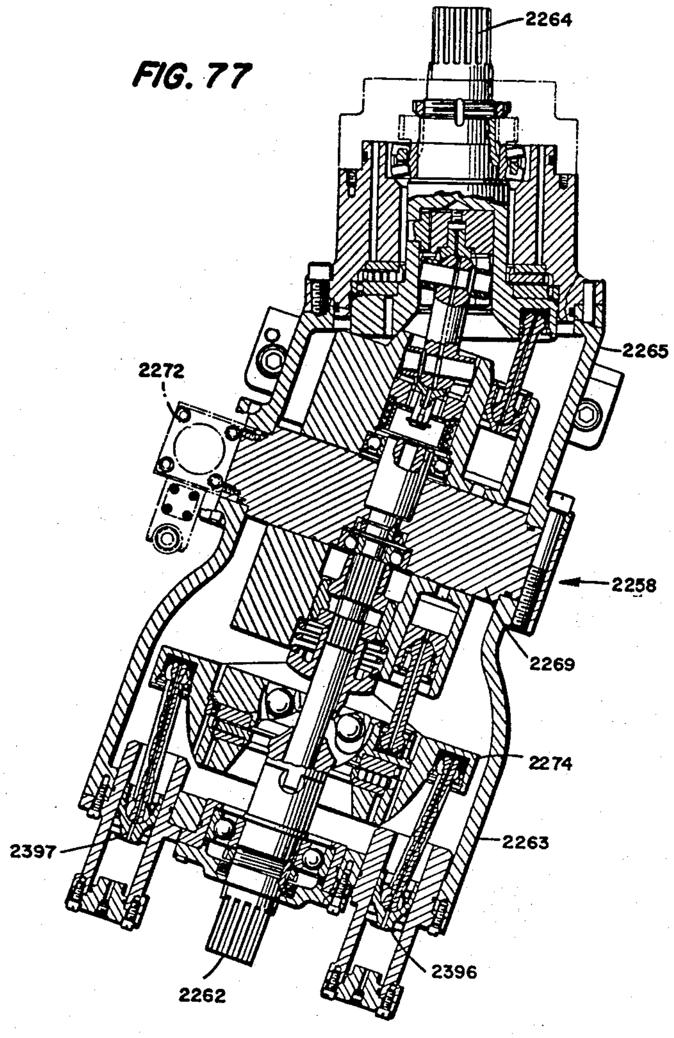
Figures 78, 78A:
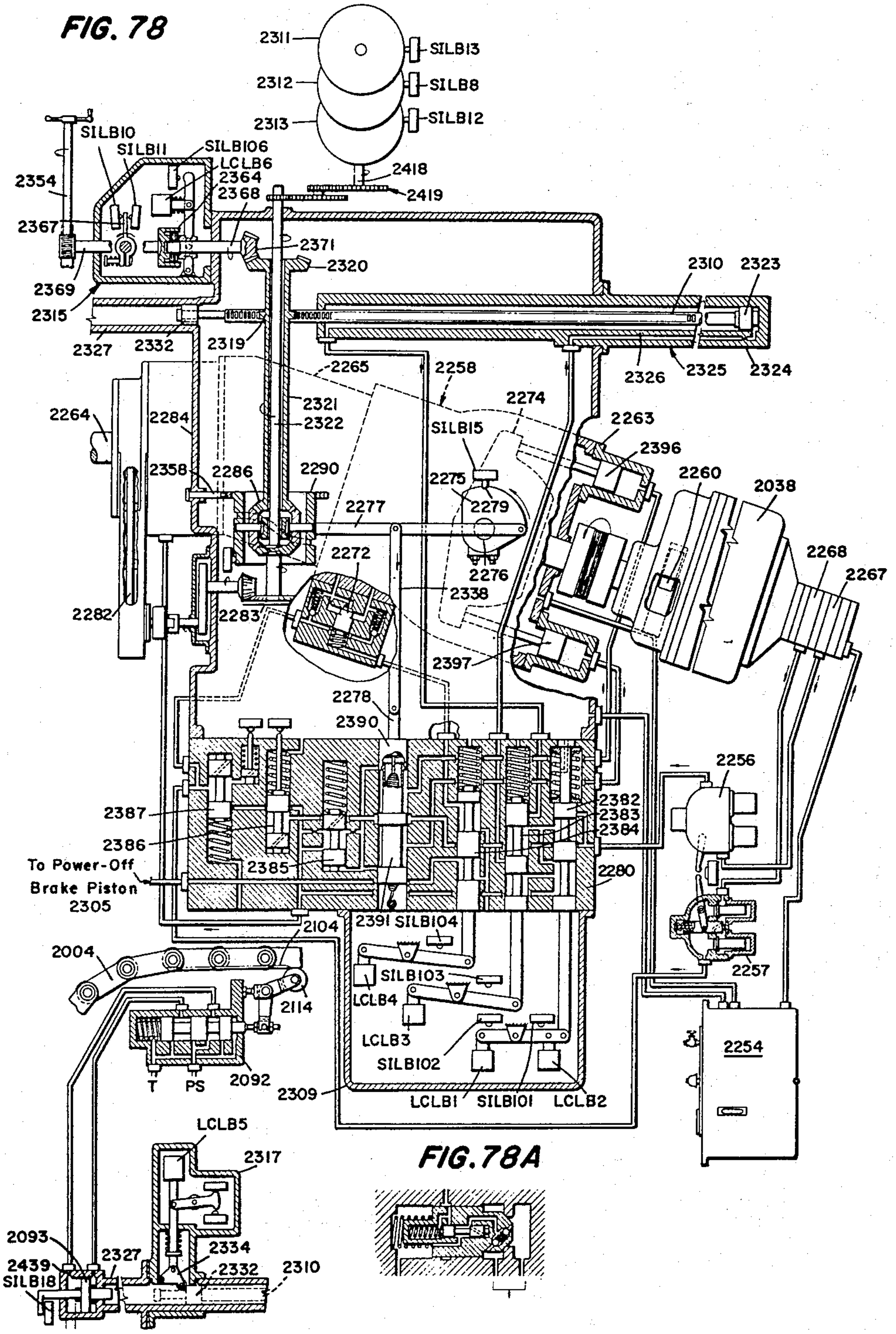
Figure 79:
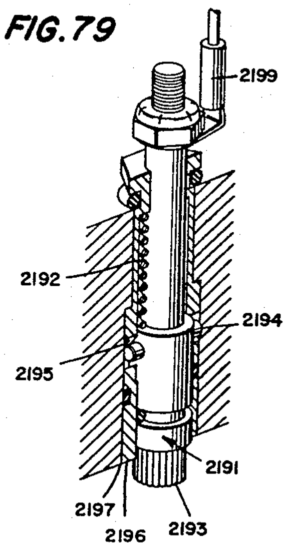
Figure 79A:
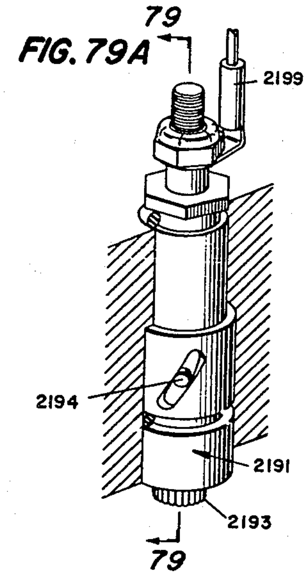
Figure 80:
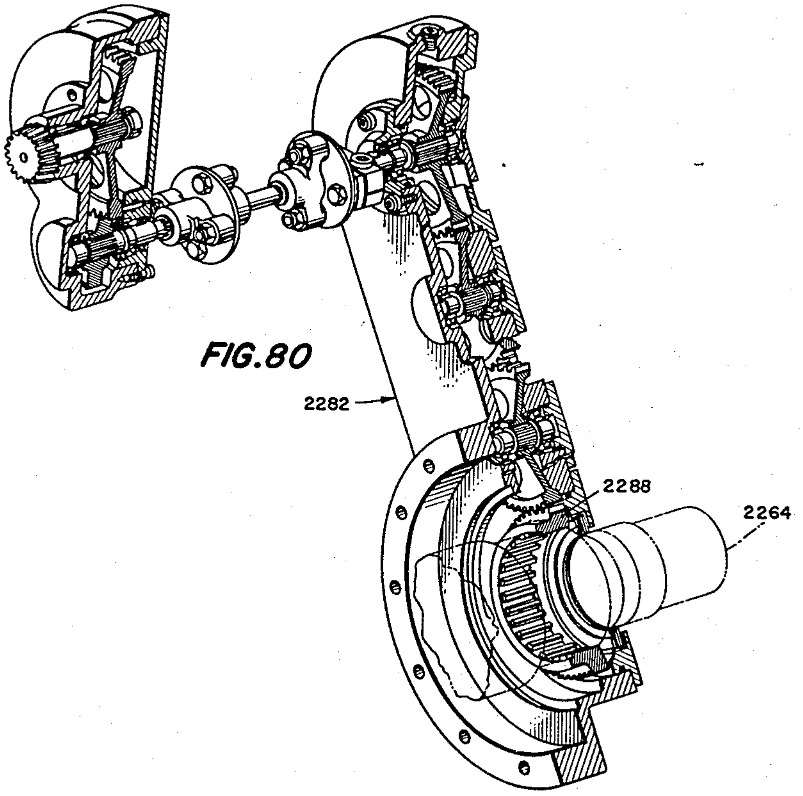
Figure 81:
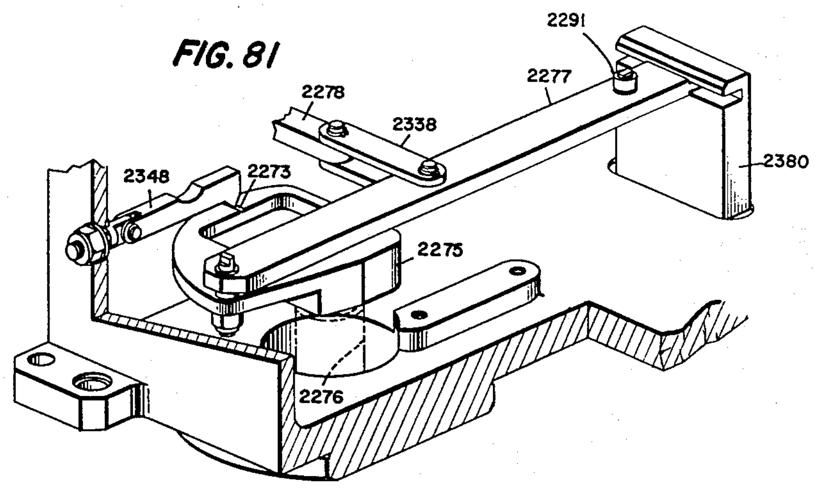
Figure 82:
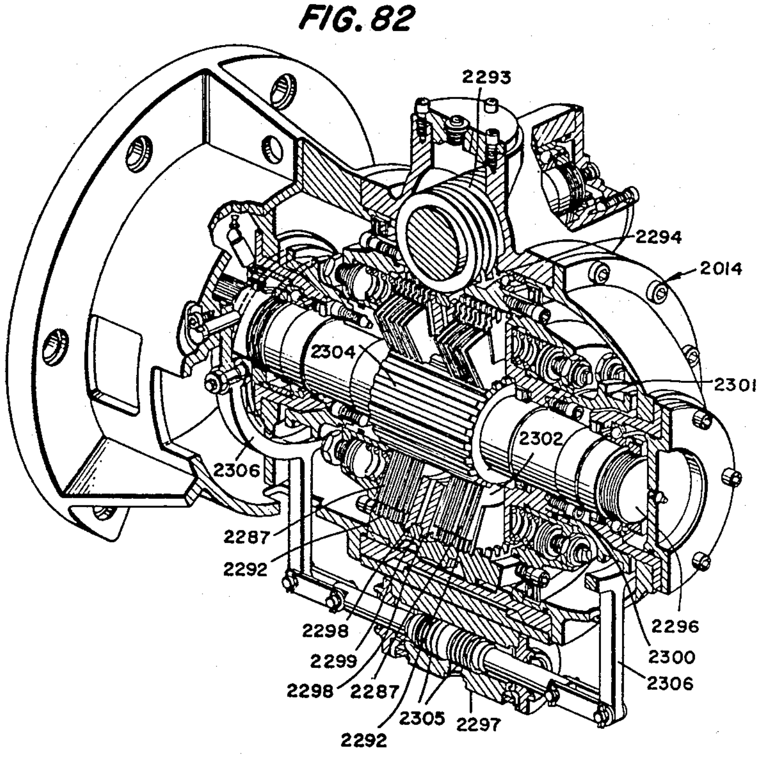
Figure 83:
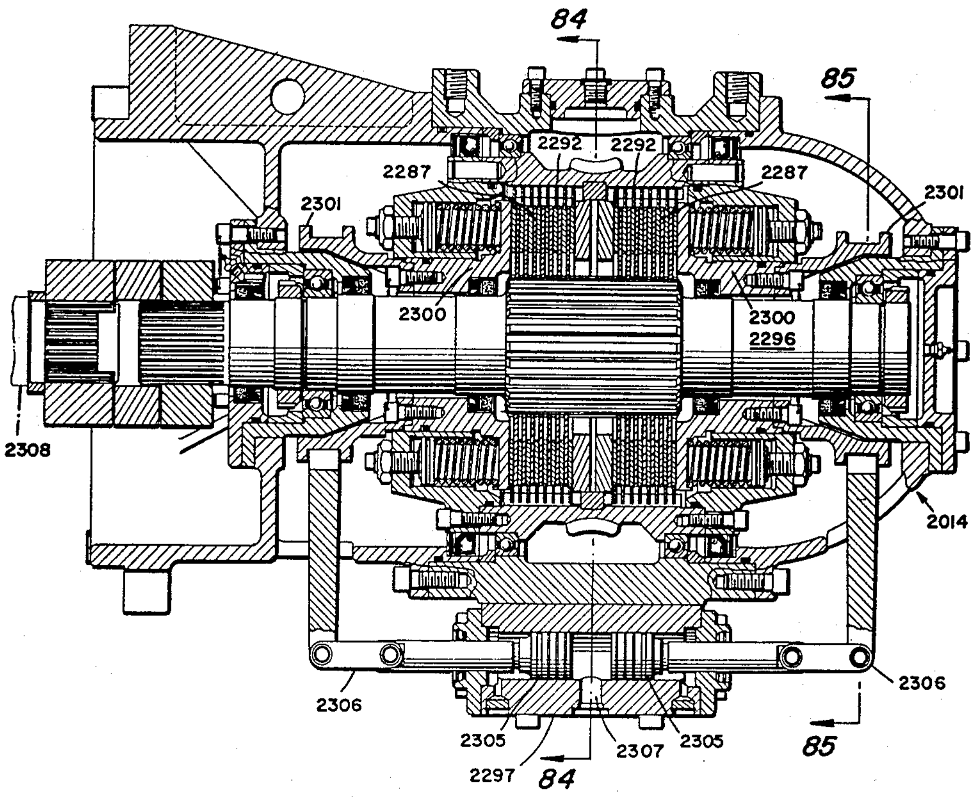
Figure 84:
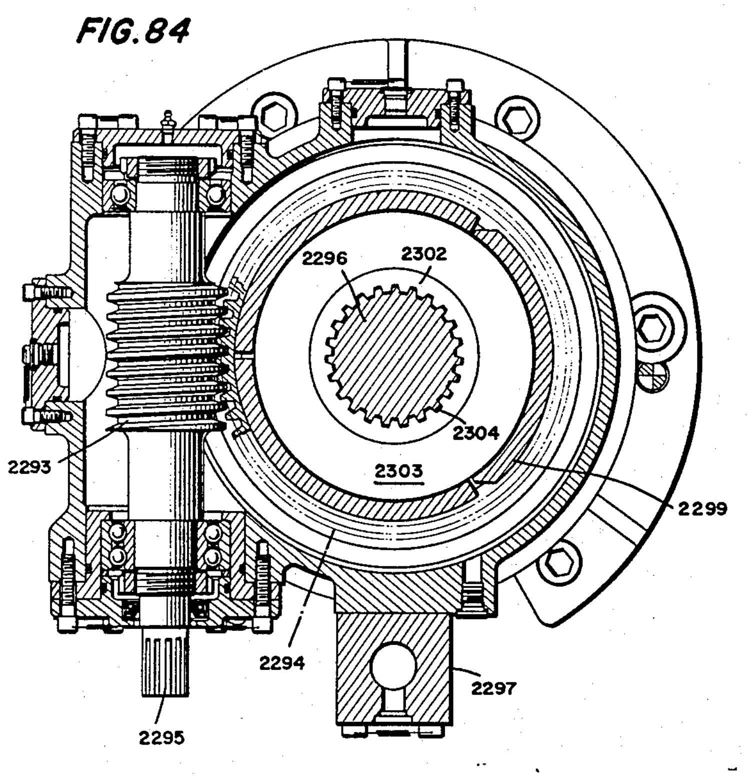
Figure 85:
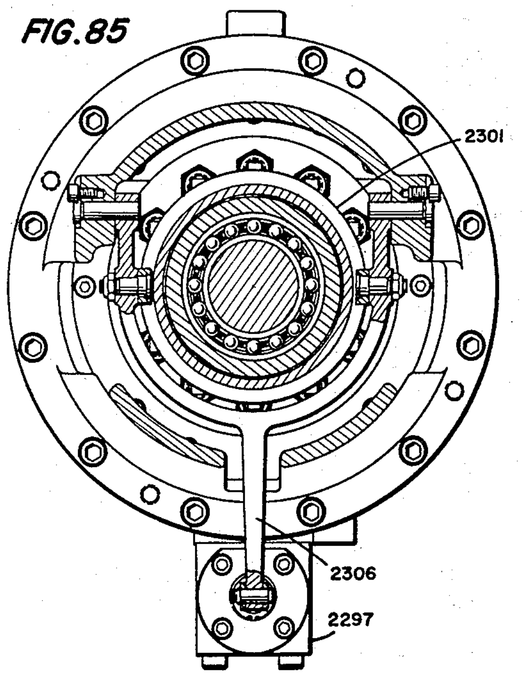
Figure 86:
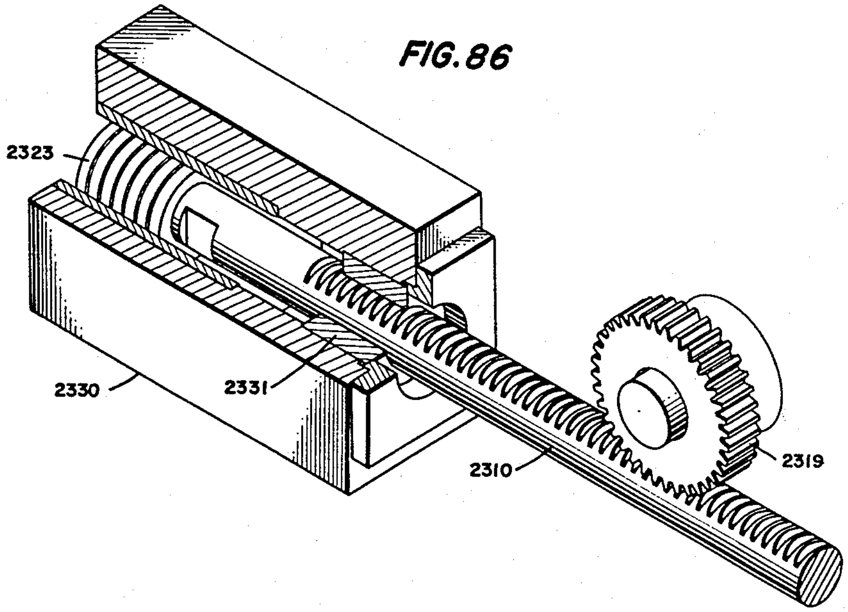
Figure 87:
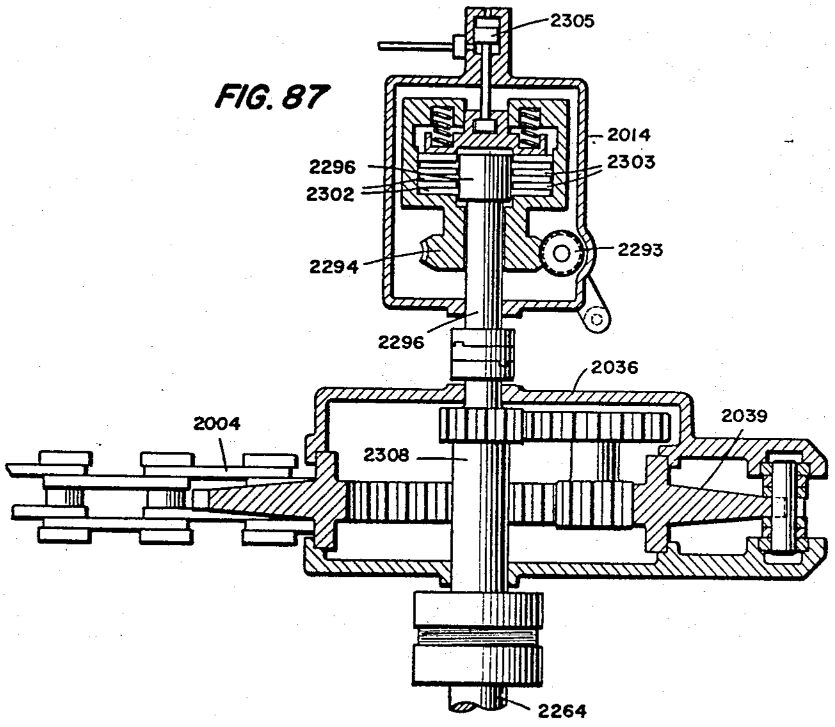
Figures 88, 89:
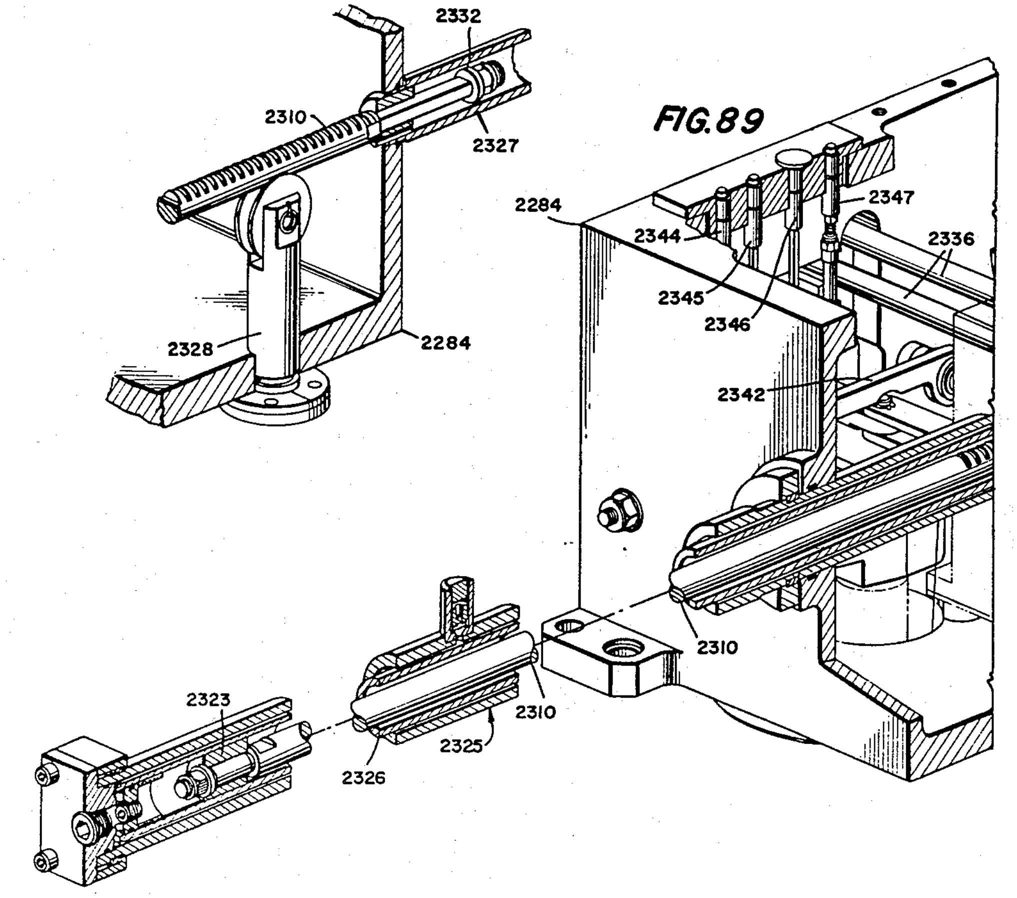
Figure 89A:
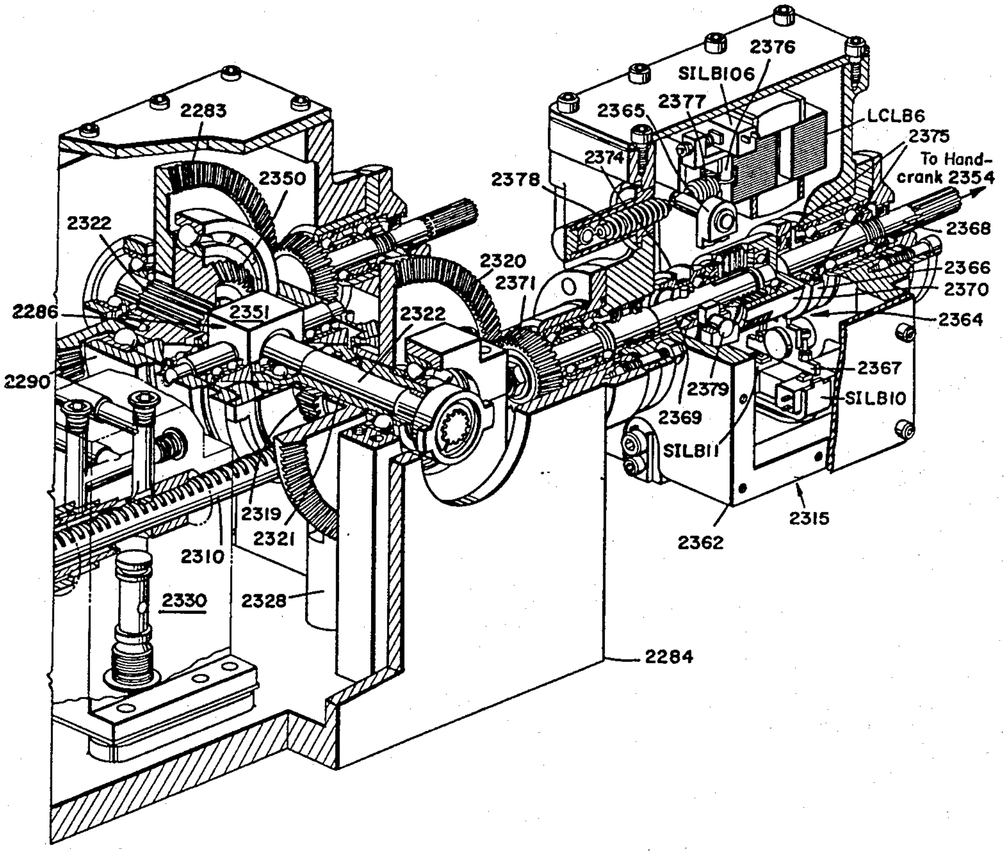
Figure 90:
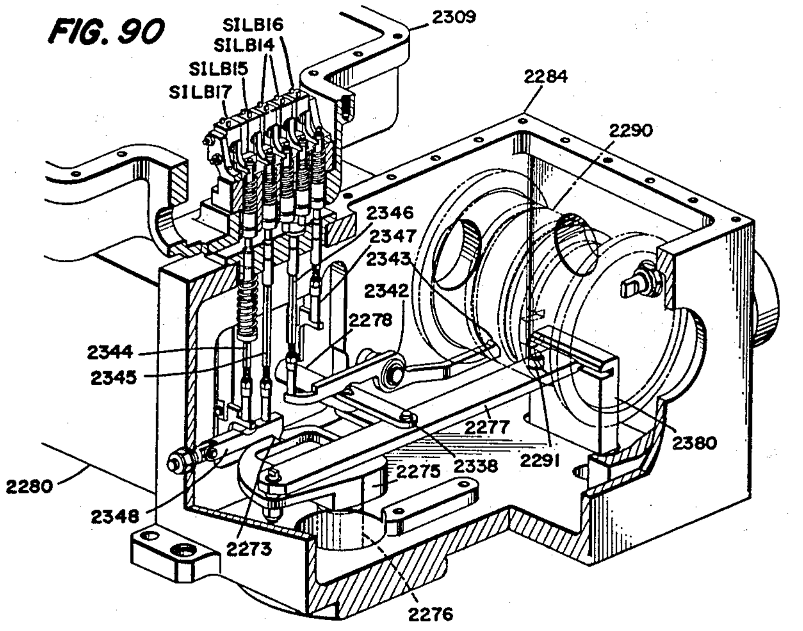
Figure 91:
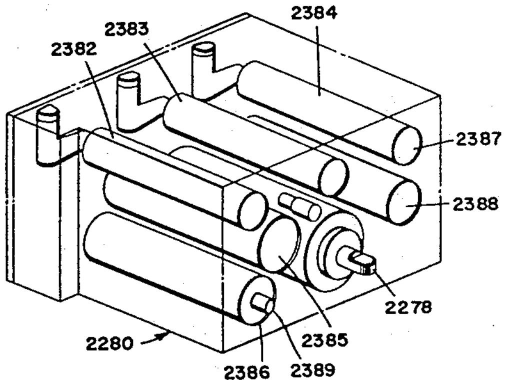
Figures 92, 93:
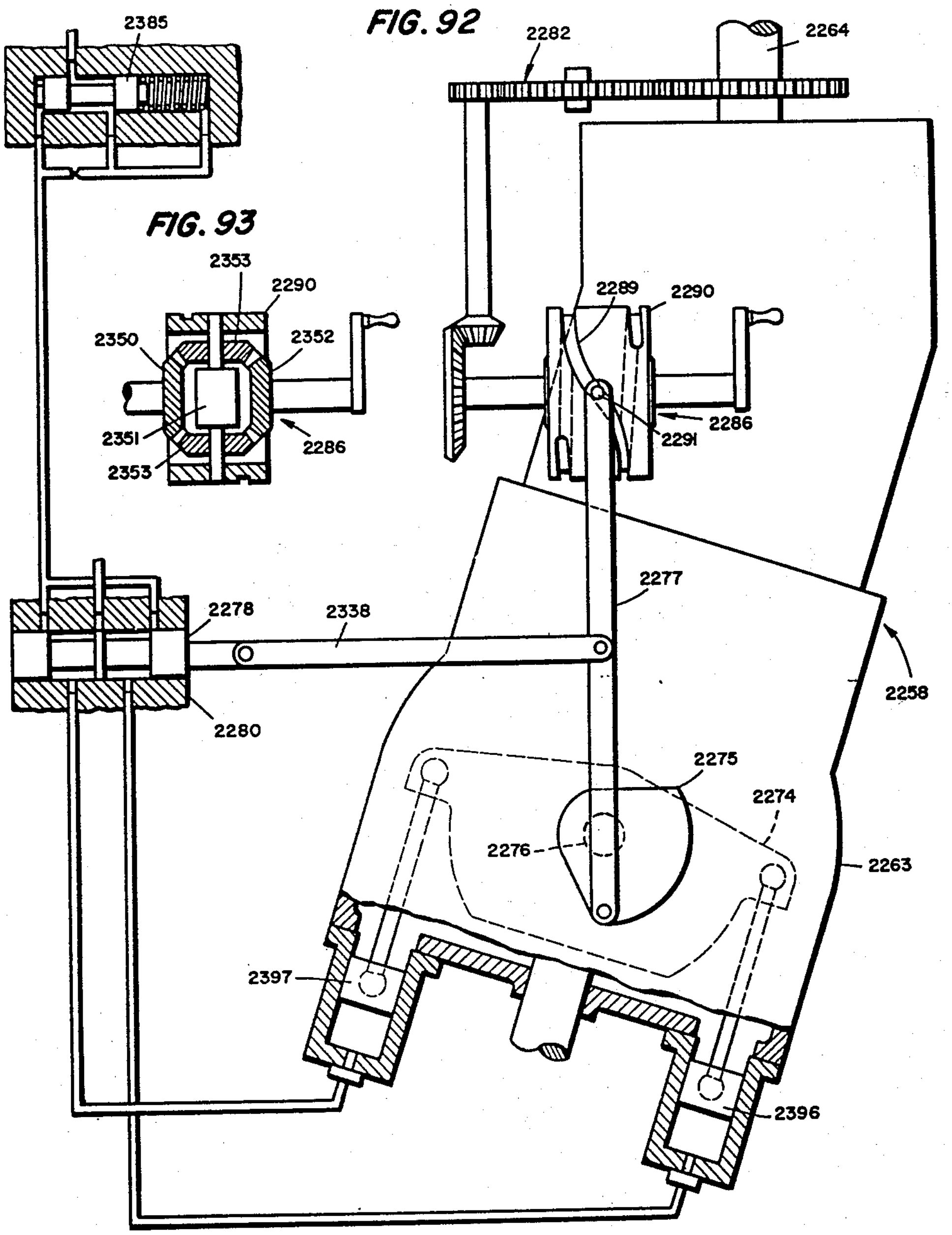
Figure 94:
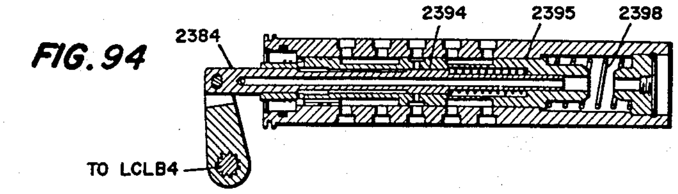
Figure 95:
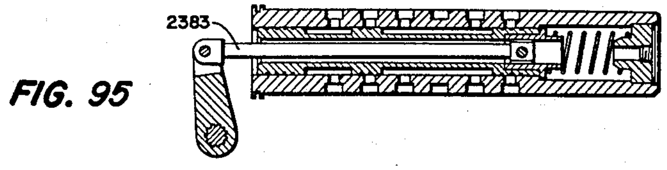
Figure 96:
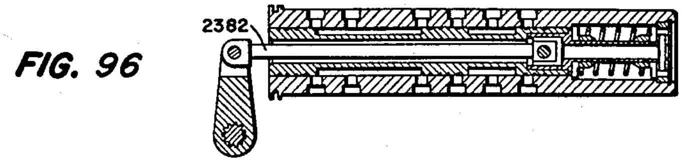
Figure 97:
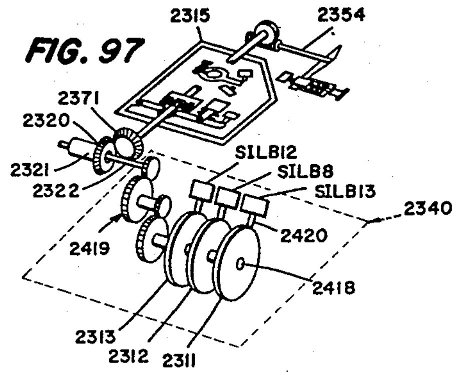
Figure 98:
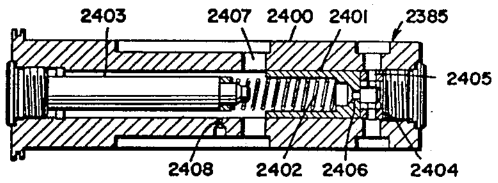
Figures 99, 99A:
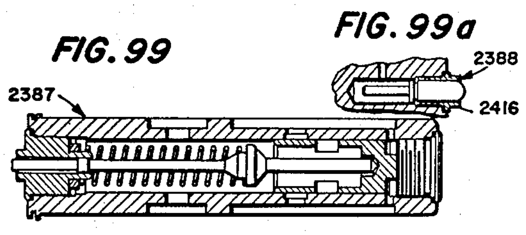
Figure 100:
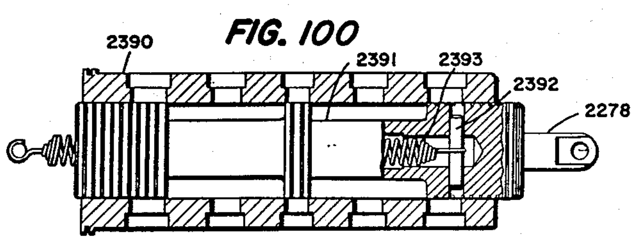
Figure 101:
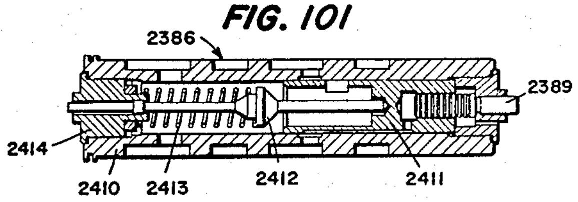
Figure 102:
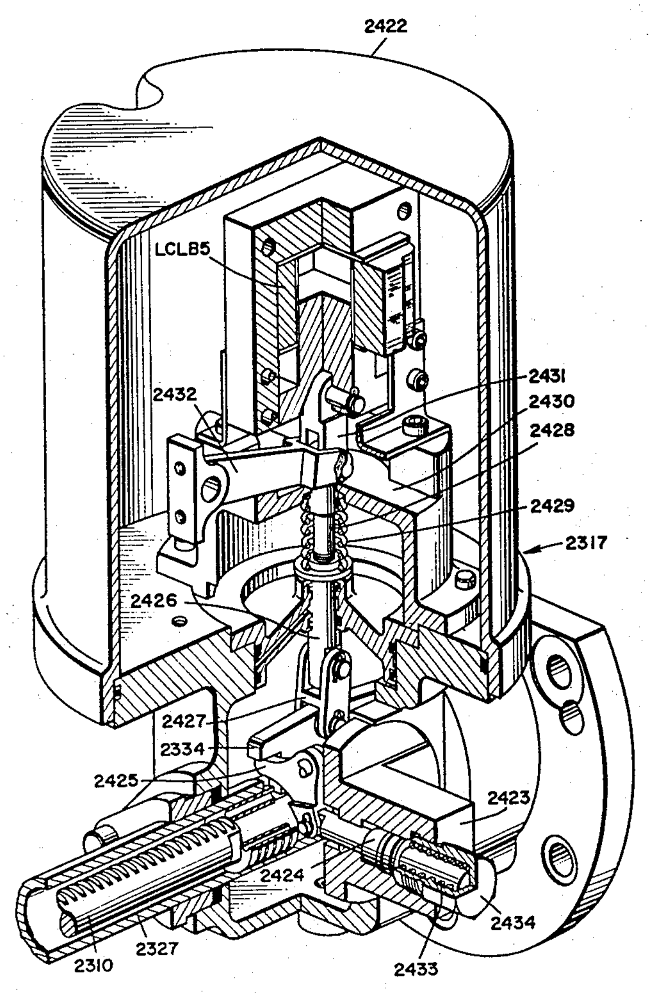
Figures 103, 104, 105:
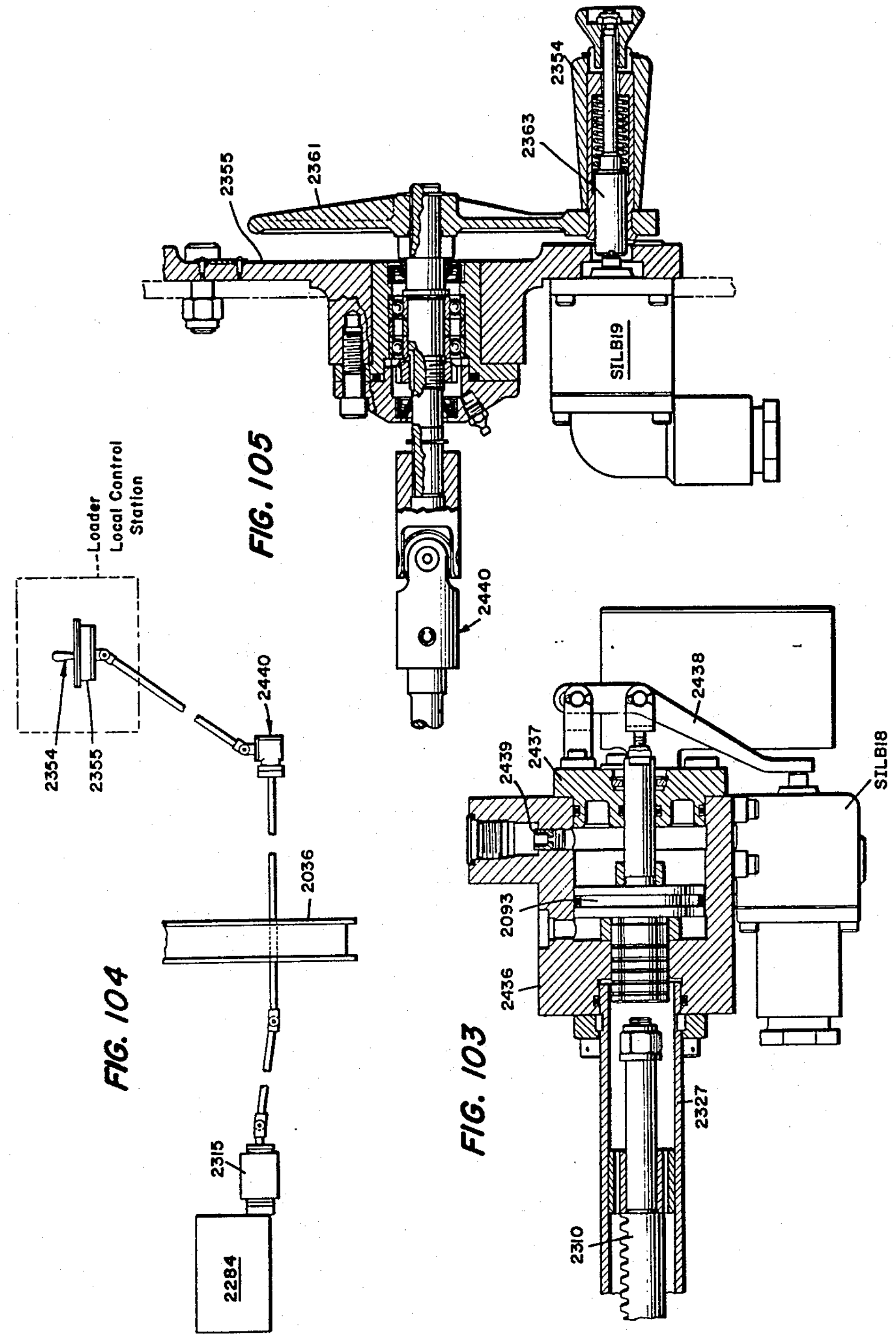
Figure 106A:
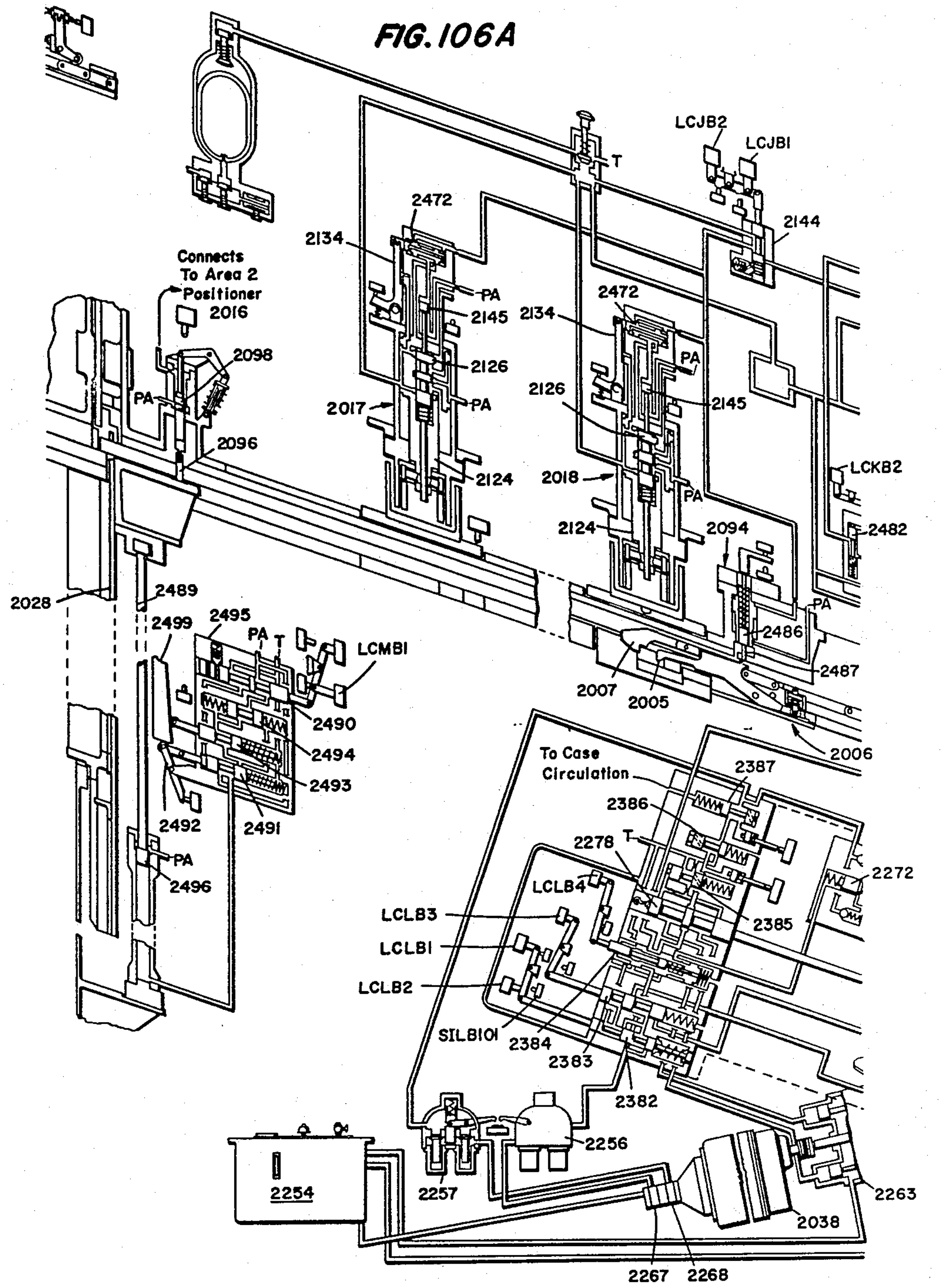
Figure 106B:
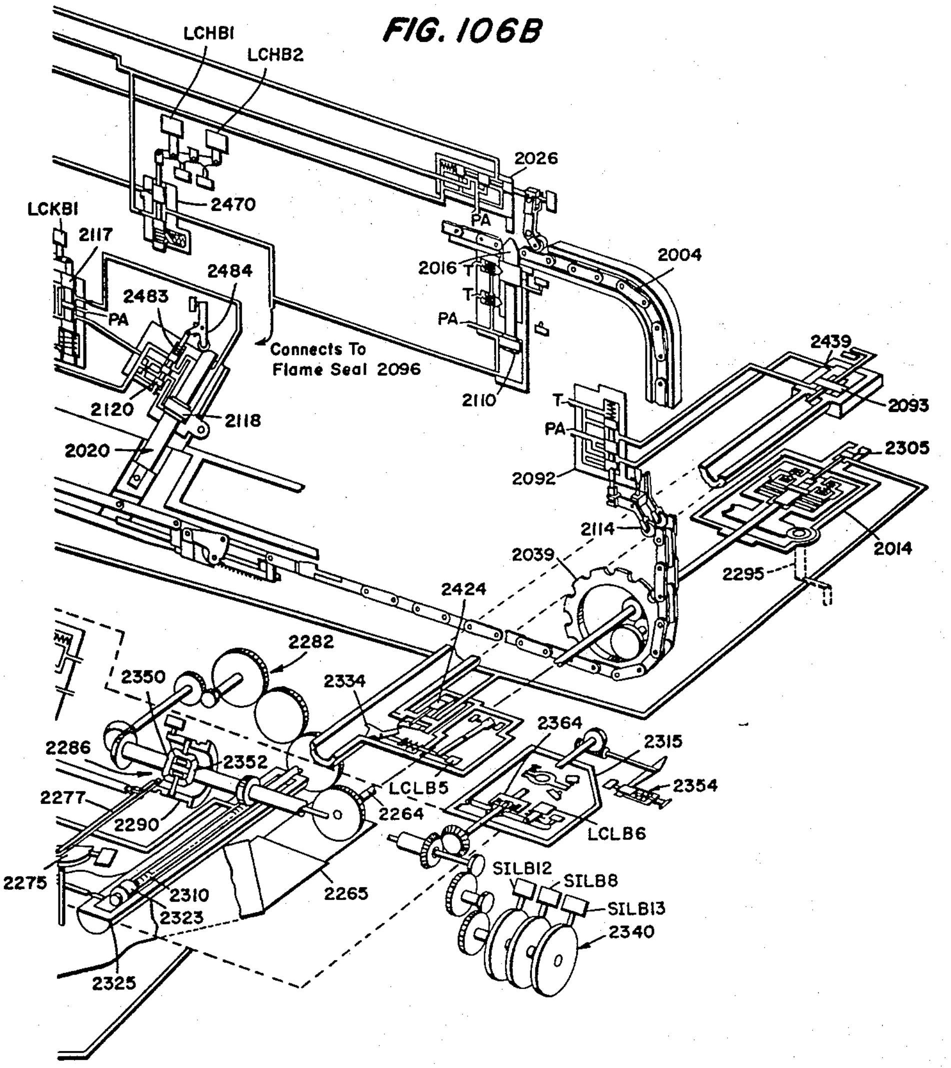
Figure 107:
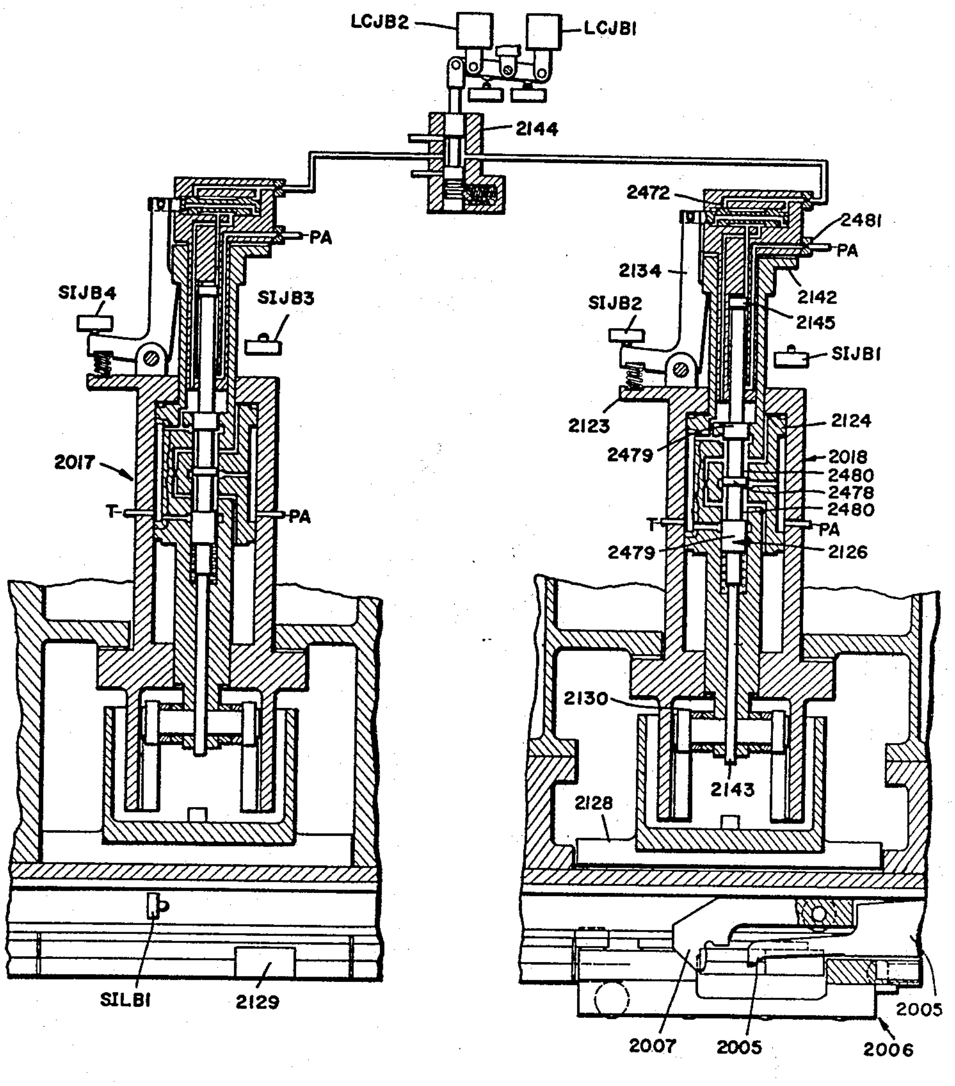
Figures 108, 109A, 109B:
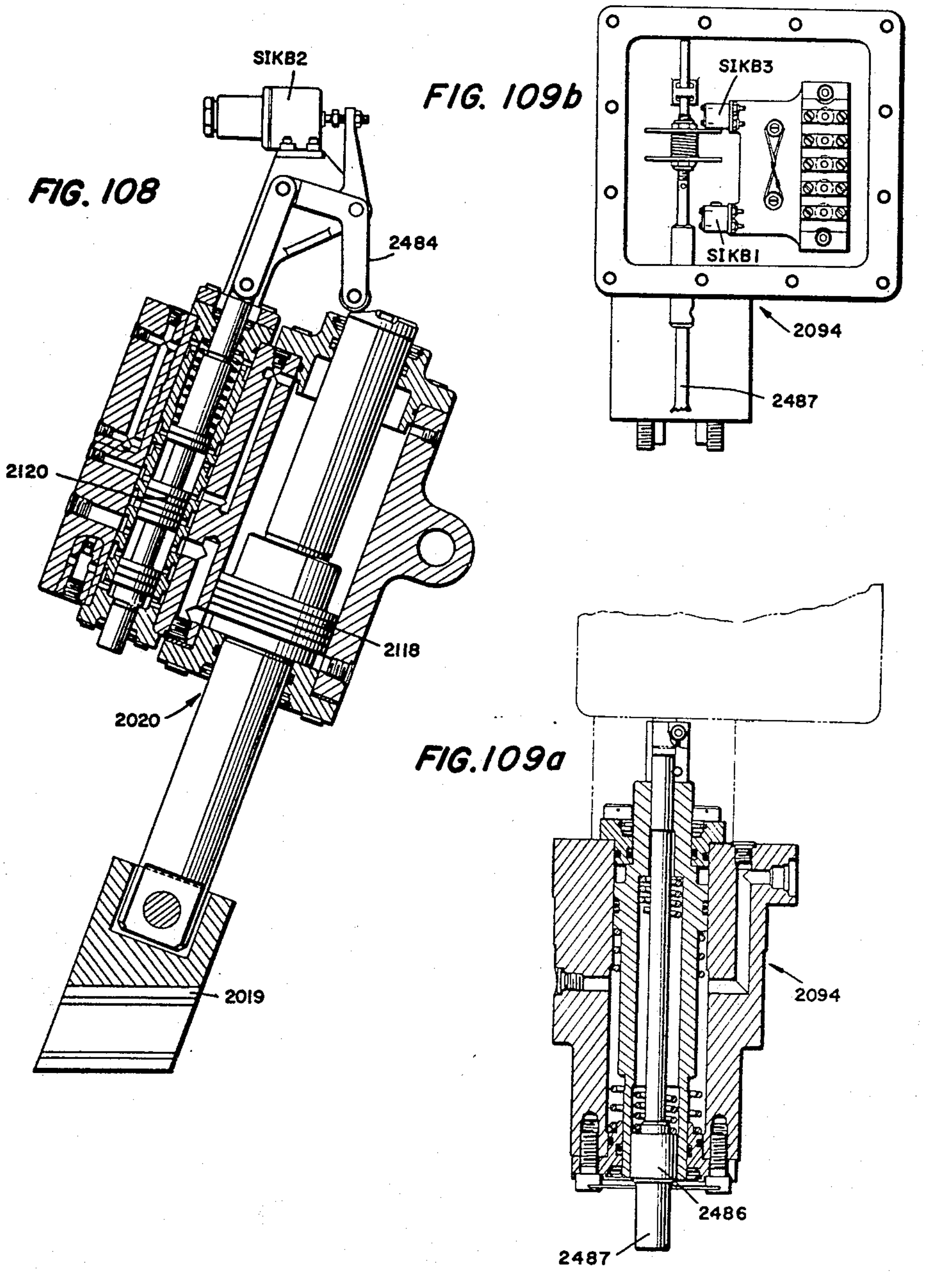
Figure 110:
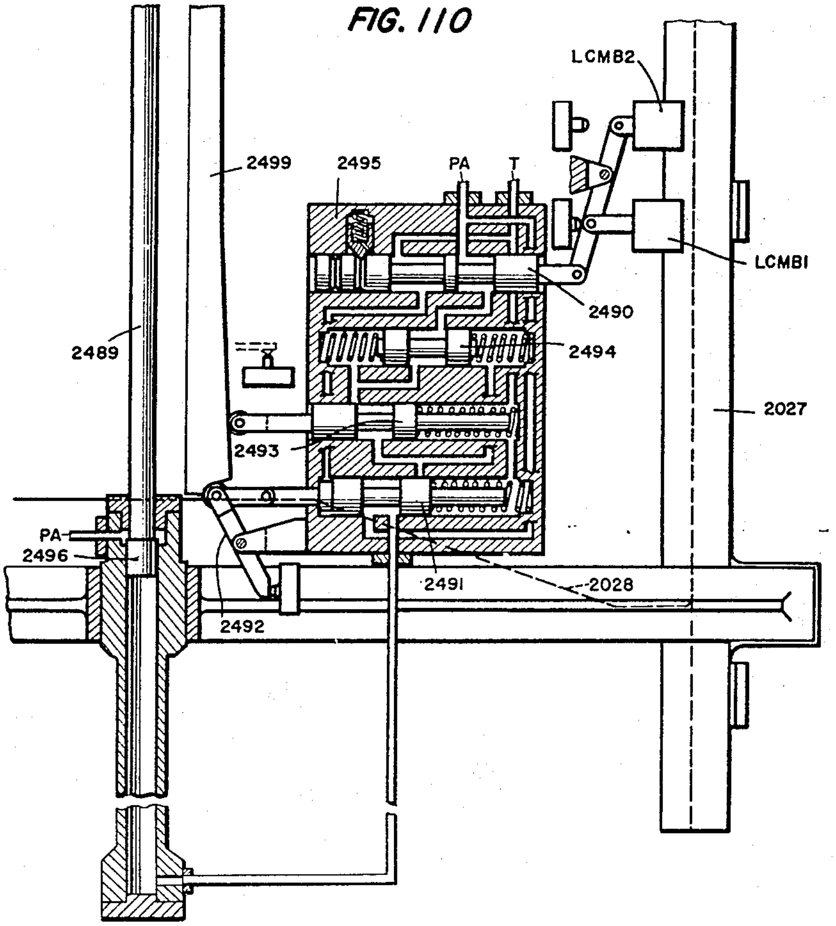
Figure 111:
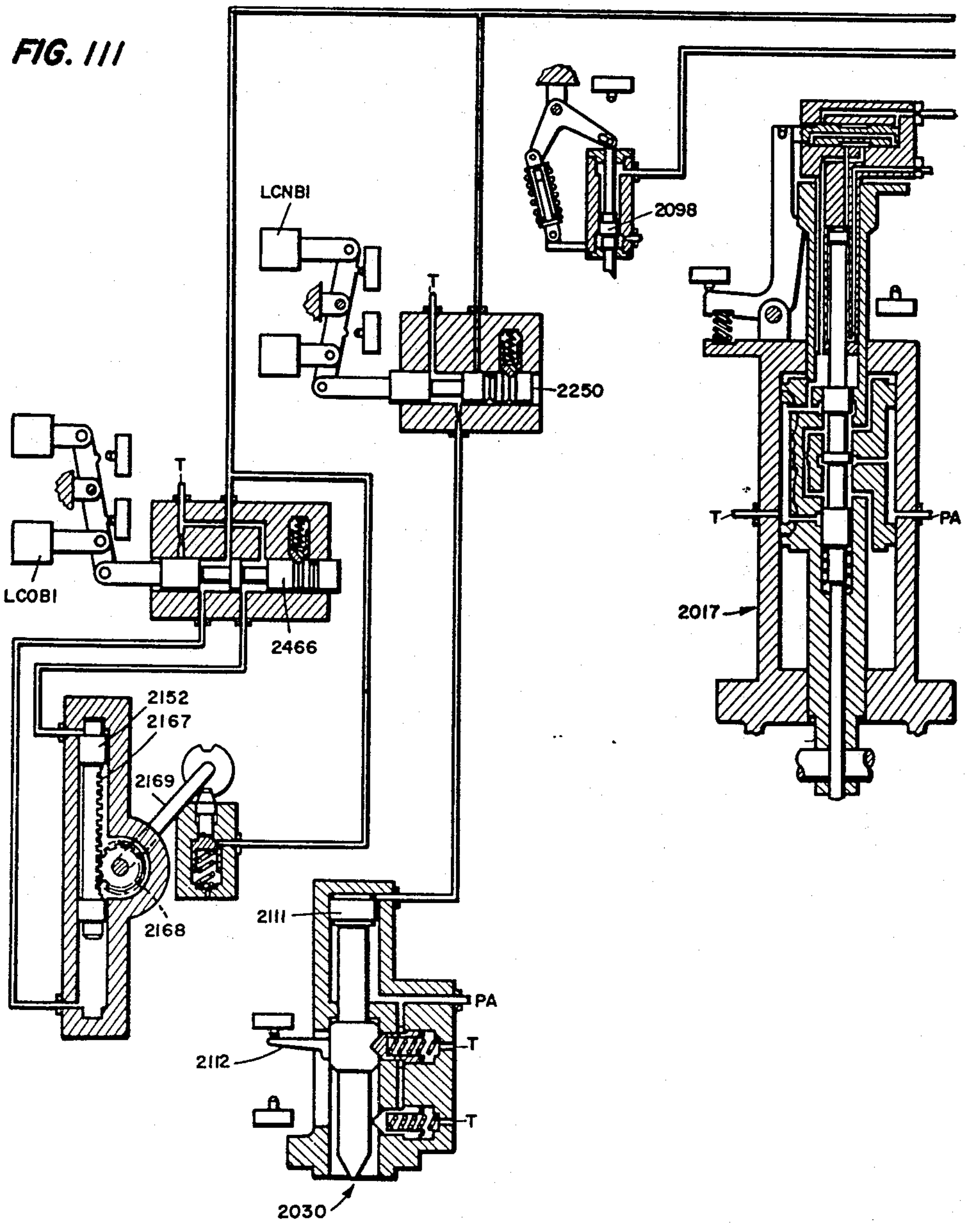
Figure 111A:
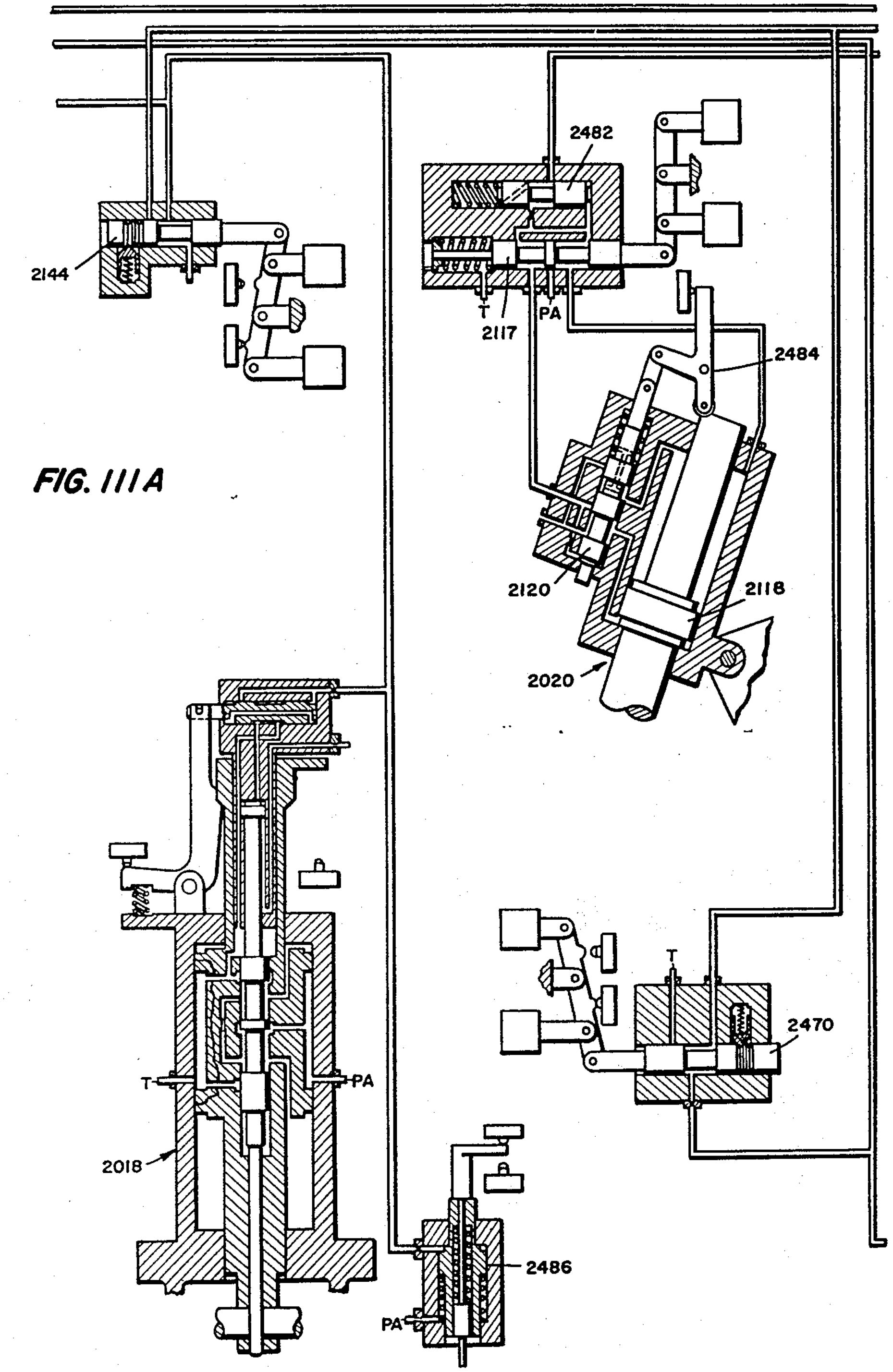
Figure 111B:
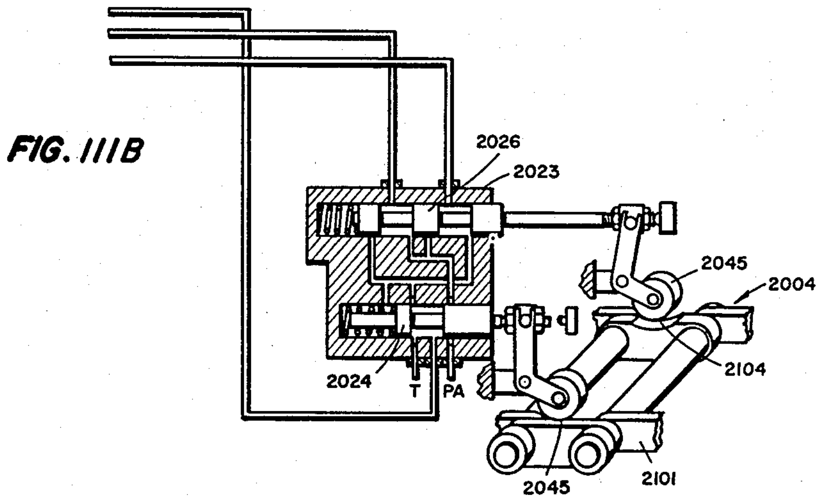
Figure 111C:
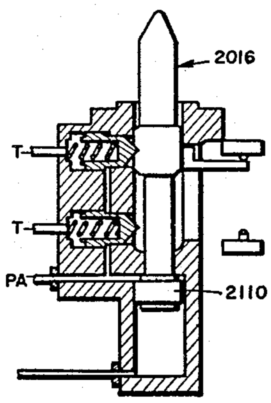
Figure 113:
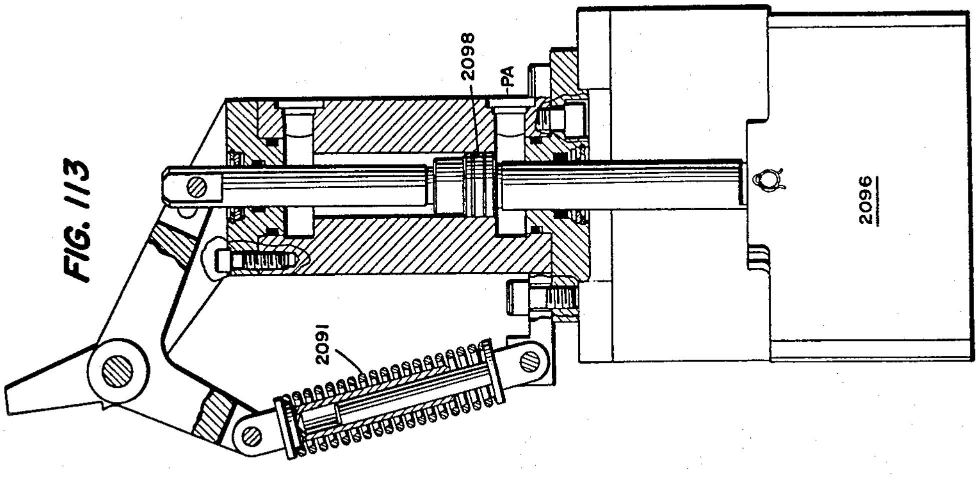
Figure 112:
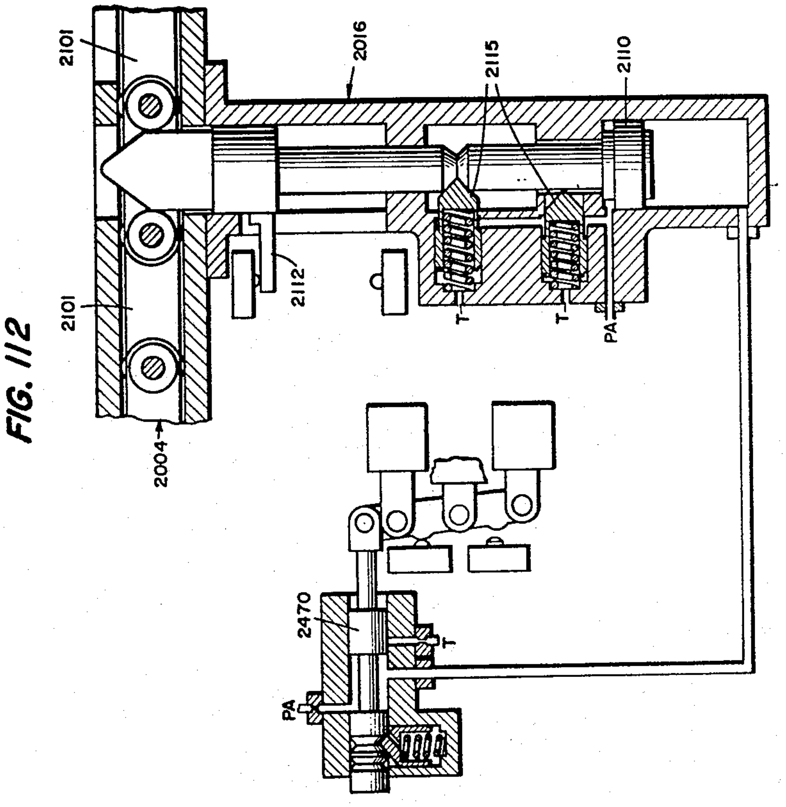
Figure 125:
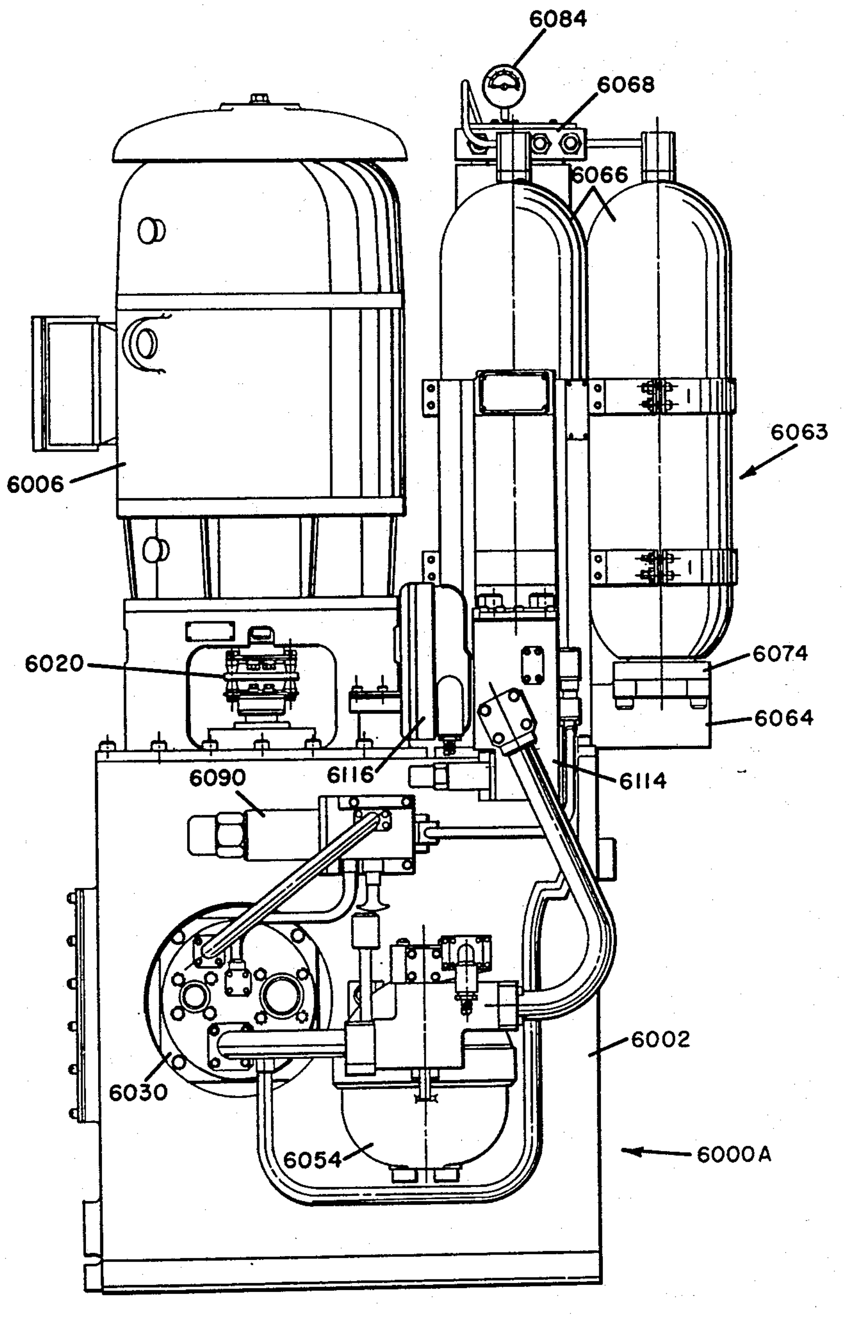
Figure 126:
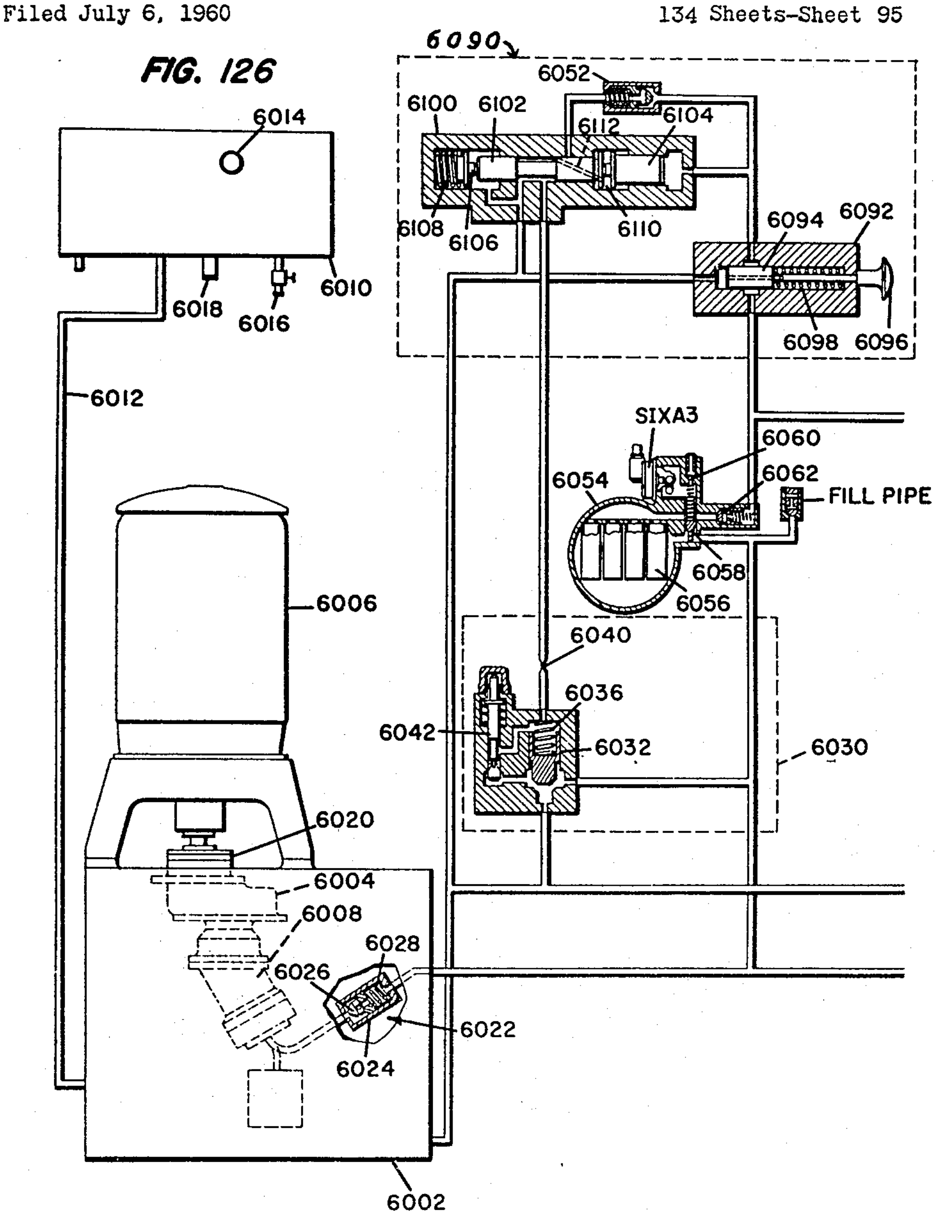
Figure 126A:
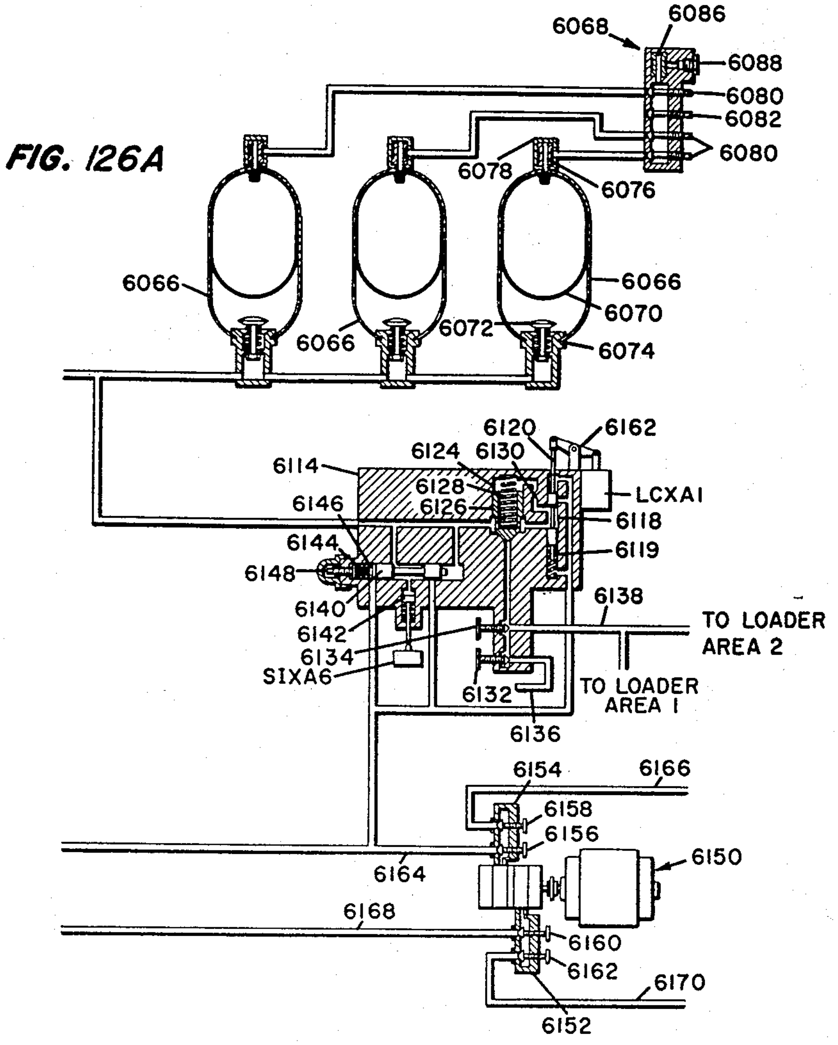
Figure 127:
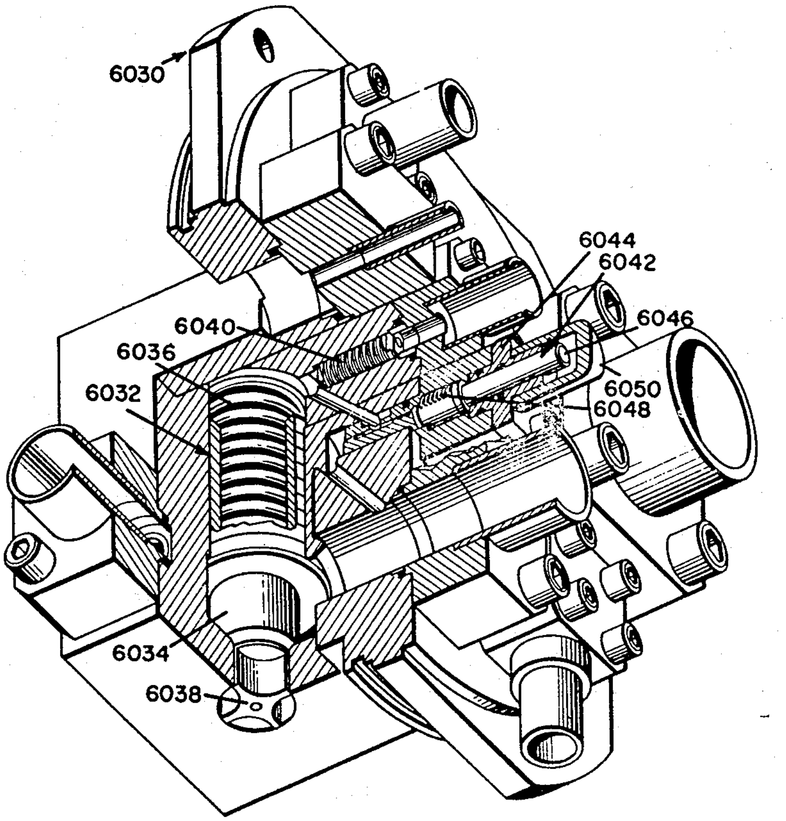
Figure 128:
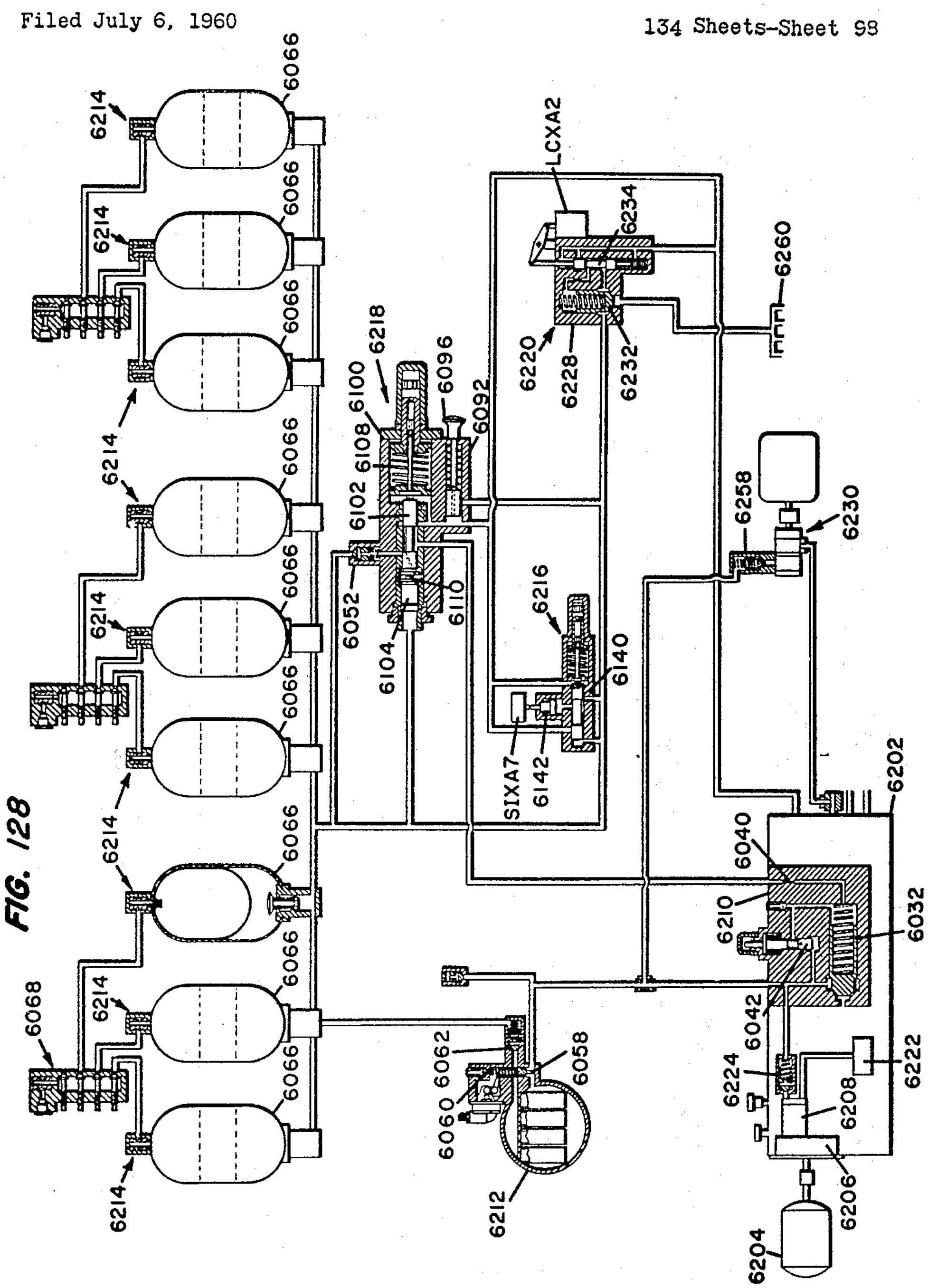
Figure 129:
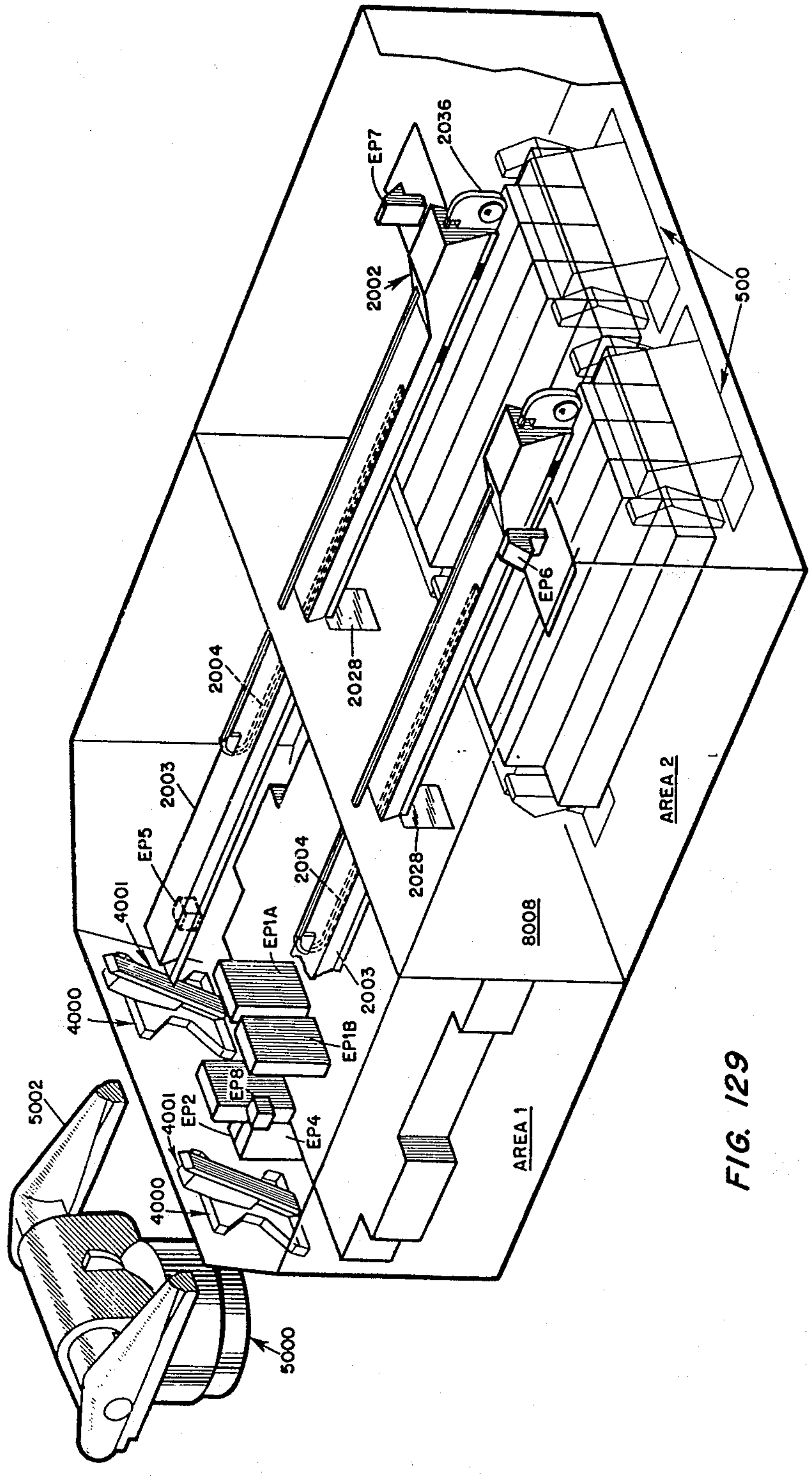
Figure 130:
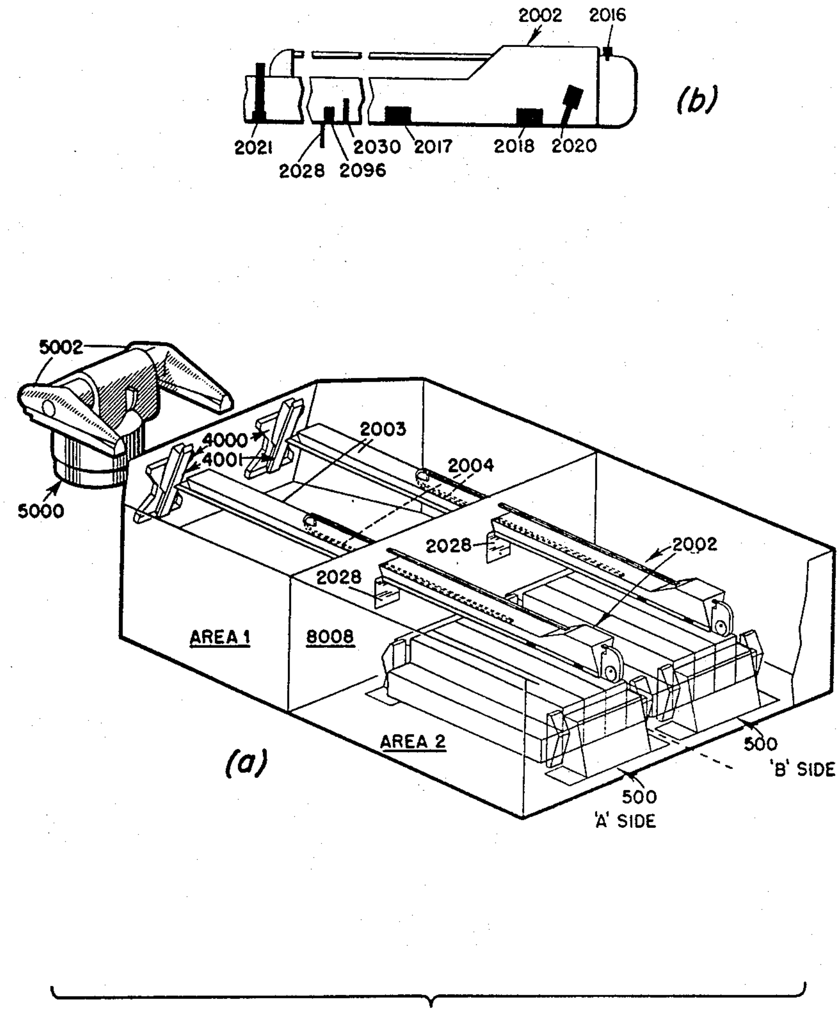
Figure 131:
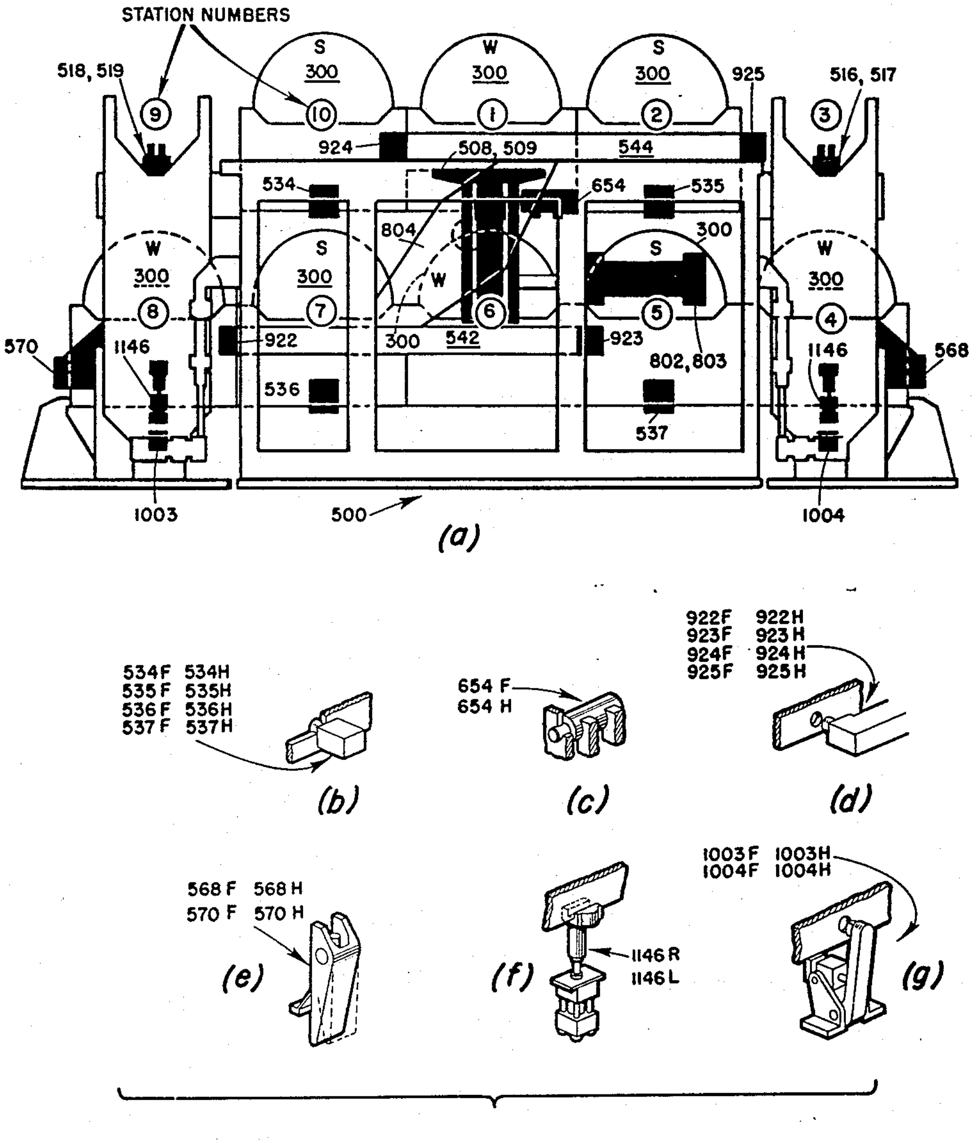
Figure 132:
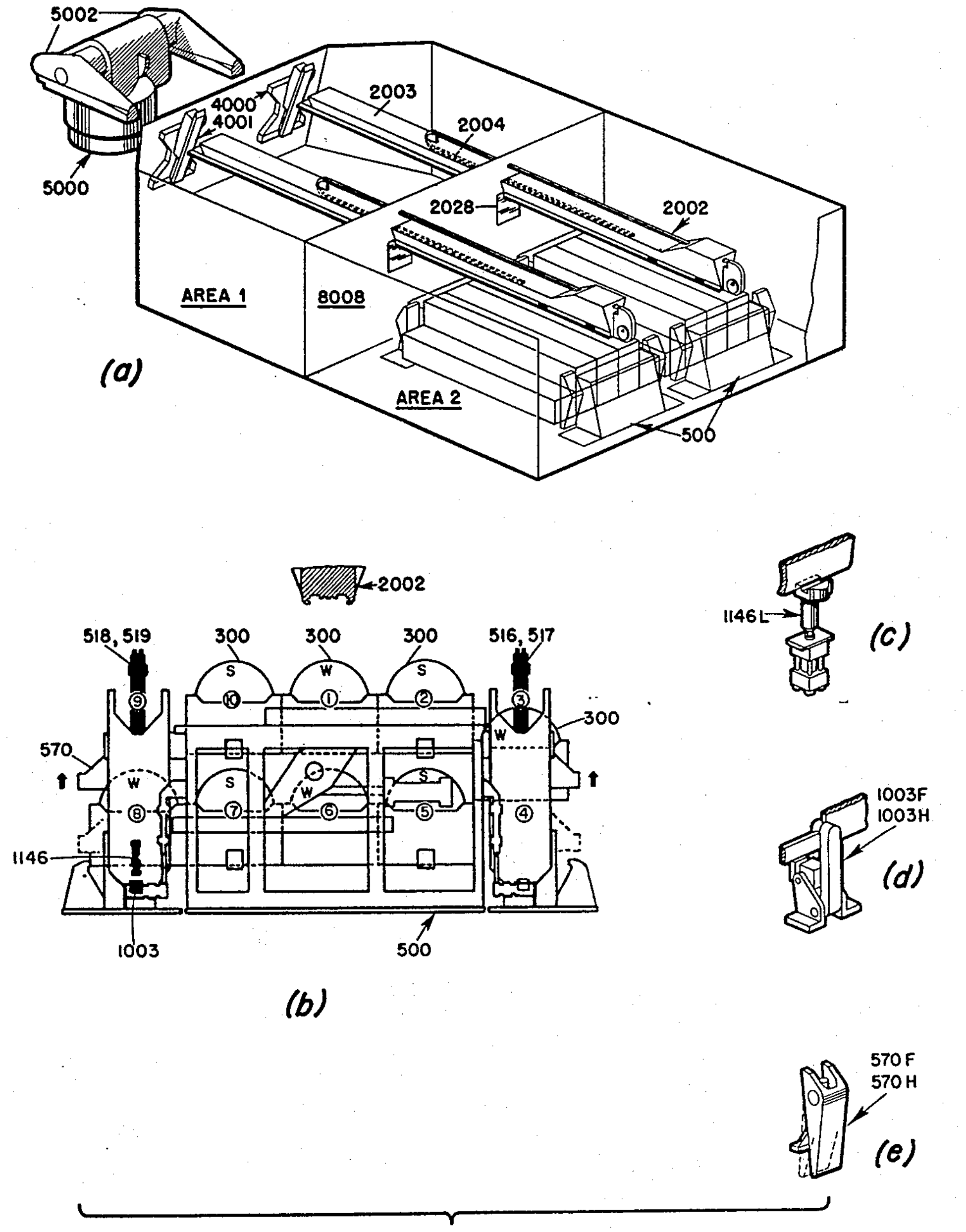
Figure 133:
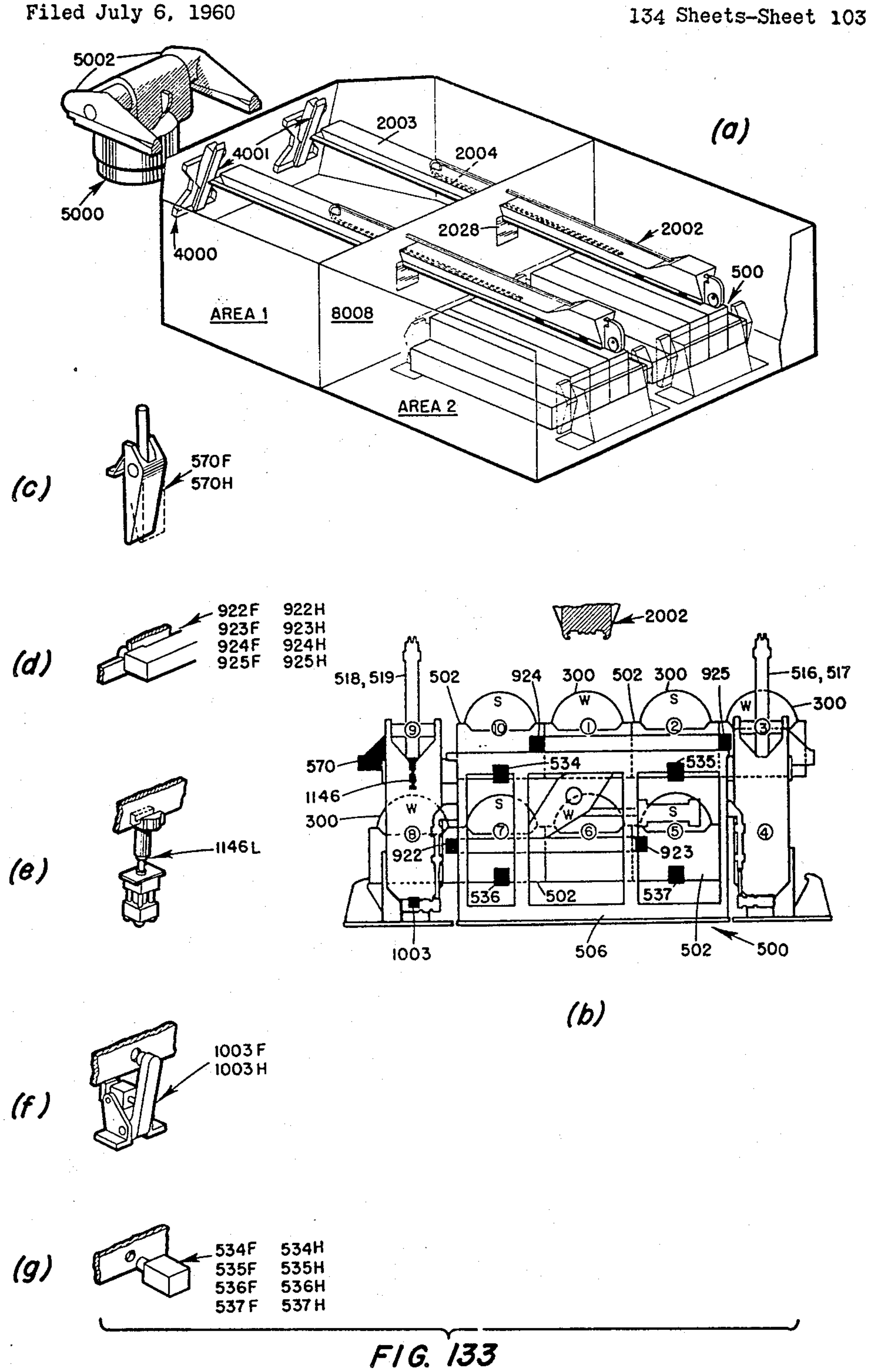
Figure 134:
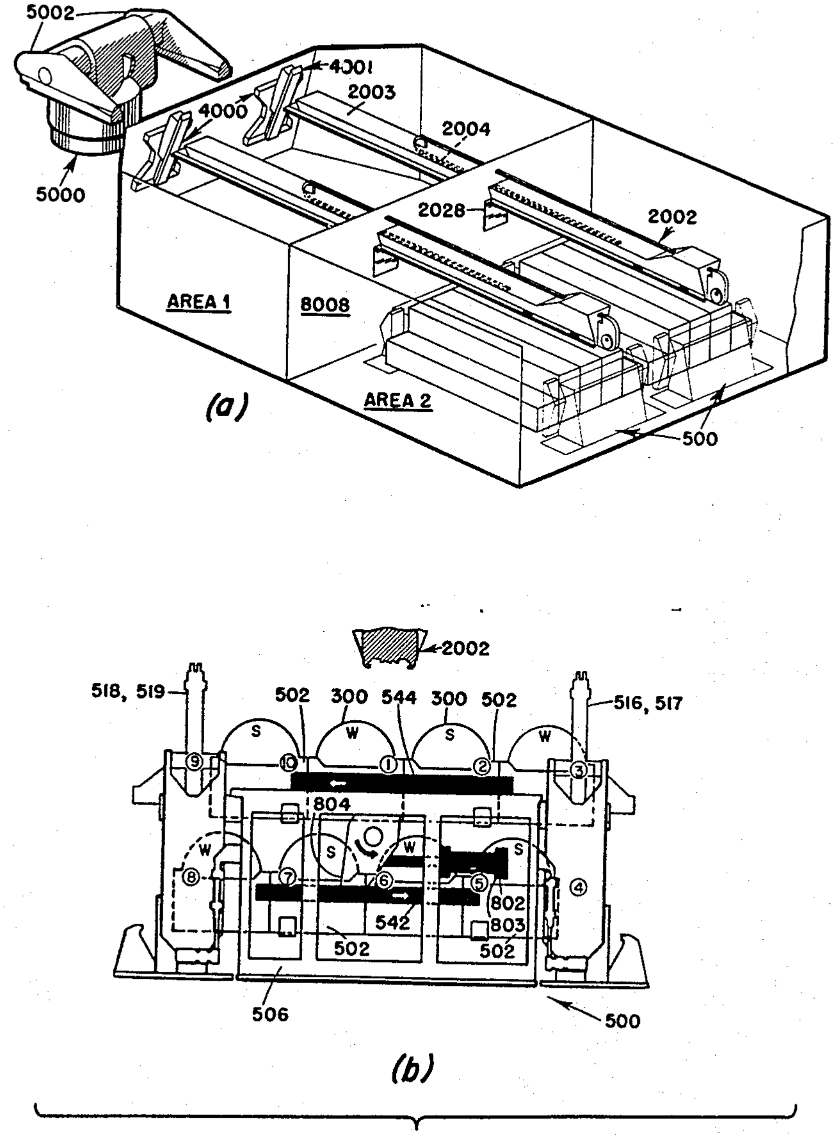
Figure 135:
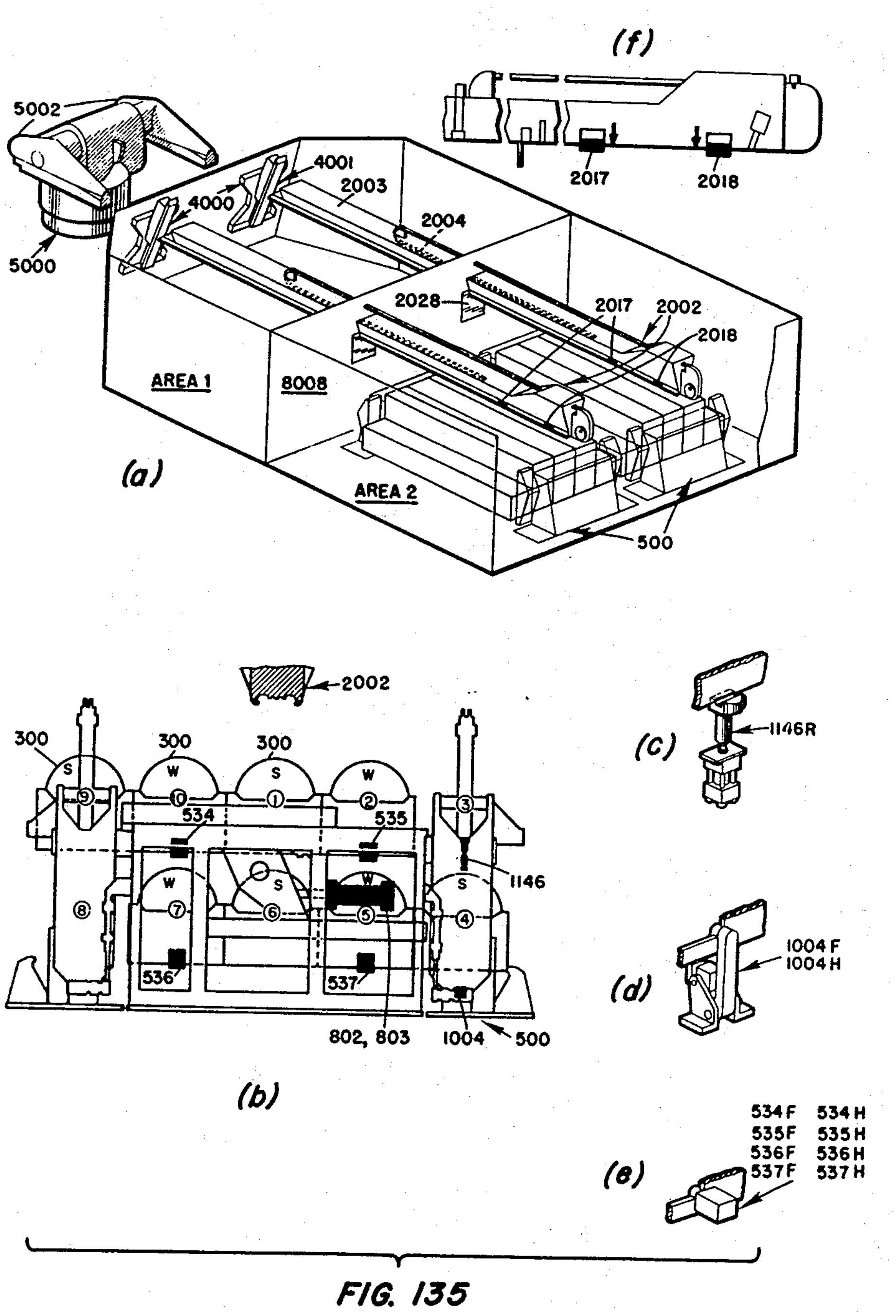
Figure 136:
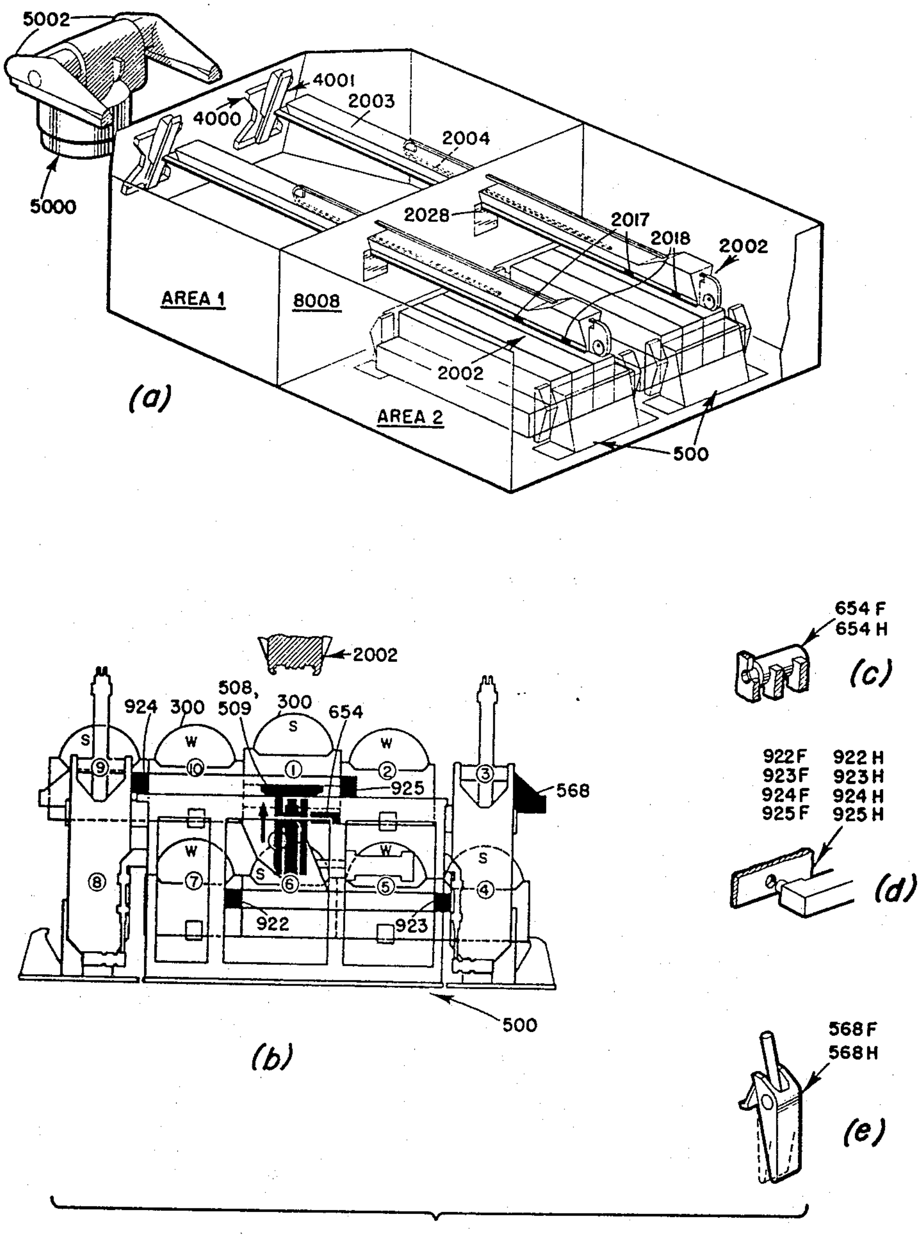
Figure 137:
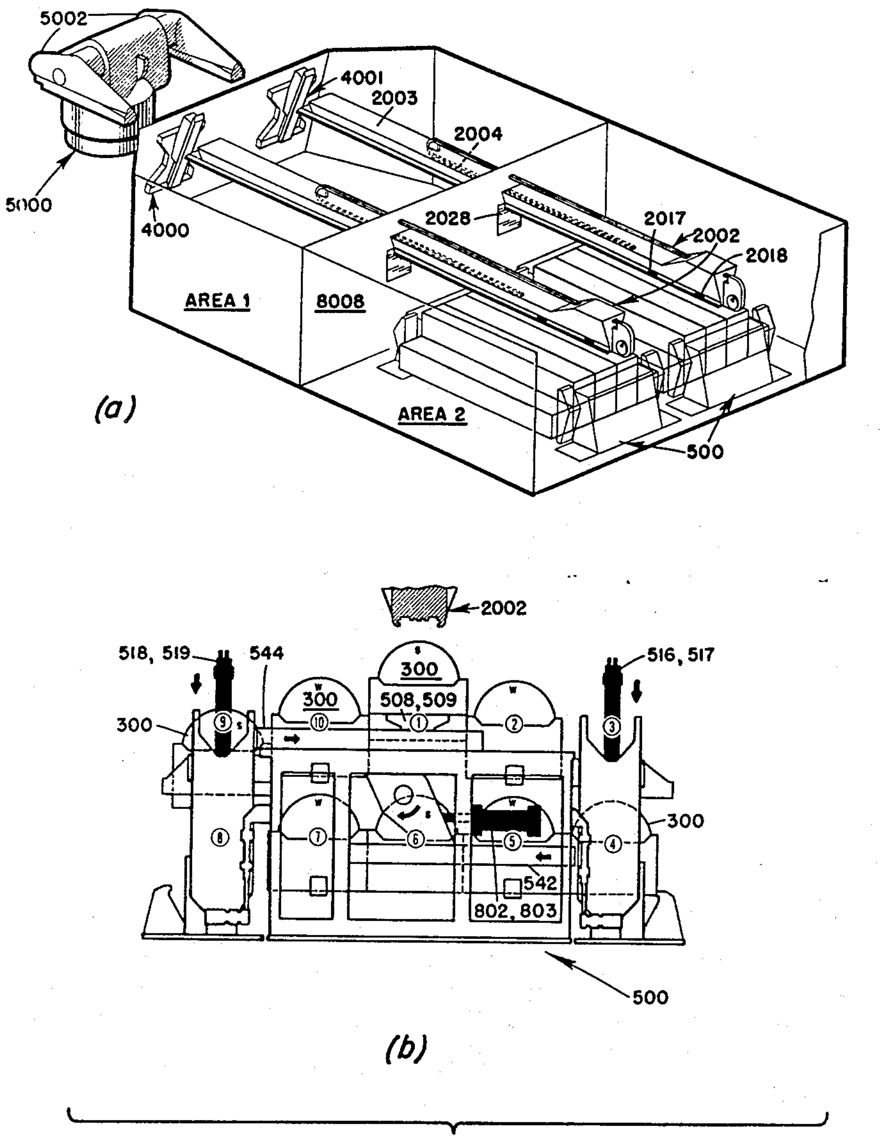
Figure 138:
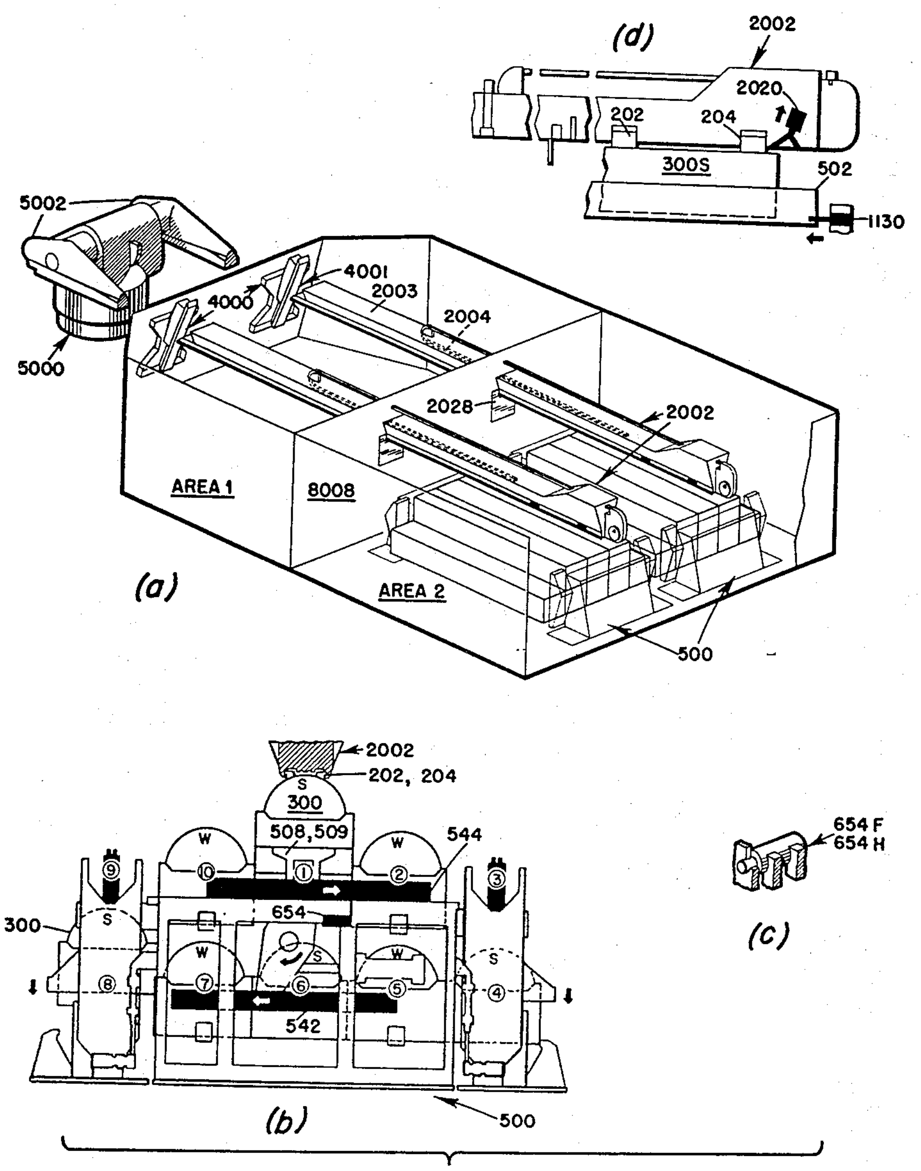
Figure 139:
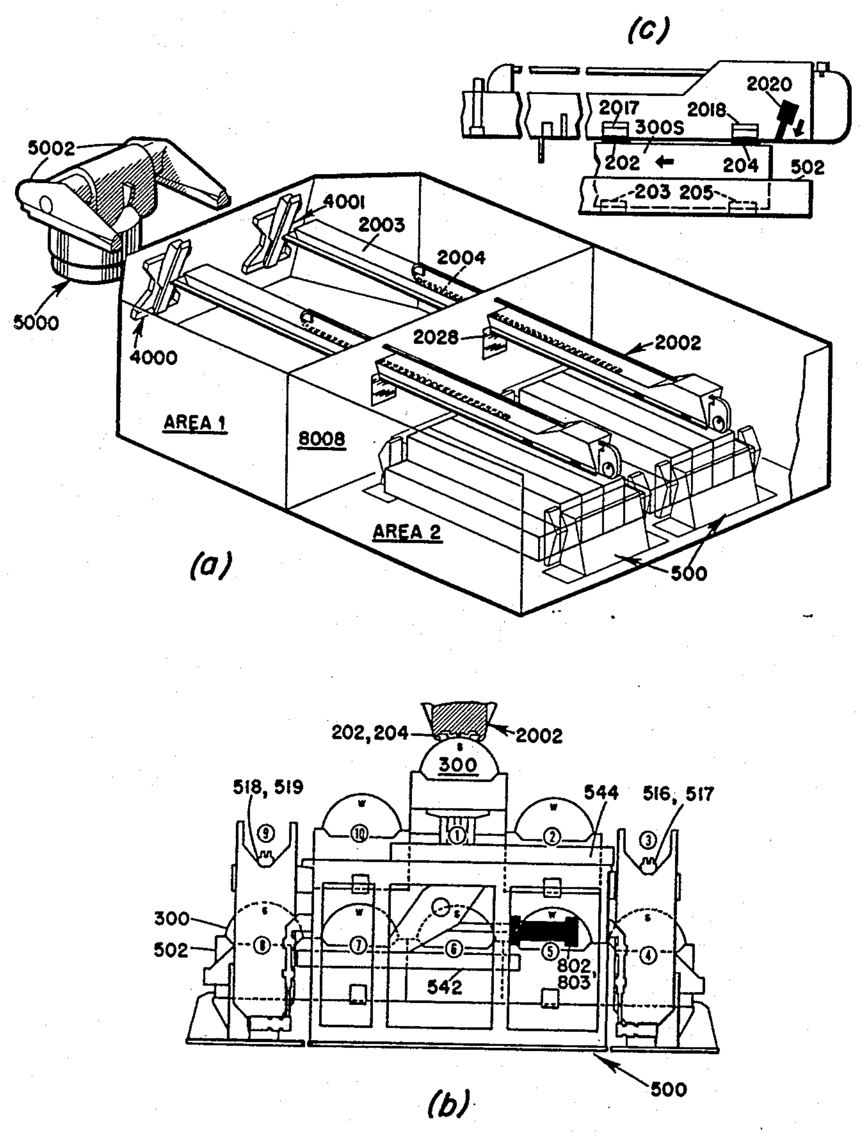
Figure 140:
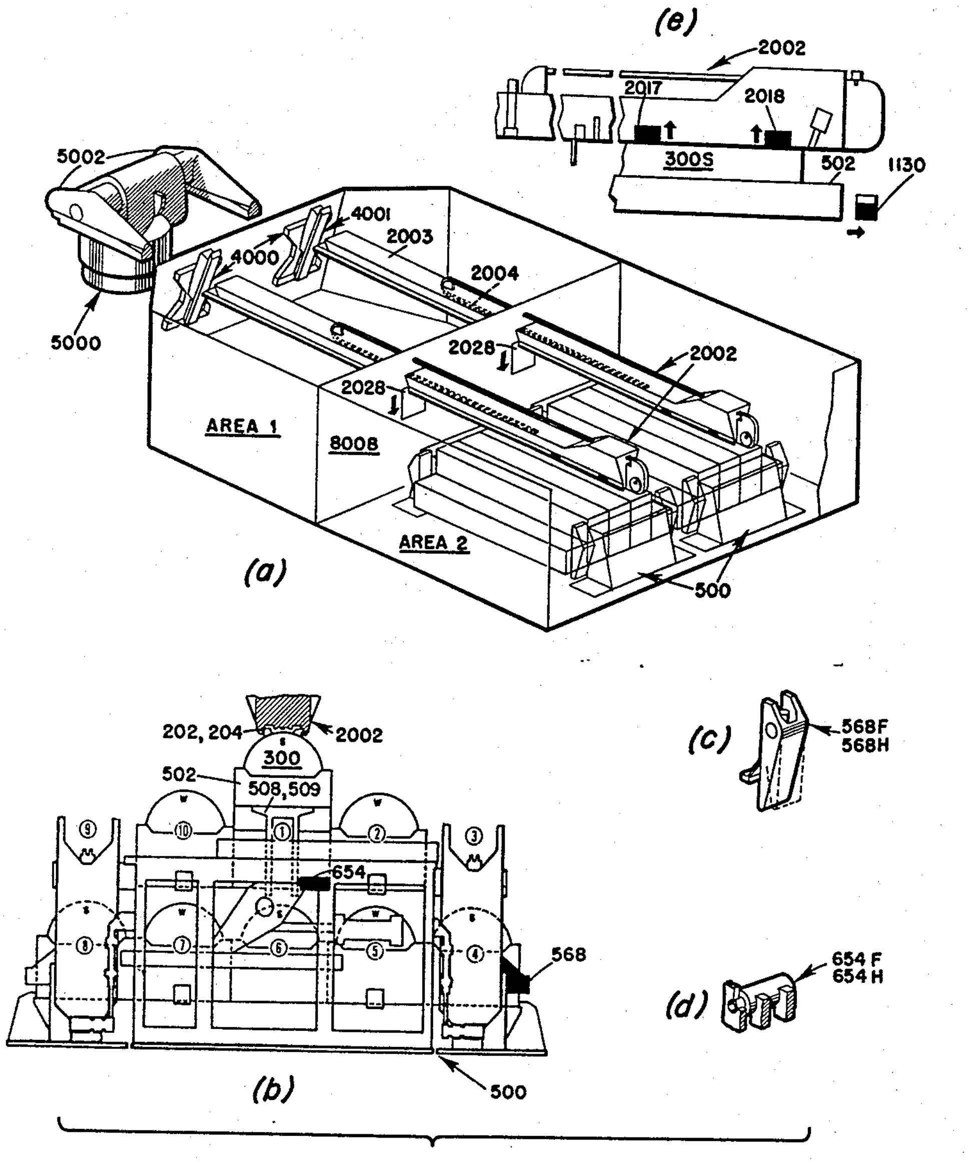
Figure 141:
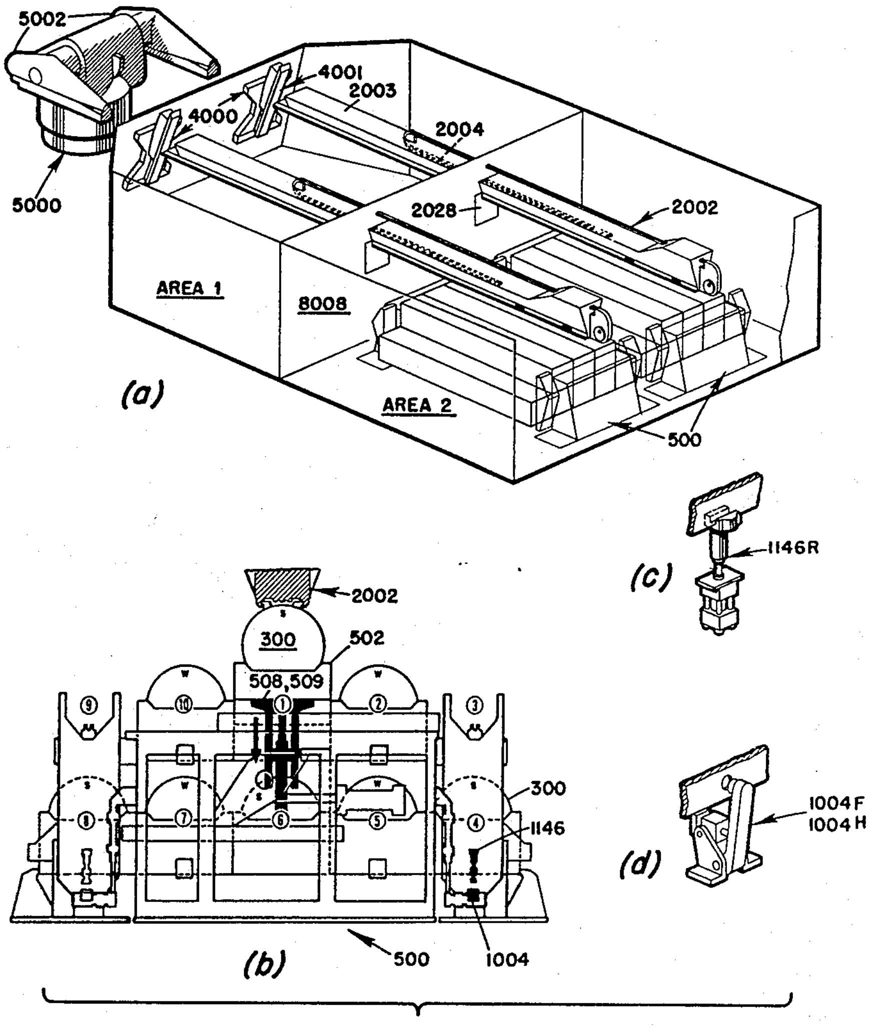
Figure 142:
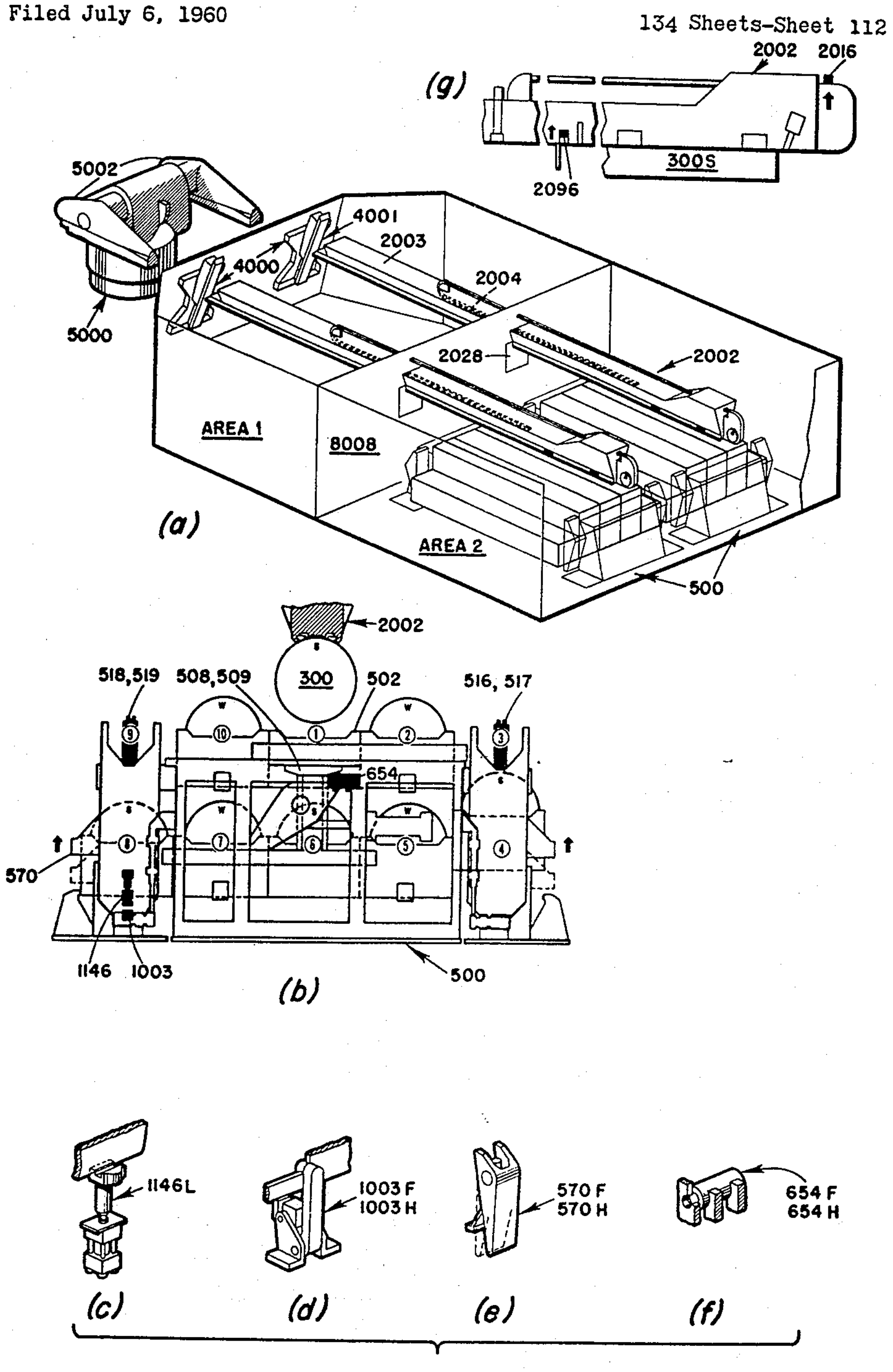
Figure 143:
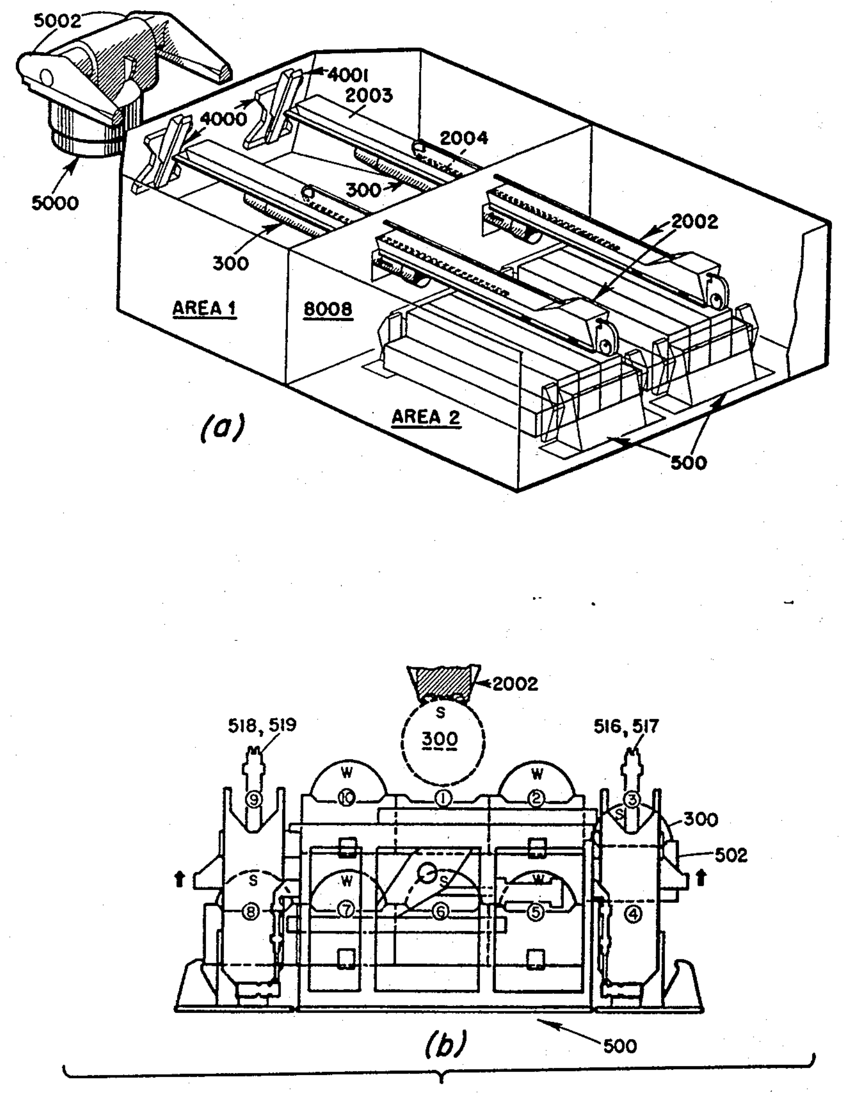
Figure 144:
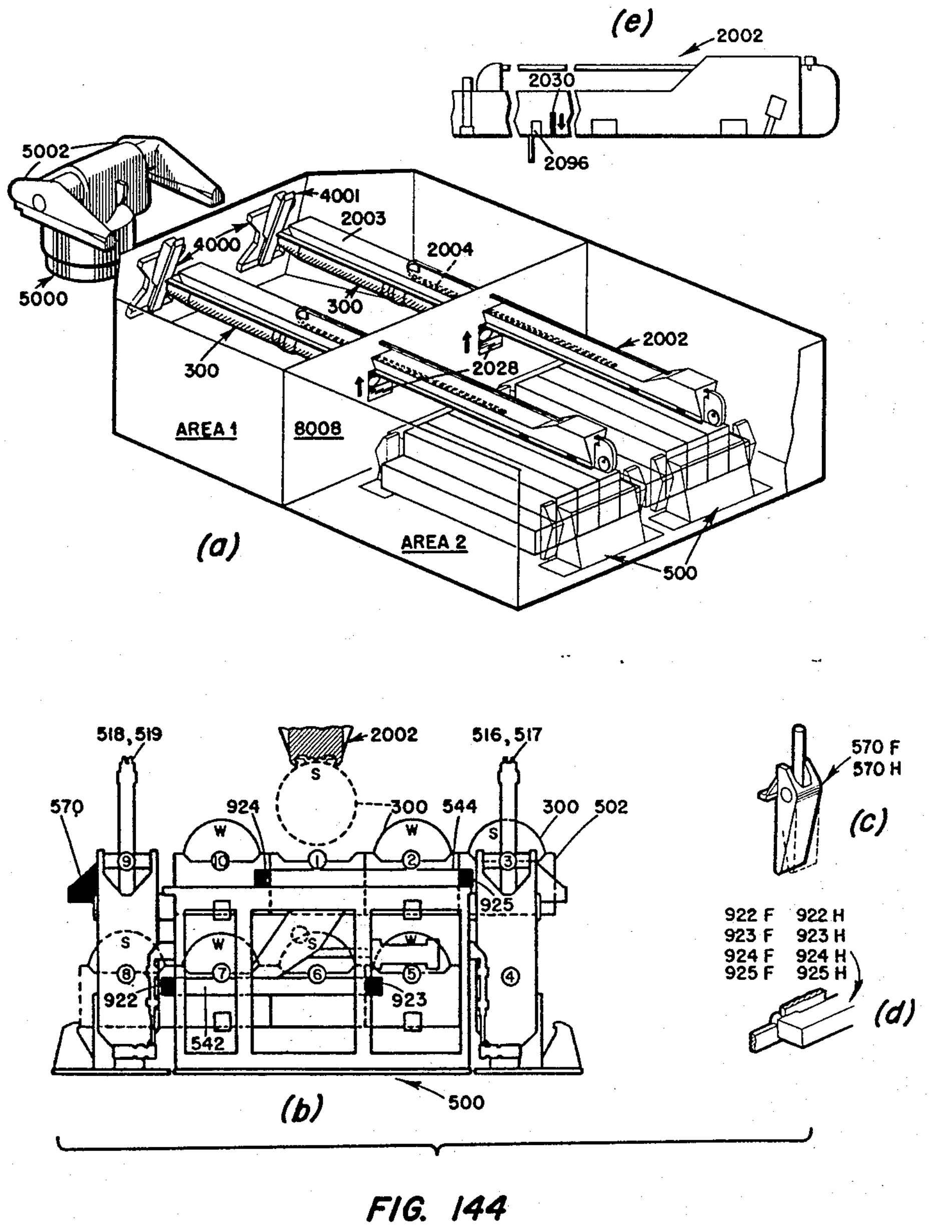
Figure 145:
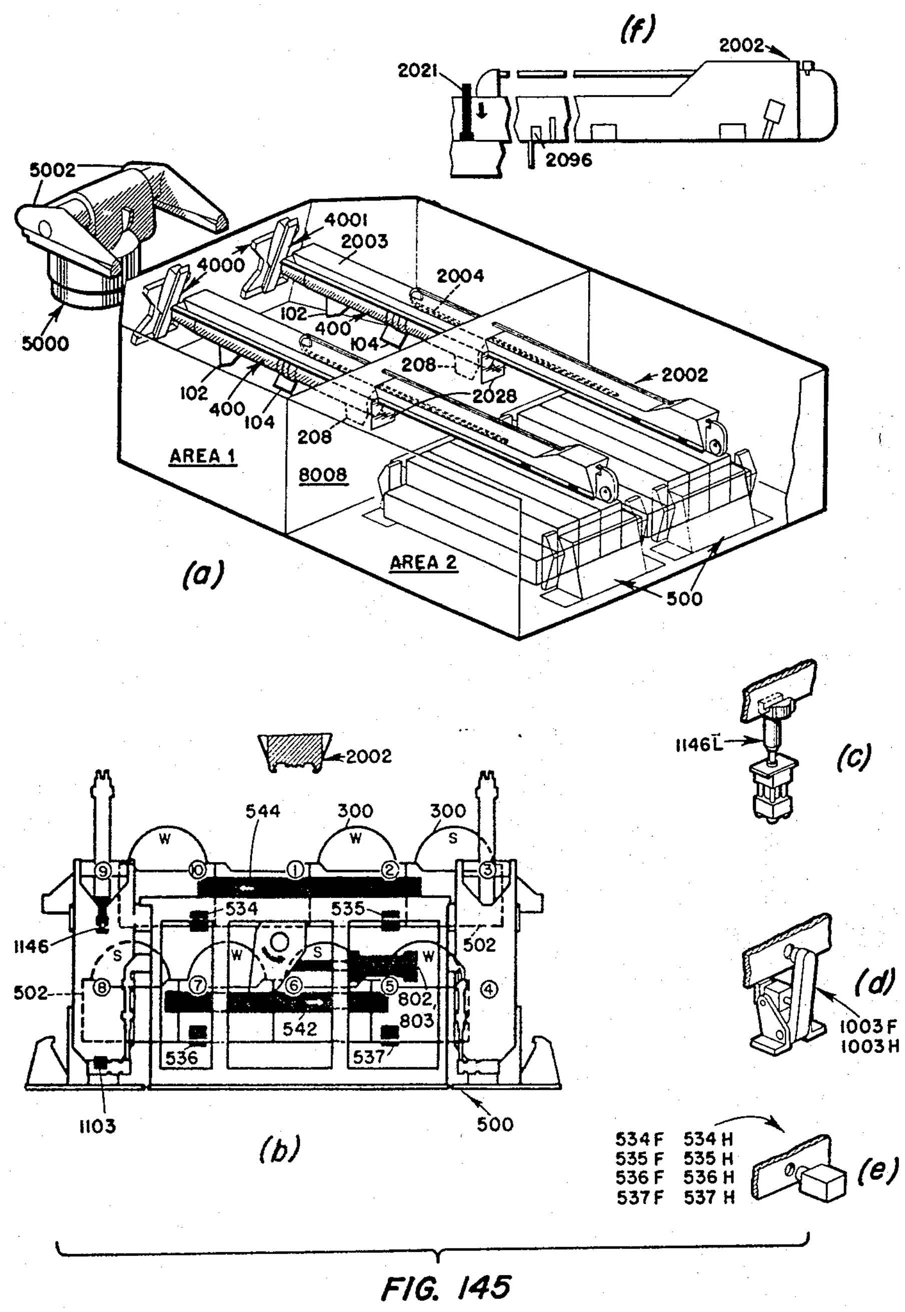
Figure 146:
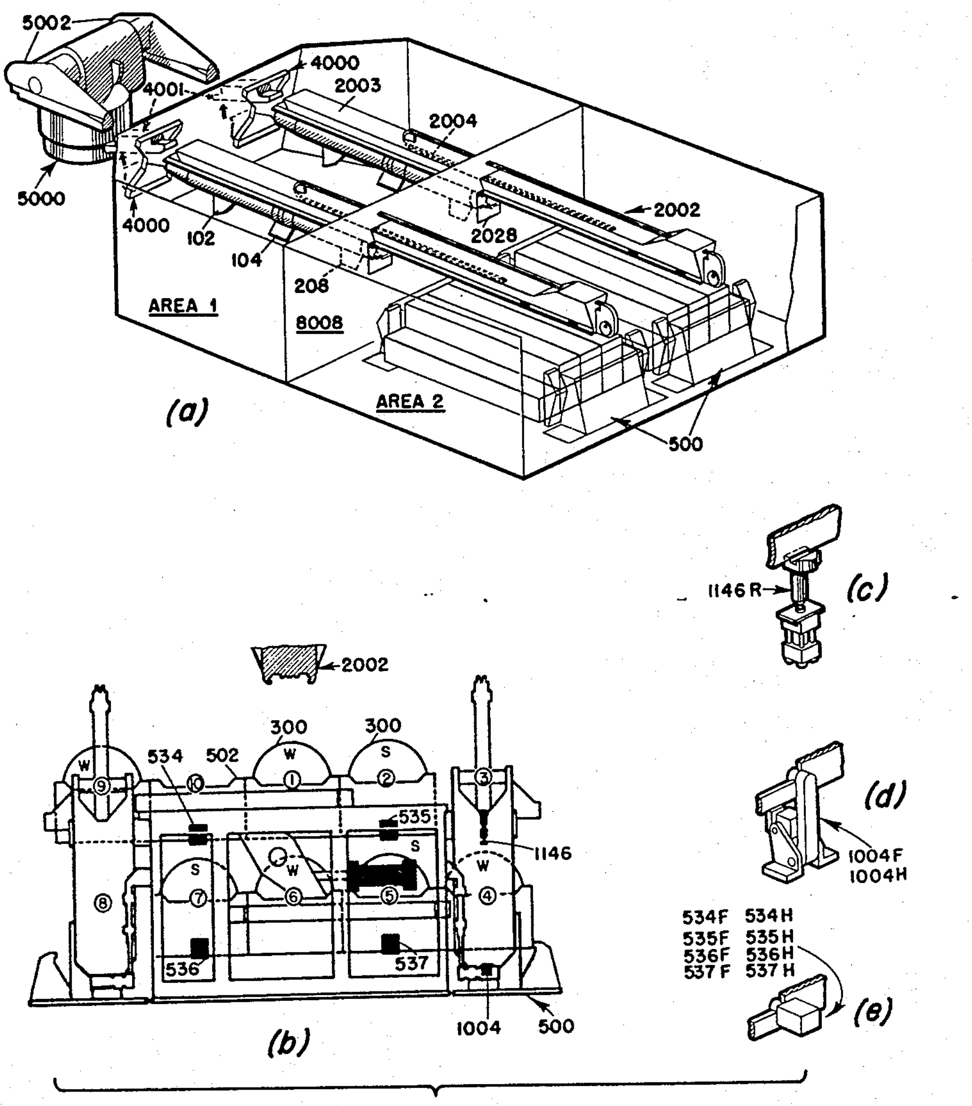
Figure 147:
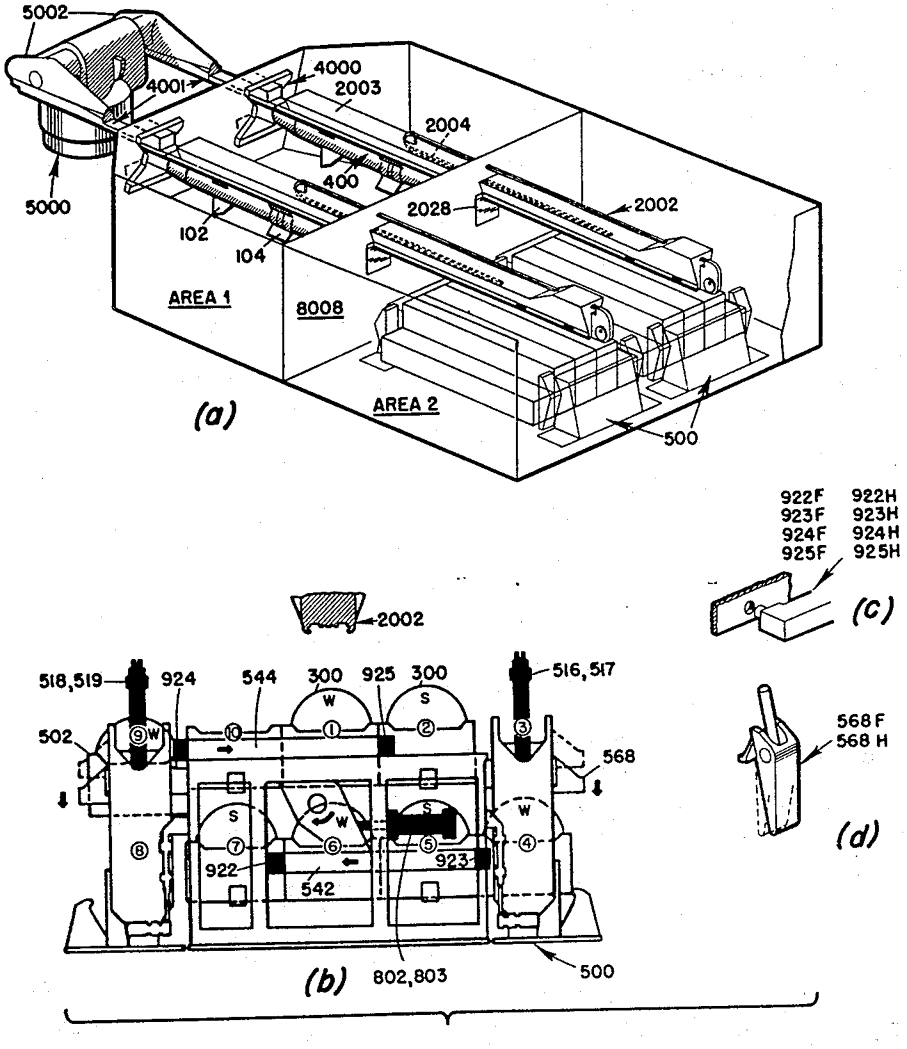
Figure 148:
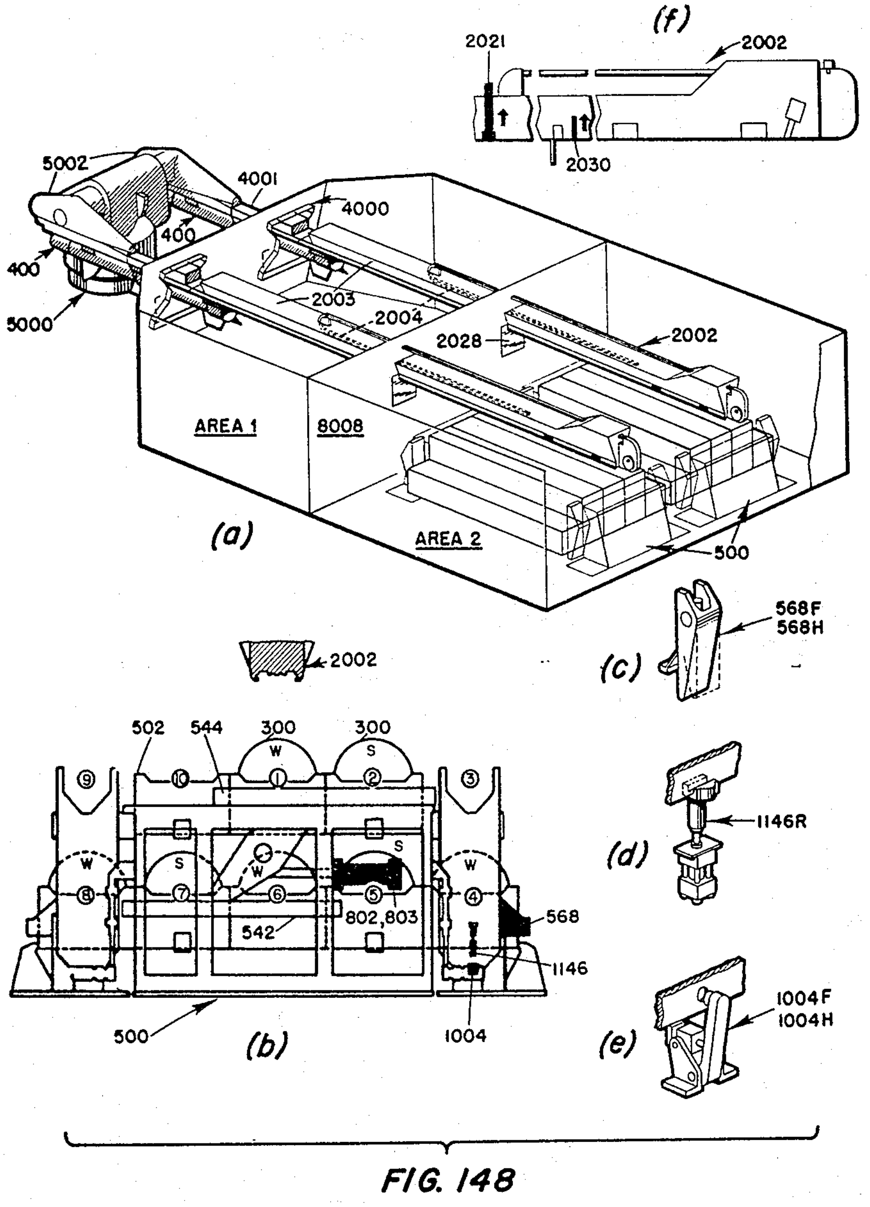
Figure 149:
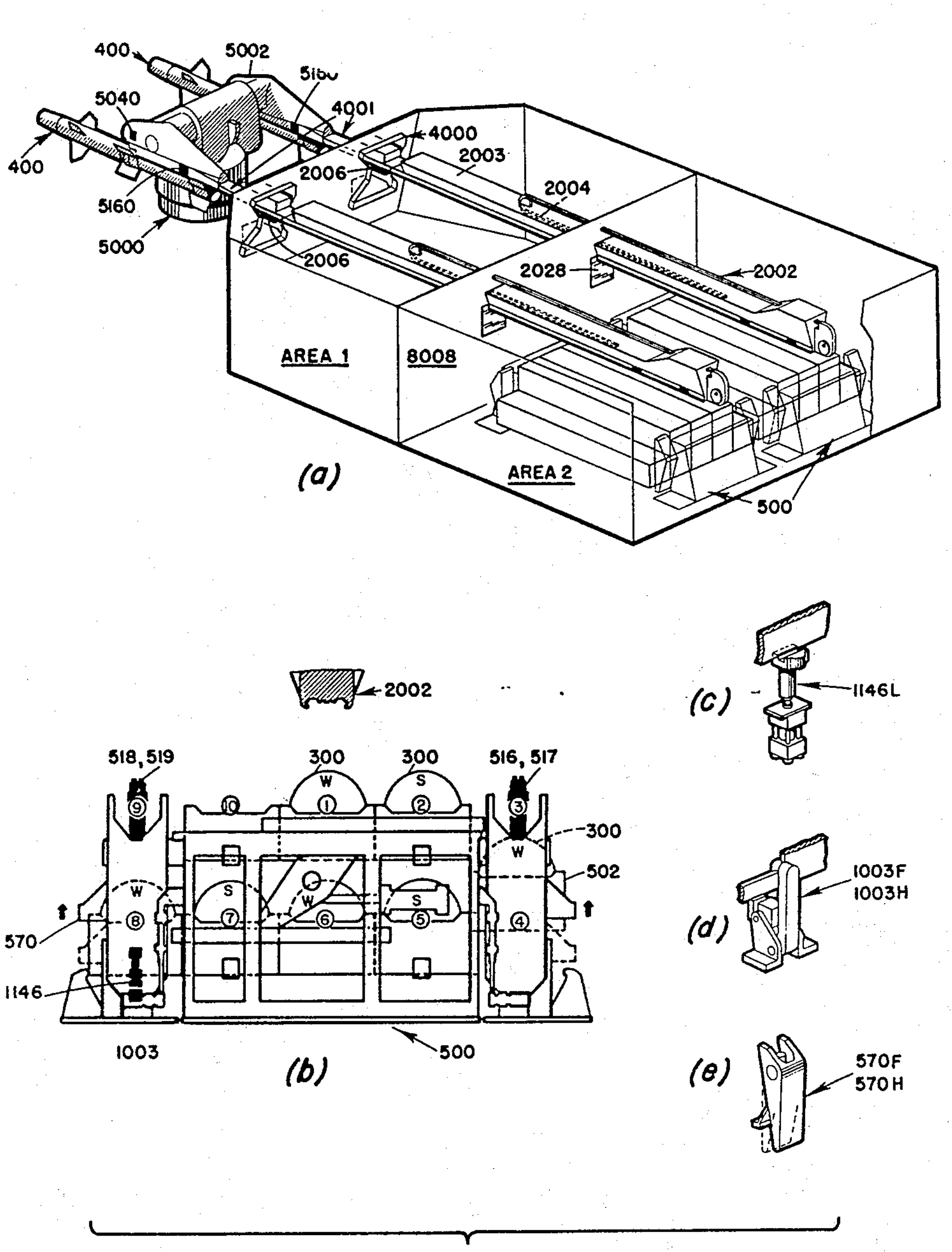
Figure 150:
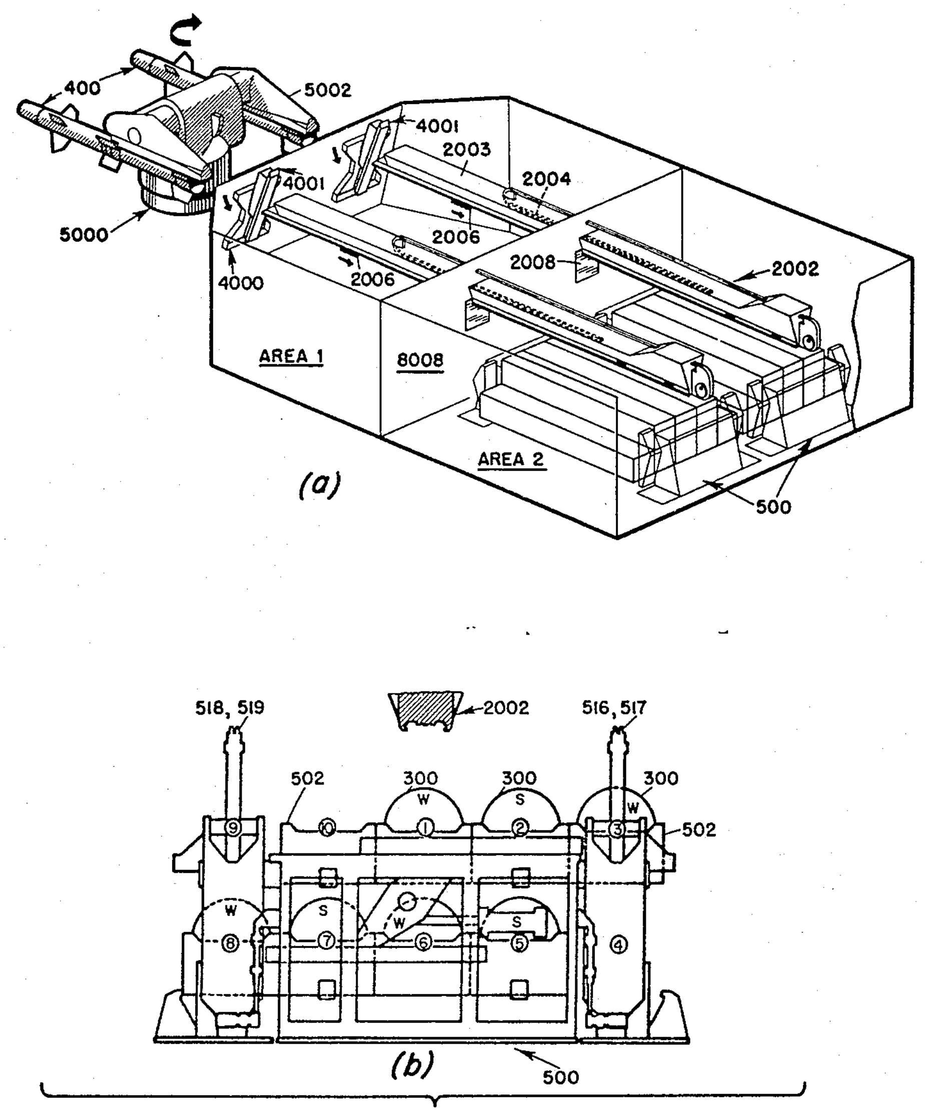
Figure 151:
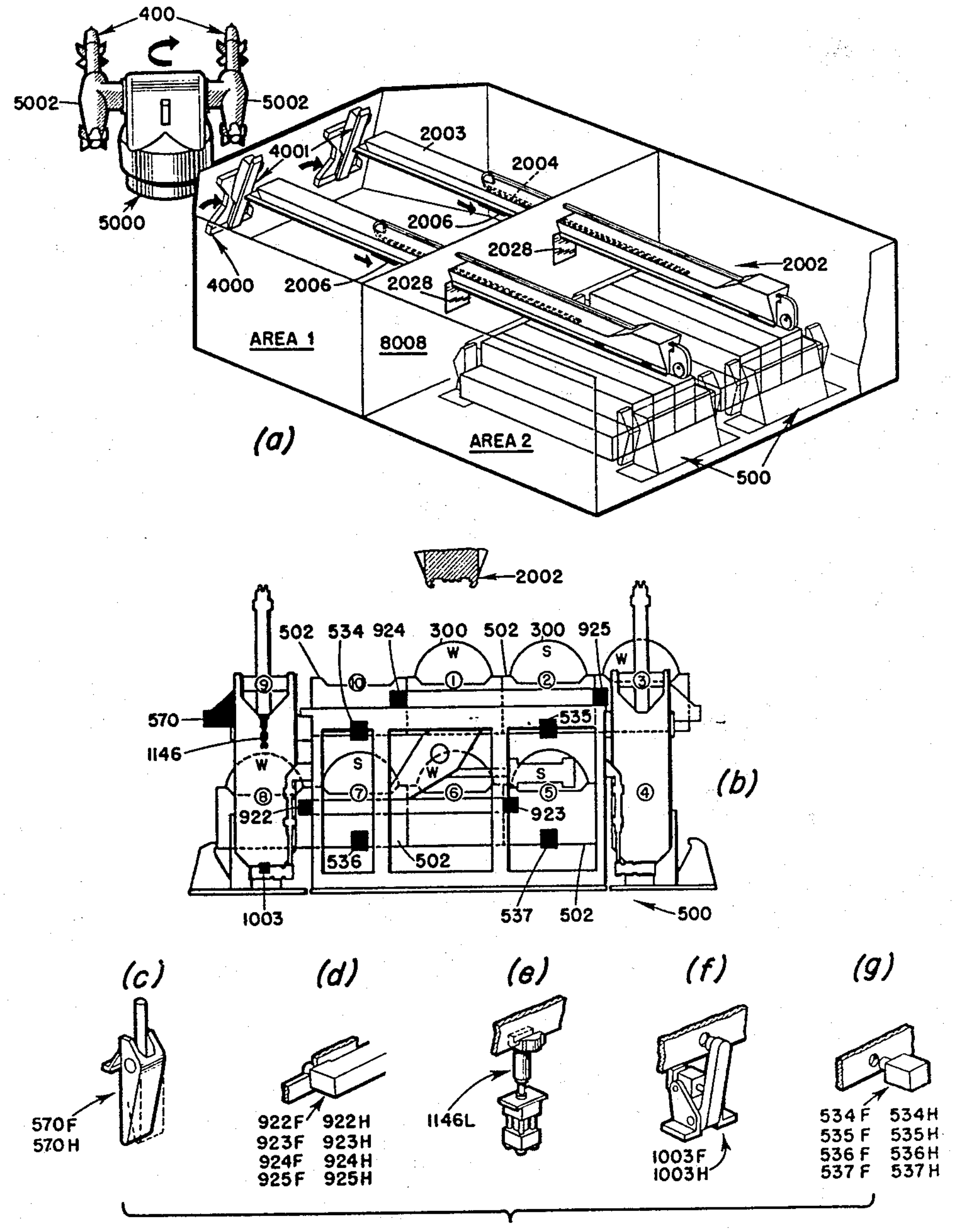
Figure 152:
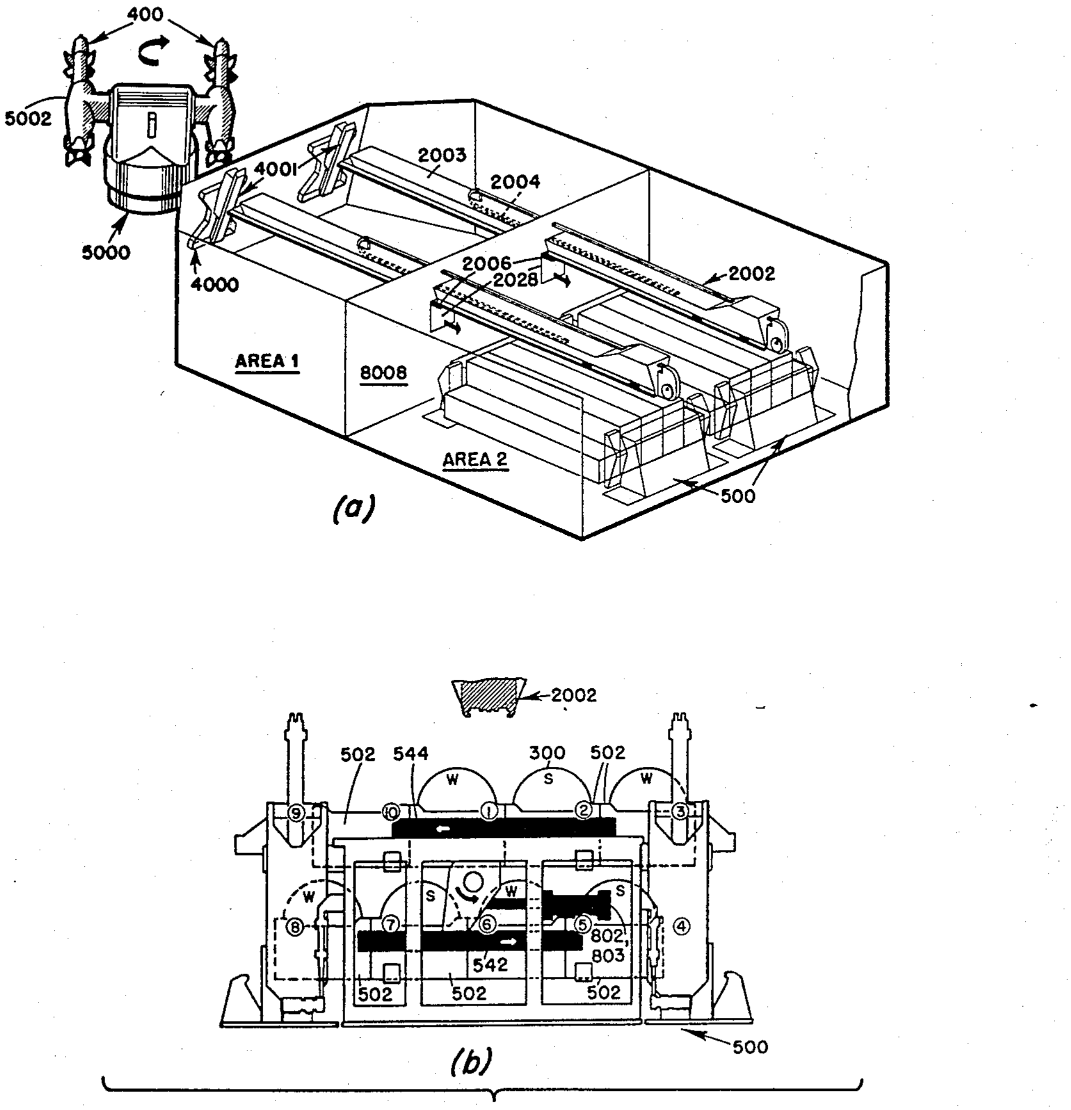
Figure 153:
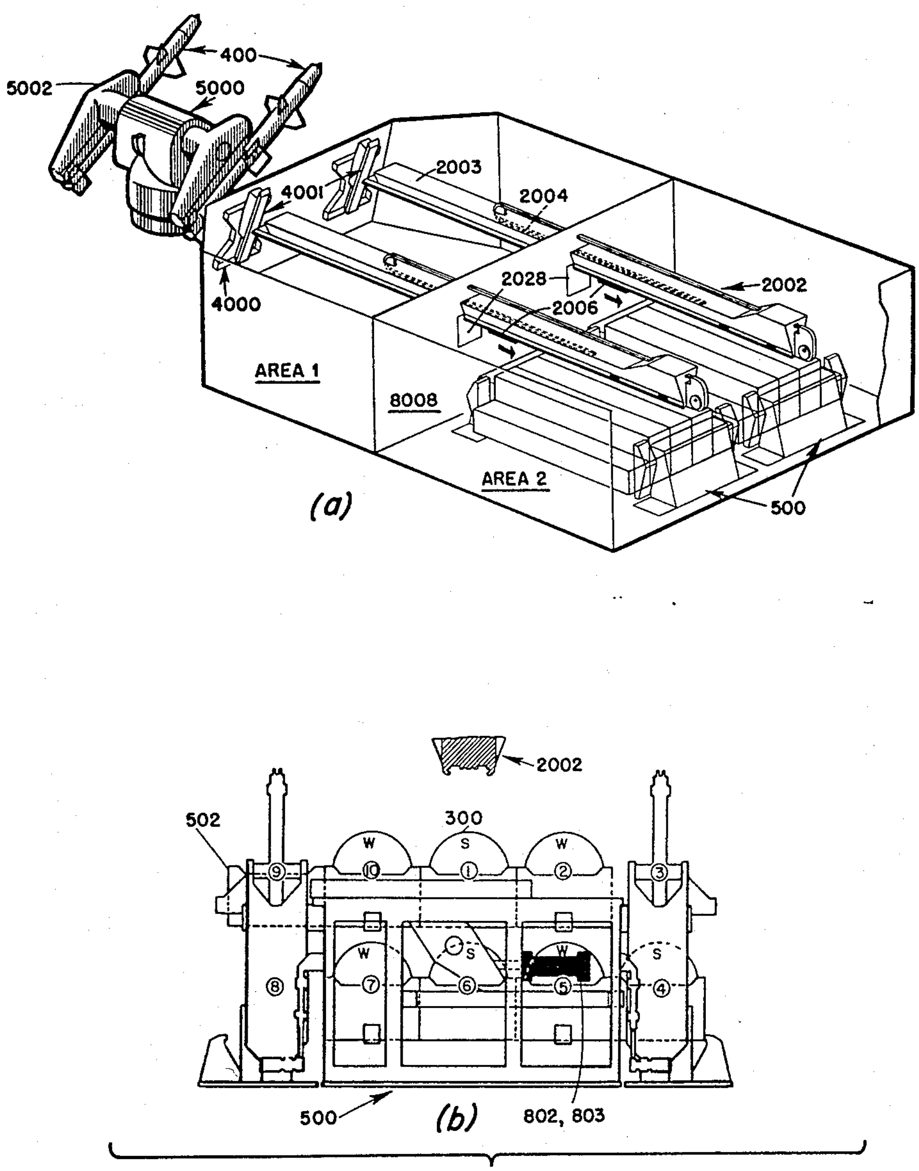
Figure 154:
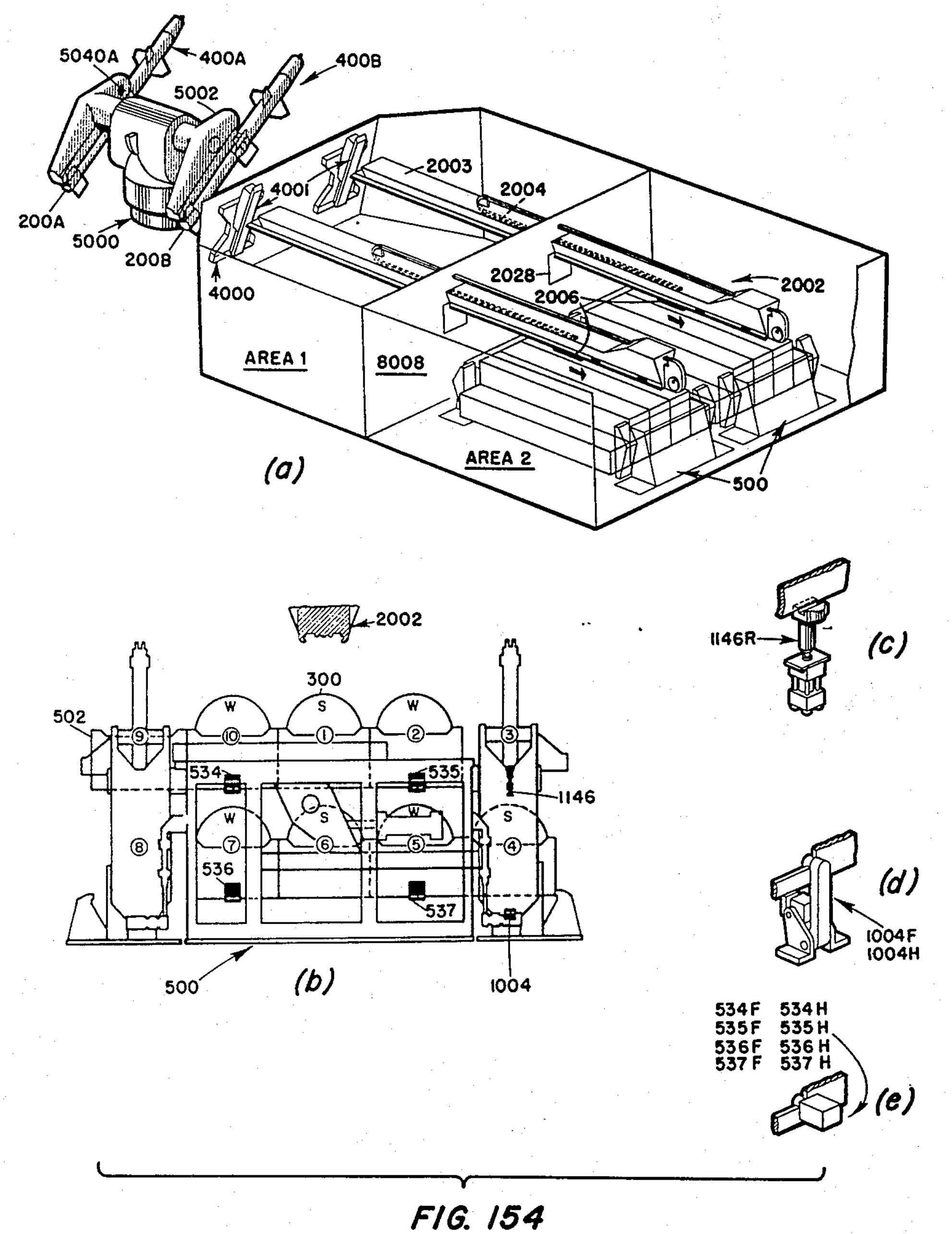
Figure 155:
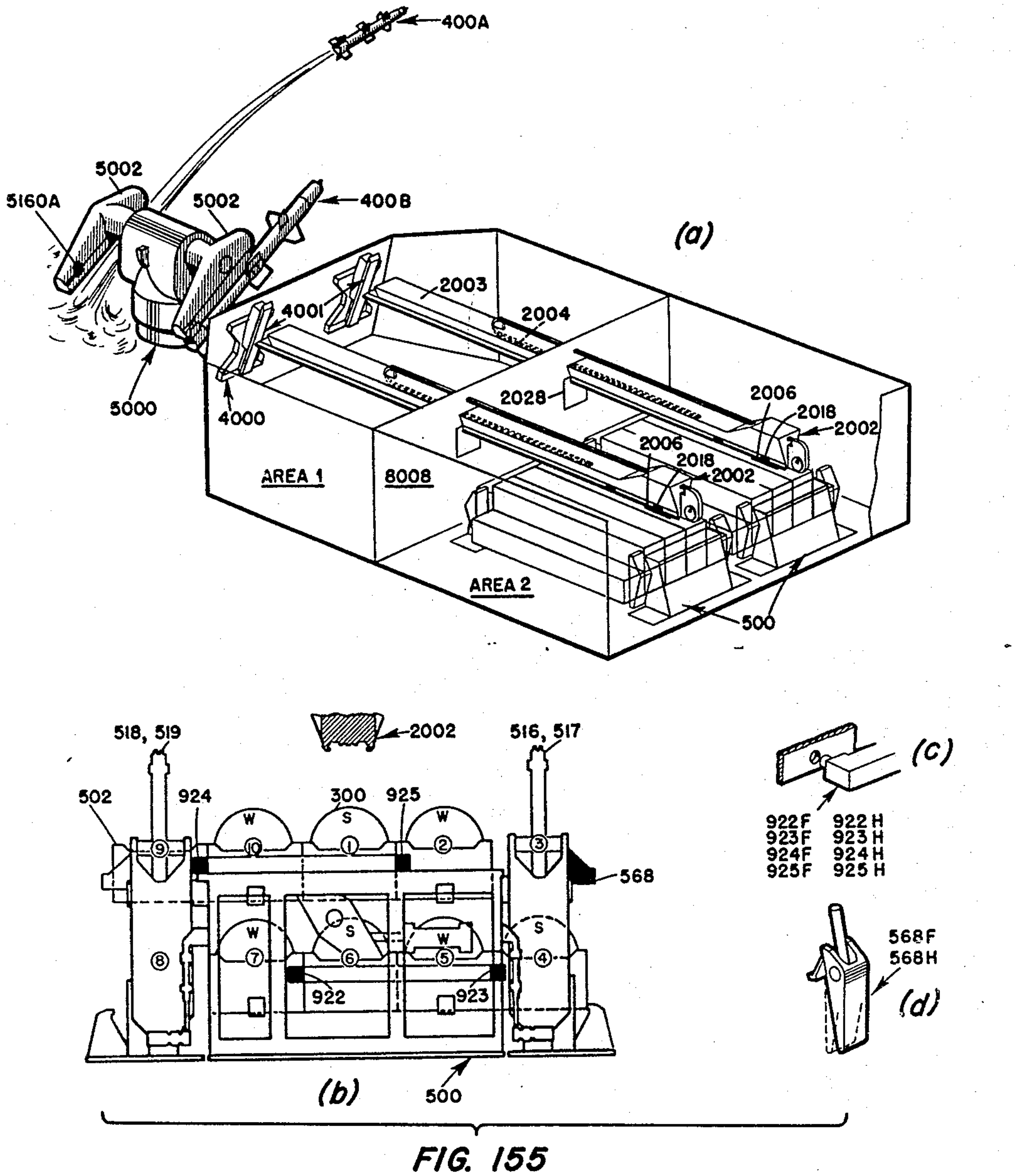
Figure 156:
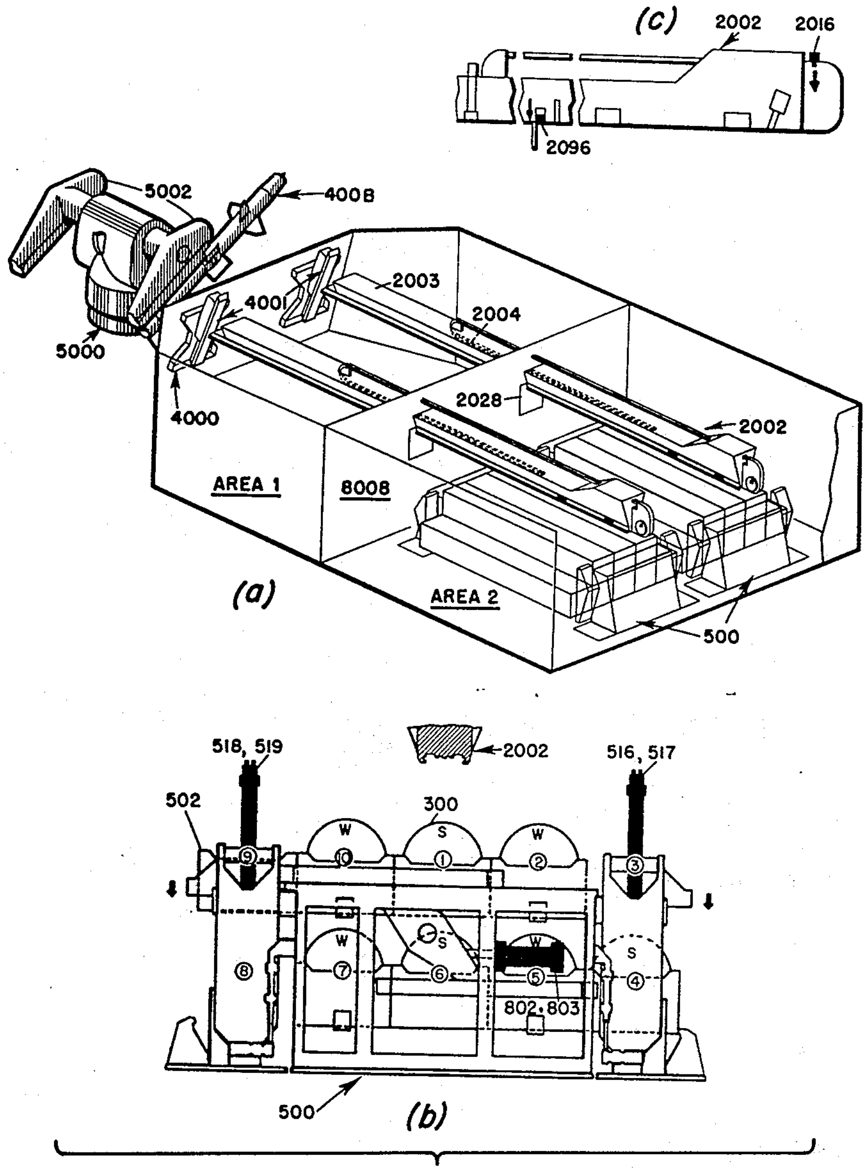
Figure 157:
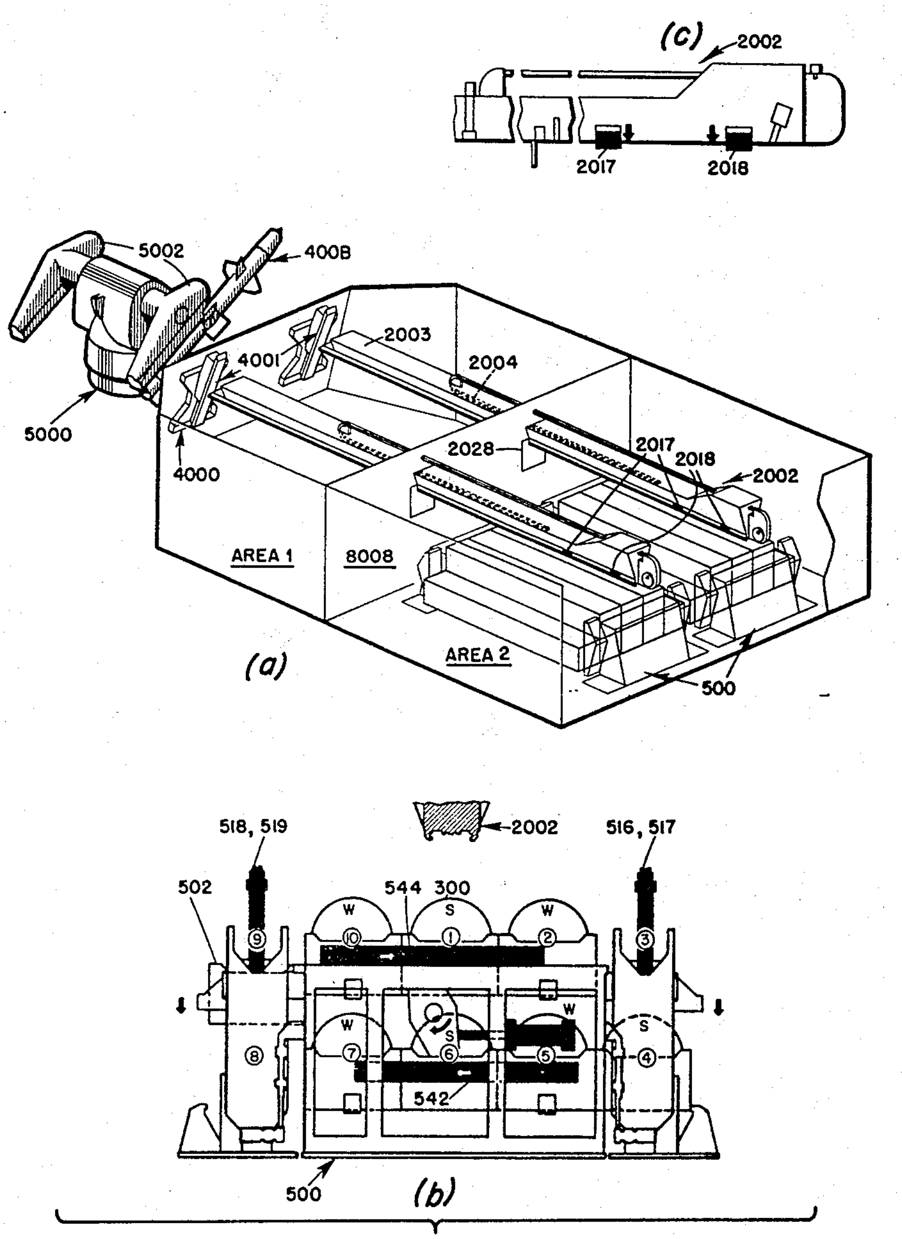
Figure 158:
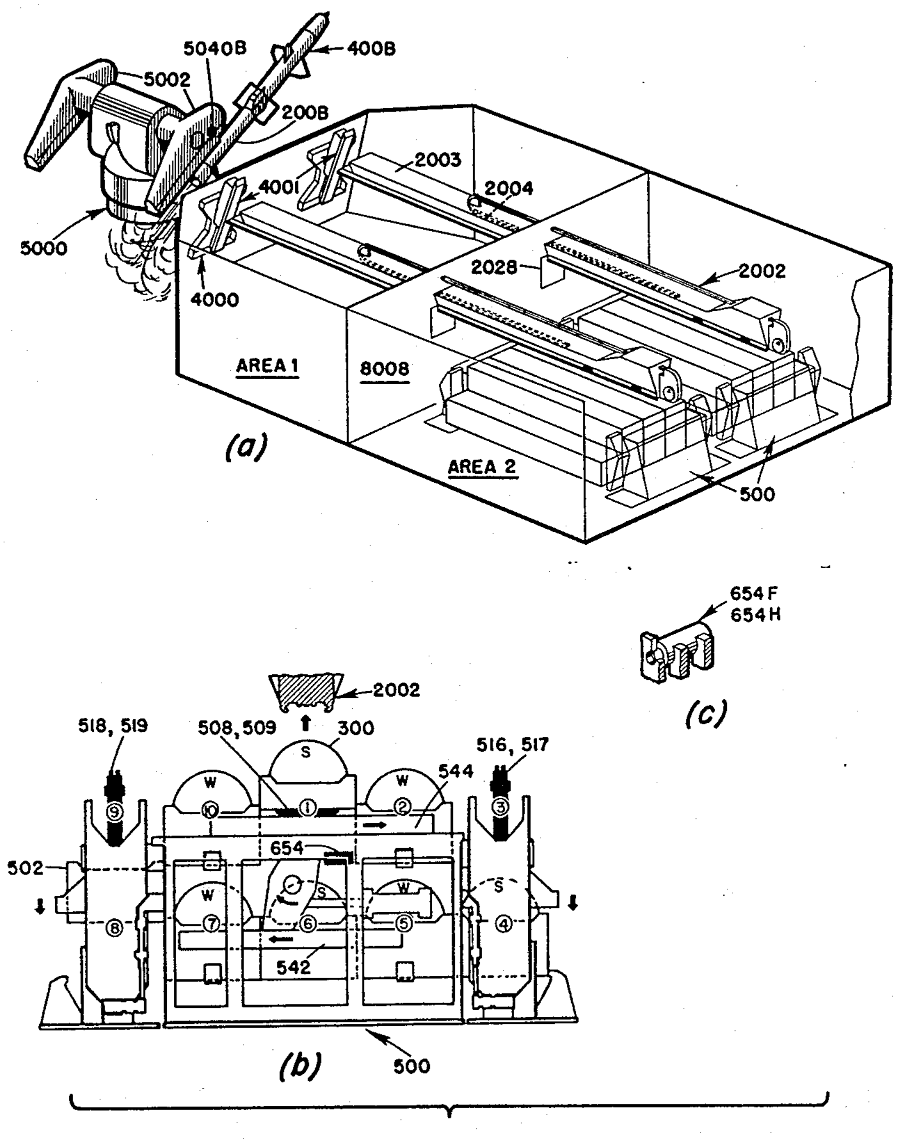
Figure 159:
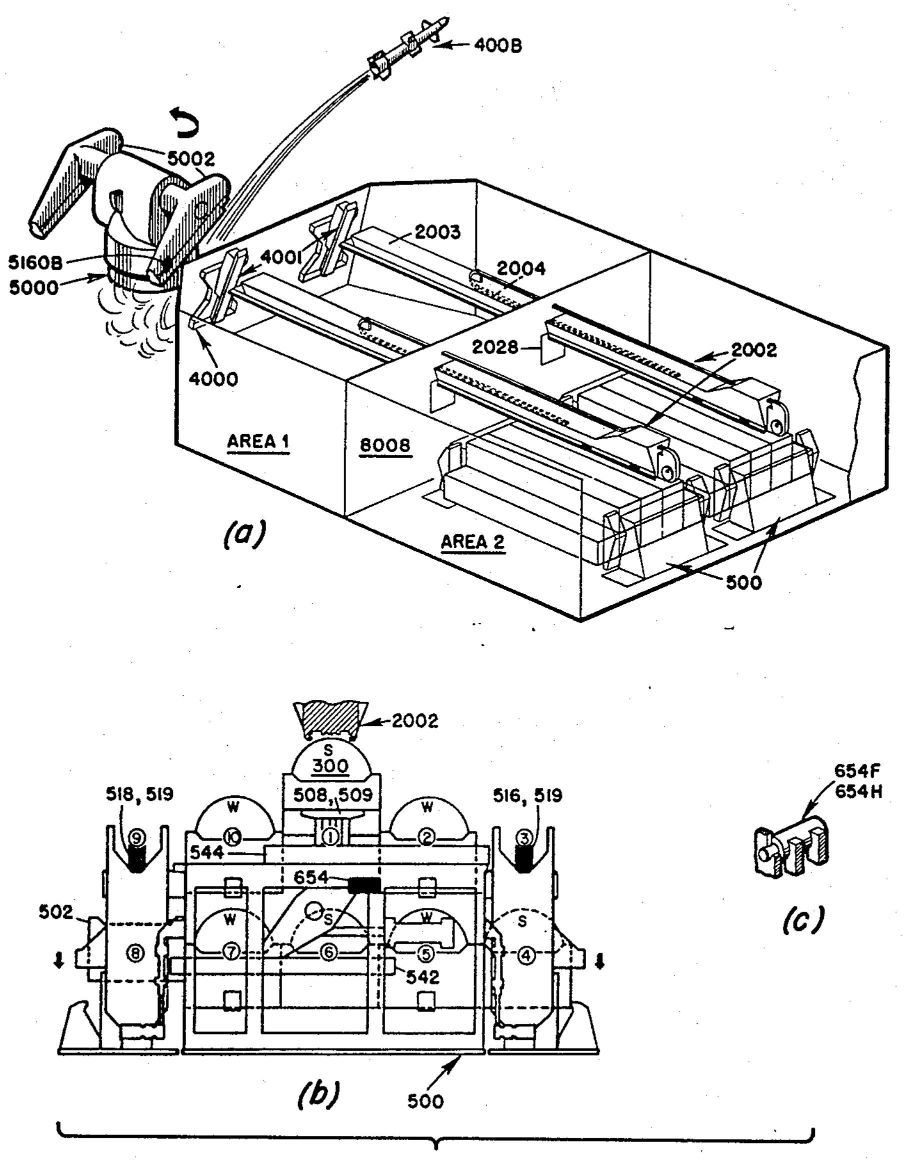
Figure 160:
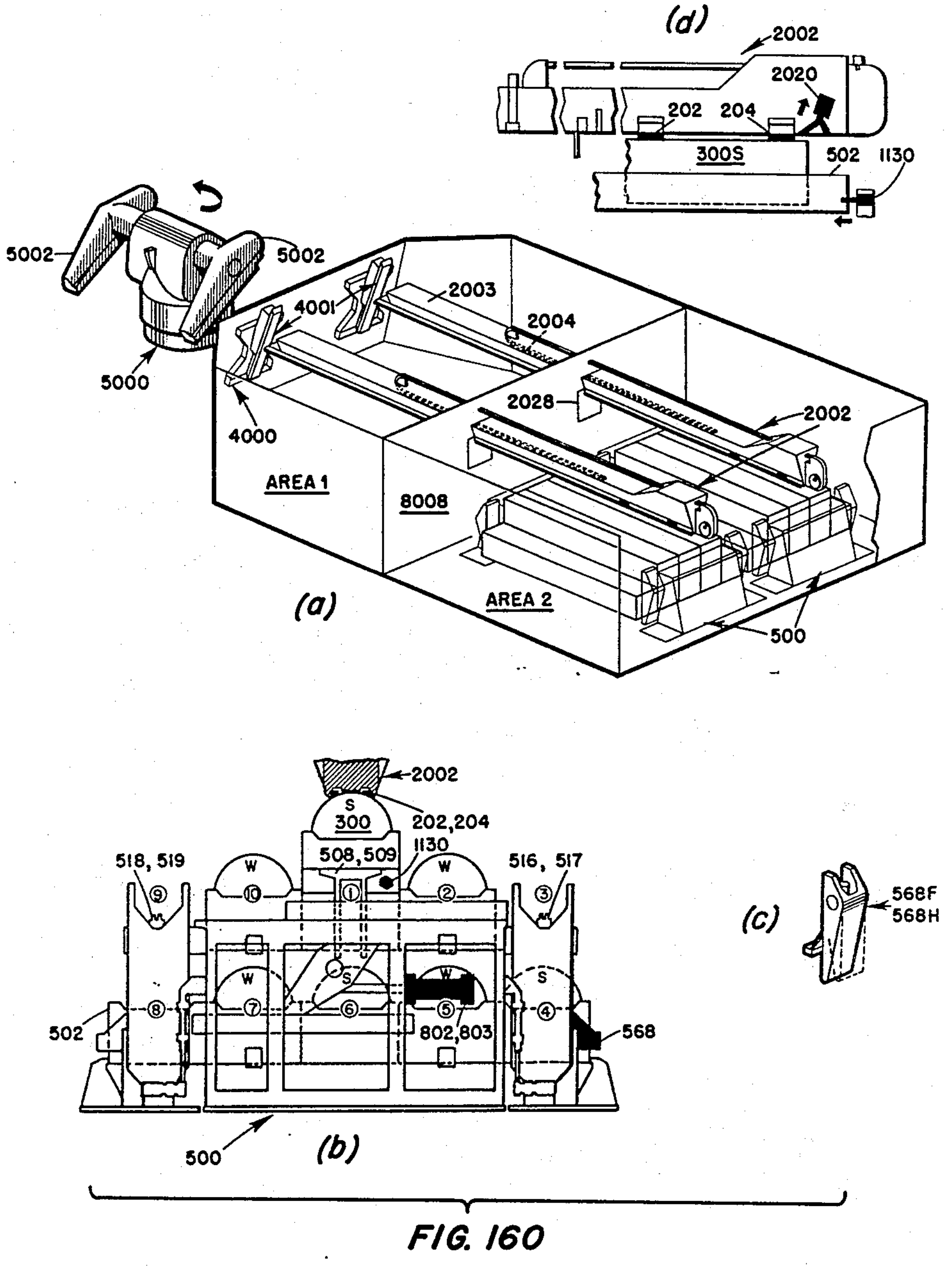
Figure 161:
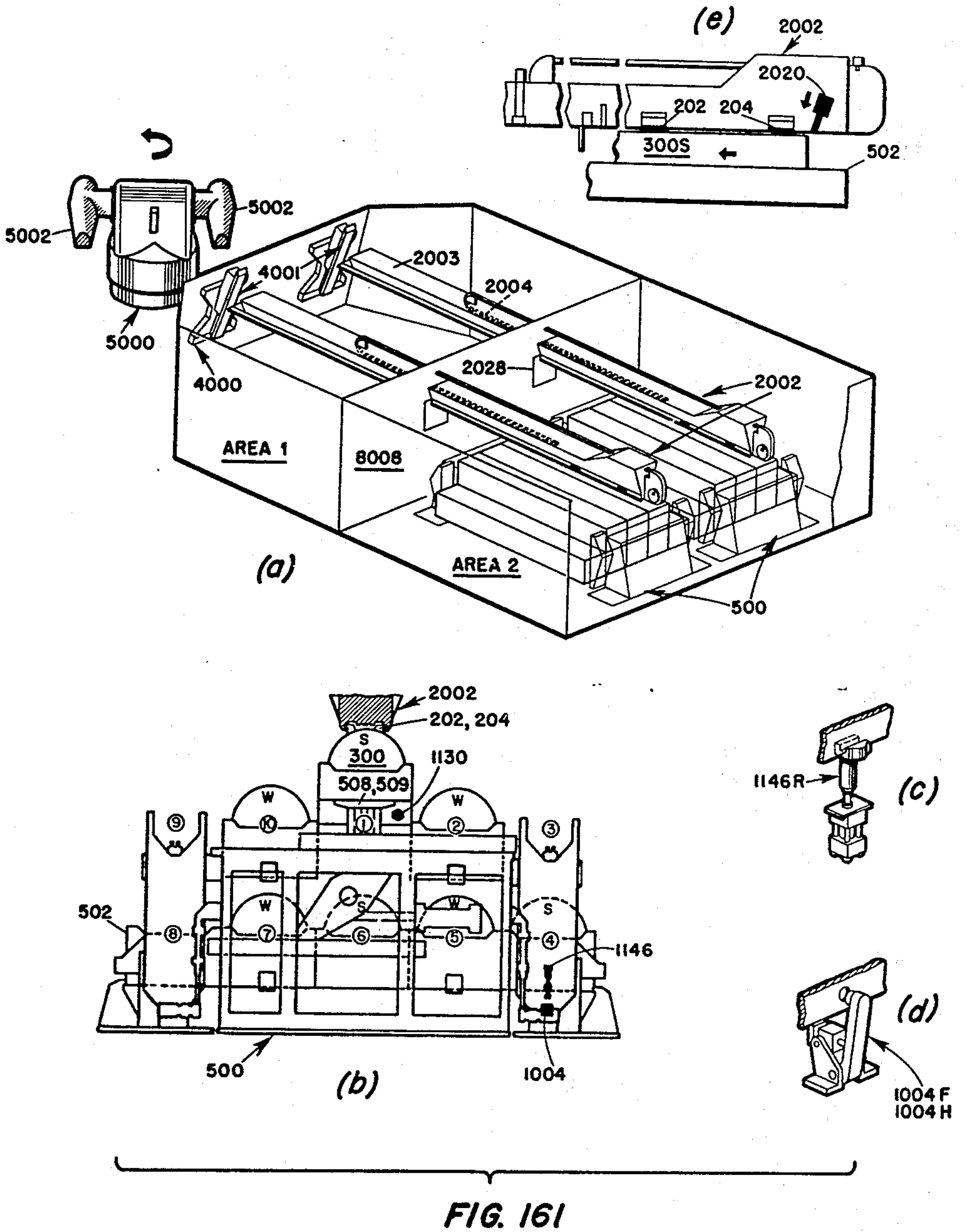
Figure 162:
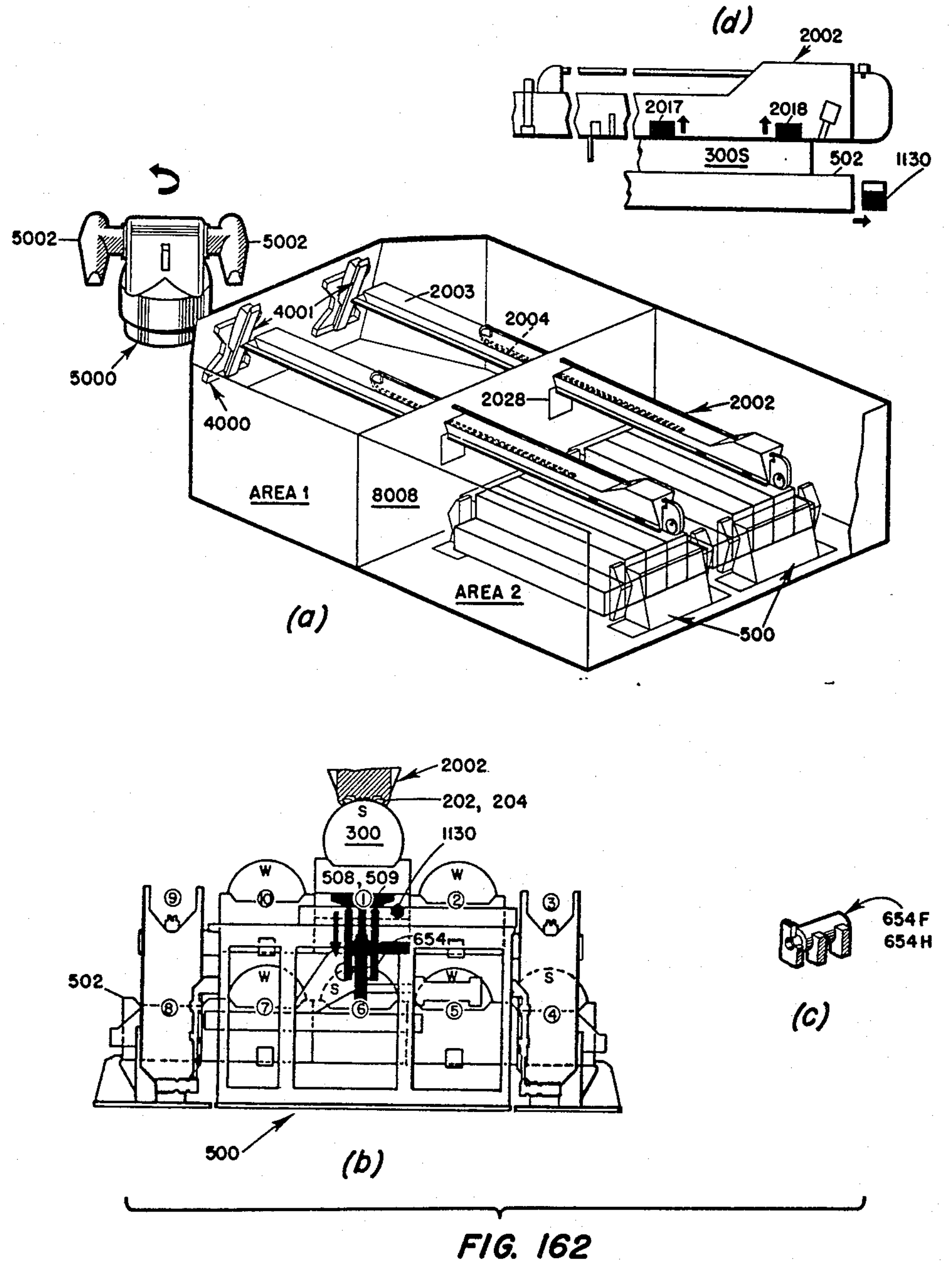
Figure 163:
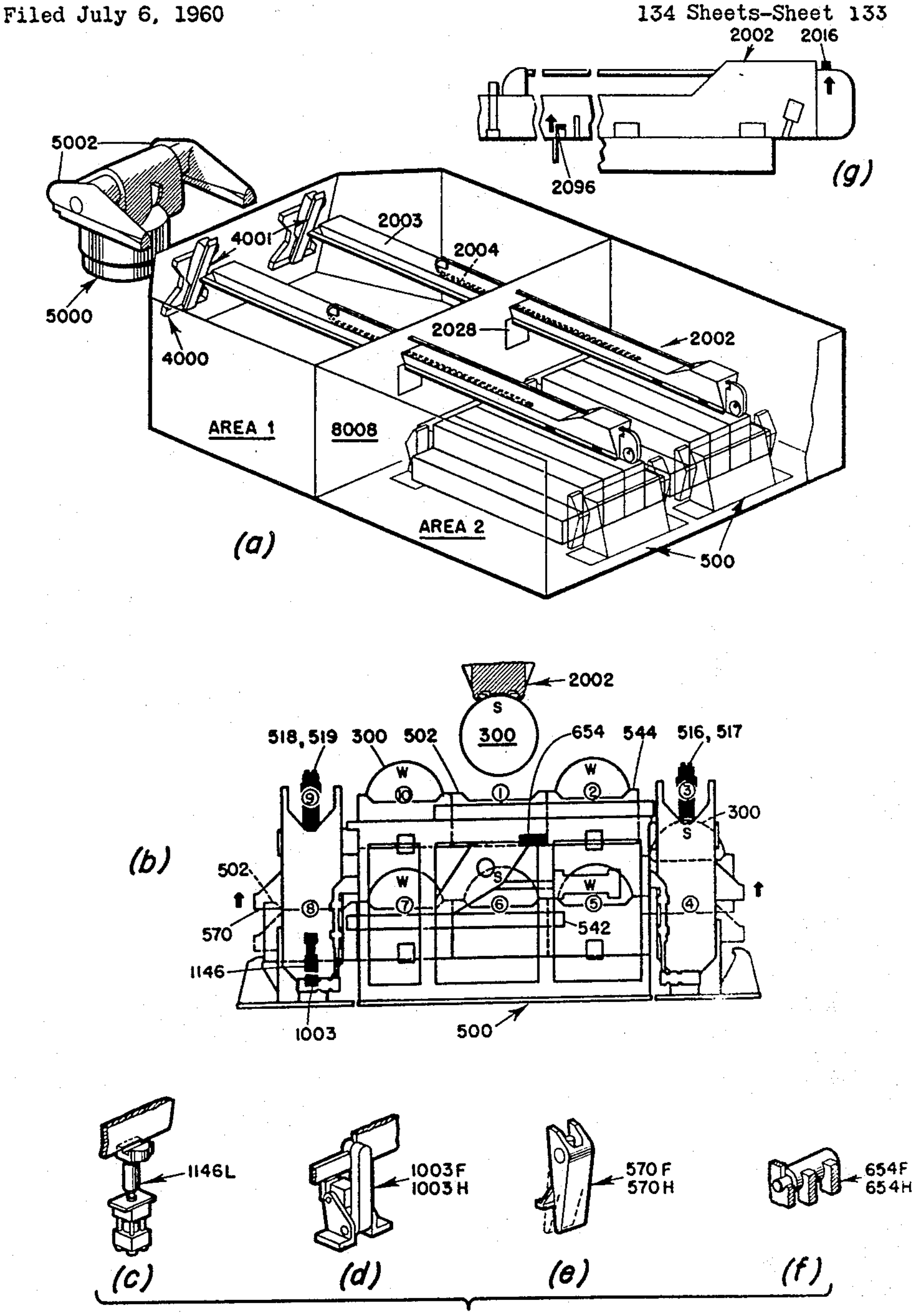
Figure 164:
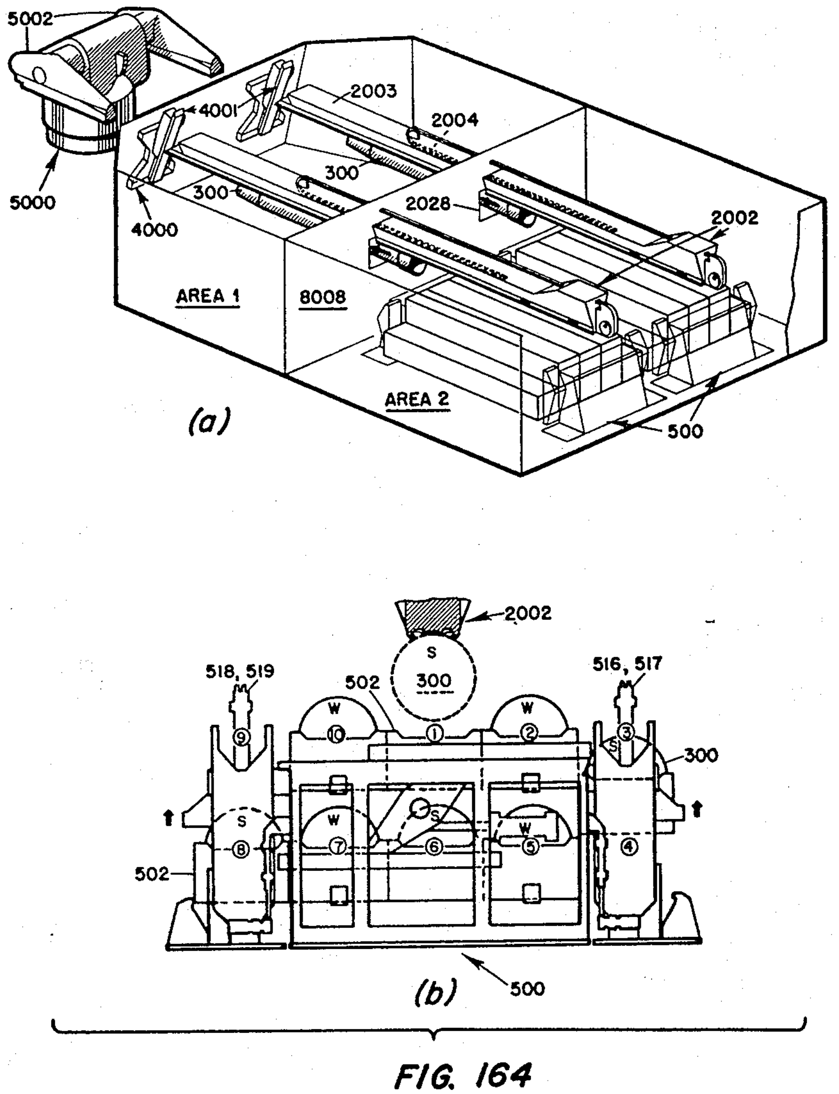

FIG. 19*a* is a cross section taken along line 19*a*—19*a* of FIG. 19;

FIG. 19*b* is a cross section taken along line 19*b*—19*b* of FIG. 19;

FIG. 20 is a vertical section of the hydraulic components of trunk section I;

FIG. 20A is a continuation of the vertical section of FIG. 20 and located to the left thereof;

FIG. 21 is a cross section taken along line 21—21 of FIG. 20A;

FIG. 22 is a vertical cross section taken along line 22—22 of FIG. 20, with the left side stowed and the right side floating;

FIG. 23 is a vertical cross section taken along line 23—23 of FIG. 20A, with the left side thereof stowed and the right side floating;

FIG. 24 is a side elevation, partly in cross section, showing the operation of the rammer, with the missile-booster combination hoisted for the aft shoe to engage the saddle cart;

FIG. 25 is a side elevation, partly in cross section, showing the operation of the rammer, with the pawls partially retracted;

FIG. 26 is a side elevation, partly in cross section, showing the operation of the rammer, with a pawl dropped behind the aft shoe of the booster;

FIG. 27 is a side elevation, partly in cross section, showing the operation of the rammer, with the missile-booster combination rammed forward;

FIG. 28 is a dimetric view, partly broken away, of a floating track in a lowered position;

FIG. 29 is a dimetric view, partly broken away, of a floating track in a raised position;

FIG. 30 is a vertical section, partly in elevation, of a floating track;

FIG. 31 is a section taken along line 31—31 of FIG. 30;

FIG. 32 is a section taken along line 32—32 of FIG. 31;

FIG. 33 is a vertical section, partly in elevation, illustrating the first stage of the floating track engagement with the forward booster shoe of the missile-booster combination;

FIG. 34 is a vertical section, partly in elevation, illustrating the second stage of the floating track engagement with the forward booster shoe of the missile-booster combination;

FIG. 35 is a vertical section, partly in elevation, illustrating the third stage of the floating track engagement with the forward booster shoe of the missile-booster combination;

FIG. 36 is a schematic view, partly in cross section, of the floating track in lowered position;

FIG. 37 is a schematic diagram of the hydraulic components for the loader in Area 1;

FIG. 38 is a cross section taken along line 38—38 of FIG. 37, showing the right half of the warmup contactor extended and the left half retracted;

FIG. 39 is a dimetric view of a flametight door;

FIG. 40 is a schematic of the flametight door of FIG. 39;

FIG. 41 is a cross section taken along line 41—41 of FIG. 40;

FIG. 42 is a dimetric view, partly in section, of a warmup contactor showing the contact box thereof extended;

FIG. 43 is a dimetric view, partly in section, of the warmup contactor of FIG. 42, showing the contact box thereof retracted;

FIG. 44 is an exploded view of a universal alignment head for the warmup contactor;

FIG. 45 is a cross section of the warmup contactor box and alignment head illustrating beginning of the engagement thereof with the missile contact pad;

FIG. 46 is a cross section similar to FIG. 45 of the warmup contactor box and alignment head illustrating complete engagement thereof with the missile contact pad;

FIG. 47 is a vertical section, partly in side elevation, of a high current contact of the warmup contactor;

FIG. 48 is a vertical section, partly in side elevation, of a low current contact of the warmup contactor;

FIG. 49 is a dimetric view of the loader portion of a span track-to-loader latch mechanism;

FIG. 50 is a dimetric view of the span track portion of the span track-to-loader latch mechanism;

FIG. 51 is a section taken lengthwise through a knee joint of the saddle cart;

FIG. 52 is a dimetric view of a typical joint and mounting for the sections of loader chain storage track;

FIG. 53 is a dimetric view of a loader chain assembly showing cam rollers and link cutout;

FIG. 54 is a typical section taken through a chain link;

FIG. 55 is a side elevation of loader chain and saddle cart therefor;

FIG. 56 is a dimetric view of the saddle cart and a pawl linkage arrangement showing relationship to loader chain and skid tracks;

FIG. 57 is a vertical sectional view of the saddle cart, chain pawls, and linkage arrangement;

FIG. 57A is a continuation to the right of FIG. 57;

FIG. 58 is a dimetric view illustrating position of the saddle cart and loader chain linkage arrangement after loading of the weapon onto the launcher;

FIG. 59 is a side elevation, partly in cross section, showing stoppage of the saddle cart with said saddle cart being latched to the loader chain nearing end of travel;

FIG. 60 is a side elevation, partly in cross section, showing the stoppage of the saddle cart with the knee latch being released;

FIG. 61 is a side elevation, partly in cross section, showing the stoppage of the saddle cart, with the saddle cart being decelerated;

FIG. 62 is a side elevation, partly in cross section, of the saddle cart stopped, with the loader chain overtraveled;

FIG. 63 is a dimetric view, partly broken away, of the saddle cart crosshead assembly after loading of the weapon onto the guide arm of the launcher;

FIG. 64 is an exploded view of the saddle cart crosshead assembly;

FIG. 65 is a cutaway elevation view, partly in cross section, of engaging means on the guide arm for receiving the saddle cart;

FIG. 66 is a cutaway elevation view, partly in cross section, of the saddle cart in the guide arm, showing knee joint cam roller engaging the guide arm;

FIG. 67 is a cutaway elevation view, partly in cross section, of the saddle cart in the guide arm, showing booster of the weapon engaged to the guide arm, with the loader chain in an overtraveled position;

FIG. 68 is a dimetric view of guide arm latch and saddle cart;

FIG. 69 is a side elevation, partly in cross section, illustrating the engagement of the aft booster shoe of booster to saddle cart, with the saddle cart being in normal loaded position;

FIG. 70 is a view similar to FIG. 69, with the safety stop limiting pawl lift;

FIG. 71 is a view similar to FIGS. 69 and 70, showing aft booster shoe in nominal position before ramming with left and right inserts showing minimum and maximum tolerance, respectively;

FIG. 72 is a schematic diagram of the basic elements which control the movement of the loader drive;

FIG. 72A is an enlargement of the differential of FIG. 72 showing the control barrel cam and details of the stop ring and stop;

FIG. 73 is a dimetric view of a photoelectric receiver and light source therefor;

FIG. 74 is a sectional view of a filter assembly on a supply tank;

FIG. 75 is a dimetric view, partly cut away, of auxiliary servo and supercharge pumps;

FIG. 76 is a cutaway view of a geared speed reducer;

FIG. 77 is a sectional view, partly in elevation, of the hydraulic transmission for the loader;

FIG. 78 is a hydraulic schematic of the loader drive control components used in hydraulic control of the loader system;

FIG. 78A is a cross section of a main relief valve;

FIG. 79 is a section taken along line 79—79 of FIG. 79A, partly in perspective, of a low current contact of the warmup contactor;

FIG. 79A is a perspective view of low current contact of the warmup contactor;

FIG. 80 is a cutaway view, partly in perspective, of B-end response gearing;

FIG. 81 is a dimetric view, partly in cross section, of the A-end response assembly;

FIG. 82 is a dimetric view, partly cut away, of a loader power-off brake;

FIG. 83 is a sectional view of the loader power-off brake assembly;

FIG. 84 is a cross section of the power-off brake taken along line 84—84 of FIG. 83;

FIG. 85 is a cross section of the loader power-off brake along line 85—85 of FIG. 83;

FIG. 86 is a dimetric view, partly cut away, of a pilot rack and pinion therefor;

FIG. 87 is a cross section, partly in plan, of the loader chain drive sprocket and power-off brake;

FIG. 88 is a dimetric view of an assembly detail of the pilot rack anchor and roller;

FIG. 89 is a dimetric view, partly cut away, of pilot rack differential and clutch;

FIG. 89A is a continuation to the right of the dimetric view of FIG. 89;

FIG. 90 is a dimetric view, partly in section and partly in phantom, of components of the gearbox;

FIG. 91 is a dimetric phantom view of loader control valve block;

FIG. 92 is a schematic of the loader drive cam and operating valves;

FIG. 93 is a cross section of a detail of control cam and differential;

FIG. 94 is a longitudinal cross section, partly in elevation, of a power-off valve;

FIG. 95 is a longitudinal cross section, partly in elevation, of a pilot rack piston control valve;

FIG. 96 is a longitudinal cross section, partly in elevation, of a loader selector valve;

FIG. 97 is a schematic of switch cams;

FIG. 98 is a longitudinal cross section of a metering valve;

FIG. 99 is a cross section of a supercharge relief valve;

FIG. 99A is a longitudinal cross section of a remote plunger for a pressure indicator;

FIG. 100 is a longitudinal cross section of a servo valve;

FIG. 101 is a longitudinal cross section of a servo relief valve;

FIG. 102 is a dimetric view, partly in cross section, of Area 1 stop;

FIG. 103 is a sectional view, partly in elevation, of a creepage piston;

FIG. 104 is a schematic of local control assembly;

FIG. 105 is a sectional view, partly in elevation, of the local control handcrank;

FIG. 106 is a master schematic of loader power drive and loader components;

FIG. 106A is a continuation to the right of FIG. 106;

FIG. 106B is a continuation to the right of FIG. 106A;

FIG. 107 is a schematic, partly in cross section and side elevation, of the forward and rear floating tracks;

FIG. 108 is a schematic, partly in cross section and side elevation, of a rammer;

FIG. 109*a* is a schematic, partly in cross section and side elevation, of the lower portion of shoe engagement indicator;

FIG. 109*b* is a schematic, with parts removed, of the upper portion of shoe engagement indicator;

FIG. 110 is a schematic of flametight door control valves;

FIG. 111 is a hydraulic schematic of Areas 1 and 2 interlock valves;

FIG. 111A is a continuation to the right of FIG. 111;

FIG. 111B is a continuation to the upper right of FIG. 111A;

FIG. 111C is a continuation to the lower right of FIG. 111A;

FIG. 112 is a hydraulic schematic of the Area 2 positioner;

FIG. 113 is a schematic, partly in cross and elevation, of a chain track flame seal;

FIGS. 114 to 124 inclusive are operational schematic diagrams of the power drive in various different cyclic conditions;

FIG. 125 is a side elevation of the Area 1 accumulator unit showing generally the location of the component parts;

FIG. 126 is a hydraulic schematic of the Area 1 accumulator unit fully charged and unloading;

FIG. 126A is a continuation to the right of the hydraulic schematic of the Area 1 accumulator unit of FIG. 126;

FIG. 127 is a dimetric view, taken from below, of an adapter block assembly;

FIG. 128 is a hydraulic schematic of the Area 2 accumulator pump charging unit;

FIG. 129 is a schematic outline drawing of the guided missile launching system showing location of control panels;

FIGS. 130(*a*) and (*b*) are schematic outline drawings of the guided missile launching system showing it in a condition ready for automatic continuous load operation;

FIG. 131(*a*) to (*g*) are outline drawings of components of ready service mechanism in a normal stowed position;

FIGS. 132(*a*) to (*e*) are outline drawings of components of guided missile launching system showing the ready service mechanism beginning its automatic operation;

FIGS. 133(*a*) to (*g*) are similar to FIGS. 132(*a*) to (*e*) with the ready service trays positioned for counterclockwise indexing thereof;

FIGS. 134(*a*) and (*b*) are similar to FIGS. 133(*a*) to (*g*) with the ready service mechanism indexing counterclockwise;

FIGS. 135(*a*) to (*f*) are similar to FIGS. 134(*a*) and (*b*) with the ready service mechanism indexing being completed;

FIGS. 136(*a*) to (*e*) are similar to FIGS. 135(*a*) to (*e*) with the ready service mechanism shown beginning hoist to the loader;

FIGS. 137(*a*) and (*b*) are similar to FIGS. 136(*a*) to (*e*) with the hoist continuing to raise to the loader;

FIGS. 138(*a*) to (*d*) are similar to FIGS. 137(*a*) and (*b*) with the center hoist being raised to the loader;

FIGS. 139(*a*) to (*c*) are similar to FIGS. 138(*a*) to (*d*) with the missile-booster combination being transferred to the loader;

FIGS. 140(*a*) to (*e*) are similar to FIGS. 139(*a*) to (*c*) with the missile-booster combination being positioned on the loader;

FIGS. 141(*a*) to (*d*) are similar to FIGS. 140(*a*) to (*e*) with the showing hoist being lowered to Station I;

FIGS. 142(*a*) to (*g*) are schematic outline drawings illustrating the beginning of a second cycle as loaders prepare to move the first salvo of missile-booster combinations to Area 1;

FIGS. 143(*a*) and (*b*) are similar to FIGS. 142(*a*) to (*g*) with the first salvo of missile-booster combinations in Area 1;

FIGS. 144(*a*) to (*e*) are similar to FIGS. 143(*a*) and (*b*) with the missile-booster combinations positioned in Area 1;

FIGS. 145(*a*) to (*f*) are similar to FIGS. 144(*a*) to (*e*) during installation of wings and fins to missile and booster to form a weapon;

FIGS. 146(*a*) to (*e*) are similar to FIGS. 145(*a*) to (*f*) with the action of the system continuing;

FIGS. 147(*a*) to (*d*) are similar to FIGS. 146(*a*) to (*e*) with the wing and fin assembly being completed;

FIGS. 148(*a*) to (*f*) are similar to FIGS. 147(*a*) to (*d*) illustrating the loading of first salvo of weapons onto the launcher;

FIGS. 149(*a*) to (*e*) are similar to FIGS. 148(*a*) to (*f*) with the weapons positioned on the launcher, the ready service mechanism begins its third cycle;

FIGS. 150(*a*) and (*b*) are outline drawings of guided missile launching system showing the launcher beginning to train and elevate to a firing position;

FIGS. 151(*a*) to (*g*) are similar to FIGS. 150(*a*) and (*b*) showing the blast doors closed and the launcher continuing to a firing position;

FIGS. 152(*a*) and (*b*) are similar to FIGS. 151(*a*) to (*g*) with the action continuing;

FIGS. 153(*a*) and (*b*) are similar to FIGS. 152(*a*) and (*b*) with the launcher in a firing position;

FIGS. 154(*a*) to (*e*) are similar to FIGS. 153(*a*) and (*b*) in that the weapons on the launcher are prepared to fire;

FIGS. 155(*a*) to (*d*) are similar to FIGS. 154(*a*) to (*e*) illustrating the firing of the A-side weapon;

FIGS. 156(*a*) to (*c*) are similar to FIGS. 155(*a*) to (*d*) showing the action during the interval prior to firing of the second weapon of the salvo;

FIGS. 157(*a*) to (*c*) are similar to FIGS. 156(*a*) to (*c*) with B-side weapon being readied for firing from the launcher;

FIGS. 158(*a*) to (*c*) are outline drawings of the guided missile launching system when the B-side weapon is fired;

FIGS. 159(*a*) to (*c*) are similar to FIGS. 158(*a*) to (*c*) with the B-side weapon being clear of the launcher;

FIGS. 160(*a*) to (*d*) are similar to FIGS. 159(*a*) to (*c*) in that the launcher begins to return to the load position;

FIGS. 161(*a*) to (*e*) are similar to FIGS. 160(*a*) to (*d*) showing the loader capturing the missile-booster combinations of the second salvo;

FIGS. 162(*a*) to (*d*) are similar to FIGS. 161(*a*) to (*e*) with the floating tracks being raised to align with the loader rail;

FIGS. 163(*a*) to (*g*) are similar to FIGS. 162(*a*) to (*d*) showing the loaders preparing to move the second salvo of missile-booster combinations into Area 1; and FIGS. 164(*a*) and (*b*) are similar to FIGS. 163(*a*) to (*g*) in that the missile-booster combinations for the second salvo move into Area 1.

GUIDED MISSILE LAUNCHING SYSTEM

Figure 1:
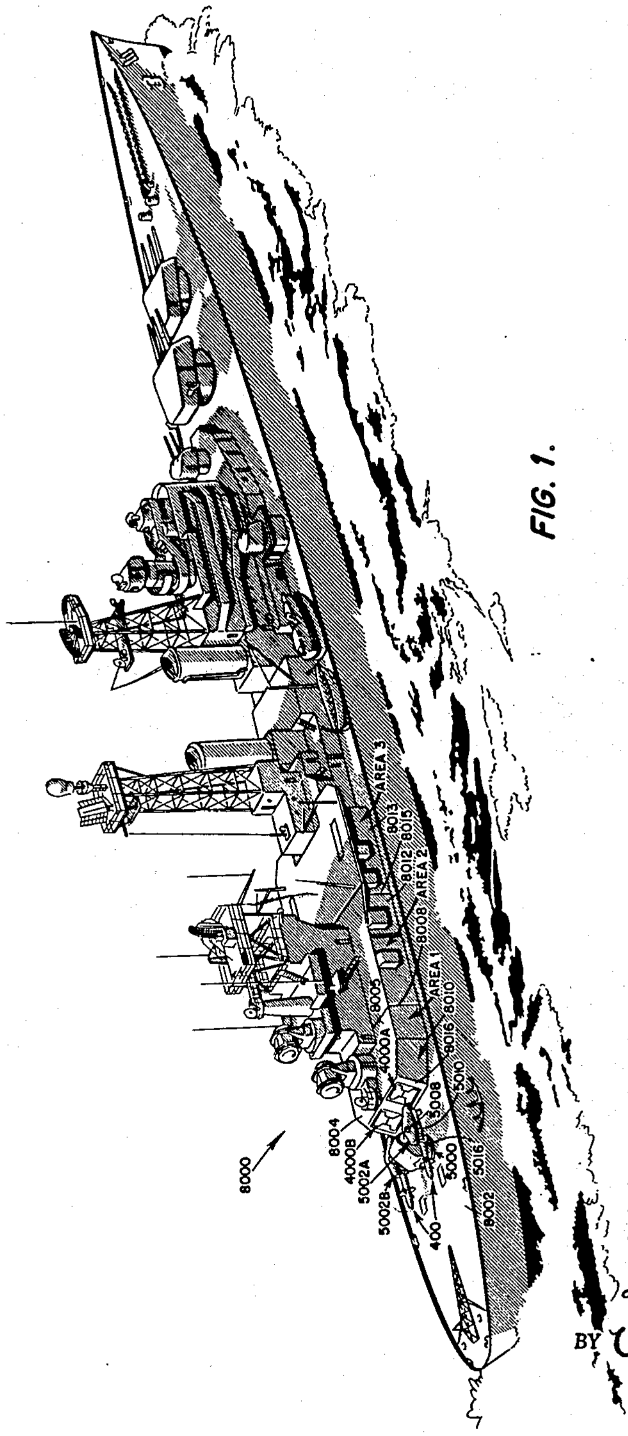
FIG. 1 is a perspective view of a cruiser type vessel showing the general location of a guided missile launching system incorporating the loaders comprising the present invention.

The guided missile launching system is part of a missile weapon system utilized aboard guided missile vessels or ships 8000, such as the cruiser type vessel shown in FIG. 1, to insure maximum fleet protection against targets, such as aircraft or missiles, and surface and shore targets.

The missile weapon system aboard each vessel 8000 comprises a guided missile launching system including a dual guided missile launcher 5000, and a guided missile launcher feeder 2000 including a guided missile launching system control.

As illustrated in FIGS. 1, 3, 3A, 3B, 4, 4B, 4C, 5, 5A, 6, 6A, 6B, 6C, 6D, 7, 7A, 7B, and 8, the guided missile launching system comprises the previously mentioned dual guided missile launcher 5000, and the guided missile launcher feeder 2000. The guided missile launcher feeder 2000 comprises a guided missile assembler 3000, a pair of guided missile loaders 2002A and 2002B, and a pair of ready service mechanisms 500A and 500B for feeding weapons 400 to the dual launcher 5000 from the pair of ready service mechanisms and their control components. The letters "A" and "B" refer to the right (starboard) and left (port) sides of the vessel 8000, respectively. This guided missile launching system is designed as an above-deck installation for guided missile type vessels 8000, and the embodiment disclosed herein is intended to be located aft (stern) of the vessel as shown in FIG. 1. However, with minor modification and adaptation, the same guided missile launching system may be installed below deck, if desirable, or as a land installation.

Figure 3:
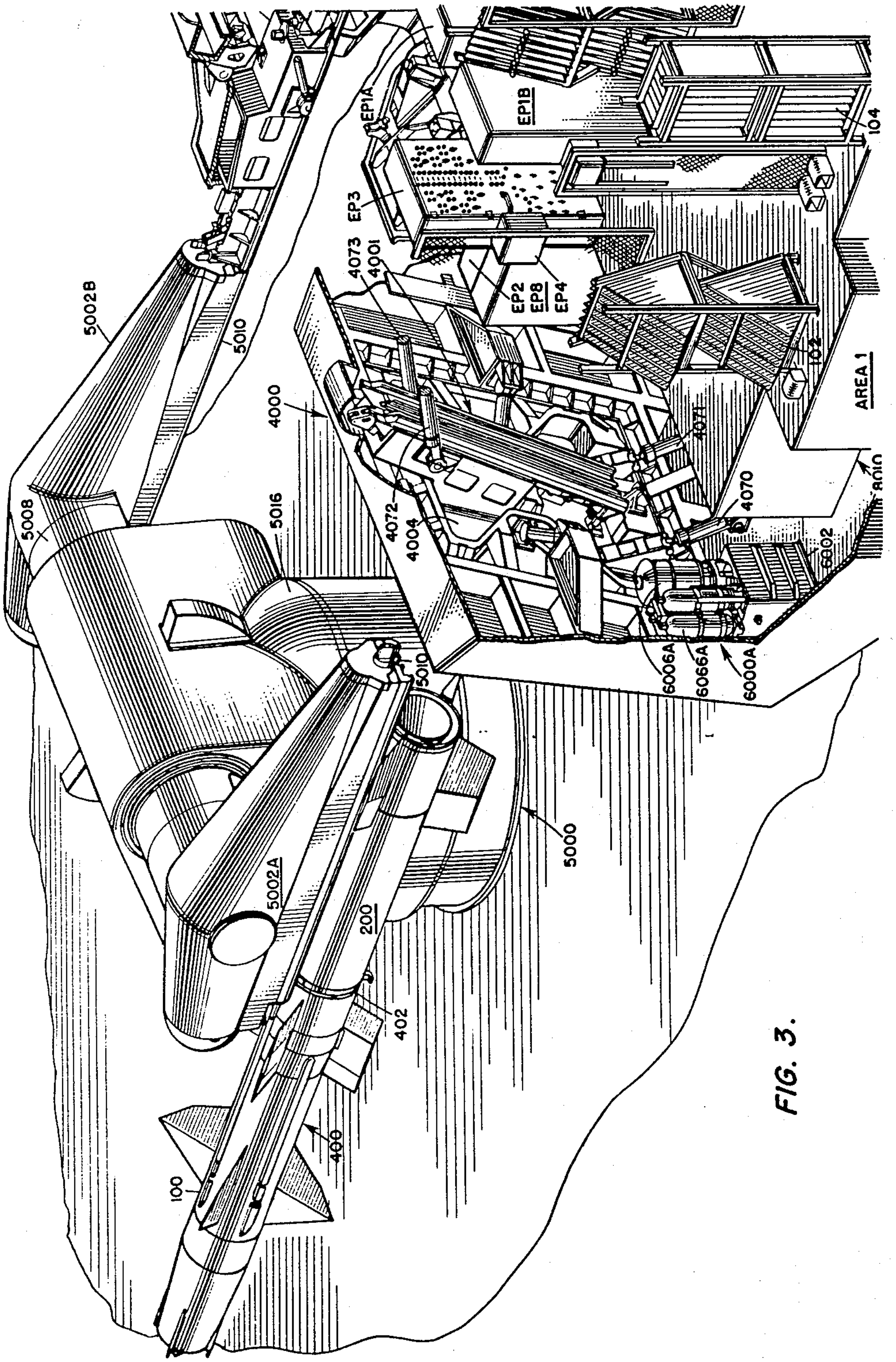
FIG. 3 is a perspective view, with parts removed, of the guided missile launching system including a launcher and a portion of the wing and fin assembly compartment (Area 1)

The dual launcher 5000, as shown in FIGS. 1 and 3, is mounted on the centerline of the vessel 8000, aft of the main deck 8002 thereof. The guided missile feeder 2000 extends forward toward the bow of the vessel 8000, as illustrated in FIGS. 1, 3, 3A, and 3B. The guided missile feeder 2000 and the control components therefor are mounted above the main deck 8002, and are housed in an aft deckhouse 8004 from the main deck 8002 to the overhead level indicated by numeral 8005.

As illustrated in FIGS. 1 and 3, the dual launcher 5000 has two arms (A-side) indicated generally by reference numerals 5002A and (B-side) 5002B which are supported on a single rotatable carriage 5006. Each launcher arm 5002A or 5002B is secured to the end of a trunnion tube 5008, which, in turn, is mounted in the launcher carriage 5006 so that both arms move together, although they are located on opposite sides of the carriage. Each launcher arm 5002A or 5002B is capable of handling a weapon 400. The guided missile feeder 2000 is, therefore, provided for supplying weapons 400 to its associated launcher arm 5002A or 5002B.

Although each loader 2002A or 2002B and its corresponding ready service mechanism 500 of the guided missile feeder 2000 operates independently, both loaders may be and preferably are operated simultaneously so that both launcher arms 5002A and 5002B can be loaded with weapons 400 at the same time. Each loader 2002A or 2002B of the guided missile feeder 2000 is only capable of loading its associated arm with a weapon 400, that is, the A-side loader 2002A will load the arm 5002A of the launcher 5000 with a weapon 400. Thus, if one-half of the guided missile feeder 2000, that is, either the A-side or B-side loaders 2002A or 2002B, respectively, develops an operation malfunction, or a reload of a single arm 5002A or 5002B of the launcher 5000 is desired, only one loader of the guided missile feeder 2000 is operated.

Figure 3A:
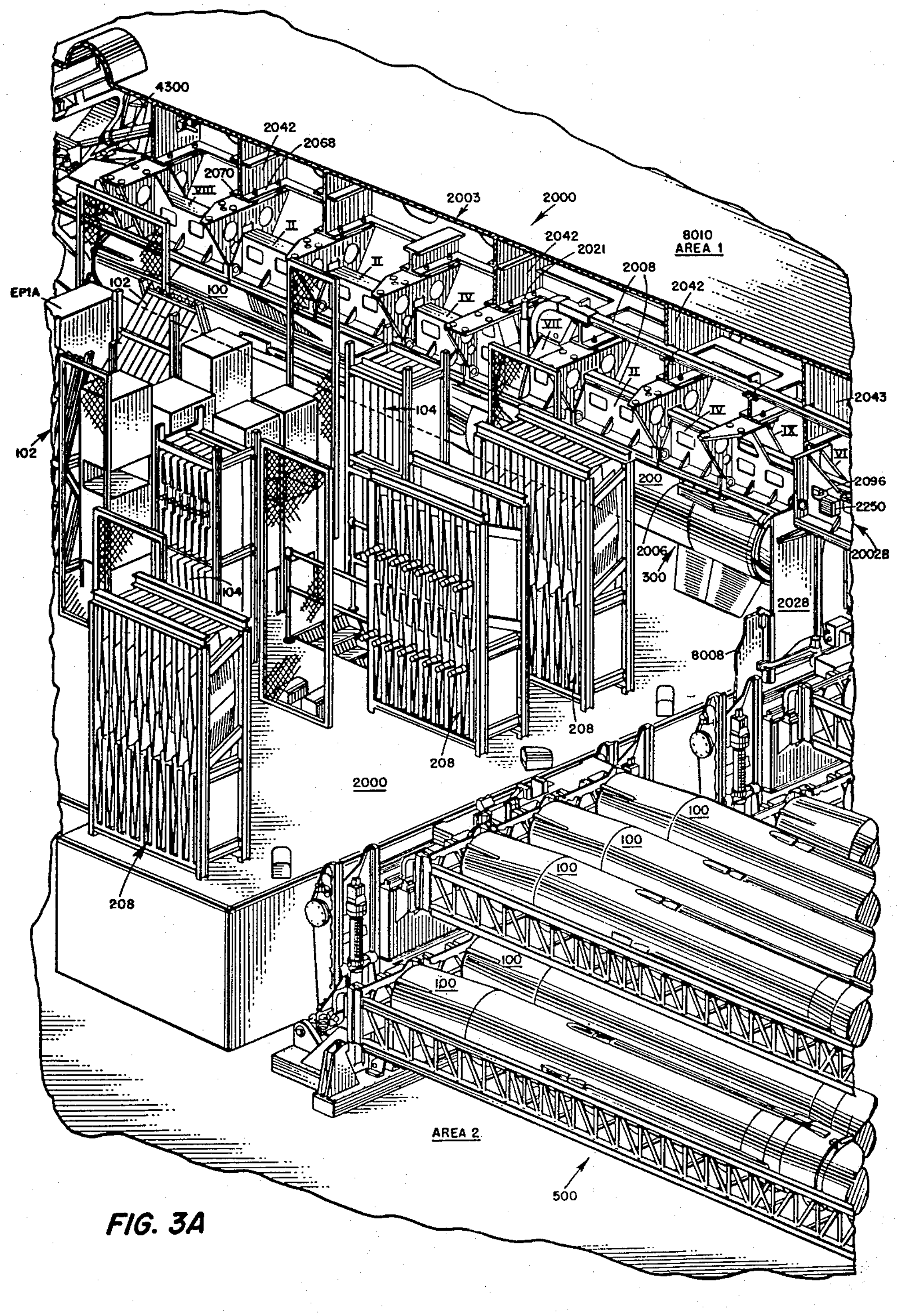
FIG. 3A is a continuation of the perspective view of FIG. 3, with parts removed, of the guided missile launching system including the wing and fin assembly compartment (Area 1) and a ready service compartment (Area 2) containing a pair of ready service mechanisms positioned therein.
Figure 6:
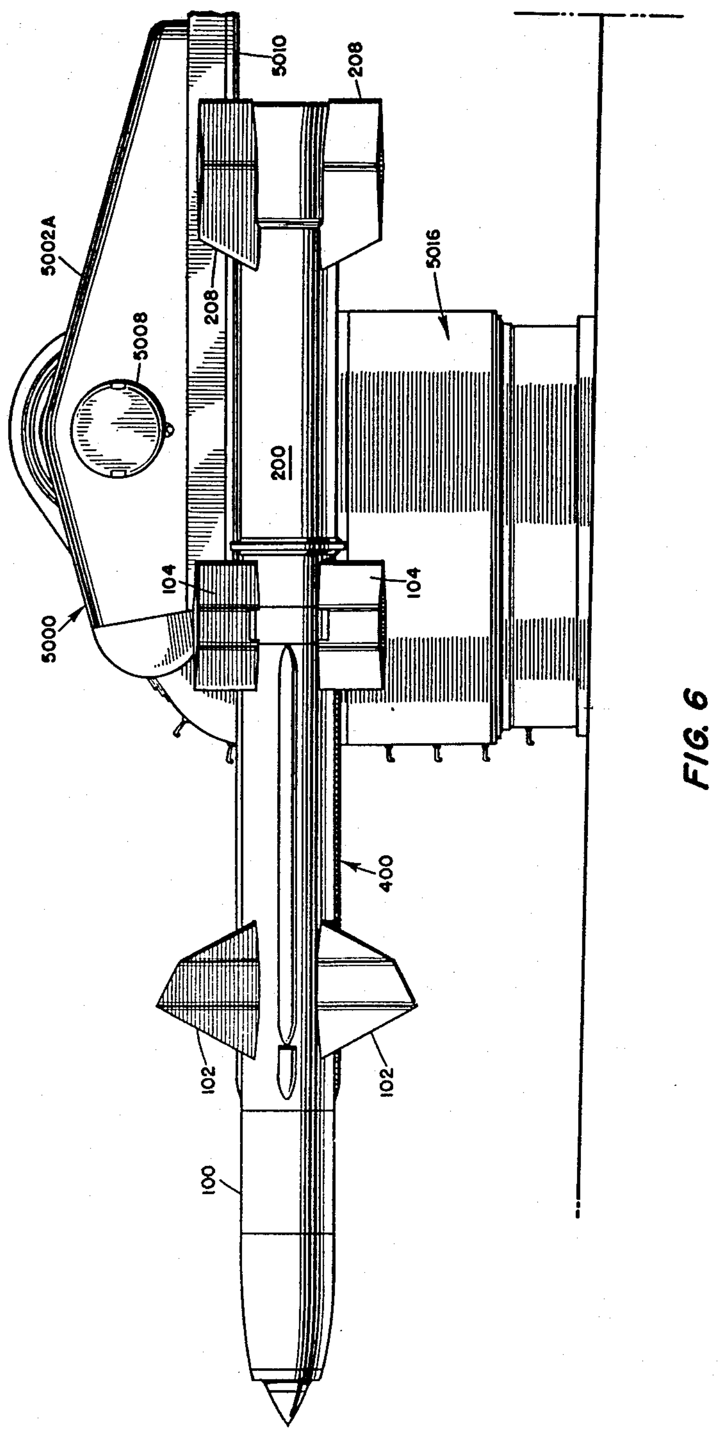
FIG. 6 is a side elevation, with parts removed, of the A-side of the guided missile launching system, showing the launcher with a weapon positioned thereon.

The components of the guided missile feeder 2000 are contained in two adjoining compartments, referred to hereinafter as the wing and fin assembly compartment 8010, or Area 1, and the ready service compartment 8012, or Area 2, illustrated in FIGS. 1, 3, 3A, 3B, 4A, 4B, 4C, 6A, 6B, 6C, and 6D, in the aft deckhouse 8004. These compartments 8010 and 8012 are separated by an athwartships bulkhead 8008 as illustrated in FIGS. 1, 4B and 6B. The fin and assembly compartment 8010 (Area 1) contains the guided missile assembler 3000 and two pairs of transversely spaced blast doors 4000 for use in feeding weapons 400 to the guided missile launcher 5000, and the latter is positioned adjacent thereto, as illustrated in FIGS. 1, 3, 4A, 6A and 8.

The guided missile feeder 2000 for the launcher 5000 comprises the previously mentioned A-side loader 2002A and the B-side loader 2002B corresponding to the arms 5002A and 5002B on the launcher, respectively (when the launcher is in the load or stowed position), as illustrated in FIGS. 3, 3A, 3B, 4A, 4B, 6A, 6B, 6C, 6D, 7, 7A and 7B. All handling of the weapons 400 in the guided missile feeder 2000 and the loading thereof onto the launcher 5000 are accomplished by moving the weapons horizontally. During actual loading of weapons 400 onto the launcher 5000, pairs of blast doors indicated generally by 4000, which are mounted in the face 8016 of the aft deckhouse 8004 adjacent to each launcher arm 5002A and 5002B, are open, as illustrated in FIGS. 1, 3, 4A, and 6A.

Figure 4:
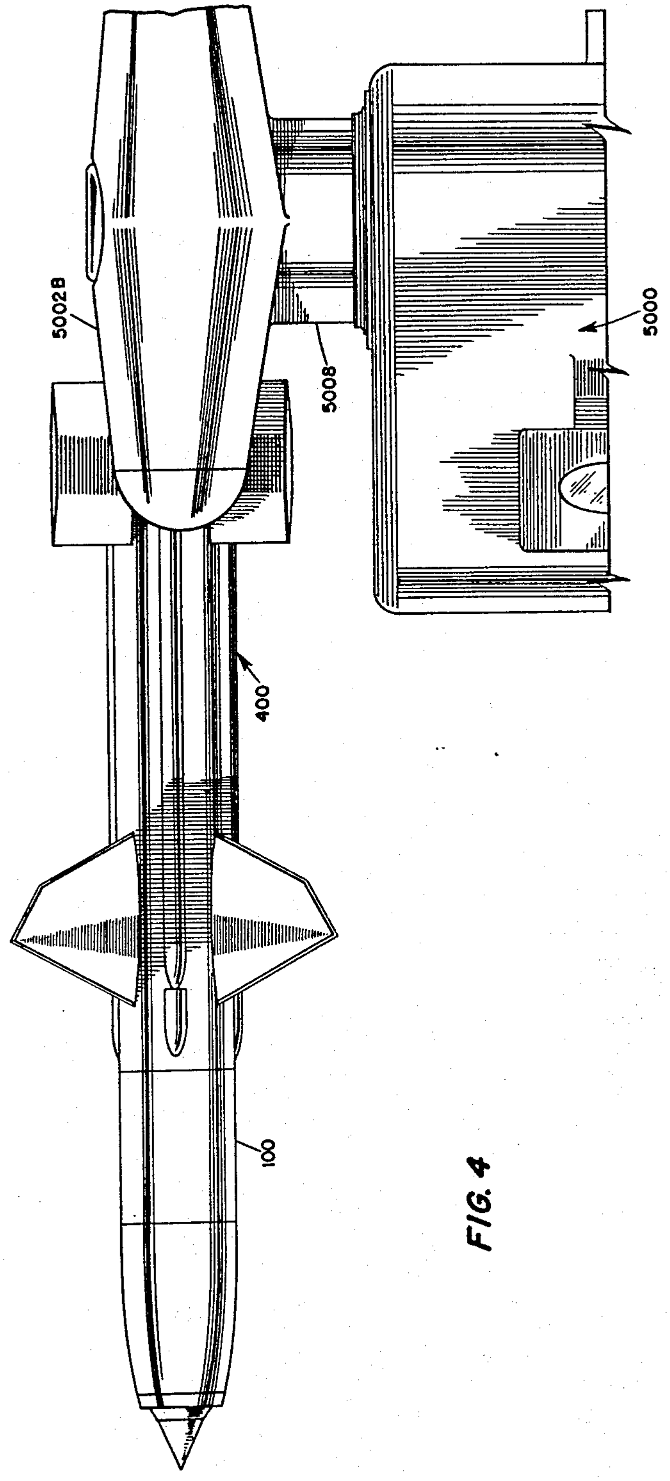
FIG. 4 is a top plan view, with parts removed, of the B-side of the guided missile launching system, showing the launcher with a weapon positioned thereon.
Figure 4A:
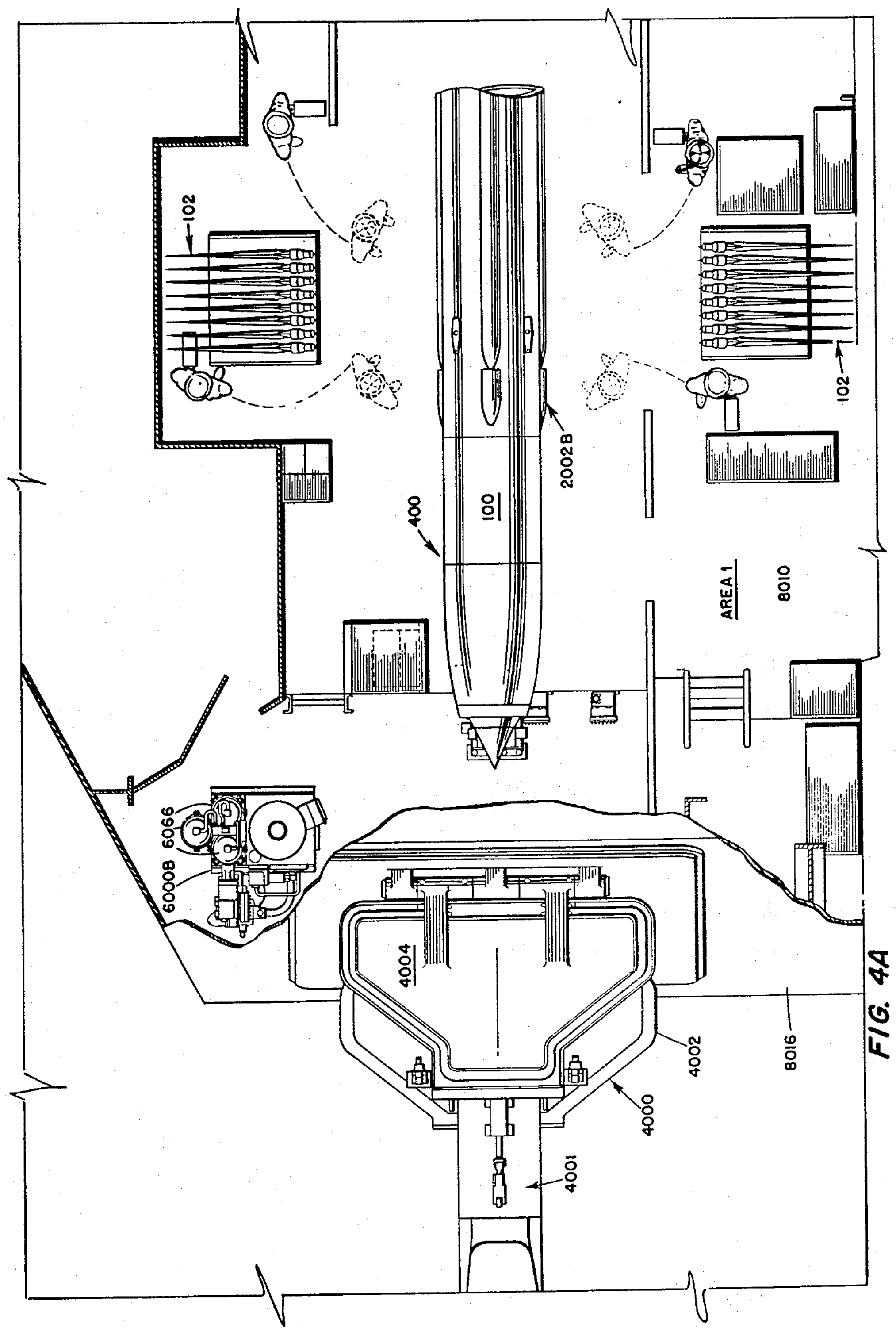
FIG. 4A is a continuation of the top plan view of FIG. 4, with parts removed, of the B-side of the guided missile launching system, showing generally the location of the span track, blast doors, and the wing and fin assembly compartment (Area 1)
Figure 6A:
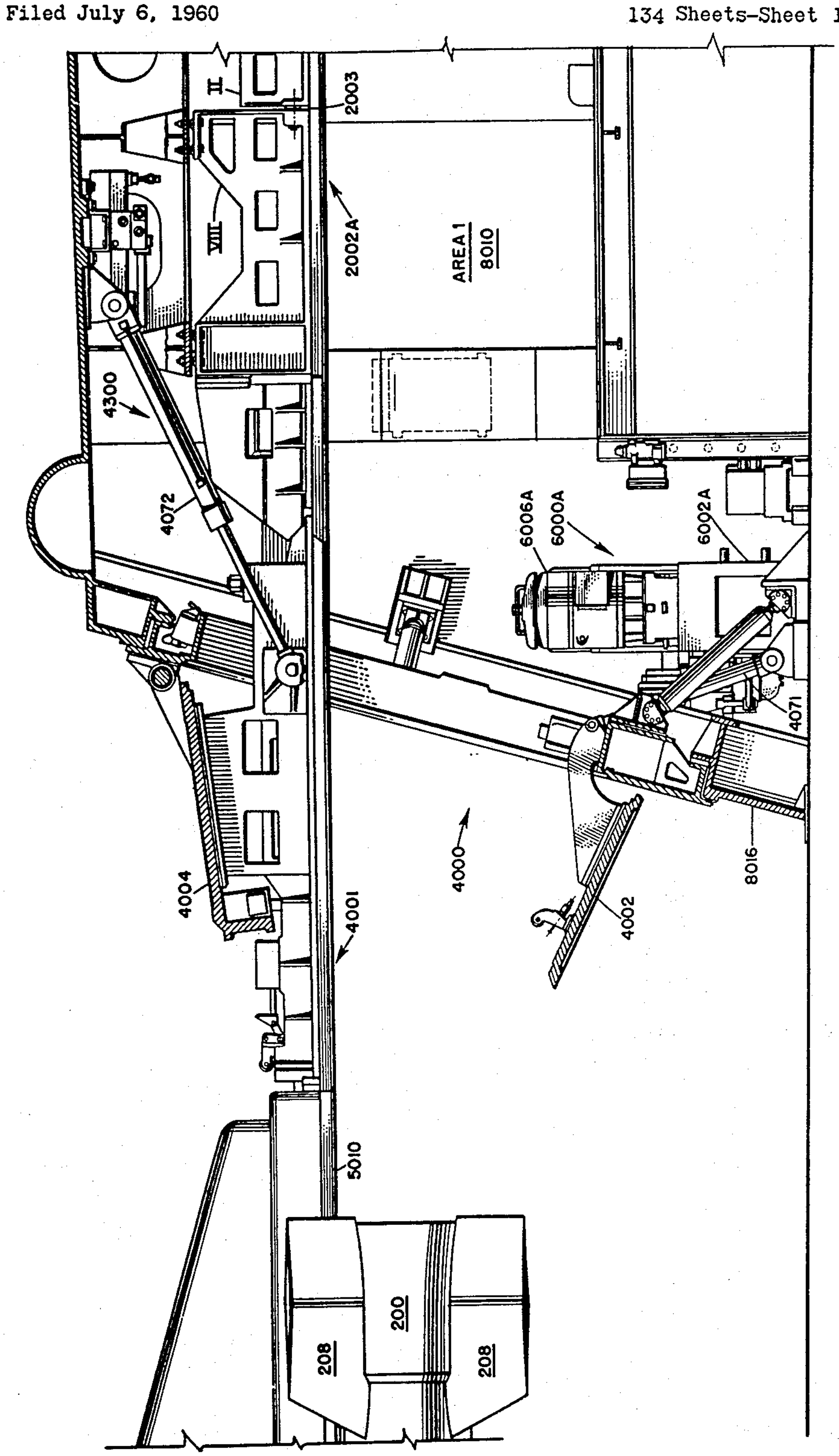
FIG. 6A is a continuation of the side elevation of FIG. 6, with parts removed, of the guided missile launching system showing generally the location of the span track, blast doors, Area 1 accumulator, loader trunk, and the wing and fin assembly compartment (Area 1)
Figure 6B:
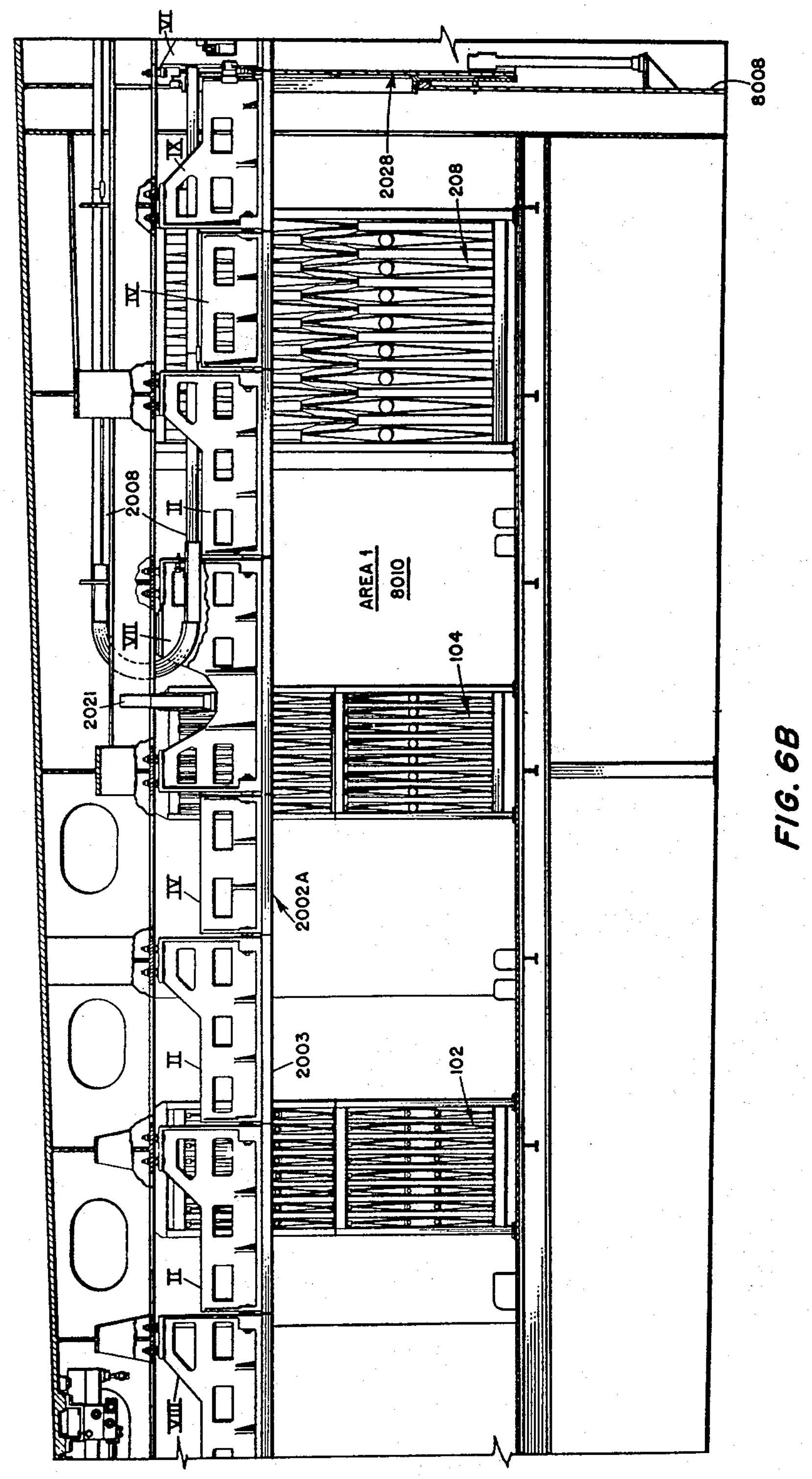
FIG. 6B is a continuation of the side elevation of FIG. 6A, with parts removed, of the guided missile launching system showing loader trunk, and the wing and fin assembly compartment.

A span track, indicated generally by reference numeral 4001, as illustrated in FIGS. 3, 4A, and 6A, which is an integral part of each upper blast door 4004 of the pairs of blast doors 4000, bridges the gap between its respective loader 2002A or 2002B of the guided missile feeder 2000 and the launcher 5000.

Figure 2:
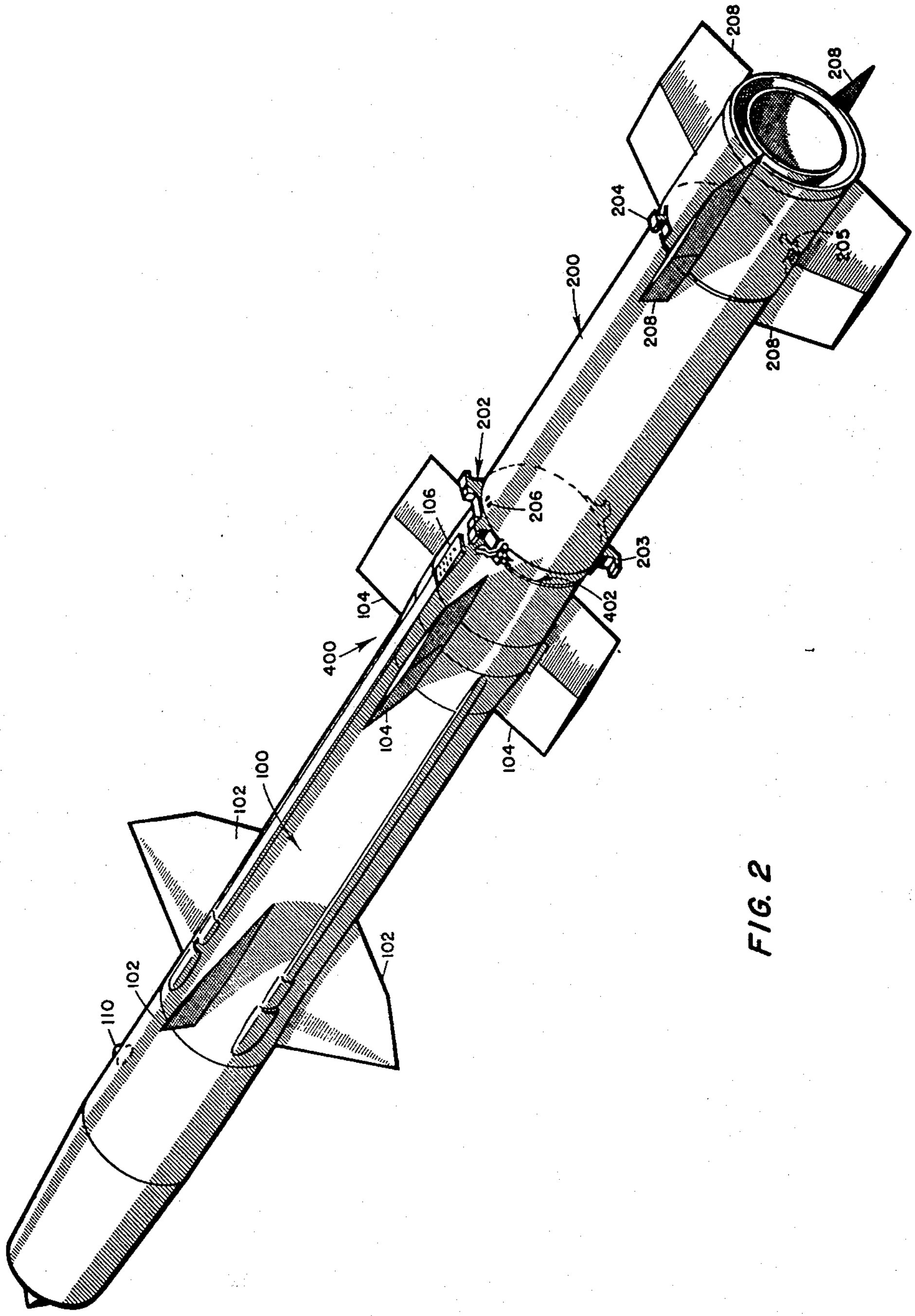
FIG. 2 is a perspective view of a weapon including a missile and booster.

The components of the guided missile launching system function automatically to deliver missile-booster combinations 300, which consist of a missile 100 and a booster or booster rocket 200, as shown in FIG. 2, without the wings 102 or fins 104 for the missile and fins 208 for the booster rocket from Area 2 to Area 1 where these components are assembled thereto to form weapons 400 in condition for firing to the power-driven remotely controlled launcher 5000.

Figure 8:
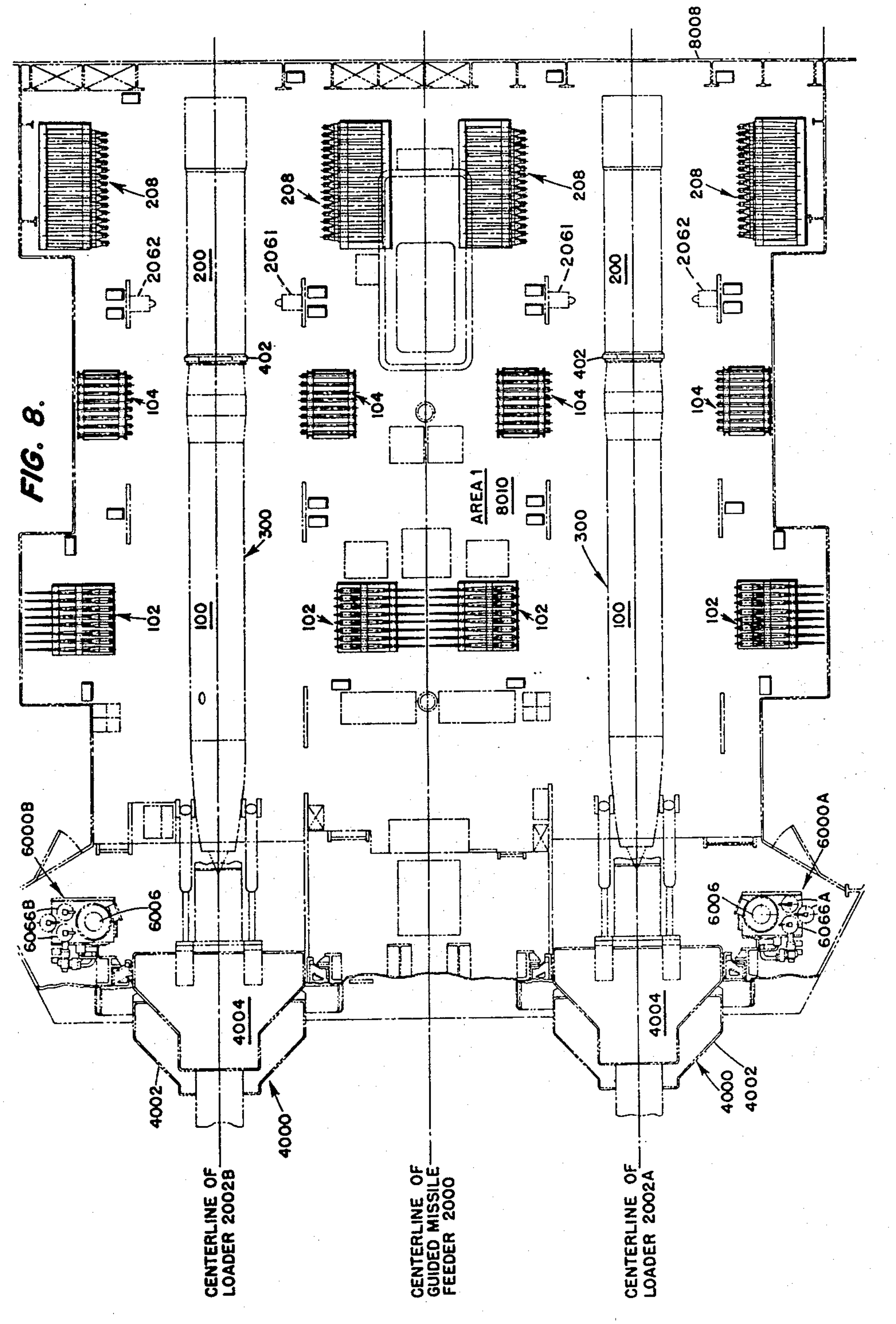
FIG. 8 is a plan view, with parts removed, of the wing and fin assembly compartment (Area 1), showing generally the location of the A-side and B-side blast doors, loaders, wings and fin racks, and allied assembler equipment.

In the wing and fin assembly compartment 8010 (Area 1), illustrated schematically in FIGS. 3, 3A, 4A, 4B, 6B, and 8, delivery of the missile-booster combinations 300 to the launcher 5000 is interrupted briefly to assemble four wings 102 and four fins 104 to the missile 100 as well as four fins 208 to the booster 200, to install an arming mechanism 110, as shown in FIG. 2, to obtain a complete weapon 400, and to cock a missile-booster clamping ring 402, shown in FIGS. 2 and 8, positioned between the missile 100 and booster 200 to hold them together during movement by the guided missile feeder 2000 and the first part of aerial flight of the weapon 400. Upon installation of all airborne equipment, each missile-booster combination 300 becomes a weapon 400, and it is loaded onto the launcher 5000 by the guided missile feeder 2000.

Firing of S-type missiles 100S from the launcher 5000 may be in two-round salvos or by single rounds, according to the demands of the tactical situation, W-type missiles 100W can be loaded onto the launcher 5000 in the same manner as S-type missiles 100S, that is, onto both launcher rails 5010 at one time, as illustrated in FIGS. 1, 3 and 6, but if either rail 5010 (A-side or B-side) contains a W-type missile, firing of the weapon 400 from the launcher 5000 can occur only in single rounds (A-side arm 5002A or B-side arm 5002B only). All elements of this system are operable in step control as well as in normal automatic control.

Referring now to FIG. 2, the weapon 400 handled in the guided missile launching system comprises the previously mentioned missile 100 and booster 200, with wings 102 and fins 104 and 208 assembled thereto, mated together by the missile-booster clamping ring 402.

The missile 100, of either the S or W type, is illustrated as a ramjet-propelled, supersonic missile, while the booster or rocket 200 is of a solid propellent rocket type. However, other types of missiles, boosters, or combinations thereof, can be handled by the guided missile launching system herein described and illustrated.

In the following specification, therefore, the missile-booster combination will be referred to by reference numeral 300 until after the assembly of all airborne equipment including the wings 102, fins 104 and 208, and the arming mechanism 206, and then it will be referred to as a weapon by the reference numeral 400.

The missile-booster combinations 300 are stowed in the previously mentioned ready service mechanisms 500A and 500B located in the ready service compartment 8012

(Area 2) in trays 502 in ready condition for delivery to the guided missile launcher 5000 by the loaders 2002A and 2002B of the guided missile feeder 2000.

LOADERS

The dual feeder 2000 comprises the A-side loader 2002A and the B-side loader 2002B as shown generally in FIGS. 3, 3A, 3B, 4, 4A, 4B, 4C, 6, 6A, 6B, 6C, 6D, 7, 7A, 7B, and 8.

Each loader 2002A and 2002B is comprised principally of a loader trunk 2003 (shown best in FIGS. 3, 3A, 3C, 6A, 6B, and 6C), a chain 2004 (shown best in FIGS. 19, 20, and 55), a saddle cart 2006 (shown best in FIGS. 11, 19, 20, 24, 25, 26, 27, 56, 57), a chain storage track 2008 (shown best in FIGS. 3A, 3B, 9, 10, 17, 19, and 52), a loader power drive 2010 (shown best in FIGS. 3B and 6D), a drive sprocket 2039 (shown best in FIGS. 19, 20, and 55), a power-off brake 2014 (shown generally in FIG. 3B), an Area 2 positioner 2016 (shown best in FIGS. 12, 19, and 20), a forward floating track 2017 (shown best in FIGS. 3B, 6C, 12, and 20A), an aft floating track 2018 (shown best in FIGS. 6D, 20, 28, 29, 30, and 36), a rammer 2020 (shown best in FIGS. 6D, 12, 24, 25, 26, and 27), an Area 1 warmup contactor 2021 (shown in FIG. 12), Areas 1 and 2 interlock valves 2024 and 2026 (shown best in FIG. 19), a floating span track assembly 4001, a flametight door 2028 (shown best in FIGS. 39, 40, and 41), an Area 1 positioner 2030 (shown in FIG. 12), an Area 1 accumulator 6000 described in Section III of this application and shown generally in FIGS. 3 and 6A, and a set of spaced blast doors indicated generally by reference numeral 4000 in FIGS. 1, 3, 4A, and 6A.

Figure 3B:
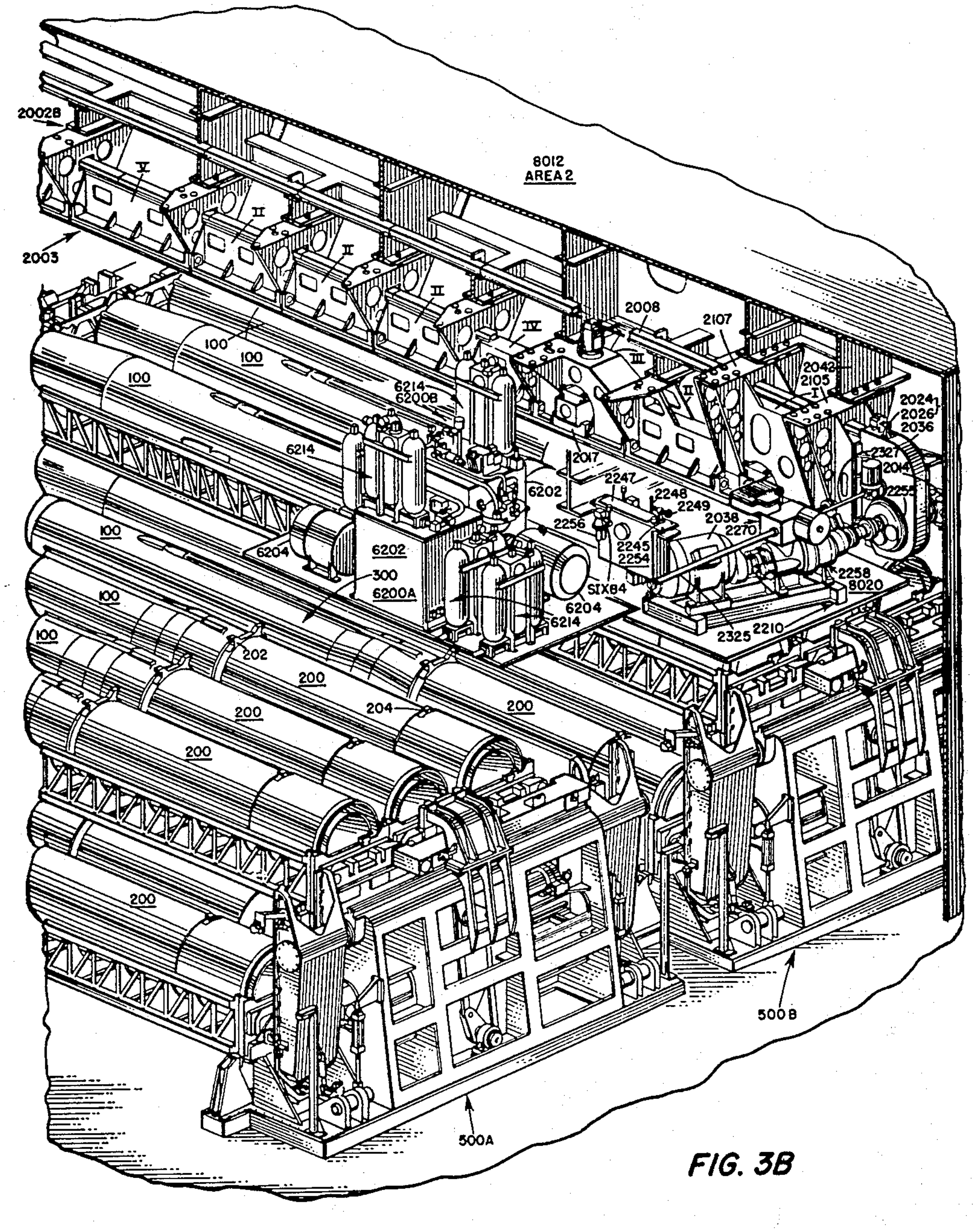
FIG. 3B is a continuation of the perspective view of FIG. 3A, with parts removed, of the guided missile launching system including the ready service compartment having the pair of ready service mechanisms positioned therein.
Figure 4B:
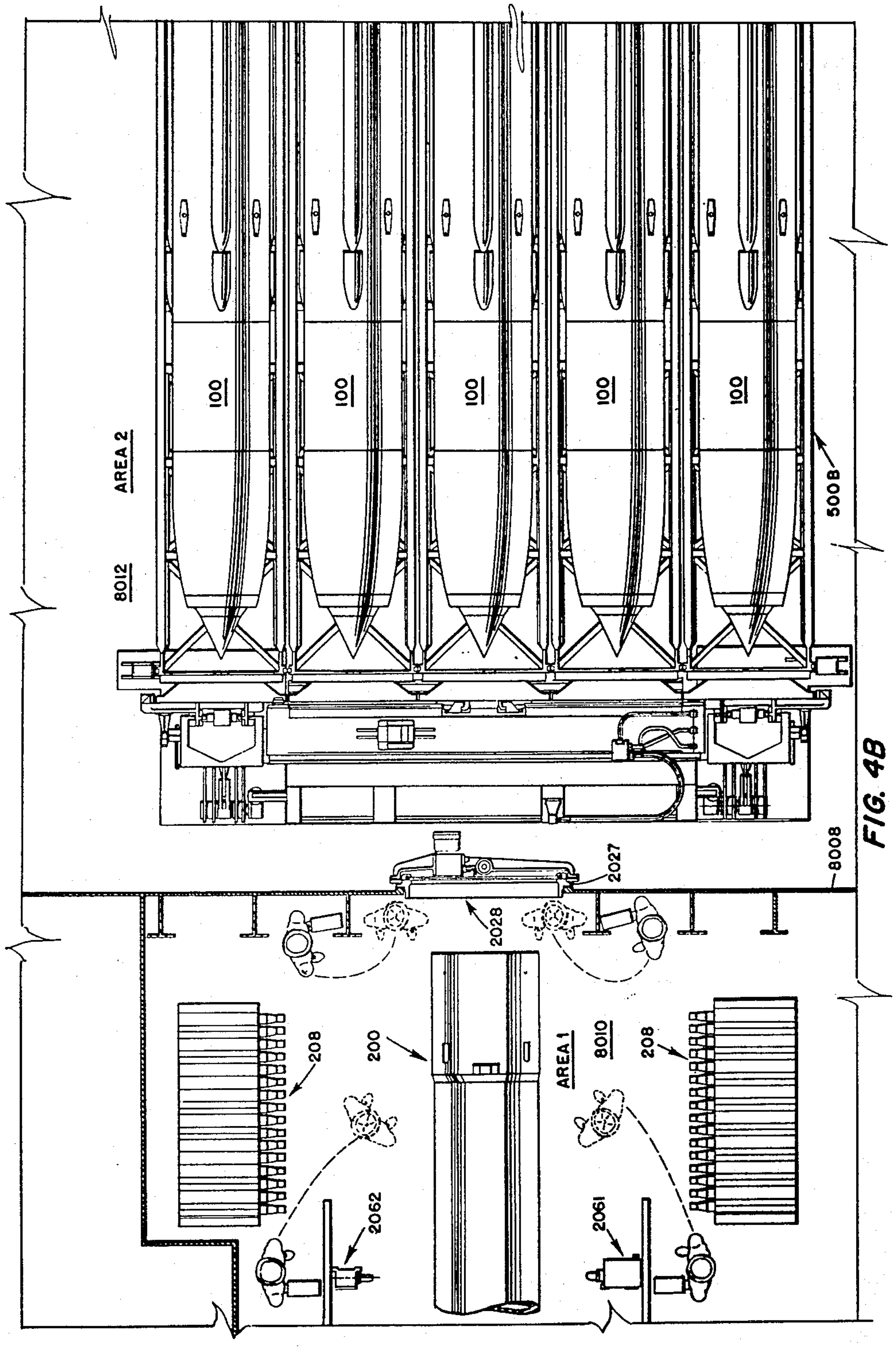
FIG. 4B is a continuation of the top plan view of FIG. 4A, with parts removed, of the B-side of the guided missile launching system, showing generally the wing and fin assembly compartment (Area 1) and the ready service compartment including the B-side ready service mechanism.
Figure 4C:
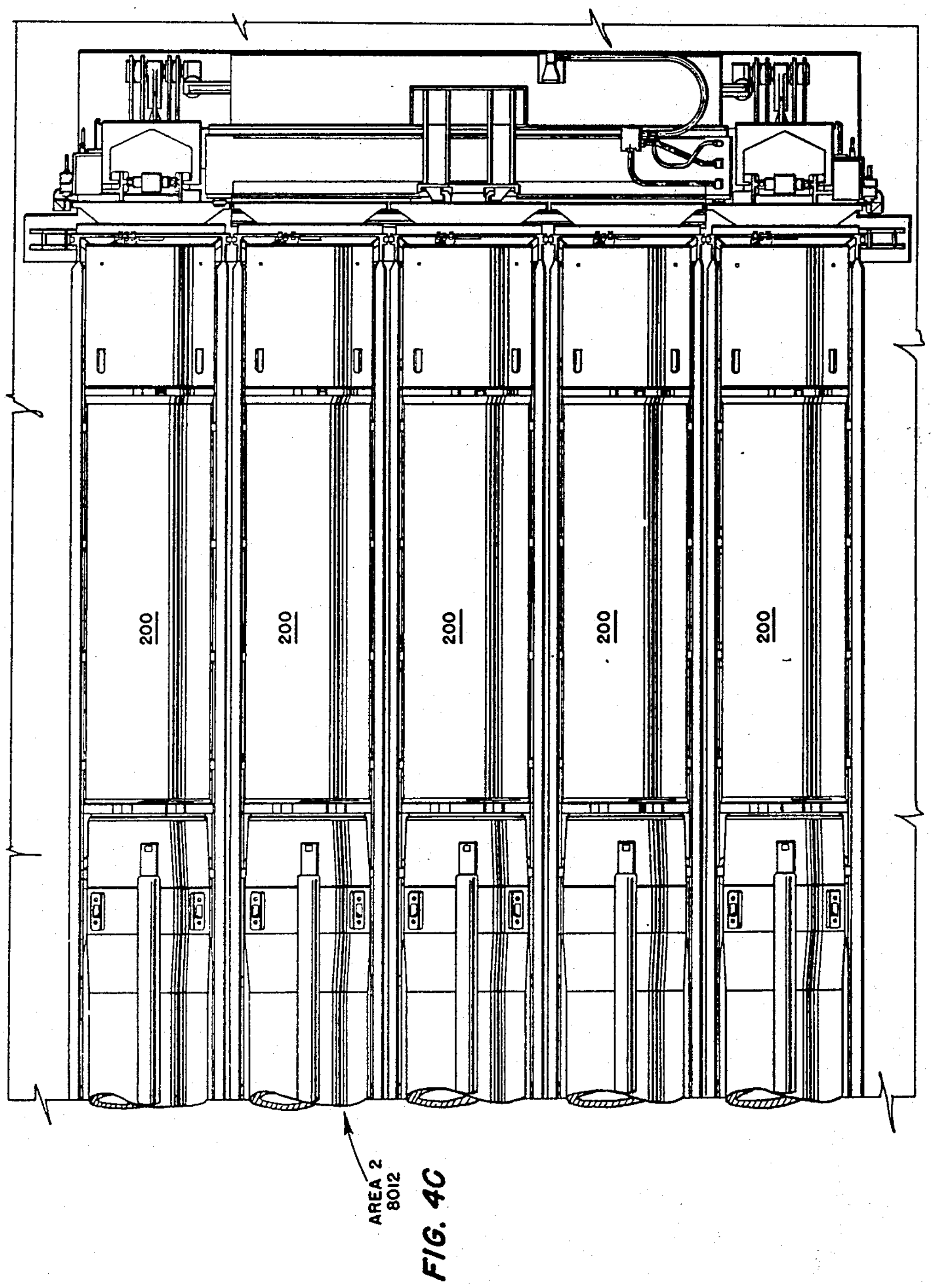
FIG. 4C is a continuation of the top plan view of FIG. 4B, with parts removed, of the B-side of the guided missile launching system, showing generally a portion of the ready service compartment including the B-side ready service mechanism.

The rammer 2020 moves the missile-booster combination 300 forward a small distance to disengage the lower booster shoes 203 and 205 from the shoe receptacles 1202 and 1203 in the tray 502, shown in FIG. 3B, and to engage the upper booster shoes 202 and 204 with a loader rail 2034 and the saddle cart 2006. The loader 2002A or 2002B, horizontally transfers the missile-booster combinations 300 from Area 2 to Area 1, and as weapons 400 to the launcher 5000.

Figure 6C:
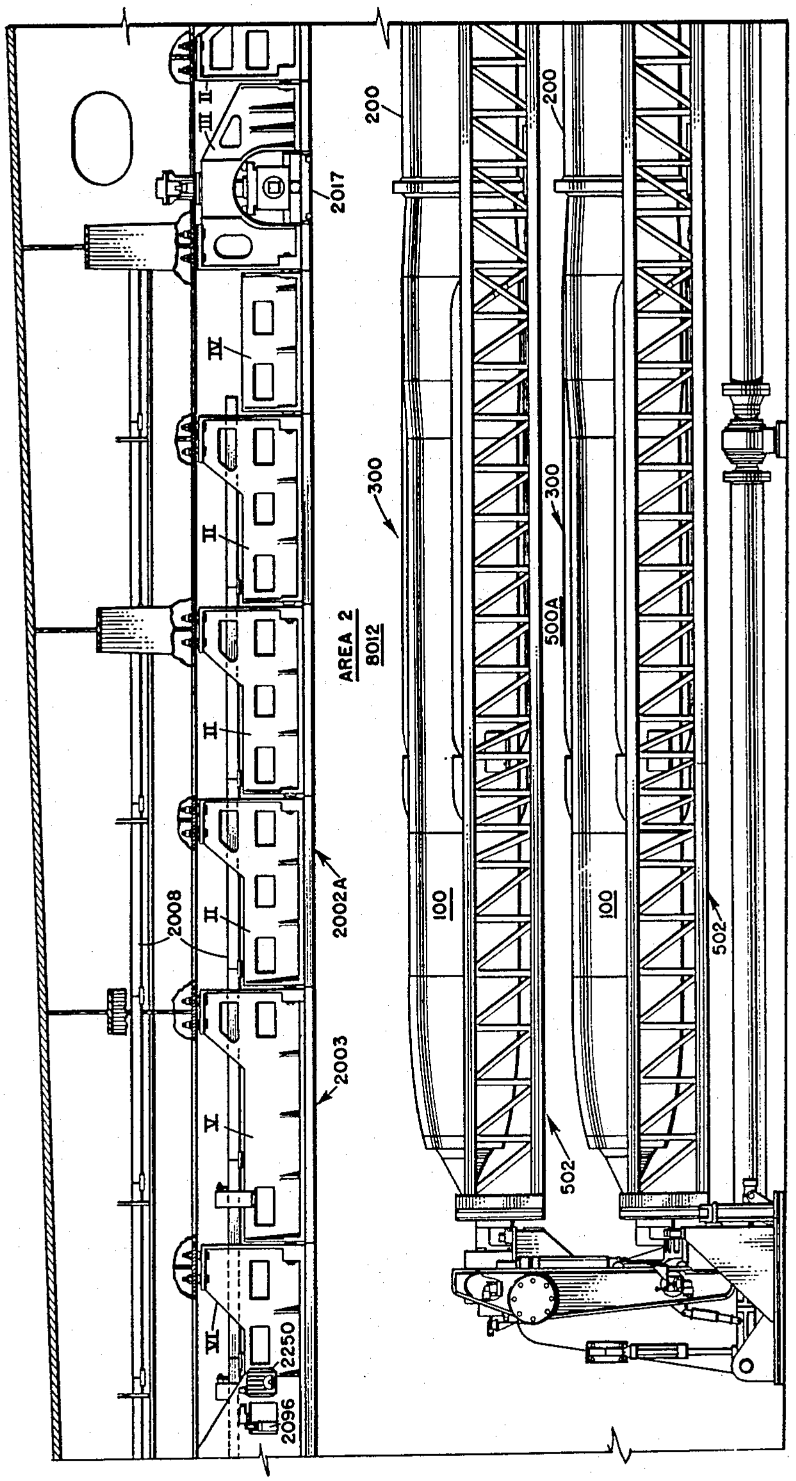
FIG. 6C is a continuation of the side elevation of FIG. 6B, with parts removed, of the guided missile launching system showing the ready service compartment (Area 2) including the ready service mechanism.
Figure 7:
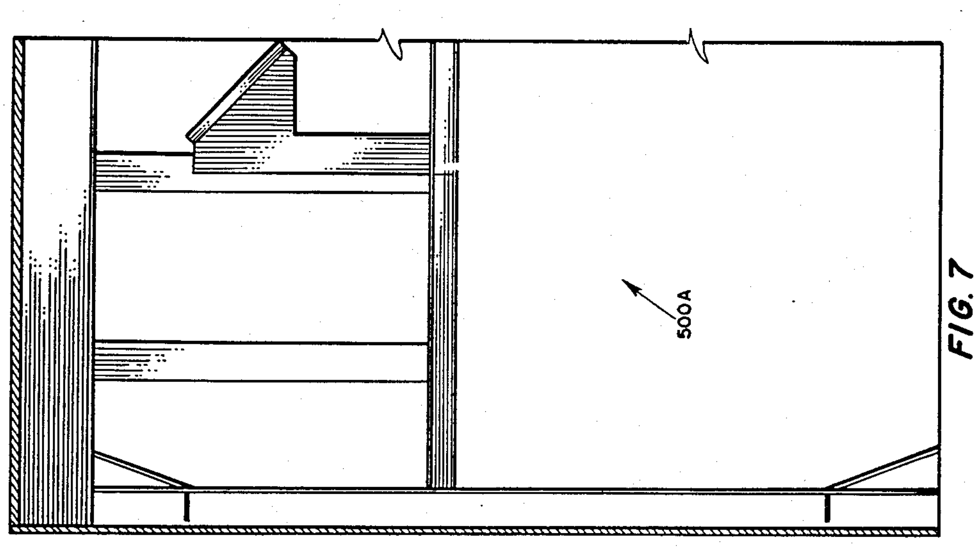
FIG. 7 is an end view, with parts removed, of the guided missile launching system showing the A-side of the ready service compartment (Area 2) including the ready service mechanism.
Figure 6D:
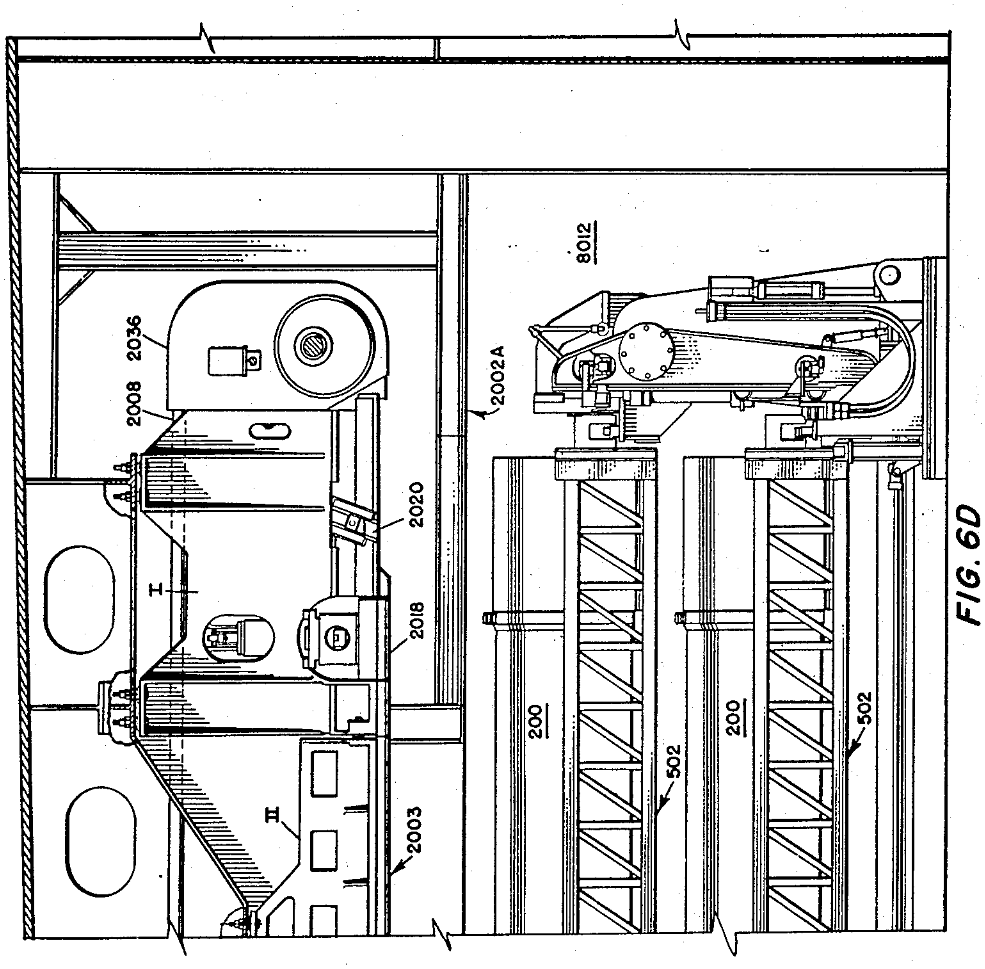
FIG. 6D is a continuation of the side elevation of FIG. 6C, with parts removed, of the guided missile launching system showing the ready service compartment (Area 2) including the ready service mechanism.
Figure 7A:
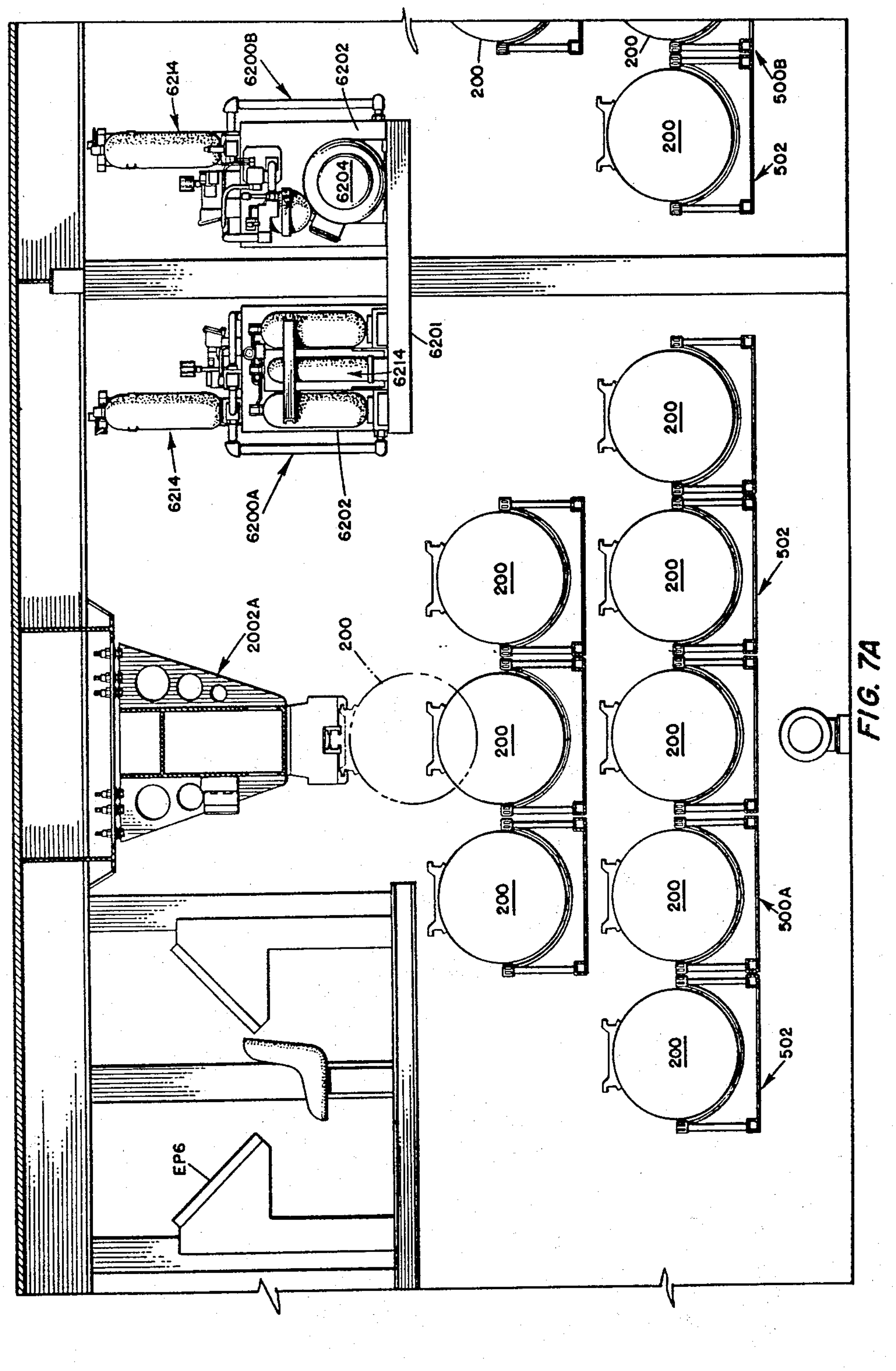
FIG. 7A is a continuation of the end view of FIG. 7, with parts removed, of the guided missile launching system showing the ready service compartment (Area 2) and the A-side and B-side ready service mechanisms.
Figure 7B:
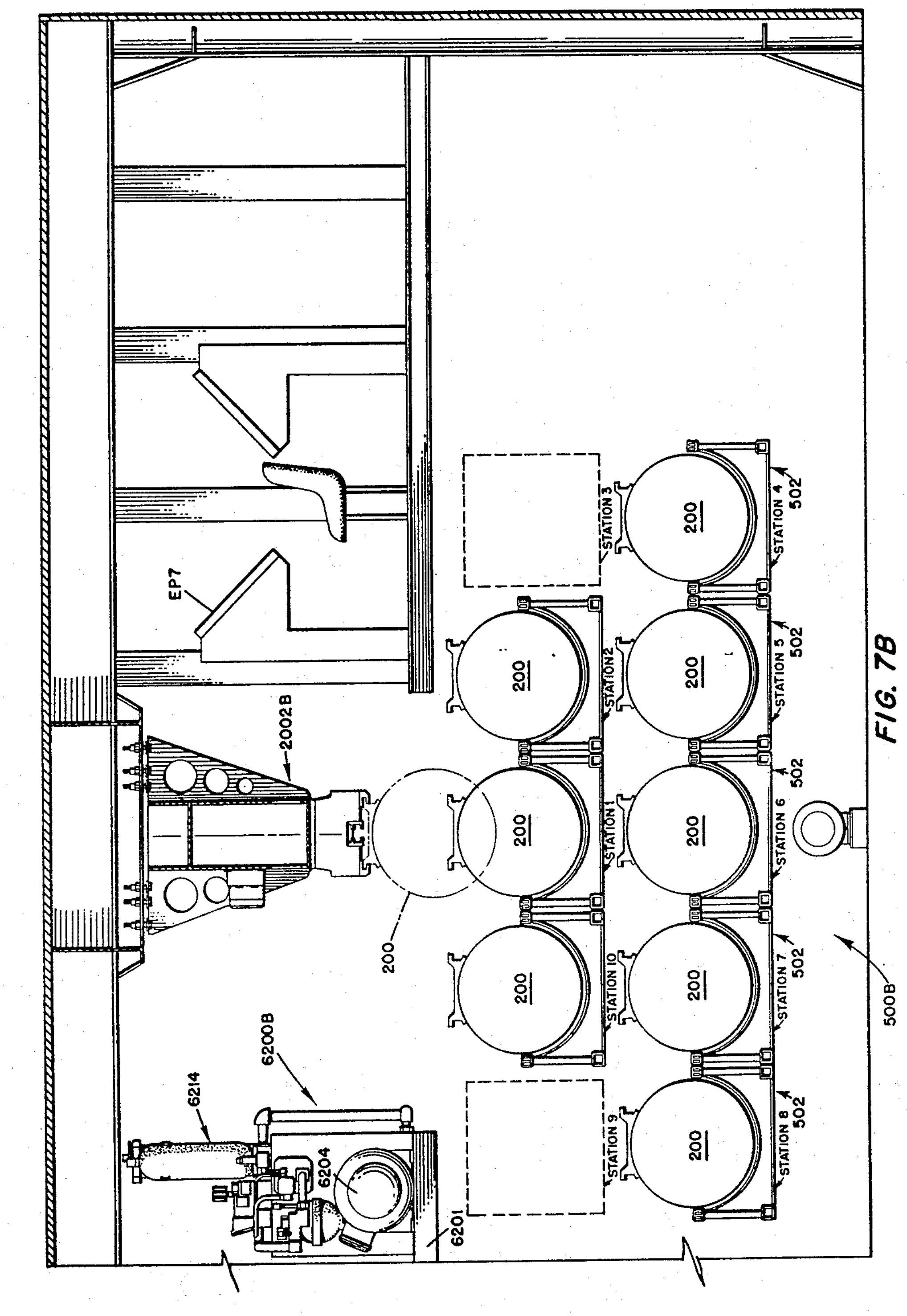
FIG. 7B is a continuation of the end view of FIG. 7A, with parts removed, of the guided missile launching system showing the ready service compartment (Area 2) and the B-side ready service mechanism.

The loader power drive 2010, shown best in FIGS. 3B and 6D), is connected to the shaft of a sprocket which drives a link chain located in the track housing 2036, as shown best in FIGS. 6D, 19, and 20. The power drive 2010 is driven by an electric motor 2038, shown best in FIG. 3B. This power drive 2010 supplies the loader chain 2004 with the necessary power for movement of the saddle cart 2006 from Area 2 to the launcher 5000 and back again.

The Area 1 accumulator 6000 for each loader 2002A or 2002B, which is forward of the weapon 400 shown in FIG. 4A, powers all of the hydraulic components of its respective loader 2002A or 2002B, except the loader power drive 2010. The floating span track assembly 4001 is attached to the upper blast door 4004, and it provides the necessary connection between a loader trunk section VIII, shown generally in FIG. 3A, and the launcher guide arm 5002 for transferring a weapon 400 from Area 1 to the launcher 5000.

Each set of spaced blast doors 4000 for each loader 2002 comprises lower and upper blast doors 4002 and 4004, shown generally in FIGS. 1, 3, 4A, and 6A, and they seal off Area 1 from the launcher 5000 during firing of the booster 200 of the weapon 400.

All of the major subassemblies of the loader 2002A or 2002B are interlocked for synchronized operation as a single unit, the primary function of which is to transfer the missile-booster combination 300 from the ready service trays 5002 positioned in the ready service mechanisms 500A or 500B in Area 2 into Area 1 for assembling of wings 102 and fins 104 and 208 to the missile-booster combination 300 to form weapon 400, automatic warmup thereof, and then to transfer the weapon 400 onto the launcher 5000. Another function of each loader 2002A or 2002B is to return weapons 400 to Area 1 in the event of misfiring of the booster 200 or during exercising cycles using dummy weapons.

In FIGS. 3, 3A, and 3B, there is shown the loader 2002B in Areas 1 and 2. The loader trunk 2003B, which is the principal part of the loader 2002B, is attached to the spaced overhead beams 2042 of the structure of the deck house 8004. The loader trunk 2003B extends from the forward end of Area 2 to the aft end of Area 1 where the retractable floating span track assembly 4001 is provided for bridging the gap between the loader trunk 2003B and the launcher guide arm 5002B. The guide arm 5002B and the span track assembly 4001 actually form an extension of the loader 2002B.

Each loader 2002A or 2002B has the same degree of automation as described in U.S. patent application Serial Number 506,392, filed May 5, 1955, by Fred H. Allen et al., for "Method and Apparatus for Handling a Missile." The normal load cycle for the guided missile launching system is handled in automatic. However, the system can be operated manually or step control thereof can be performed.

Figure 9:
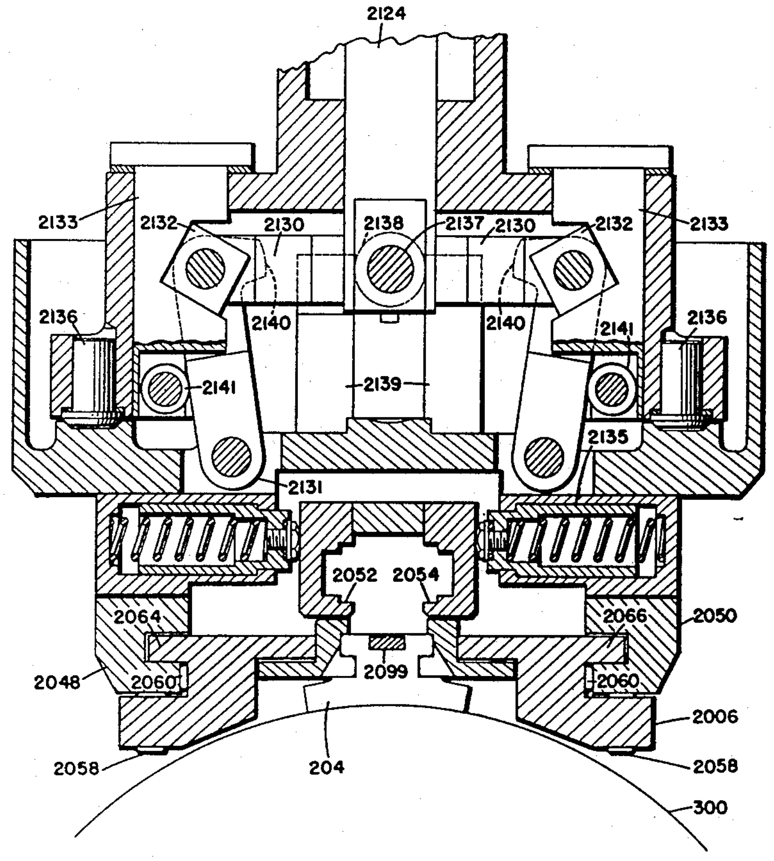
FIG. 9 is a schematic diagram, partly in cross section, of the aft shoe floating track, with the saddle cart being in an aligned position.
Figure 10:
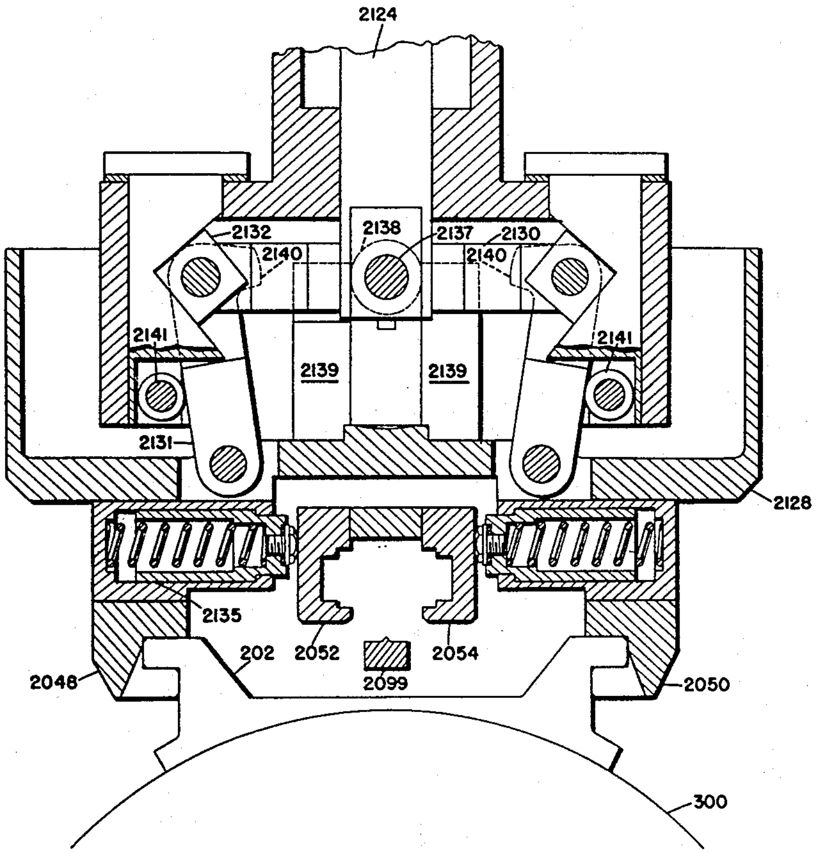
FIG. 10 is a schematic diagram, partly in cross section, of the forward shoe floating track, with the forward shoe being in an aligned position.

Except for a forward support of the missile 100 by the ready service trays 502, all handling contact of the missile-booster combinations 300 is with the forward and aft booster shoes 202 and 203, and 204 and 205, respectively, as shown in FIGS. 2, 9, and 10. The forward booster shoes 202 and 203, with a broad "wheel base," are provided for vertical support and lateral stability of the missile-booster combination 300. The aft shoes 204 and 205 give little support in this manner but all longitudinal transfer of the missile-booster combination 300 is through engagement with the aft shoes 204 or 205.

The loader trunk 2003 is provided with a pair of skid tracks 2048 and 2050, as shown in FIGS. 9 and 10, to engage the broad upper forward booster shoe 202 of the booster 200. Rather than provide separate skid tracks for the narrow upper aft shoe 204, the saddle cart 2006, which is attached to the engaging end of the loader chain 2004, is used to support the upper aft shoe 204. This saddle cart 2006, in turn, is guided by the skid tracks 2048 and 2050 provided for the forward shoe 202. In addition, the loader trunk 2003 is provided with an additional set of tracks 2052 and 2054, as shown in FIGS. 9 and 10, for guiding the loader drive chain 2004.

The upper forward booster shoe 202 is guided in the skid tracks 2048 and 2050, and the saddle cart 2006 is also guided by the same tracks, as shown in FIGS. 9 and 10. Horizontal guide rollers 2060 give the saddle cart 2006, illustrated in FIG. 11, lateral stability which vertical rollers 2058 provided for contacting the bottom surfaces of the skid tracks 2048 and 2050 give roller support to the saddle cart 2006 only when there is a vertical load from the bottom.

The center of gravity of the missile-booster combination 300 is forward of the forward booster shoe 202. The missile-booster combination 300, cantilevered in this manner, causes the load at the upper aft shoe 204 to be upwardly and not downwardly. When the saddle cart 2006 travels empty, it is supported only by skid lugs 2064 and 2066, shown best in FIGS. 9 and 11.

The trays 502 engage the booster 200 with the receptacles 1202 and 1203 which are designed to retain the lower forward and aft booster shoes 203 and 205, respectively. To disengage the booster shoes 203 and 205 from the receptacles 1202 and 1203 in the trays 502, the missile-booster combination 300 must be rammed forward, relative to the launcher 5000, a nominal amount of approximately four (4) inches. In the same forward movement, the upper booster shoes 202 and 204 engage the loader skid tracks 2048 and 2050, and the saddle cart 2006, respectively, with the same four (4) inch ram stroke.

With the selection of the type of missile 100S or 100W, namely S-type or W-type, the tray 502 with its missile-booster combination 300S or 300W is shuttled and hoisted to a nominal position approximately 0.250 inch below the normal load position on the loader track 2034. After ramming of the missile-booster combination 300 by the rammer 2020, equipment on the loader track 2034 lifts the missile-booster combination 300 the remaining 0.250 inch for lateral alignment with the loader track 2034.

*Loader trunk*

Figure 12:
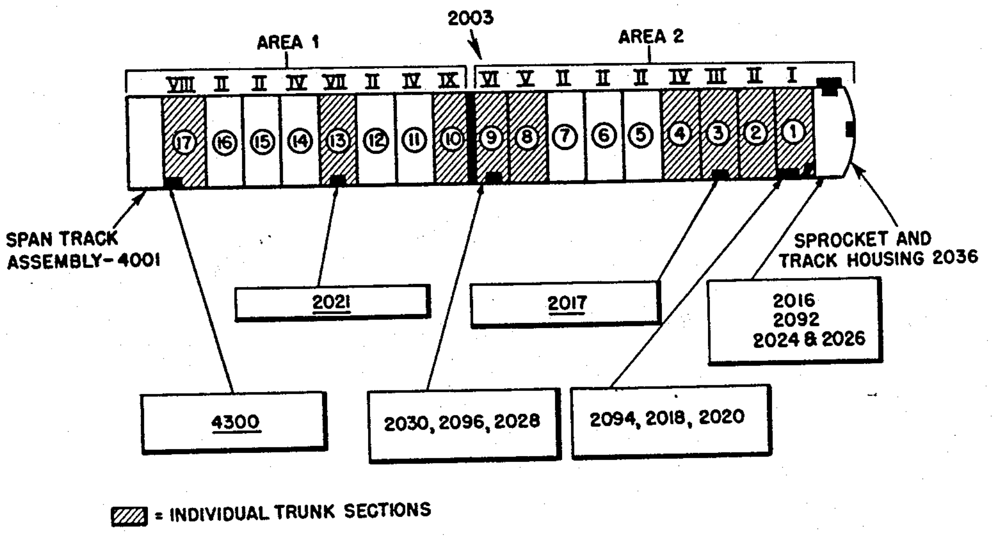
FIG. 12 is a block diagram of trunk sections and hydraulic components, showing relative location thereof.

The loader trunk 2003 is made up of nine major sections, namely I, II, III, IV, V, VI, VII, VIII, and IX, as shown in FIGS. 3, 3A, 3B, and schematically in FIG. 12. Five of these sections, namely sections I, III, VI, VII, and VIII, have hydraulic components, while the remaining four sections II, IV, V, and IX, serve as continuations or extensions of the adjacent sections. Of these four trunk sections II, IV, V, and IX, trunk section II is duplicated seven times and trunk section IV is duplicated three times. The other sections I, III, VI, VII, and VIII are not duplicated, as indicated in FIG. 12.

Each major trunk section is slightly different in design and serves the primary function of giving structural support to the lengths of loader track 2034 for the transferring of missile-booster combinations 300 and weapons 400, and the secondary function of housing the various hydraulic units essential to the over-all operation of the system. All trunk sections are identical as far as the loader track 2034 is concerned.

Each of the 17 trunk sections is bolted to mounting flanges 2068 and 2070 extending outwardly from the overhead deck beams 2042, as shown in FIGS. 3A and 3B and is butted and bolted to the next trunk section to form a continuous row of trunk sections reaching from the frame of the vessel 8000 in the forward part of Area 2 to the aft part of the vessel in Area 1 adjacent to the blast doors 4000.

One end of each trunk section is bolted to the spaced overhead deck beam 2042, while the opposite end is supported by the adjacent trunk section. The support between trunk sections is designed to give vertical and lateral stability thereto while allowing the trunk sections to breathe in the longitudinal direction. Mounted in this manner, the loader trunk 2003, formed of the trunk sections, does not become a part of the structure of the vessel 8000.

Figure 13:
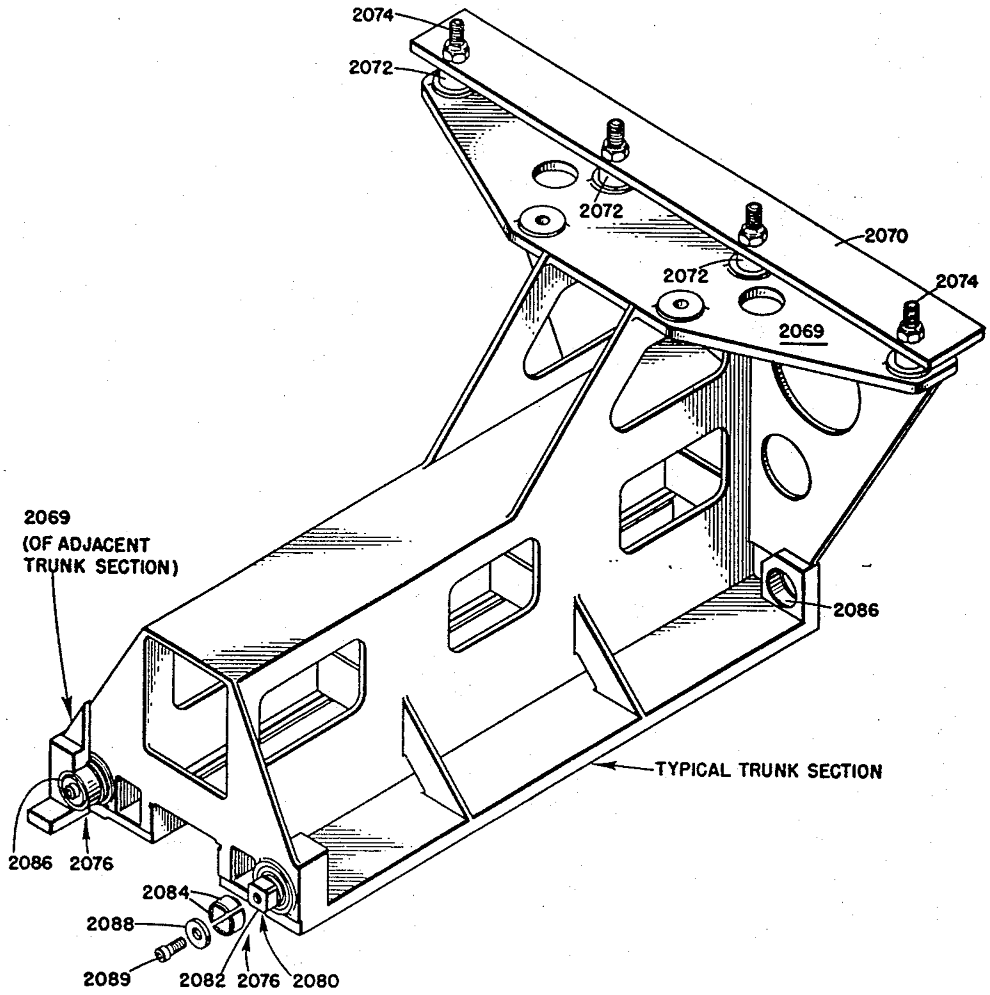
FIG. 13 is a dimetric view of a typical trunk section and the bolting arrangement therefor.
Figure 16:
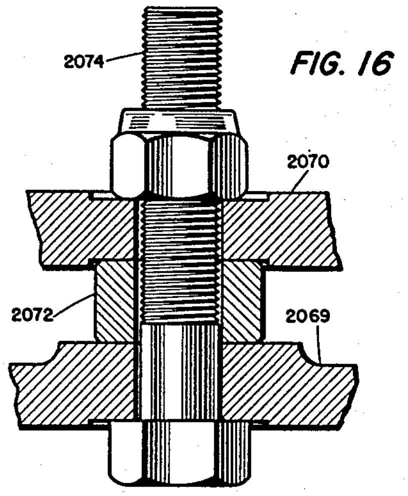
FIG. 16 is a vertical cross section, partly in elevation, of a trunk mounting bolt.

A typical trunk section, such as trunk section II, as shown in FIGS. 13 and 16, is bolted to a special flange 2070 of an overhead deck beam 2042. A spacer 2072 is inserted with each bolt 2074 between a mounting flange 2069 of the section and the special flange 2070 provided on the overhead deck beam 2042.

Figure 15:
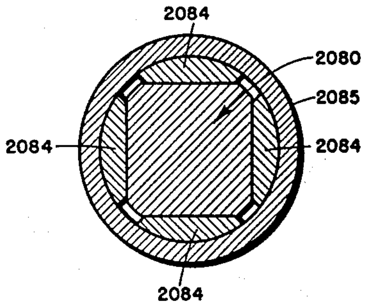
FIG. 15 is a cross section taken along line 15—15 of FIG. 14.
Figure 14:
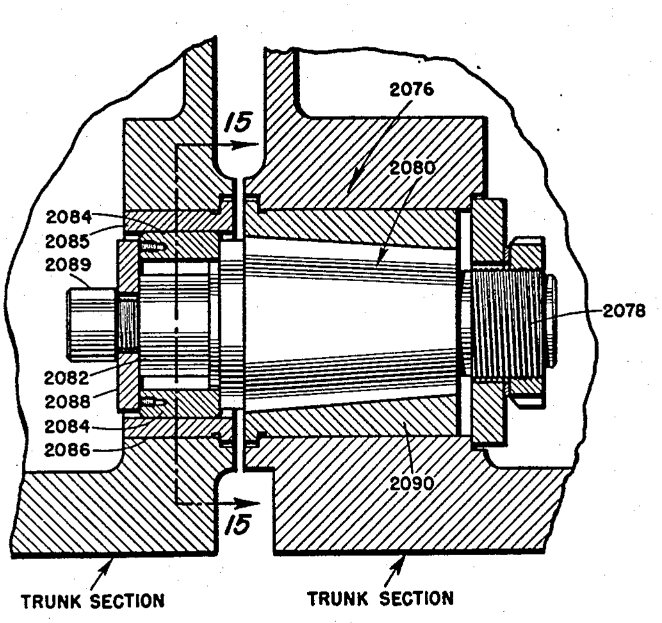
FIG. 14 is a longitudinal cross section, partly in elevation, of a typical dowel floating support positioned between trunk sections.

In FIGS. 13, 14, and 15, the construction of the special floating dowel supports 2076 between trunk adjacent sections are illustrated in detail. Each dowel support 2076 comprises a square dowel 2080, whose other end is tapered and securely bolted by a bolt 2078 to the end of the trunk section. The square protruding end 2082 of each dowel 2080, together with four keys 2084, located within a dowel sleeve 2085 fit into a dowel hole 2086 of the adjacent trunk section.

The keys 2084 are retained in position by a washer 2088 and a screw 2089 which engages in a threaded aperture in the square protruding end 2082 of the dowel. The tapered end of the dowel 2080 is also inserted in a tapered sleeve 2090 in the typical trunk section. Exact alignment between adjacent trunk sections of skid tracks 2048 and 2058, is secured by selective fitting of the dowel keys 2084.

Figure 17:
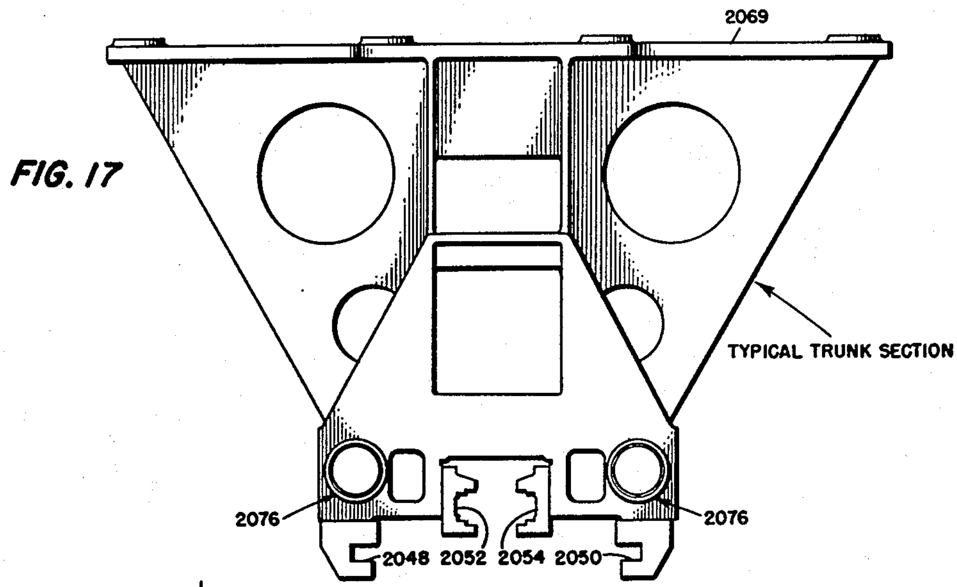
FIG. 17 is an end view of a typical trunk section.
Figure 18:
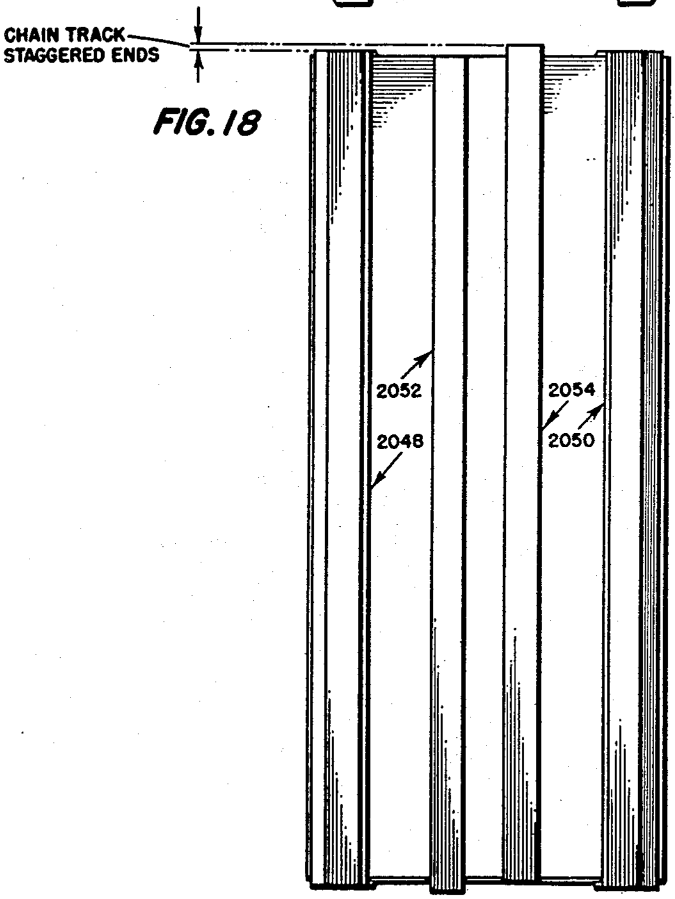
FIG. 18 is a bottom view of a typical trunk section, such as shown in FIG. 17.

An end view and a bottom view of a typical trunk section are shown in FIGS. 17 and 18, respectively. The lengths of the skid tracks 2048 and 2050 and chain tracks 2052 and 2054 are such that a nominal gap exists between adjacent track sections. The skid tracks 2048 and 2050 on each side of the typical trunk section are flush with each other at the ends.

The surfaces of the sliding upper forward booster shoe 202 pass over the gap at the same time when the missile-booster combination 300 is moving. The adjacent sections of the chain tracks 2052 and 2054 are staggered at the ends, as shown in FIG. 18, to provide line contact with at least one chain roller 2058 as the chain 2004 passes over the gap.

Although a typical trunk section is shown in FIGS. 13, 17, and 18, other trunk sections vary somewhat in design. Since the rammer 2020, the floating forward and aft tracks 2017 and 2018, and the warm-up contactor 2021, are built into the loader trunk 2003 at the required locations, the trunk sections vary in design accordingly.

Trunk section I adjacent to the loader power drive 2010 in Area 2, trunk section III containing the forward float track 2017, trunk section VI aft of the flametight door 2028, section VII containing the warm-up contactor 2021 in Area 1, and section VIII adjacent to the blast doors 4000 in Area 1, are bolted to the overhead deck beams 2042 at each end of the trunk section. This construction is shown in FIGS. 3, 3A, and 3B.

*Loader trunk—Area 2 (ready service compartment)*

In the ready service compartment 8012 of Area 2, several important functions are performed before the missile-booster combination 300 is moved into the wing and fin assembly compartment 8010 of Area 1 which assembly is described in copending application Serial Number 31,785 filed May 5, 1960. Once the desired selection is made of the missile-booster combination 300S or 300W from the ready service mechanism 500 (A or B), the forward and aft floating tracks 2017 and 2018 of the trunk sections III and I engage the forward and aft booster shoes 202 and 204, respectively, of the booster 200 of the missile-booster combination 300.

The missile-booster combination 300 is then raised into the chain track and saddle cart connections, which, in turn, transfer the missile-booster combination 300 along the skid tracks 2048 and 2050 into Area 1. Thus, the ready service compartment 8012 of Area 2 is utilized for the stowage, selection, and transfer of missile-booster combinations 300 to Area 1, as best illustrated in FIGS. 3, 3A, and 3B.

In Area 2, there are located nine individual trunk sections, as shown in FIG. 12, which are bolted to the overhead deck beams 2042, as previously mentioned, and to adjoining trunk sections by the supports 2076. The hydraulically operated components of Area 2 include the power drive 2010 for the chain 2004.

The sprocket and track housing 2036, which is secured to trunk section I, contains the following hydraulically operated components, namely the Area 2 positioner 2016, a creepage control valve 2092, and the Areas 1 and 2 interlock valves 2024 and 2026, as shown in FIGS. 12 and 19, while trunk section I contains a shoe engagement indicator 2094, the aft floating track 2018, and the rammer 2020, best illustrated in FIGS. 12 and 20.

Trunk section III contains only one hydraulically operated component, which is the forward floating track 2017, while trunk section VI contains three hydraulically operated components, namely the Area 1 positioner 2030, a chain track flame seal 2096, and the flametight door 2028, all localized in FIGS. 3A and 12.

Of the various trunk sections mentioned above, trunk section I is the largest of the Area 2 trunk sections, while trunk section IV is the smallest. The other trunk sections in Area 2, not having hydraulically operated components, are trunk sections II, IV, and V.

*Loader trunk—Area 1*

Once the missile-booster combination 300 has been transferred from the ready service tray 502 in Area 2 into Area 1, it is ready for assembly. As previously mentioned, the over-all operation in Area 1 transforms the missile-booster combination 300 into a weapon 400 when the four (4) wings 102 aand the four (4) fins 104 are mounted on the missile 100, and the four (4) fins 208 are secured to the booster 200, as shown in FIG. 2. Next, in the operation, the external warmup contact is applied through the Area 1 warmup contactor 2021. During this time, the flametight door 2028 is closed.

In order to complete the transfer of the weapon 400 to the guide arm 5002 of the launcher 5000, the blast doors 4000, with the floating span track assembly 4001 attached to the upper blast door 4004, are swung open and the aft end of the track assembly is retained by a span track-to-loader latch 4300 positioned in trunk section VIII. Beyond this span track assembly 4001, the weapon 400 is transferred to the guide arm 5002 of the launcher 5000.

Each loader trunk 2003 (A or B-side) in Area 1 consists of eight individual trunk sections which are attached to the overhead deck beams 2042 and the adjoining trunk sections as previously mentioned. In Area 1, there are two hydraulically operated components, aside from subassemblies, namely, the Area 1 warmup contactor 2021 located in trunk section VII, and the span track-to-loader latch 4300 of trunk section VIII. During the prefiring preparations of the weapon 400 in Area 1, Area 2 is sealed off from Area 1 by the flametight door 2028.

In FIG. 12, the loader trunk 2003 is schematically illustrated by means of an outline drawing which shows Areas 1 and 2, the various trunk sections, their locations, and the previously mentioned hydraulically operated components.

In addition to the hydraulically operated components mentioned in the previous two sections, each Area 1 accumulator 6000 is located just forward of the loader trunk 2003 in Area 1 and just aft of the blast doors 4000 and the span track assembly 4001.

Each Area 1 accumulator 6000 powers all hydraulic units of its respective loader trunk 2003, as previously mentioned. The only components in the assembly Areas 1 and 2 of the loader 2002 that the Area 1 accumulator 6000 does not power are the loader chain 2004 and the loader power drive 2010 therefor. As will be described in detail later, the loader chain 2004 is powered by the chain power drive 2010 which is connected to the sprocket and chain track housing 2036.

As previously mentioned, there are nine (9) different types of trunk sections which appear in various combinations to make a total of 17 units, as shown in FIG. 12. Both A-side and B-side trunks 2003 are identical in every way, the only distinction being that each may operate independently of each other.

*Loader trunk section I and sprocket and track housing*

Trunk section I of the loader 2002 is the largest of the trunk sections and it can be identified by its position directly aft of the loader assembly Area 2 (forward on the vessel 8000), in position 1, as shown in FIG. 12. The sprocket and track housing 2036, which contains a sprocket 2039 for the loader chain 2004 and which sprocket is driven by the chain power drive 2010, is bolted securely to one end of trunk section I.

Two solenoid operated control valves 2144 and 2117, are shown in FIG. 20. The top solenoid operated control valve 2144 is used as the control for the aft floating track 2018, while the lower solenoid operated control valve 2117 is used as the control for the piston 2118 of the rammer 2020.

Trunk section I is easily identified by the high, deeply angled overhead beam attaching arms 2105 and 2107, as best illustrated in FIG. 3B. These arms 2105 and 2107 are bolted to overhead deck beams 2042. Because of the size requirements of trunk section I, these overhead deck beam arms 2105 and 2107 reach up a distance almost twice that of all other trunk sections.

The two overhead deck beams 2042 to which trunk section I is bolted are shorter than those to which the other trunk sections are bolted as shown in FIG. 3B. Even though movement of each basic trunk component is restricted vertically and laterally, there must be fractional freedom longitudinally. The natural rolling and pitching motion of a ship, such as vessel 8000, at sea necessitates this condition.

Trunk section I is so designed that each flange thereof is securely bolted to each overhead deck beam 2042 at 12 points, while the single flange of the other trunk sections average six to eight bolts, except for the two flanges of each trunk section VII and VIII which have 8 bolts for each flange or a total of sixteen (16) bolts for the section. The manner of securing each trunk section to its overhead hanging deck beam 2042, as illustrated in connection with trunk section I, is directly in proportion to its size, weight, and purpose.

Trunk section I and the sprocket and track housing 2036, as shown schematically in FIG. 12, have seven hydraulically operated components, namely the Area 2 positioner 2016, the creepage control valve 2092, the Areas 1 and 2 interlock valves 2024 and 2026, respectively, the shoe engagement indicator 2094, the aft floating track 2018, and the rammer 2020, which help to initiate the loading of the missile-booster combination 300 from the ready service Area 2 to the loader 2002. A brief description of each component will now be given to point out the relationship and function of each component in the system.

*Area 2 positioner*

The Area 2 positioner 2016, which is mounted to the upper portion of the sprocket and track housing 2036, as shown in FIG. 20, just below the Area 2 interlock valve 2026, locks the chain 2004 and attached saddle cart 2006 in the load position during the ramming operation of the missile-booster combination 300 by the rammer 2020, thus assuring a desired position for the loading cycle.

The loader power drive 2010 will halt the saddle cart 2006 in Area 2 within one quarter of an inch. The ramming equipment including the rammer 2020 is constructed to accommodate one half an inch in this longitudinal direction. However, variations are to be expected during repeated cycles of loading of missile-booster combinations 300.

The Area 2 positioner 2016 brings the sadddle cart 2006 and a reverse or aft motion pawl 2005 of the chain 2004 to a specific position prior to each cycle of loading of a missile-booster combination. In the event the saddle cart 2006 should stop a fraction of an inch off perfect alignment to the aft floating track 2018, the Area 2 positioner 2016 wil move the saddle cart 2006 into the desired position as it extends. The wedge-shaped positioner 2016, driven by a piston 2110, slips between links of loader chain 2004 and automatically shifts the chain 2004 and saddle cart 2006 to the desired position.

When the rammer 2020 extends, forcing the missile-booster combination 300 forward four inches to engage the skid track of the floating track section 2018, thrust load is imposed on the loader chain 2004. Without the Area 2 positioner 2016 to lock the chain 2004, this thrust load would be transmitted to the loader power drive 2010. For this reason, the Area 2 positioner 2016 serves a dual purpose.

Once the Area 2 positioner 2016 has extended to lock the loader chain 2004 into position, the interlock valve 2026 is extended. An actuator arm 2112, attached to the piston 2110 of the Area 2 positioner 2016, engages switches SIHB2 and SIHB1, as shown in FIG. 20, to indicate that either the retraction of extension action of the Area 2 positioner has occurred. These switches SIHB2 and SIHB1 are interlocked to the loader sequence.

*Creepage control valve*

The creepage control valve 2092 is located in the sprocket and track housing 2036 just above the chain sprocket 2039, as shown in FIGS. 19, 20, and 72. It is mechanically operated and designed to hydraulically control a creepage piston 2093 associated with the loader power drive 2010. The creepage piston 2093, in turn, controls the final movement or creepage of the saddle cart 2006 at the end of a load cycle.

Figure 11:
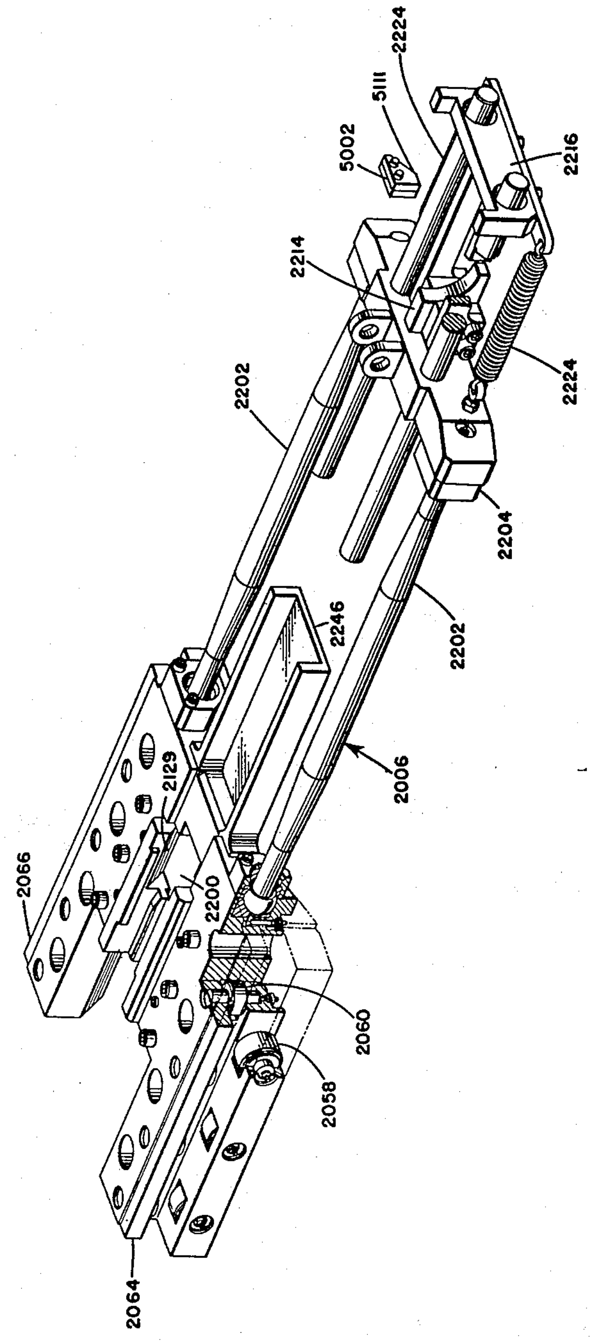
FIG. 11 is a dimetric view of the lower components of the saddle cart.

The saddle cart 2006 engages a stop 5111, shown best in FIG. 11, and the weapon 400 is transfered to the launcher 5000 before the loader chain 2004 comes to the end of its travel. The loader chain 2004 may travel 3.250 inches beyond its destination after the weapon 400 is loaded to the launcher 5000. The saddle cart 2006 may also contact its stop 5111 when the chain 2004 still has a distance of six (6) inches to travel.

Inasmuch as the loader chain 2004 runs at a speed of twelve (12) feet per second, with a deceleration rate of nine (9) feet per second, the loader chain will be traveling at a speed of three (3) feet per second when it is only six (6) inches from the end of travel. This velocity is undesirable. The velocity of the loader chain 2004 must be limited to twelve (12) inches per second during the last eight (8) inches of travel.

The actuator arm 2116 of the creepage control valve 2092, on which a cam roller 2114 is supported, contacts a switch SILB5, shown schematically in FIGS. 19, 20, and 72, to give an electrical indication of condition at the control panel that the creepage control valve 2092 is extended. This is interlocked with the over-all system.

*Areas 1 and 2—Interlock valves*

The Areas 1 and 2 interlock valves 2024 and 2026, respectively, are located at the top of the track housing 2036, just above the Area 2 positioner 2016 in trunk section I, as shown in FIG. 19. The Area 2 interlock valve 2026 is hydraulically controlled to prevent the Area 2 loader rail equipment from working unless the saddle cart 2006 is retracted to Area 2, while Area 1 interlock valve 2024 does the same for the Area 1 loader equipment. The ends of the interlock valves 2024 and 2026 act as actuator arms on switches SILB2 and SILB4.

Each interlock valve 2024 and 2026 is mechanically linked by an actuator arm 2025 to a roller 2045 which rolls on the top edge of the links 2101 of the loader chain 2004, as shown best in FIG. 19. The top edge of the loader chain 2004 serves as a cam and the roller 2045 as a cam follower. When the loader chain 2004 is retracted to the load position in Area 1, a notched or detented chain link, such as 2104, moves to correspond with the position of the cam follower of the Area 2 interlock valve 2026. The spring loaded roller 2045 drops accordingly to extend the valve 2026. The Area 1 interlock valve 2024 is extended in a similar manner, but only when the saddle cart 2006 is stopped in the proper position in Area 1.

The results of interlocking the various hydraulic components is the same for both Areas 1 and 2 interlocking operation. The only difference is in relation to the function of the different hydraulic components.

*Shoe engagement indicator*

The shoe engagement indicator 2094 is located in trunk section I just aft of the aft floating track 2018, as shown best in FIGS. 20 and 109*a*. When the rammer 2020 is retracted, an indication is essential that the aft motion pawl 2005, shown in FIGS. 20, 22, and 24–27, has dropped down to engage the aft surface of the aft booster shoe 204. The shoe engagement indicator 2094 also limits the retract stroke of the rammer 2020. The shoe engagement indicator 2094 is extended to contact a cam surface of the aft motion pawl 2005 of the saddle cart 2006 when the rammer 2020 is retracted.

Switches SIKB1 and SIKB, shown best in FIGS. 20 and 109*b*, are contacted respectively when the plunger of the shoe engagement indicator 2094 engages the aft motion pawl 2005 and when the indicator shifts back to a normal position. The plunger of the shoe engagement indicator 2094 retracts after the forward and aft floating tracks 2017 and 2018, respectively, are raised. This clears elements of the loader chain 2004 prior to the next load cycle of the missile-booster combination 300.

*Rammer*

The rammer 2020, as shown best in FIGS. 6D, 12, 24, 25, 26, and 27, is positioned in trunk section I, aft of the aft floating track 2018 at the loader track level. The rammer 2020 functions by buckling and straightening thigh and leg links 2205 and 2207, respectively, to force the reverse or aft motion pawl 2005 of the saddle cart 2006 to engage the aft booster shoe 204 of the missile-booster combination 300. It also forces the missile-booster combination 300 four (4) inches forward for the forward booster shoe 202 to engage the loader rail sections of the forward floating track 2017. The rammer 2020 is made up generally of a rammer piston 2118 which is attached to a short chain track section 2019 and of a latch valve 2120.

Once the missile-booster combination 300 has been raised by the center hoists 508 and 509 of the ready service mechanism 500, as shown best in FIG. 138, and the aft booster shoe 204 has entered a receptacle 2200, shown best in FIG. 11, of the saddle cart 2006, there remains a horizontal difference of four (4) inches to the loaded position of the saddle cart 2006.

In this present position, the reverse or aft motion pawl 2005 is lifted and rests on the top surface of the rear booster shoe 204. Both a forward motion pawl 2007 and the aft motion pawl 2005 must be ram-retracted until the latter pawl 2005 has passed over the top of the booster shoe 204 and dropped to engage the aft surface of the rear booster shoe 204. The missile-booster combination 300 is then rammed by the rammer 2020 the four (4) inches forward to disengage shoe receptacles in the tray 502, and to engage the saddle cart 2006, as shown by a schematic series of the ramming operation illustrated in FIGS. 24, 25, 26, and 27.

*Aft floating track*

The aft floating track 2018, as shown best in FIGS. 6D, 20 28, 29, 30, and 36, is located in trunk section I in Area 2. In a stowed and load position, the aft floating track 2018, is mated with the saddle cart 2006 which floats with it while engaging the aft booster shoe 204.

The aft and forward floating tracks 2018 and 2017, respectively, differ only slightly, the difference being mainly in the manner in which each aligns to the rear and forward shoes 204 and 202 of the booster 200. For this reason, the detailed description of the aft floating track 2018 also applies to the forward floating track 2017, shown best in FIGS. 3B, 6C, 12, and 20A.

The aft floating track 2018, synchronized with the movement of the forward floating track 2017, extends down to engage the aft booster shoe 204. The forward floating track 2017, on the other hand, engages the forward booster shoe 202. The rammer 2020 is then operated and it forces the forward and aft shoes 202 and 204 of the booster 200 forward four (4) inches into the skid tracks 2048 and 2050 of the forward and aft floating tracks 2017 and 2018, respectively. The missile-booster combination 300 is then raised from the tray 502 of the ready service mechanism 500 and transferred to the loader 2002. It is to be noted that the skid tracks 2048 and 2050 are identical in shape for the forward and aft floating tracks 2017 and 2018 and the trunk sections of the trunk 2003.

The forward and aft floating tracks 2017 and 2018 extend before the center hoists 508 and 509 of the ready service mechanism 500 is raised. Prior to this, the ready service tray 502 has indexed to position the desired missile-booster combination, namely 300S or 300W in the center hoists 508 and 509.

FIGS. 28 and 29 show diametric views of the aft and forward floating tracks 2018 and 2017, respectively, and their various components are further illustrated in FIGS. 22, 23, 30, 31, and 32. The track 2017 or 2018, as shown in FIG. 28, is in a lowered position, while in FIG. 29, it is shown in a raised position.

The assembly of each floating track 2017 or 2018 consists of a latch valve block 2122 attached to a latch frame 2123 which has two switches SIJB1 and SIJB2 mounted thereon. Switch SIJB1 is used in conjunction with a servo lift piston 2124 in a lowered position and the other switch SIJB2 for the servo lift piston 2124 in a raised position. These switches SIJB1 and SIJB2 are connected to a servo piston housing 2125 containing the servo lift piston 2124 and a servo valve 2126. The entire unit is supported by a cam frame 2127 which, in turn, is bolted to the trunk section I.

A hanger frame 2128, which reaches around the cam frame 2127, supports two short lengths of skid tracks 2048 and 2050. In the forward floating track 2017 these sections of skid tracks 2048 and 2050 have tapered lead-in slots 2129 provided to receive the forward booster shoe 202. The aft floating track 2018 carries the saddle cart 2006 which has its own tapered receptacle to receive the aft booster shoe 204 when a missile booster combination 300 is raised by the center hoists 508 and 509 of the ready service mechanism 500.

The floating hanger frame 2128 is independent of the chain tracks 2052 and 2054. The sections of the skid tracks 2048 and 2050 straddle the chain tracks 2052 and 2054, as best illustrated in FIGS. 9, 10, 28, and 29. The chain tracks 2052 and 2054 support the hanger frame 2128 until the missile-booster combination 300 is raised from the tray 502 of the ready service mechanism 500 to make contact and lift the hanger frame 2128.

The hanger frame 2128 is raised and lowered by the servo lift piston 2124. This piston 2124 is linked to the hanger frame 2128 by a set of toggle links 2130 and hanger bars 2131.

In the floating or load position, illustrated in the split views of FIGS. 22 and 23, the hanger bars 2131 and a pair of hanger blocks 2132 support the weight on hanger cams 2133. The hanger blocks 2132 are retained in this position by the toggle links 2130 which are lifted slightly beyond center at a servo lift piston pin 2137 connected to the servo lift piston 2124. When the loader assembly power is off, the servo lift piston 2124 is locked in this position by a latch 2134 in the latch frame 2123, as shown in FIG. 36.

In the load position, prior to a booster shoe contact, the hanger frame 2128 is held in a centered position by a pair of spring-loaded centering plungers 2135, shown best in FIGS. 28 and 29, which contact the inner side of the chain tracks 2052 and 2054. In addition to the gravity load of the hanger frame 2128, there is a hydraulic force of 600 pounds acting on the frame. This weight must be overcome when the forward and aft booster shoes 202 and 204 make contact and lift the frame 2128.

The forward and aft floating tracks 2017 and 2018 align independently of each other with their respective booster shoe. One floating track, say 2017 (2018), may align from the right of the centerline, while the other floating track, say 2018 (2017), may align from the left. FIG. 10 shows how the forward floating track 2017, which is located in trunk section III, as shown best in FIG. 12, is aligned to the forward booster shoe 202. The same applies to the alignment of the aft floating track 2018 with the aft booster shoe 204.

The center of the top surface of the booster shoe 202 is located in a shaded rectangle 2099 of FIG. 10. The booster shoe 202 contacts the tapered lead-in slot 2129 in the skid track and aligns the frame 2128 laterally with the shoe. Then, as the tray 502 with its missile-booster combination 300 is raised from the ready service mechanism 500, the frame 2128 is lifted by the forward booster shoe 202. The distance of lift of the missile-booster combination 300 depends on the stopping position of the hoists 508 and 509 of the ready service mechanism 500 and the various tolerances which exist in the ready service tray 502 and structure of the missile-booster combination 300.

Variations in the position of the forward and aft booster shoes 202 and 204 can be expected between successive load cycles in a plane at right angles to the loader 2002. In the vertical plane, the missile-booster combination 300 is raised to a nominal position below the loader skid tracks 2048 and 2050. The engaging surfaces of the aft booster shoe 204 of the missile-booster combination 300 will be one quarter of an inch below this position. However, the vertical lift of the aft booster shoe 204 will vary as much as plus or minus one quarter of an inch.

Inasmuch as each ready service tray 502 is supported by the ends only, a certain amount of sag can be expected therein. As a result, the lift of the forward booster shoe 202 of the missile-booster combination 300 will be approximately one half an inch below the normal load position, with a vertical tolerance of the forward booster shoe 202 of plus or minus one half an inch.

In the lateral or transverse direction, the booster shoes 202 and 204 can be misaligned as much as plus or minus three quarters of an inch. The forward booster shoe 202, with its wide wheel base, can be tilted as much as plus or minus two degrees relative to the loader tracks 2048 and 2050 in the lateral plane. Any deviation can be corrected by wedging the missile-booster combination 300 into alignment with tapered receptacles.

As an illustration, a point P, above the top surface and at the center of the forward and aft booster shoes 202 and 204, respectively, is selected. The shaded rectangular areas shown in FIGS. 9, 10, 33, 34, and 35 represent the tolerance in position that can accommodate this point P. If the imaginary center P of the booster shoe 202 falls within these areas, the missile-booster combination 300 can be engaged, aligned, and raised to the loader rail.

The height of the tolerance rectangles 2099 are seven-eighths (⅞) inch and seven-sixteenths (7/16) inch, respectively, for the forward and aft booster shoes 202 and 204. Only at the centers of the rectangles 2099 do the areas reach the total heights of one (1) inch and one half (½) inch. This is due to the beveled ends of hanger frame locators 2136 used on the aft track 2018 only, as shown in FIG. 30, which act as dowels to locate the frame 2128 in the final aligned position. The aft and forward floating track 2018 and 2017 of trunk section I and III, respectively, can accommodate any misaligned position of the booster shoes 204 and 202.

The servo lift piston pin 2137, connected to the toggle links 2130, includes a pair of piston guide rollers 2138, as shown best in FIGS. 9, 10, and 29. These rollers 2138, guided by a piston guide cam 2139, prevent transverse loads on the extended servo piston 2124, as illustrated in FIGS. 28 and 29. The piston guide cams 2139, in addition, serve an added function. Under certain conditions, the top end of the hanger bars 2131 have a hanger bar protrusion 2140 which contacts the exterior side of the piston guide cams 2139.

As stated previously, the hanger frame 2138 will accommodate angular misalignments of the booster shoes 202 or 204 of as much as two degrees from the transverse horizontal. This angular misalignment is limited when the hanger bar protrusion 2140 and the piston guide cam 2139 make contact. Because of this, the hanger frame 2128 cannot shift further sideways when contacted by a misaligned shoe 202 or 204.

As shown best in FIGS. 9, 10, 33, 34, and 35, a pair of wedge rollers 2141 are used to align the missile-booster combination 300 and hanger frame 2128 to the loader skid tracks 2048 and 2050. As the servo piston 2124 lifts, as shown in FIGS. 34 and 35, to straighten the toggle links 2130, the hanger bar 2131 contacts one of the wedge rollers 2141. As the force of the piston 2124 pivots about the rollers 2141, the bar 2131 laterally forces the hanger frame 2128 into the correct alignment. The frame locator 2136 maintains this aligned condition and withstands lateral load when the vessel 8000 rolls.

As FIG. 36 shows, the hanger frame 2128 has been lowered. The aft floating track 2018 has been lowered five-eighths of an inch. This is one-eighth of an inch more than previously mentioned. However, it is necessary for switch indication, as will be explained subsequently.

FIG. 36 also shows a projection 2142 at the top end of the servo piston 2124 contacting an interlock switch SIJB3. When the switch SIJB3 is closed, it signals that the aft floating track 2018 has been lowered. When the missile-booster combination 300 is hoisted to the loader skid tracks 2048 and 2050, the aft floating track 2018 must be lifted at least this one-eighth of an inch to get an indication that the booster shoes 202 and 204 are in contact with the skid tracks.

A probe 2143, detailed in FIG. 32, contacts the hanger frame 2128 with a hydraulic force of about 600 pounds. When the hanger frame 2148 is lifted by the missile-booster combination 300, it must lift against this force in addition to the weight of the hanger frame 2148 itself. When the probe 2143 is lifted by contact with the hanger frame 2148, the servo lift piston 2124 also lifts. The servo lift piston 2124 always follows the movement of the servo valve 2126.

Once the missile-booster combination 300 has been rammed a sufficient distance to engage the loader skid tracks 2048 and 2050 of the floating tracks 2017 and 2018, a solenoid is energized. This solenoid shifts a control valve 2144 and ports pressure from the top side of a pilot piston 2145, shown in FIGS. 30 and 36, to the header tank T. Since the bottom side of the piston 2145 is always connected to PA fluid pressure, the servo piston 2124 and servo valve 2126 are raised. The toggle links 2130 and hanger bars 2131 align and lift the missile-booster combination 300 to the loader skid tracks 2048 and 2050. An interlock switch SIJB4 indicates when the piston 2124 is lifted and latched.

The forward floating track 2017 includes a rail loaded switch SILB1, as shown in FIG. 30. This switch SILB1 is actuated by the forward booster shoe 202 after the missile-booster combination 300 has been rammed by the rammer 2020.

As shown in FIGS. 28 and 29, each end of skid tracks 2048 and 2050 of the floating tracks 2017 and 2018 has a guide plate 2146 to contact the adjacent fixed skid tracks 2048 and 2050 on the various trunk sections of the loader 2002. These guide plates 2146 tolerate all longitudinal thrust loads of the missile-booster combinations 300 and locate the forward and aft floating tracks 2017 and 2018 during alignment of the missile-booster combination 300.

*Trunk section II*

Trunk section II of the loader 2002, as shown best in FIGS. 3A, 3B, 6A, 6B, 6C, 6D, 12, and 13, has no hydraulic components or mechanical parts. This trunk section II appears seven times in the entire trunk assembly in positions 2, 5, 6, 7, 12, 15, and 16, as shown best in FIG. 12, in both loaders 2002A and 2002B.

The primary function of each trunk section II is that of an extension or continuation of the trunk 2003 to fulfill specifications of size and handling required by the missile-booster combination 300 or weapon 400. Unlike trunk section I, each trunk section II is secured to its corresponding overhead deck beam 2042 at one end only.

*Trunk section III*

Trunk section III, as shown best in FIGS. 3B and 6C, and shown schematically in FIG. 12, is located between trunk sections II and IV aft of the launcher 5000, or forward with regard to the vessel 8000. Trunk section III appears only once in the trunk 2003 at position 3. This forward floating track 2017 operates in conjunction with the aft floating track 2018, as previously mentioned.

*Loader trunk section IV*

Trunk section IV, as illustrated in FIGS. 3A, 3B, 6B, 6C, and schematically in FIG. 12, is the smallest of all the trunk sections. It appears three times in the loader trunk 2003 in positions 4, 11, and 14, as shown in FIG. 12. The purpose of each trunk section IV is the same as trunk section II, that is, to serve as a continuation or extension of the loader trunk 2003 to fulfill size and handling specifications of the missile-booster combination 300. It will be noted that the most distinguishing feature of each trunk section IV is the absence of an overhead beam connecting arm since the trunk section is bolted to other trunk sections fore and aft only.

As shown schematically in FIG. 12, trunk section IV appears in trunk position 4 in Area 2 and trunk positions 11 and 14 in Area 1 between trunk sections IX and II, and VII and II, respectively. Trunk section IV has no hydraulic components or moving parts.

*Loader trunk section V*

Loader trunk section V, as shown in FIGS. 3B and 6C, is one of the longest of the trunk sections. Its location, as shown schematically in FIG. 12, is at position 8 between trunk sections II and VI in Area 2. This trunk section is provided with no hydraulic components or moving parts. Like trunk sections II and IV described previously, it is the primary function of trunk section V to serve as a continuation or extension of the loader trunk 2003 to fulfill size and handling requirements of the missile-booster combination 300 or weapon 400.

It will be noted that the shape of the upper extremities of trunk section V distinguish it from all other trunk sections.

*Loader trunk section VI*

Trunk section VI, as shown best in FIGS. 3A and 6C, is located between trunk sections V and IX in trunk position 9 at the forward end of Area 2, or at position 9 directly aft of the flametight door 2028, as shown schematically in FIG. 12. It houses the previously mentioned Area 1 positioner 2030, the chain track flame seal 2096 and is adjacent to the flametight door 2028. FIG. 6C also shows the solenoid housing for the Area 1 positioner 2030.

*Area 1 positioner*

The Area 1 positioner 2030, as shown schematically in FIG. 12 and in detail in FIG. 37, is located in trunk section VI just aft of the chain track flame seal 2096. Its primary function is to lock the chain 2004 and the saddle cart 2006 into the desired position in Area 1 so that the external warmup contactor 2021 may be applied to the missile 300 of the missile-booster combination.

Like all other hydraulic units of the loader trunk 2003, excluding the chain power drive 2010 and chain or drive sprocket 2039 attached to trunk section I, the Area 1 positioner 2030 is connected to the hydraulic system of the Area 1 accumulator 6000.

It is identical to the Area 2 positioner 2016, previously discussed in connection with FIGS. 19 and 20, except for the shape of the actuator arm 2113 protruding from the side, as shown in FIG. 37. This actuator arm 2113 contacts switches SINB2 and SINB1, as shown in FIG. 37, when a piston 2111 of the Area 1 positioner 2030 has retracted or extended. The Area 1 positioner 2030, like the Area 2 positioner 2016, is electrically interlocked with the sequence of loading of the missile-booster combinations on the loader 2002. The Area 1 positioner 2030 has its own solenoid controlled selector valve 2250, as shown in FIG. 37.

Like the Area 2 positioner 2016, the bottom side of the Area 1 positioner 2030 is designed to be open to fluid PA pressure from the accumulator 6000 at all times, thus holding the piston 2111 in a retracted position when the loader chain 2004 moves back into Area 2. When the equipment is shut down, the detented piston 2111 engages and holds the Area 1 positioner 2030 in the retracted position.

*Chain track flame seal*

The chain track flame seal 2096, as shown best in FIGS. 39 and 41, which is located in trunk section VI, closes the chain tracks 2052 and 2054 when the saddle cart 2006 is in Area 2, thus simultaneously sealing off the loader trunk 2003 of Area 2 from its continuation loader trunk 2003 of Area 1 along with the flametight door 2028. This action is necessary for the safety of the missile crew and the magazine area of the ready service compartment 8012. The chain track flame seal 2096 is linked to the operation of the Area 2 positioner 2016. In addition, it is interlocked to the hydraulic system of the Area 1 accumulator 6000.

FIG. 39 shows a small slot 2097 just below the junction of trunk sections VI and IX. This slot 2097 is the opening through which the flame seal 2096 depresses to close off the chain track 2052 and 2054 fore and aft. In FIG. 39, the flame seal 2096 is shown in the extended position which would indicate that the saddle cart 2006, attached to the aft booster shoe 204 of the missile-booster combination 300, would normally be in Area 2 of the loader 2002. The flame seal 2096 is arranged in a slanted or angled position.

In order that the surfaces of the aft booster shoe 204 may move smoothly through this area, no two opposite rollers of the chain 2004 are permitted to roll over the chain track flame seal slot 2097 at the same time. This angled slot 2097 through the chain track area necessitates the like-angled flame seal 2096.

An electrical interlock switch SIMB3, shown best in FIG. 41, indicates the retraction of the flame seal 2096. When the missile-booster combination 300 is ready to be transferred into Area 1, fluid pressure is ported to the smaller side of a flame seal operating piston 2098, also shown in FIGS. 39 and 41. Inasmuch as hydraulic pressure in the larger piston area subsides, the flame seal 2096 is forced back into a retracted position. This causes a toggle-spring operated arm 2091 to act as an actuator to contact the adjacent interlock switch SIMB3 shown in FIG. 41.

The chain track flame seal 2096 is not hydraulically or electrically connected with the previously mentioned flametight door 2028. Both the chain track flame seal 2096 and the flametight door 2028 are closed when the loader saddle cart 2006 is in the ready service Area 2. However, the flametight door 2028 is closed and the chain track flame seal 2096 is open when the loader saddle cart 2006 is extended beyond the flametight door 2028.

*Flametight door*

The flametight door 2028 is located between trunk section VI and trunk section IX, as illustrated best in FIGS. 3A, 4B, 6B, 12, 39, 40, and 41. When the flametight door 2028 is closed, it separates the trunk sections of Area 1 from the trunk sections of Area 2 and it allows free passage of the missile-booster combination 300 from Area 2 into Area 1 when it is open. It is the function of the flametight door 2028 to seal off the magazine area of Area 2 while the lower and upper blast doors 4002 and 4004 are open, as shown best in FIGS. 3, 3A, 4A, 4B, 6A, and 6B. The frame 2027 of the flametight door 2028 is mounted to the athwartships bulkhead 8008 of the vessel 8000 and it is aligned to the adjacent loader trunk sections VI and IX, as shown in FIGS. 1, 3A, 4B, 6B, 39, and 41.

The flametight door frame 2027 is maintained in its position by two locating dowels 2029, shown best in FIGS. 39 and 40, fitted to the trunk sections VI and IX. The flametight door 2028 slides in vertical gibs 2095 over a large aperture in the frame 2027. In addition to sealing the aperture, the top edge of the flametight door 2028 passes through a gap in the skid tracks 2048 and 2050 and it is contoured to fit around the chain track 2052 and 2054, leaving the track open for passage of the loader chain 2004. The flametight door 2028 is linked to the interlock system of the loader 2002, as will be pointed out subsequently.

A section of the chain stowage track 2008 passes through the upper portion of the door frame 2027 of the flametight door 2028, as shown best in FIGS. 39 and 40. The door frame 2027 is fitted to the outside contour of the chain stowage track 2008 to provide a seal therefor.

*Loader trunk section IX*

The trunk section IX, as shown in FIGS. 3B, 6B, and 12, is located just forward of the flametight door 2028, aft in assembly Area 1, in position 10, as shown best in FIG. 12. This trunk section IX has no hydraulic components or moving parts.

Its function is that of serving as an extension or continuation of the loader trunk 2003 as required for handling of the missile-booster combination 300 in moving the latter from Area 2 to Area 1. Trunk section IX is secured to an overhead beam 2042 at one end only.

The trunk section IX and the trunk section II are the only trunk sections in the entire loader trunk 2003 that are substantially identical. Trunk section IX appears only once in the loader trunk 2003 of Areas 1 and 2.

*Loader trunk section VII*

Trunk section VII, as shown best in FIGS. 3A and 6B, is located between the trunk sections II and IV in Area 1, in position 13, as schematically illustrated in FIG. 12. It has a distinguishing half circle cutout or opening at the top thereof and to the center of the section.

*Warmup contactor*

The warmup contactor 2021 engages the electrical contact or pad 106 on the missile 100 of the missile-booster combination 300, shown in FIGS. 2, 45, and 46, which is positioned forward of the missile-booster clamping ring 402 of the missile-booster combination 300.

The warmup contactor 2021 extends and retracts as shown in the split view of FIG. 38 and in FIGS. 42 and 43, approximately eight inches through the center of trunk section VII from a position directly above the chain tracks 2052 and 2054. A section of the chain tracks 2052 and 2054 folds away to accommodate a warmup contactor box 2148, shown in FIGS. 37 and 38.

The exact location of the contactor pad 106 on a missile 100 will vary due to mechanical inexactness in the structure of the missiles of successive rounds. As a result, the contactor box 2148 must be individually aligned to each missile 100 by a floating block 2157, illustrated in FIG. 44. This is accomplished by a counter-sunk locator socket 108, shown in FIGS. 45 and 46, in the missile contact pad 106.

The bottom of the contactor box 2148 is fitted with a round, tapered locator 2150 which extends beyond the contactor box 2148, as illustrated in FIGS. 45 and 46. Once the missile-booster combination 300 has been positioned in Area 1, the accumulator pressure fluid is ported to a rack piston 2152 and pinion shaft detent 2153, as illustrated in FIGS. 37, 42, and 43. The pinion shaft detent 2153 is hydraulically released to permit the warmup contactor box 2148 to be extended approximately eight inches. As the warmup contactor box 2148 is extended, as shown best in FIG. 46, the locator 2150 engages the locator socket 108 and automatically aligns the warmup contactor box 2148 with respect to the contactor pad 106 of the missile 100. A universal alignment head 2155, located just back of a guide yoke 2154, allows the contactor box 2148 to move in a longitudinal and/or transverse direction to match the position of the contactor pad 106, as shown in FIG. 44.

FIG. 45 shows the contactor box 2148 in the centered free position with the contactor box 248 and pad 106 misaligned in one plane, while FIG. 46 shows the contactor box 2148 aligned and engaged with the contactor pad 106 of the missile 100. Centering freedom of the contactor box 2148 is provided for similar misalignment in the transverse direction. The previously mentioned universal alignment head 2155 to which the contactor box 2148 is mounted provides for plus or minus one half an inch displacement in the longitudinal and transverse directions.

The universal alignment head 2155 is provided with four pivot bars 2156, as shown in FIG. 44. These pivot bars 2156 are vertically and pivotally mounted to a center or floating block 2157 of the universal alignment head 2155 by four loosely fitted vertical pins 2158.

An opposite pair of the four pivot bars 2156 are pivotally supported by two yoke brackets 2159 by means of horizontal pins 2160. The yoke brackets 2159 depend from the guide yoke 2154 by pivot shafts 2161 which are held in place by C-washers 2162. The remaining pair of pivot bars 2156 are pivotally pinned to a pair of hangers 2163.

In FIG. 45, the locator 2150 is misaligned with the locator socket 108 by approximately one quarter inch, while FIG. 46 shows the universal alignment arrangement providing the necessary compensation therefor. The design of the universal alignment head 2155 provides for a total of one half an inch displacement in both the longitudinal and transverse directions.

The universal alignment head 2155 has a pressure rod 2165, as shown best in FIGS. 44, 45, and 46, which is vital in the design of the universal alignment head. There is a total vertical force of about 500 pounds between the contactor box 2148 of the warmup contactor 2021 and the contactor pad 106 of the missile 100 upon contact. This force is distributed through the individual electrical contacts 2190 and 2191. The force of contact between a spindle 2186 and contactor box 2148 is carried by the pressure rod 2165. It can be seen from FIG. 45 that the contactor box 2148 is supported by the guide yoke 2154 which is retained by a guide yoke retainer 2166. In FIG. 46, the vertical contact force is taken through the pressure rod 2165 and the guide yoke 2154 is floating with respect to the guide yoke retainer 2166.

The missile contact pad 106 is provided with a plurality of circuits, all of which circuits are electrically interlocked with the control panel EP3, shown in FIG. 3 for emergency use.

In FIGS. 47 and 48, the high current and low current contacts 2190 and 2191, respectively, are shown in detail for the warmup contactor 2021, shown in FIGS. 45 and 46. It can be seen that the current contacts 2190 and 2191 are individually spring-loaded by the springs 2192.

The springs 2192 create pressure which holds the high and low current contacts 2190 and 2191 snugly in place during engagement with the contactor pad 106 of the missile 100. The current contacts 2190 and 2191 are also provided with beryllium copper wire bristles 2193 which are soldered to the ends of the contacts.

As a current contact 2190 or 2191 is compressed against its respective spring 2192, it is forced to revolve. This causes the bristles 2193 to move like a circular brush. A helix pin 2194, which passes through the center of the current contact 2190 or 2191, is guided by a twisted cam slot 2195 in a contact quill 2196.

The hexagon shaped quill 2196 is fitted to a hexagon socket 2197 in a phenolic insulator block 2198. This prevents the contact quill 2196 from rotating. Terminal wires 2199 enter into the contactor box 2148 through a plurality of separate flexible conduits 2189, as shown in FIGS. 45 and 46.

Aside from longitudinal, transverse, and angular variations in the position of the current contacts 2190 and 2191, the vertical positioning thereof must also be provided for. As shown in FIG. 42, there is provided a connecting rod 2180 for a crank 2182 which provides a fixed stroke of eight (8) inches. However, the contactor box 2148 travels less than this distance, depending on the vertical position of the missile contact pad 106.

An overtravel spring 2184 for the spindle 2186 permits the connecting rod 2180 to overtravel after the contactor box 2148 has engaged the missile contact pad 106. When the crank pin 2183 is in a self-locked, overcenter position, the overtravel spring 2184 governs the actual contact pressure of the components, that is, the warmup contactor 2021 and the contactor pad 106. Failure of hydraulic power will thus not affect the contact pressure of the warmup contactor 2021 with the contactor pad 106 of the missile 100.

*Loader trunk section VIII*

Trunk section VIII, as shown best in FIGS. 3A, 6A, and 49, is located just aft of the blast doors 4000 and span track assembly 4001, forward in Area 1, in position 17, as shown schematically in FIG. 12. It is the longest trunk section, and it houses the span track-loader latch 4300.

The slanted ends of the chain tracks 2052 and 2054 and skid tracks 2048 and 2050 are designed to be aligned with the skid tracks 4206 and chain tracks 4208 of the span track 4200 attached to the upper blast door 4004.

*Span track-loader latch*

The span track-loader latch 4300, as shown in FIGS. 3A, 6A, and 49, is located in the last trunk section VIII, just above the loader tracks 2034, directly aft of the upper blast door 4004 and the span track asesmbly 4001.

In order to complete the transfer of the weapon 400 from Area 1 to the guide arm 5002 of the launcher 5000, the span track assembly 4001 attached to the upper blast door 4004, must extend, align, and secure to the loader trunk 2003 of the loader 2002 and to the guide arm 5002 of the launcher 5000.

The forward end of the span track assembly 4001, as shown in FIG. 50, has a pair of rollers 4269 mounted to it which engages between the tapered cam surfaces 2109 of trunk section VIII. As the span track assembly 4001 nears the horizontal plane of the loader trunk 2003, these rollers 4269 center and align the span track assembly 4001 with the trunk section VIII. Another pair of rollers 4268 on the span track 4001 engage the span track-loader latch 4300.

*Chain stowage track*

The chain stowage track 2008 houses approximately eighty-four (84) feet of loader chain 2004. This loader chain 2004 is stowed when the loader saddle cart 2006 is fully retracted. The chain stowage track 2008 also offers protection for the loader chain 2004 against flames should a fire occur. As shown best in FIGS. 3A, 3B, 6B, 6C, and 6D, the chain stowage track 2008 spans an area from the sprocket and track housing 2036, attached to trunk section I in Area 2 to the topside of trunk section VII in Area 1, or positions 1 to 13 as schematically illustrated in FIG. 12. The chain stowage track 2008 is provided with a chain guide 2037, shown in FIG. 19, which rises vertically from the chain or drive sprocket 2039.

Through a circular 180° bend at trunk section VII, the loader chain 2004 is guided through another part of the chain stowage track 2008. This reversed part of the stowage track 2008 runs closely parallel to the loader trunk 2003 in Areas 1 and 2, as shown best in FIGS. 3A, 3B, 6B, and 6C. The chain stowage track 2008 is actually a series of four-foot tubular sections mounted to the previously mentioned overhead beams 2042 and flexibly aligned and abutted to each other somewhat like the loader trunk sections. The chain stowage track 2008 from Area 2 passes through the athwartships bulkhead 8008 into Area 1, as illustrated in FIGS. 3A and 6B.

The overhead run of the chain stowage track 2008 passes through open areas in the webs 2043 of the overhead beams 2042. Typically, one end of the section of chain stowage track 2008 is flange mounted to the web 2043 of the overhead beam 2042, while the other end is aligned, as shown best in FIG. 52, to the adjacent section by gibs 2009. The end of the track section is thus allowed to float longitudinally with a nominal gap between sections of approximately one eighth of an inch. The ends of the track sections are cut at a 10-degree bias to give support to one side of the loader chain 2004 while its opposite side passes over the gap.

The construction of the outgoing straight sections of chain stowage track 2008 and the gibs 2009 are illustrated in FIG. 52. The return run of the track, as stated, is bolted to the loader trunk sections. Track sections of the chain stowage track 2008 are identical in design except for the section next to the loader track 2034, sections passing through the flametight door frame 2027 and sections next to the 180° circular return track. The circular return of the chain stowage track 2008, which is attached to trunk section VII, is heavily constructed because of the high loads which the loader chain 2004 encounters in making the semi-circular turn.

The outer shape of the track sections is sealed along the area of the flametight door frame 2027. Because the loader chain 2004 is normally stowed in the chain stowage track 2008, additional flame resistance is offered during the time that a new load cycle of a missile-booster combination 300 is about to begin and while the saddle cart 2006 is still located in Area 1.

*Loader chain*

It is the primary purpose of the loader chain 2004 to transfer the saddle cart 2006, once the latter has engaged the aft shoe 204 of the booster 200, of a missile-booster combination 300, forward to the guide arm 5002 of the launcher 5000 in a loading operation of a weapon 400 and back again for either a reloading of a missile-booster combination 300 in Area 2 or the return of a weapon 400 from the launcher 5000 to Area 1.

The loader chain 2004 is powered by the chain power drive 2010 which is attached to the sprocket 2039 in the track housing 2036 at trunk section I in Area 2. The loader chain 2004 travels the distance of the loader chain track at a speed of twelve (12) feet per second in normal automatic operation.

In FIG. 53, there is shown the chain assemblage of interlock valve or cam rollers 2114 and a typical length of loader chain 2004, while in FIG. 55, the loader chain 2004 is shown attached to the saddle cart 2006 and the loader drive sprocket 2039 in a normal operative condition.

The loader chain 2004 is made up, as shown in FIG. 53, of 275 links 2101, three and one half inches wide, with a four inch pitch attached to the saddle cart 2006. When the saddle cart 2006 is located in a load position in Area 2, the free end 2103 of the loader chain is contained in the chain stowage track 2008 which extends aft into Area 1 where it bends back short of the loader warmup contactor 2021 and hence forward into Area 2, as previously mentioned. A cross-section of the chain 2004 is shown in FIG. 54.

The edges of some of the chain links 2101 have cutouts 2104, visible in FIGS. 19 and 53, which are used as cam surfaces functioning as an important part of the hydraulic and electric interlock circuits to be described subsequently and as previously pointed out in connection with FIG. 19. The cam rollers 2114, coupled with valves and switches, thus indicate when the saddle cart 2006 is located in either Area 1 or Area 2.

A special coupling link 2106, as shown best in FIGS. 19, 20, and 55, which is located between the saddle cart 2006 and the loader chain 2004 allows these two components to be disconnected for shipboard installation and servicing. This coupling link 2106 also moves against a positive stop 2108 when the saddle cart 2006 is retracted beyond the normal stopping position in Area 2.

*Saddle cart*

The saddle cart 2006 is a moving assembly which is designed to glide along the previously mentioned skid tracks 2048 and 2050 of the loader track 2034 in Area 1 and Area 2 of the loader 2002. This saddle cart 2006 is attached to and pulled by the loader chain 2004 by means of the coupling link 2106, as shown best in FIGS. 11, 19, 55, 56, and 57A.

In a normal stowed and load position the saddle cart 2006 rests flush with the forward end of trunk section I, as shown best in FIG. 20. The saddle cart 2006 is perfectly aligned with the aft floating track 2018. The saddle cart 2006, with the guide rollers 2058 and 2060 give vertical and lateral support to the missile-booster combination 300 during its transfer from the ready service mechanism 500 of Area 2 to the wing and fin assembly compartment 8010 of Area 1. The forward and aft surfaces of the aft booster shoe 204 are engaged by the forward motion pawl 2007 and the reverse or aft motion pawl 2005 of the saddle cart 2006. All longitudinal transfer of force is the result of contact between the surfaces of the booster shoe 204 and the pawls 2005 and 2007.

Once the desired missile-booster combination 300 (S or W type missile 100) has been positioned in the center ready service tray 502 of the ready service mechanism 500A or 500B and raised by the ready service center hoists 508 and 509 to a point just below the loader track 2034 of the trunk sections in Area 2, the aft and forward floating tracks 2018 and 2017 are engaged by the aft and forward shoes 204 and 202 of the booster 200, respectively.

The vertical distance that the floating tracks are lifted is only about three-fourths of an inch at the forward floating track 2017 and one-half of an inch at the aft floating track 2018. The rammer 2020 forces the pawls 2005 and 2007 of the saddle cart 2006 to engage the aft booster shoe 204 by retracting. Once the aft and forward shoes 204 and 202 of the booster 200 are engaged with the skid tracks 2048 and 2050 of the loader track 2034 and an indication is given by the shoe engagement indicator 2094, the rammer 2020 extends and rams the entire missile-booster combination 300 forward approximately four (4) inches.

The missile-booster combination 300 is then raised to where the saddle cart 2006 is aligned to the skid tracks 2048 and 2050 along with the forward booster shoe 202. The missile-booster combination 300 is then ready to be transferred into Area 1 for assembly of the wings 102, and fins 104 and 208 thereto to form weapons 400, as previously mentioned.

When the aft booster shoe 204 enters the receptacle 2200 of the saddle cart 2006 and is approximately four (4) inches aft of the position of the saddle cart 2006, the reverse motion pawl 2005 is lifted and sits on the top surface of the aft booster shoe 204. As described in the rammer operation of the rammer 2020, the forward and reverse motion pawls 2007 and 2005, respectively, must be retracted until the reverse motion pawl 2005 has passed topside of the aft booster shoe 204 and dropped to engage the aft surface of the shoe 204. The ramming of the missile-booster combination 300 by the rammer 2020 then takes place.

Several sets of chain links are required to move the forward and reverse motion pawls 2007 and 2005 along with the saddle cart 2006 since both elements are attached to the loader chain 2004. For ease of understanding, the various links and joints of the saddle cart 2006 are analogous to the anatomy of the human leg.

As shown best in FIG. 11, the saddle cart 2006 is connected to a tie rod crosshead 2204 by two identical tie rods 2202. The saddle cart receptacle 2200 for receiving the aft shoe 204 of booster 200 is positioned at the open end of the saddle cart 2006. The coupling link 2106, which secures the saddle cart 2006 to the loader chain 2004, is located to the rear of the crosshead assembly 2204, as shown best in FIG. 56. The forward and reverse motion pawls 2007 and 2005, respectively, can be seen to fit between the tie rods 2200 and extend fore and aft of the whole assembly of the saddle cart 2006.

During the ramming by the rammer 2020 of the missile-booster combination 300, the tie rod crosshead 2204 holds the saddle cart 2006 rigidly to a hip link 2206 through an auxiliary leg link 2208 and an auxiliary thigh link 2210, as shown best in FIGS. 56, 57, and 57A. These links 2208 and 2210 may also collapse, but only when the weapon 400 is loaded to the guide arm 5002 of the launcher 5000.

The auxiliary leg and thigh links 2208 and 2210 are locked in place by a knee latch 2212, best illustrated in FIGS. 56 and 57A, until the saddle cart 2006 reaches the end of travel on the guide arm 5002 of the launcher 5000. The knee latch 2212 projects from the frame support a floating cam 2214. It is spring-loaded to engage a notch 2209 in the auxiliary leg link 2208.

Once the saddle cart is stopped, weapon 400 is then transferred to the guide arm 5002 of the launcher 5000. Through the pawl engagement, the loader chain 2004 must force the weapon 400 from the saddle cart 2006 to engage the aft shoe latching mechanism 5110 on the guide arm 5002.

When the cart is at a point one and one-third inches from stop, a guide bar 2216 of a floating cam 2214 of the saddle cart 2006 contacts a stopping bar 5111 on the guide arm 5002 of the launcher 5000. During the next five-sixteenth inches of travel, the knee latch 2212 disengages the auxiliary leg link 2208 from its locked position. The auxiliary leg and thigh links 2208 and 2210 buckle (or collapse) at an auxiliary knee joint 2218, as shown best in FIG. 58, and the loader chain 2004 and pawls 2005 and 2007 continue forward to complete the loading cycle.

The velocity of the loader chain 2004 and the saddle cart 2006 must be offset. Creepage control of the drive to be described, reduces this velocity of the loader chain 2004 and saddle cart to a creepage movement in the final phase of the loader chain travel. This speed must be offset. As the leg link 2207 associated with the saddle cart 2006 unlatches, a secondary roller 2220 contacts the floating cam 2214 of FIG. 57A. This forces the auxiliary leg and thigh links 2208 and 2210 to buckle. The contour of the floating cam 2214 is designed to decelerate the saddle cart 2006 to a complete stop. In this connection, reference should be made to the description of the creepage control valve 2092, illustrated and described in connection with FIG. 72.

As illustrated in FIGS. 59, 60, 61, and 62, a fixed cam 5188 is located to contact a cam roller 2222 of the auxiliary knee joint 2218. In the collapsed position of the auxiliary leg and thigh links 2208 and 2210, the cam 5188 of the guide arm 5002 and the pivot point of the auxiliary leg link 2208 are centered. The pivot end of the auxiliary thigh link 2210 is anchored and moves with the chain coupling link 2106. The loader chain 2004 can no longer move the saddle cart 2006 when the auxiliary knee joint 2218 collapses to contact the fixed cam 5188. At this point, the saddle cart 2006 is locked and cannot move regardless of the position of the loader chain 2004.

The roller 2222 of the auxiliary knee joint 2218 moves down the circular cam surfaces when the saddle cart 2006 is retracted from the guide arm 5002 of the launcher 5000. The roller 2222 moves until it reaches the cam radius. The secondary roller 2220 contacts the floating cam 2214. The contour of the floating cam 2214 accelerates the saddle cart 2006 away from the surface stop. The saddle cart 2006 is then accelerated to match the speed of the chain 2004.

In one and one-third inches, the knee latch 2212 locks the auxiliary leg and thigh links 2208 and 2210, respectively, into position and the saddle cart 2006 is coupled to the loader chain 2004. After the auxiliary leg and thigh links 2208 and 2210 are latched, the moving tie rod crosshead 2204, which supports a floating cam guide pin 2215, contacts the stationary floating cam 2214 and carries it away with the loader chain 2004.

The floating cam 2214 is held against the tie rod crosshead 2204 by a pair of floating cam tension springs 2224 during the travel of the loader chain 2004, as shown in FIGS. 56, 57A, 58, and 63, which are hooked to the outer crosshead 2204 and the floating cam guide bar 2216 also urge the guide bar 2216 against the guide arm stop 5111, shown best in FIG. 11, when loading the weapon 400 to the guide arm 5002 of the launcher 5000.

FIGS. 63 and 64 show the crosshead assembly and subassemblies in dimetric and exploded view. It can be seen that the tie rod crosshead 2204 is provided with a pair of guide rods 2226, and it is guided thereby into each end of the hip link 2206 by journals 2228 and 2229, shown best in FIG. 64. The floating cam 2214 in assembly with the guide bar 2216 is guided at one end by these two guide rods 2226 and at the other end by the guide pin 2215 slide-fitted into a journal 2230 in the center of the tie rod crosshead 2204, as shown in FIG. 64.

Referring now to FIG. 51, there is shown a cross-section of a knee joint 2232 consisting of two special chain track rollers 2234. Each roller 2234 has a hub extension 2235 designed to act as a cam roller. The chain tracks 2052 and 2054 have clearance for travel of these hub extensions 2235.

However, there is a cam surface 5190 located on the guide arm 5002, as shown in FIG. 66, which is contacted by the top and bottom of the hub extension 2235. As a result, there is a moment of travel when only the hub extensions 2235 of the special chain rollers 2234 guide the knee joint 2232.

As shown in FIGS. 65, 66, and 67, the top of the chain tracks 2052 and 2054 is cut away to provide an open section 5193 and the cam surface 5190 guides the knee joint 2232 out of the chain tracks 2052 and 2054. When the knee joint 2232 approaches a radial end 5191 of the cam surface 5190 the forward pivot point of the auxiliary leg link 2207 has moved to coincide with the imaginary curvature center of cam surface 5190, further forward motion of the loader chain 2004 cannot move the foot link or forward motion pawl 2007. In this manner a drive overtravel of three and one-quarter inches is allowed. The cam surface 5190 thus acts as a fixed index which accurately locates the weapon 400 for the latches 5118 and 5160 of the guide arm 5002 of the launcher 5000.

FIGS. 58 and 68 show the auxiliary knee joint 2218 and the knee joint 2232 of the saddle cart 2006 after the weapon 400 has been loaded on the guide arm 5002 of the launcher 5000. The joints 2218 and 2232 are in the same schematic position as shown in FIG. 67.

It has been related how a section of the chain tracks 2052 and 2054 is cut away to provide the open section 5193 which allows the knee joint 2232 to collapse. There are three sets of chain rollers 2235, 2236, and 2237 forward of the knee joint 2232 which pass through this cut-out section 5193. Connections between the foot link or forward motion pawl, ankle, and leg links 2007, 2238, and 2207, respectively, have a rigid back feature.

The longitudinal surfaces of these links 2007, 2238, and 2207 together form a horizontal plane. The leg link 2207 and foot link or pawl 2007 can fold up but not down. Two sets of rollers 2236 and 2237 remain in the chain tracks 2052 and 2054 while passing through the open section 5193. A retainer 5192 is located on the guide arm 5002 of the launcher 5000 which retains the forward foot link rollers 2235 and 2236 after they pass through the open section 5193.

As shown in FIG. 69, the ankle link 2238 has a pivot pin 2240 for the reverse or aft motion pawl 2005. This pivot pin 2240 is dropped below the chain track level. Since the reverse or aft motion pawl 2005 can pivot freely at pin 2240, a tension spring 2242 between the link 2238 and the reverse or aft motion pawl 2005 holds the forward end of the pawl 2005 down during the load cycle of the missile-booster combination 300 and weapon 400. A safety stop 2244 is provided to limit the lift of the reverse or aft motion pawl 2005. As shown in FIG. 69, the saddle cart 2006 is in the normal load position. In FIG. 70, the missile-booster combination 300 is retained by the reverse or aft motion pawl 2005 if for some reason, such as vertical mechanical shock, the pawl 2005 is raised.

The safety stop 2244 contacts a surface 2246 on the rear end extension of the saddle cart 2006. In FIG. 71, the aft booster shoe 204 is shown entering the receptacle 2200. Because of the safety stop 2244, the forward end of the reverse or aft motion pawl 2005 will not raise to clear the top of the aft booster shoe 204 when the rammer 2020 retracts the pawl. Inasmuch as the saddle cart 2006 is stationary when the rammer 2020 is retracted, the reverse motion pawl 2005 must retract the distance indicated between the arrows before the safety stop 2244 clears the rear of the surface 2246.

The ram stroke of the rammer 2020, as previously stated, is nominally four (4) inches. During successive load cycles of the missile-booster combinations 300, however, this dimension can vary. A variation of plus or minus one-half inch is provided for. The insets of FIG. 71 show the nominal position of the aft booster shoe 204 and its position at the two extremes. It is to be noted how the arrowed dimensions shown therein must match or be greater than the arrowed overlap of the safety stop 2244 and the surface 2246 before the reverse or aft motion pawl 2005 is permitted to lift.

*Track housing*

The sprocket and track housing 2036, which is bolted to the aft end of trunk section I in Area 2, houses the chain or drive sprocket 2039, the creepage control valve 2092, the Area 1 and Area 2 interlock valves 2024 and 2026, and the Area 2 positioner 2016, as illustrated best in FIGS. 19, 20, 72, 78, and 87.

As shown in FIGS. 19 and 19*a*, the track housing 2036 is essentially a pair of identical spaced plates 2035, with the chain track guide 2037 located therebetween. The chain track guide 2037, which consists of two symmetrical track sections 2040, is a continuation of the previously mentioned loader chain tracks 2052 and 2054, shown best in FIGS. 9, 10, and 17. These spaced plates 2035 match together to form the large, oval-like shape of the sprocket and chain housing 2036. The chain track guide 2037, together with the matched plates 2035, occupy a width of about seven (7) inches. This distance, less the normal thickness of the outer plates 2035 and the thickness of the chain track guide sections 2040 of the chain track guide 2037, is ample to accommodate the three and one-half (3½) inch width of the loader chain 2004.

The chain track guide 2037 is made up of the previously mentioned straight and curved lengths or sections 2040 which are securely attached to the spaced track housing plates 2035 by spaced bolts 2041. The chain track guide 2037 directs the loader chain 2004 to the chain or drive sprocket 2039 through one end and out to Areas 1 and 2 through the other end thereof. The chain drive reduction gears 2251, 2252, 2253, as shown best in FIGS. 19 and 19*b*, are housed separately. The chain stowage track 2008 is attached to the upper chain track guide 2037 of the sprocket and track housing 2036, as shown best in FIGS. 6C, 6D, and 19.

The fixed loader or positive chain stop 2108 is included in the arrangement of the sprocket and track housing 2036, as shown in FIG. 19. The purpose of this positive chain stop 2108 is to create a maximum retract position for the loader chain 2004. In normal operation, this positive chain stop 2108 may not be used. However, during manual operation of the loader power drive 2010, the saddle cart 2006 can be moved beyond its usual stopping point.

*Photocell*

An electric photocell 2061, as shown in FIG. 73, is located in the assembly area of Area 1 of both the A-side and B-side loaders 2002A and 2002B, respectively, to signal that that area is clear for continuance of either a load or unload cycle of a missile-booster combination 300 in handcrank step control only, as will be pointed out subsequently. The photocell 2061 also acts as a safety device. If the light beam is accidently interrupted, the load or unload interlock circuit is stopped. Each electric photocell includes a light source 2061 and a receiver unit 2062. The exact location of each photocell 2061 is preferably on the centerline of each missile-booster combination 300 or loader 2002A or 2002B, as shown best in FIG. 8.

*Loader power drive mechanism—Loader power drive*

The assembly for the loader power drive 2010 is mounted to a special platform 8020, shown best in FIG. 3B., located in Area 2 adjacent to the bulkhead 8015 separating Area 2 and Area 3, often referred to as the missile-booster storage compartment 8013, located as shown best in FIGS. 1 and 3B. In Area 3, or the missile-booster storage compartment 8013, the missiles 100 and boosters 200, or the missile booster combinations 300 are stored prior to being moved into the ready service compartment 8012 or Area 2, as previously mentioned in connection with the ready service mechanisms 500.

The function of the loader power drive 2010 is to move missile-booster combinations 300 on the loader trunk 2003 by means of the loader chain 2004 and the saddle cart 2006. The saddle cart 2006, the power drive 2010, and a part of the loader trunk 2003B are best shown in FIGS. 3A and 3B.

The electric motor 2038 of the loader power drive 2010 is coupled by a hydraulic transmission 2258 to the drive sprocket 2039 which moves the loader chain 2004 and the saddle cart 2006, as shown in FIG. 55. A loader control unit 2270, as shown best in FIG. 3B, mounted on the top of the loader power unit 2010, regulates the output of the electric motor 2038 through the hydraulic transmission, as will be described subsequently.

*Supply tank*

A loader drive supply tank 2254, shown best in FIGS. 3B and 78, is utilized as a reservior for the hydraulic oil or fluid used in the loader power drive 2010 and the loader control unit 2270. The supply tank 2254 is a steel box-like weldment which is suspended parallel to the loader trunk 2003 from the level above. A clamp (not shown) at the bottom of the tank 2254 is attached to one end of the cylinder for the pilot rack 2310, shown in FIGS. 78, 86, 88, and 89. The tank 2254 holds twenty (20) gallons of hydraulic fluid with expansion space for an additional two gallons.

The top of the tank 2254 is provided with a removable cover 2247, a filler pipe 2248 having a manual shut-off valve 2249 and a mesh screen to strain oil added to the supply tank, a breather 2254 and a switch SIXB4 which is a part of the filter assemblies 2256 and 2257, shown in FIGS. 3B and 78. On the left-hand side of the tank 2254, there is illustrated the supercharge filter assembly 2256. The right-hand side of the supply tank 2254 similarly mounts a servo filter assembly 2257.

*Filter assemblies*

The filter assemblies 2256 and 2257, located on opposite sides of the supply tank 2254, strain all oil or fluid used in the loader power drive 2010. The two filter assemblies 2256 and 2257, the right filter assembly 2257 for the servo hydraulic system, and the left filter assembly 2256 for the supercharge hydraulic system, are identical. Each filter assembly 2256 and 2257, as shown in FIG. 74, includes a filter housing 2448, a filter plate 2449, a manifold 2450, and two bowls 2451, each holding a micronic filter element 2452. A bypass valve UVLB14 is provided in the right servo filter assembly 2257, while a bypass valve UVLB15 is provided in the left supercharge filter assembly 2256, together with a switch-actuating mechanism operated by either bypass valve, and the filler pipe 2248 with a needle valve and a plug.

An adapter block 2453 is bolted to the top of the filter housing 2448. This adapter block holds components of the bypass valve and the switch-actuating mechanism, plus a needle valve to manually bleed off any air trapped behind the bypass valve.

The filter manifold 2450 is bolted inside the filter housing 2448. The filter manifold 2450 is provided with passages to lead hydraulic fluid to and from the filter elements 2452, and a hole for the plunger of the bypass valve UVLB14 or UVLB15.

The filter plate 2449, which is an oval steel piece with two threaded holes, is bolted to the underside of the filter housing 2448. The filter bowls 2451, which are hollow cylinders, each hold a filter element 2452 and a coiled spring 2455. These bowls 2451 are screwed in the two threaded holes. The spring 2455 in each bowl 2451 keeps the filter element 2452 up tight against its manifold 2450.

*Bypass valves*

Each bypass valve UVLB14 (or UVLB15) consists of a plunger 2456 which slides up and down in a passageway inside the housing for the manifold 2450 and the adapter block 2453, together with a spring 2457 above this plunger 2456. The top end of the plunger 2456 is provided with a deep groove (not shown). A yoke assembly 2459, fastened to a switch-actuating shaft 2458, rides in this groove (not shown). When the bypass valve UVLB14 (or UVLB15) shifts, the yoke assembly 2459 is moved, rotating the switch-actuating shaft 2458 and operating the switch SIXB4.

The bypass valve UVLB14 (or UVLB15) opens to shunt hydraulic fluid past the filter elements 2452 when they become so clogged that the pressure drop across them reaches 45 to 55 p.s.i. In addition to bypassing the hydraulic fluid, the bypass valve UVLB14 (or UVLB15) actuates the switch SIXB4 to turn on an amber light on the EP3 panel, shown best in FIG. 3, warning the operators of the guided missile launching system that the filter elements 2452 are clogged and should be changed.

The two bypass valves UVLB14 or UVLB15 on one tank 2254 for the servo and supercharge systems actuate the same switch SIXB4, each using its own actuator shaft 2458 and yoke assembly 2459. The shaft 2458 is bushed at each end, and both shafts are located inside a common tube. A dogleg actuator 2460 is bolted to the shafts 2458 and operates the switch SIXB4.

When new filter elements 2452 are installed in the filter assemblies 2256, the hydraulic fluid is added to the filter assembly through the filler pipe 2248, and the needle valve is lightly screwed down. The pump is then started, and the needle valve is then opened slightly until all the air is vented. Then the needle valve is tightened and the plug replaced. Any air trapped behind the plunger 2456 of the bypass valve UVLB14 (or UVLB15) must similarly be vented by opening the needle valve in the adapter housing 2453 until fluid alone, that is, no air comes out. Then the needle valve is tightened and the plug replaced.

*Loader drive electric motor*

Each loader 2002A or 2002B in the guided missile feeder 2000 is provided with the sixty (60) horse power electric motor 2038, as shown in FIGS. 3B, and 75 through 78. The motor 2038, through the hydraulic transmission 2258, furnishes the power to drive the loader chain 2004. The electric motor 2038 is horizontally mounted on the platform 820, together with the hydraulic transmission 2258, as shown in FIG. 3B. The motor 2038 is on the left as viewed looking towards the launcher 5000, while the hydraulic transmission 2258 is on the right and positioned between the motor 2038 and the sprocket and track housing 2036. The motor 2038 is coupled to the chain or drive sprocket 2039 by the hydraulic transmission 2258, with the chain or drive sprocket 2039 being mounted to trunk section I, as previously described.

As best illustrated in FIGS. 5A, 75, 76, 77, and 78, the electric motor 2038 is connected to a geared speed reducer 2260, which, in turn, is coupled to the A-end shaft 2262 of the hydraulic transmission 2258. The B-end drive shaft 2264, which comes out of the hydraulic transmission 2258, is coupled to the sprocket and track housing 2036 in order to drive the chain or drive sprocket 2039, shown best in FIG. 19. The housing for the geared speed reducer 2260, as illustrated best in FIG. 76, serves as the end bell and bearing support at one end of the electric motor 2038.

The opposite end of the electric motor 2038, as shown in FIG. 75, is provided with a guarded external cooling fan 2266, and it is coupled to gear pumps 2267 and 2268 which provide hydraulic servo and supercharge pressures for operation of the respective components of the system.

The electric motor 2038 is a constant speed induction type, and it runs continuously during operation of the guided missile launching system. Although the electric motor 2038 runs constantly, its output through the hydraulic transmission 2258 is regulated by the loader control unit 2270, which controls the hydraulic fluid from the servo and supercharge pumps 2267 and 2268.

*Servo and supercharge pumps*

The servo gear pump 2267 is provided to supply hydraulic fluid for the servo valve 2278, the tilt plate stroking pistons and the gearbox components, all of which will be described presently. The servo pressure from the servo gear pump 2267 is also used to release the power-off brake 2014 and the stop 2317 for the Area 1 pilot rack 2310, as shown best in detail in FIG. 78. The supercharge gear pump 2268 supplies hydraulic fluid to the hydraulic transmission 2258 and a main relief valve valve 2272. These two pumps 2267 and 2268, as shown best in FIG. 75, are mounted in a single housing and are connected to the drive shaft of the electric motor 2038 by a flexible coupling.

The supercharge gear pump 2268, which is nearest the electric motor 2038, develops one hundred (100) p.s.i.; while the servo gear pump 2267 develops four hundred (400) p.s.i. The pressure difference is obtained from different settings of relief valves 2386 and 2387, shown best in FIG. 78.

*Geared speed reducer*

The geared speed reducer 2260, as illustrated best in FIGS. 76 and 78, reduces the output speed of the electric motor 2038, and additionally boosts the torque needed to drive the hydraulic transmission 2258.

The electric motor 2238 is provided with a twenty-four (24) tooth helical drive pinion 2259 which turns a fifty-three (53) tooth driven gear 2261. The driven gear 2261, in turn, turns a splined shaft 2263, which is coupled to the A-end shaft 2262 of the hydraulic transmission 2258. The A-end shaft 2262 of the hydraulic transmission 2258 is turned at a 2.21-to-1 speed reduction.

*Loader hydraulic transmission*

The loader hydraulic transmission 2258, with its electric drive motor 2038 provides a means of converting the nearly constant, unidirectional output of the electric drive motor 2038 into a bidirectional output which can be instantly varied to allow the loader 2002 to comply with its input orders.

The hydraulic transmission 2258, shown best in detail in FIG. 77, consists of two major parts, an A-end 2263 and a B-end 2065 which are mounted to a common valve block 2269. The hydraulic transmission 2258 is also commonly referred to as a CAB unit, that is, combination A-end and B-end.

*Main relief valve*

The main relief valve 2272, shown in FIG. 77, on the loader hydraulic transmission 2258 serves to limit the maximum pressure which can build up in the valve ports between the A-end 2263 and the B-end 2265 of the hydraulic transmission 2258. In addition, this main relief valve 2272 ports supercharge oil or fluid to the hydraulic transmission 2258 which replenishes any slippage in the oil loop between the A-end 2263 and B-end 2265 thereof. The main relief valve 2272 also serves as an ordinary bypass valve for the oil loop in the hydraulic transmission 2258 during start conditions of the electric drive motor 2038 or whenever the power-off brake 2014 is set.

*Tilt plate neutral switch*

An A-end tilt plate neutral switch SILB15, as shown best in FIG. 78, opens contacts in the start circuit of the electric drive motor 2038 whenever an A-end tilt plate 2274 in the A-end 2263 of the hydraulic transmission 2258 is off neutral. This prevents the electric drive motor 2038 from starting whenever the hydraulic transmission 2258 is on stroke.

The A-end tilt plate neutral switch SILB15 is mounted, as shown in FIG. 78, over the hydraulic transmission 2258 and it is actuated by its plunger engaging in an indentation 2273 in a response cam 2275 which is attached to an A-end response shaft 2276 leading from the A-end tilt plate 2274.

*A-end response gearing*

The previously mentioned A-end response shaft 2276 and the response cam 2275, as shown in FIGS. 78 and 81, transmit the motion of the A-end tilt plate 2274 to the loader control unit 2270 through a differential lever 2277. One end of the A-end response shaft 2276 is bolted to the A-end tilt plate 2274 and the other end thereof is splined to the A-end response cam 2275.

The A-end response cam 2275, as illustrated in FIGS. 78 and 81, transmits the motion of the A-end tilt plate 2274 to the neutralize servo valve 2278 in a control valve block 2280. A detent 2279 in the response cam 2275 actuates the A-end tilt plate neutral switch SILB15 whenever the A-end tilt plate 2274 is off of neutral.

*B-end response gearing*

The B-end response gearing assembly 2282, shown in FIGS. 78 and 80, is mounted on the A-end 2265 of the hydraulic transmission 2258 and it is coupled to a bevel gear 2283 of a gearbox 2284. The bevel gear 2283 rotates the response element of a differential 2286 within a control barrel cam 2290. The B-end response gearing assembly 2282 is driven by a spur gear 2288, shown best in FIG. 80, mounted on the B-end drive shaft 2264 within the housing of the hydraulic transmission 2258.

*Sprocket gear reducer*

As FIG. 19 schematically shows, each loader chain or drive sprocket 2039 is driven by a train of three gears 2251, 2252, and 2253, as previously mentioned. The chain or drive sprocket 2039 and the gears 2251, 2252, and 2253, as an assembly, are referred to as a sprocket gear reducer 2255. The sprocket gear reducer 2255 is coupled to the B-end output shaft 2264 of the hydraulic transmission 2258. The chain or drive sprocket 2039 drives the previously mentioned loader chain 2004 which is attached to the saddle cart 2006.

The sprocket gear reducer 2255 is mounted in the lower left side of the sprocket and track housing 2036 which is attached to trunk section I, and it appears circular in shape, as shown in FIG. 3B.

The sprocket gear reducer 2255 reduces the speed of the output of the B-end of the hydraulic transmission 2258, and increases the torque of the chain or drive sprocket 2039. The chain or drive sprocket 2039 translates the rotary motion of the gears 2251, 2252, and 2253, of the sprocket gear reducer 2255, into straight-line chain motion. Since the chain or drive sprocket 2039 is relatively large in diameter, sufficient space is provided therein to build the sprocket gear reducer 2255 into the assembly as an integral part.

*Loader power-off brake*

Each sprocket and track housing 2036 mounts a power-off brake 2014, shown best in FIGS. 3B, 5, 5A, 82, 83, 84, and 85. The power-off brake 2014 provides a means of stopping and securing the moving elements of the loader 2002 in the event of an electrical or hydraulic power failure. The power-off brake 2014 is engaged whenever the hydraulic transmission 2258 of the loader power drive 2010 is not in operation or when the equipment of the loader 2002 is stowed. Stowing of the equipment of the loader 2002 is not necessarily a function of the power-off brake 2014 since the equipment usually is stowed with the Area 2 positioner 2016 engaged.

Figure 5:
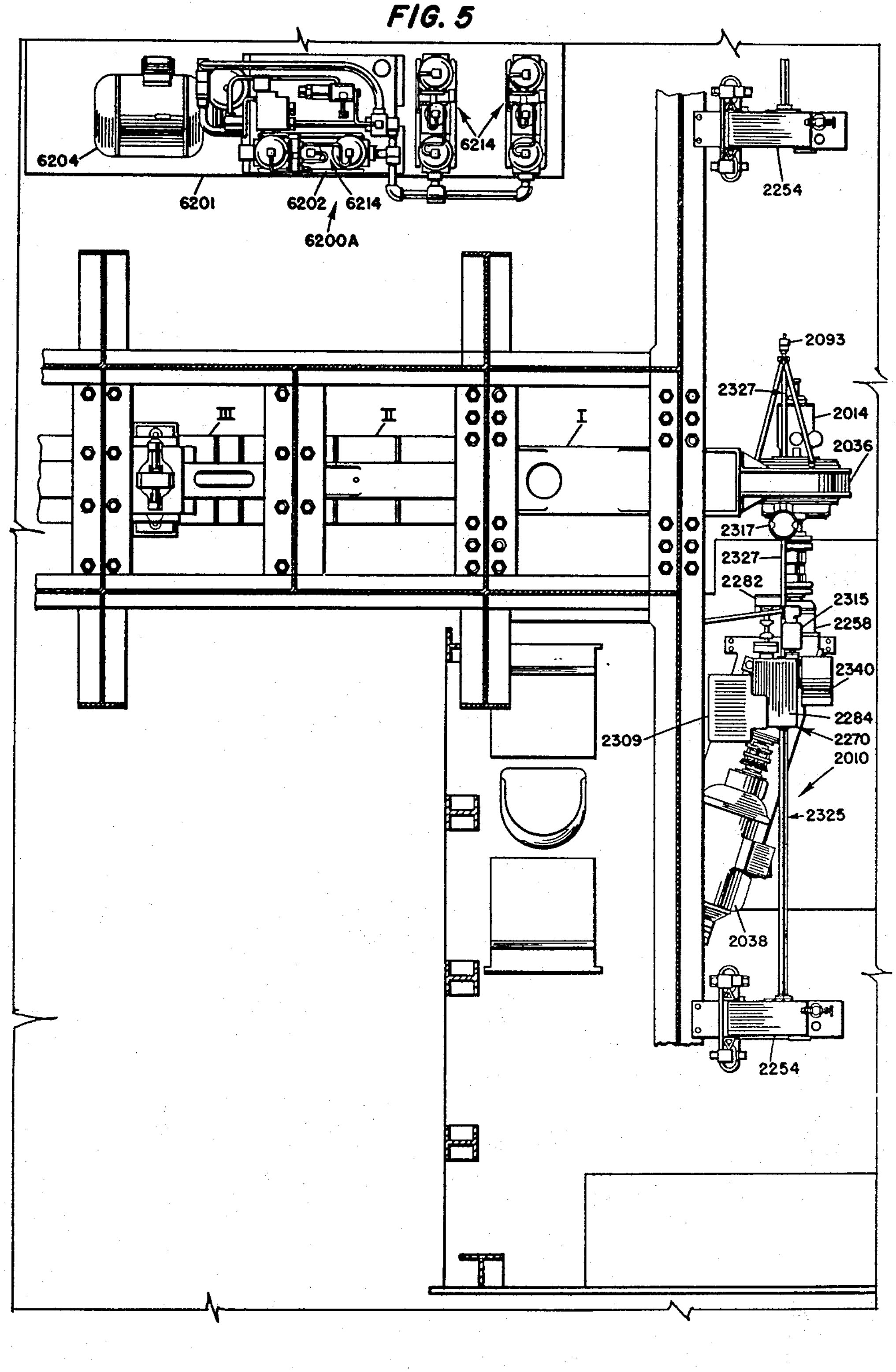
FIG. 5 is a top plan view, with parts removed, of a portion of the A-side loader, loader trunk, and loader power drive arrangement therefor comprising this invention.

The power-off brake 2014 is horizontally mounted to the right-hand side of the sprocket and track housing 2036 when viewed from the rear of the system, as best shown in FIGS. 3B, 5, and 5B. The power-off brake 2014 terminates one end of the loader power drive 2010; while the electric drive motor 2038 terminates the other end, as shown in the same FIGS. 3B, 5, and 5B.

The power-off brake 2014 contains a worm 2293 and a worm gear 2294. The worm 2293 is provided with a shaft extension 2295, as shown in FIG. 84. This shaft extension 2295 provides a means for engaging a handcrank (not shown). The handcrank is used to manually move the loader chain 2004 and saddle cart 2006 on the loader trunk 2003 in emergency power-off conditions, service and/or adjustment procedures.

The power-off brake 2014 offers a convenient means for providing a manual engagement of the handcrank. In manual drive operation, the power-off brake 2014 actually can be considered as a clutch since it is always engaged when the power is off. Once the power-off brake 2014 is disengaged, as in power operation, rotation of the manual handcrank does not have any effect on the system.

The power-off brake 2014 is a double multiple disc type. The double multiple disc construction of the power-off brake 2014 increases the brake capacity without enlarging the diameter thereof. A pair of identical brake halves 2292 are mounted back-to-back to a common brakeshaft 2296. They also share the common worm 2293, the worm gear 2294, and a valve block 2297, as shown best in FIGS. 82, 83, 84, and 85.

The components of the brake halves 2292 are symmetrically mounted from a pair of backup rings 2298 located at the center of the brake halves 2292 in the worm gear 2294 which is centrally bored to form the disc housing. The brakeshaft 2296 constitutes the inner core of the power-off brake 2014. All the component parts of the power-off brake 2014 are built around it, as best shown in FIG. 82. The brake shaft 2296 is bearing-mounted at each end.

The external diameter of the worm gear 2294 is bearing-mounted within its housing. Its inner diameter, which forms the disc housing, has a split ring 2299 and the two backup rings 2298 at its center; while the remainder of the inside of the worm gear 2294 is splined.

Two pressure plates 2300 and an actuator ring 2301, as shown best in FIGS. 82, 83, and 85, are symmetrically mounted to each end of the worm gear 2294. The worm gear 2294, the pressure plates 2300 and the actuator rings 2301 can be rotated, in either direction, only by the manual handcrank through the worm 2293. The worm 2293 can rotate the worm gear 2294, but the worm gear 2294 cannot rotate the self-locking worm 2293.

Two sets of discs 2287, separated by the backup rings 2298, are mounted between the pressure plates 2301. Each set of discs 2287 is composed of alternate small discs 2302 and large discs 2303, as shown in FIGS. 82 and 83. The smaller discs 2302 have a serrated center hole which fits onto a splined portion 2304 of the brakeshaft 2296. These discs 2302 rotate when the B-end shaft 2264 of the hydraulic transmission 2258, shown in FIGS. 78 and 80, which is coupled to the brakeshaft 2296, rotates.

The larger discs 2303 are formed with a larger center hole, and their outer edge is serrated and fitted into the splines forming the inner wall of the worm gear 2294. In normal operation, these larger discs 2303 do not rotate. These larger discs 2303 rotate only when the worm gear 2294 is rotated by the worm 2293 with the manual handcrank, as previously discussed.

When the brakeshaft 2296 is rotating, the smaller discs 2302 are free to rotate with it. When the power-off brake 2014 is set, each actuator ring 2301 forces the flat circular surface of its pressure plate 2300 toward the center of the power-off brake 2014, pressing the interleaved smaller and larger discs 2302 and 2303 together. When these interleaved discs 2302 and 2303 are pressed tightly together, friction between the discs will stop rotation of the brakeshaft 2296 and the hydraulic transmission 2258 which drives the brakeshaft 2296.

The components of the power-off brake 2014 are mounted symmetrically about a point between the two sets of discs 2287. Each assembly of pressure plate 2300 and actuator ring 2301, as shown in FIGS. 82 and 83, is controlled by a piston 2305 connected to its own actuator ring 2301 by a linkage 2306. Both pistons 2305 are mounted in the common valve block 2297 with a common hydraulic port 2307 entering between them. This common hydraulic port 2307 controls both brake halves 2292 simultaneously.

The brakeshaft 2296 is coupled to an input shaft 2308 of the sprocket and track housing 2036. Since the chain or drive sprocket 2039 is centrally open for planetary drive, shaft 2308 passes therethrough and is coupled to the B-end output shaft 2264 of the hydraulic transmission 2258, as shown best in FIGS. 83 and 87.

*Loader control unit*

The previously mentioned loader control unit 2270 consists of the electric-hydraulic components of the assembly of the loader power drive 2010 which regulate the output thereof. The loader control unit 2270 also contains electrical cabling and wiring and hydraulic piping. It is interlocked electrically to synchronize with the hydraulic components on the loader trunk 2003.

The gearbox 2284, shown generally in FIG. 78, and the pilot rack 2310, shown generally in FIG. 78 and in detail in FIGS. 86, 88, 89, and 89A, may be considered the control center of the assembly for the loader power drive 2010 with the other control components built in or around them. The gearbox 2284 and the pilot rack 2310, with the aid of the other control components, automatically regulate the angle of the A-end tilt plate 2274 to determine the direction, acceleration, constant velocity, travel distance and deceleration of the saddle cart 2006 and its load of a missile-booster combination 300 or weapon 400, as the case may be.

The control components of the loader power drive 2010, as shown best in FIG. 78, include the gearbox 2284, the pilot rack 2310, the control valve block 2280, a solenoid housing 2309, switch cams 2311, 2312, and 2313, a local control clutch assembly 2315, and Area 1 pilot rack stop 2317, and the previously mentioned creepage control piston 2093.

*Pilot rack*

The pilot rack components, as shown in FIGS. 88, 89, and 89A, are located in or on the gearbox 2284. The pilot rack 2310 meshes with a spur gear 2319 attached to a hollow differential shaft 2321 to feed an input signal into the control differential 2286. The pilot rack 2310 is moved by hydraulic fluid directed to its pilot rack piston 2323 from the control valve block 2280.

The pilot rack components, as shown best in FIGS. 5, 5A, 72, 78, 86, 89, and 89A, include the pilot rack 2310, a left and right pilot rack cylinder 2325 and 2327, respectively, a roller and anchor assembly 2328 and a pilot rack valve block 2330. The pilot rack 2310, which is often referred to as the piston rod, is formed with gear teeth. It is over seven feet in length. The pilot rack 2310 is provided with the pilot rack piston 2323 on one end, and a perforated guide 2332 on the other end.

The pilot rack piston 2323 of the pilot rack 2310 travels a distance of 73.137 inches in the process of loading a missile-booster combination 300 from Area 2 to the launcher 5000, a distance of approximately 87 feet. The travel distance of the pilot rack 2310, therefore, is proportional to the travel distance of the loader chain 2004.

The pilot rack 2310 travel back and forth through the control unit 2270 inside the left and right pilot rack cylinders 2325 and 2327, respectively, and extend out the left and right sides of the control unit 2270, as indicated best in FIGS. 5, 89, and 89A.

The left pilot rack cylinder 2325 is larger in diameter than the right pilot rack cylinder 2327, as shown best in FIGS. 5 and 72. The pilot rack cylinder 2325 is, in reality, a double cylinder. It includes an outer cylinder 2324, and an inner cylinder 2326, thus forming two passages for the flow of hydraulic fluid to the left pilot rack piston 2323, as shown in FIGS. 72 and 89. One end of the pilot track cylinder 2325 is mounted in the pilot rack valve block 2330 in the gearbox 2284, while the other end is supported by the supply tank 2254, as shown in FIG. 5. The pilot rack piston 2323, as shown best in FIGS. 5 and 72, travels within the inner cylinder 2326 from the supply tank 2254 to the pilot rack valve block 2330 in the gearbox 2284 and back.

The right pilot rack cylinder 2327 has one end thereof mounted into the right-hand side of the control unit 2270, as shown in FIGS. 5 and 72, and from there it extends through the Area 1 pilot track stop 2317 and the sprocket and track housing 2036 with the creepage piston 2093 mounted on its terminating end. The right pilot rack cylinder 2327 is of single construction, and may be called a guide cylinder because the perforated guide 2332 on the pilot rack 2310 travels in it, as shown best in FIG. 88. This right pilot rack cylinder 2327 is opened in the Area 1 pilot rack stop 2317 to allow a stop lever 2334, as shown in FIG. 78, to extend and stop the perforated guide 2332 and the pilot rack 2310 for the Area 1 position of the saddle cart 2006.

The previously mentioned pilot rack valve block 2330 is mounted in the gearbox 2284, as shown in FIGS. 86, 89, and 89A. Its function is to connect hydraulic lines 2336 from the control valve block 2280, not shown in FIGS. 86, 89, and 89A, but shown in FIG. 78, to hydraulic passages in the outer and inner cylinders 2324 and 2326, respectively, of the left pilot rack cylinder 2325 of the pilot rack piston 2323.

The pilot rack valve block 2330, in addition to the hydraulic fluid portage, provides mounting for one end of the left pilot rack cylinder 2325, and passage of the pilot rack 2310 through it. A bushing 2331, shown best in FIG. 86, and which is located between the pilot rack 2310 and the pilot rack valve block 2330 prevents leakage of hydraulic fluid except that which is carried through by the teeth of the pilot rack 2310.

The previously mentioned roller and anchor assembly 2328, which is mounted in the gearbox 2284, as illustrated in FIG. 88, is provided to insure a positive mesh between the teeth on the pilot rack 2310 and the spur gear 2319 on the hollow differential shaft 2321, as shown best in FIGS. 78 and 89A. The Area 1 pilot rack stop 2317 and the creepage piston 2093, which are located on the right pilot rack cylinder 2327 of the pilot rack 2310, as shown best in FIG. 78, will be described subsequently.

*Gearbox*

The gearbox 2284, as shown best in FIGS. 5, 78, 88, 89, 89A, and 90, is mounted on top of the hydraulic transmission 2258 of the loader power unit. It supports the left and right pilot rack cylinders 2325 and 2327, respectively, the control valve block 2280, the solenoid housing 2309, the local control clutch 2315, a switch cam assembly 2340 and one end of the B-end response gear assembly 2282, all shown in FIG. 5, except control valve block 2280, which is located directly beneath solenoid housing 2309. During operation, the gearbox 2284 is filled with hydraulic fluid to lubricate the pilot rack 2310 and the differential 2286.

In addition to the components of the pilot rack 2310, the gearbox 2284 houses the control barrel cam 2290, and the differential 2286 therewithin, the differential lever 2277, a differential lever link 2338 therefor, a cam-on-neutral lever 2342, the A-end response cam 2275, switch plungers 2344, 2345, 2346, and 2347, and a tilt plate-on-neutral lever 2348, as illustrated best in FIG. 90.

Gearbox 2284, as shown best in FIGS. 88, 89, 89A, and 90, is rectangular in shape and it is bolted to the top of the hydraulic transmission 2258. The top of the gearbox 2284 is formed by a cover which is bolted in place. It is provided with a vent plug to exhaust air when the gearbox 2284 is filled with hydraulic medium. Drainage of the gearbox 2284 is provided by opening a plug on the tilt plate upper housing atop the A-end 2263. The left side of the front wall of the gearbox 2284 is cut out, as illustrated in FIG. 90, to provide connections between the components in the gearbox 2284 and the control valve block 2280, shown in FIGS. 78, 90, 91, and 92.

*Differential assembly*

The assembly for the differential 2286, as shown in FIGS. 78, 89, 89A, 90, and 92, is located in the gearbox 2284. It determines the load error and positions the servo valve 2278, of FIGS. 78, 81, 90, and 92, in such a manner as to reduce that error. The differential 2286 is acted upon by the pilot rack 2310, or local control handcrank 2354, and the response feedback of the B-end 2265, all shown in FIG. 78.

As illustrated in FIGS. 72, 72A, 78, 89A, 90, and 93, the differential 2286 consists of a spider 2351, an input gear or element 2352, and a response gear or element 2350, all of which are mounted on an inner differential shaft 2322. The differential 2286 is of conventional design. In this particular arrangement, the spider 2351 is attached to the control barrel cam 2290 which, in turn, is fitted over the differential 2286. This control barrel cam 2290 is the output.

The response element 2350 is splined to one end of the differential shaft 2322, while the other end of the differential shaft 2322 is connected to switch cam assembly 2340, as illustrated in FIGS. 72 and 97. The switch cam assembly 2340 gives an indication as to the location of the saddle cart 2006.

Two gears 2319 and 2320 are splined to the input gear of the differential 2286, as illustrated best in FIGS. 72, 78, 89A, and 97. The smaller spur gear 2319 is rotated by the pilot rack 2310 in automatic operation, while the larger bevel gear 2320 is rotated by the local control handcrank 2354 through the clutch 2315, as illustrated best in FIGS. 78, 89, 89A, 97, and 104.

All gears in the differential 2286 are bearing mounted. With the exception of a pair of spider gears 2353, all parts are mounted on the shaft 2322 which forms the core of the differential 2286, as shown best in FIGS. 72 and 93. The large bevel gear 2283, shown best in FIGS. 78 and 89A, is splined to the differential shaft 2322. All of the other parts of the differential 2286 are free to rotate about this shaft 2322. The outer bevel gears 2352 and 2350, corresponding to the input element and response element, which mesh with the spider gears 2353, are secured to the signal input and response input corresponding to outer hollow differential shaft 2321 and the large bevel gear 2283, respectively.

In this differential 2286, the spider 2351 is attached to the barrel control cam 2290, which, in turn, is fitted over the differential 2286. The barrel control cam 2290 thereby indicates the continuous output as calculated by the differential 2286. When the spider gears 2353 turn, the spider 2351 rotates the barrel control cam 2290. The direction of rotation of the barrel control cam 2290 is dependent upon the input source into the differential 2286, that is, which way the pilot rack 2310 rotates the input element 2352 of the differential 2286.

The response, which subtracts the output of the transmission from the input signal, rotates the response element 2350 of the differential 2286 in the opposite direction. The input signal, through the pilot rack 2310, leads the response input by the amount of errors. In addition, since time is required to stop the loader 2002, the input signal for the pilot rack 2310 leads the position of the loader 2002 by the proportional distance it takes to stop the loader 2002.

The input gear or element 2352 and the spider 2351 rotate on the inner differential shaft 2322. The response gears 2283 and 2350 are splined to the inner differential shaft 2322. The response, through the inner differential shaft 2322, rotates the switch cams 2311, 2312, and 2313, shown best in FIGS. 78 and 97.

*Control barrel cam*

The control barrel cam 2290, as illustrated best in FIGS. 72, 78, 89A, 92, and 93, is cylindrical in shape and is often referred to as a barrel cam. The control barrel cam 2290 is fitted over the differential 2286, and it is attached to the spider 2351, as shown best in FIGS. 89A and 93. The periphery of the control barrel cam 2290 is provided with a helical groove 2289, which is designed for parabolic characteristics on each side of the neutral position.

The helical groove 2289 in the control barrel cam 2290 is fitted with a cam follower 2291, as illustrated best in FIG. 90, which is attached to one end of the differential lever 2277. The output movement of the control barrel cam 2290 is transmitted to the servo valve 2278 in the control valve block 2280 through the differential lever 2277 and the differential lever link 2338, as shown in FIGS. 72, 90, and 92.

The previously mentioned helical groove 2289 in the control barrel cam 2290 spirals 503 degrees around its periphery, that is 205 degrees in the load direction from neutral and 298 degrees in the opposite direction from neutral for a retract movement. The longer cam profile in the helical groove 2289 in the control barrel cam 2290 on the retract cycle gives the loader 2002, including its loader chain 2004 and saddle cart 2006, without a missile-booster combination 300 or weapon 400, a higher velocity.

*Cam stop*

A mechanical cam stop 2356, as shown best in FIG. 72A, halts the control barrel cam 2290 when rotated to either extreme position to protect the cam follower 2291, of FIG. 90. The cam stop 2356 is made of two parts, that is, a floating cam stop ring 2357 fitted in the end of the control barrel cam 2290, the signal input side, and a cam stop pin 2358 inserted through the wall of the gearbox 2284, as shown best in FIGS. 72 and 90.

Control barrel cam 2290 is provided with a 180 degree cutout 2360 into which a cog 2359 on the cam stop ring 2357 fits. A suitable spacer and collar hold the cam stop ring 2357 in place but allow it to freely rotate. The control barrel cam 2290 rotates until it engages the cog 2359 on the cam stop ring 2357, then the control barrel cam 2290 and the cam stop ring 2357 rotate together until the mechanical cam stop 2356 contacts the cam stop pin 2358. This cumulative arrangement is required because of the more than 360° rotation of the control barrel cam 2290 and operates in both directions of rotation.

*Local control clutch*

Local control clutch assembly 2315, which was mentioned earlier and which is shown best in FIGS. 78, 89A, and 104, is bolted to the right-hand side of the gearbox 2284. It is that part of the local control assembly which makes physical contact with the differential 2286. The main components of the local control clutch assembly 2315, as illustrated best in FIGS. 78 and 89A, include a housing 2362 bolted to the right side of the gearbox 2284, a solenoid LCLB6, switches SILB10, SILB11, and SILB106, a friction clutch 2364, a dual clutch operating lever 2365, a switch-actuator disc 2366, and a switch-actuator lever 2367 of inverted T-shape.

The friction clutch 2364 includes two shafts, that is, a driving cup shaft 2368 and a driven shaft 2369, as shown best in FIGS. 78 and 89A. The driving cup shaft 2368 is provided with an integral driving cup 2370, as shown in FIG. 89A, and it is connected to the output of the handcrank 2354. This driving cup shaft 2368 mounts the switch actuator disc 2366, and a plurality of large friction discs within the driving cup 2370.

The driven shaft 2369, on the other hand, is splined to a bevel gear 2371 in the gearbox 2284, and its other end fits into the driving cup 2370. The driven shaft 2369 is provided with alternate small friction discs. The driven shaft 2369 also is provided with a roller block 2374, and it is coupled or connected to the local control handcrank 2354, as shown best in FIGS. 78, 89A and 104.

The shaft of the friction clutch 2364 contains the idler type assembly or roller block 2374, and the small friction discs which are splined on one end. The driving cup shaft 2368, on the other hand, is provided with the alternate larger friction discs serrated in three places at the outer diameter to fit into the driving cup 2370.

The engagement of the friction clutch 2364 is made electrically by energizing the solenoid LCLB6. The plunger 2376 of the solenoid LCLB6 is attached by a coiled spring 2377 to the top end of the dual clutch operating lever 2365, as shown in FIG. 89A. A coiled return spring 2378 is also attached here. The clutch operating dual lever 2365 pivots at the bottom of the housing 2362. The dual clutch operating lever 2365 is provided with a plurality of pins 2379 which fit into the annular grooved roller block 2374. When the solenoid LCLB6 is energized, it pulls the top of the dual clutch operating lever 2365, by means of the spring 2377, and the roller block 2374 pushes the friction discs of the friction clutch 2364 together to form a positive drive. When the solenoid LCLB6 is energized, the plunger 2376 of the solenoid LCLB6 operates the switch SILB106. The return spring 2378 returns the plunger 2376 of the solenoid LCLB6 and its disengages the friction clutch 2364 when the solenoid LCLB6 is de-energized.

Driving cup 2370 is also provided with a switch-actuator disc 2366 in the form of a bronze ring with a small cutout on the bottom which fits into the inverted T-shaped switch-actuator lever 2367. The switch actuator lever 2367 is pin pivoted below and parallel to the driving cup shaft 2368.

Switch actuator disc 2366 is provided with two O-rings 2375 which are eccentrically mounted with respect to the centerline of the driving cup shaft 2368. When the driving cup shaft 2368 is rotated, the O-rings 2375 create a drag, with the switch actuator disc 2366 turning a few degrees until it actuates either switch SILB10 or SILB11 through the switch actuator lever 2367. The switch actuator lever 2367 comes to a positive stop thereafter, and the O-rings 2375 then slip, allowing the driving cup shaft 2368 to continue turning while the switch actuator disc 2366 remains stationary.

The switch actuator disc 2366, switch actuator lever 2367, and switches SILB10 and SILB11 are provided for local handcranking of the loader 2002. Switch SILB10 is actuated when the local handcrank 2354 is turned to move the saddle cart 2006 toward the launcher 5000, while switch SILB11 is actuated when the local handcrank 2354 is turned to return the saddle cart 2006 to Area 2 or toward the ready service mechanism 500. The free end of the driving cup shaft 2368 is connected to the local control handcrank 2354 through a series of shafts and universal joints.

*Control cam-on-neutral lever*

The previously mentioned control cam-on-neutral lever 2342, as shown best in FIGS. 89 and 90, is located in the gearbox 2284. Its function is to indicate through a double switch SILB14 when the barrel control cam 2290 is on neutral.

The control cam-on-neutral lever 2342 is pivoted on the forward wall of the gearbox 2284. This control cam-on-neutral lever 2342 is provided with an integral follower 2343 on one end which rides on the bottom of the control barrel cam 2290 to engage an indentation in the cam. The other end of the control cam-on-neutral lever 2342 is arranged to contact the vertical switch plunger 2346.

An indentation in the control barrel cam 2290 actuates switch SILB14 in the solenoid housing 2309 whenever the control cam-on-neutral lever 2342 is on neutral. The switch SILB14 turns on an amber light on the EP3 panel, shown in FIG. 3, and on the loader local control panel EP7, shown in FIG. 7B.

*A-end response cam*

The A-end response cam 2275, shown best in FIGS. 81 and 90, is located in the bottom of the gearbox 2284. The function of the A-end response cam 2275 is to transmit movement of the A-end response shaft 2276 to the servo valve 2278 in the control valve block 2280, shown in FIGS. 78, 90, and 92. The A-end response cam 2275 is an irregular-shaped cam. It is splined to the top of the A-end response shaft 2276, which extends up from the A-end tilt plate 2274. The A-end response cam is also pinned to one end of differential lever 2277.

The A-end response cam 2275 moves with the A-end tilt plate 2274 to neutralize the servo valve 2278 when the A-end tilt plate 2274 is moved. The free side of the A-end response cam 2275 is provided with the indentation 2273, as shown in FIG. 90, to accommodate cam following A-end tilt plate-on-neutral lever 2348.

*A-end tilt plate-on-neutral lever*

The A-end tilt plate-on-neutral lever 2348, as shown in FIG. 90, is located in the forward left-hand corner of the gearbox 2284 and pivoted thereto. Its function is to indicate through an electrical interlock switch SILB15 whenever the A-end tilt plate 2274 is on neutral.

The A-end tilt plate-on-neutral lever 2348 is shown in the cut-away view of the gearbox 2284 in FIG. 90. This lever 2348 consists of a short rectangular bar whose cam-following free end rides on the top of the A-end response cam 2275. The top of the lever 2348 at its free end is in contact with the switch actuator 2345 for switch SILB15 and is cut out to provide clearance for switch plunger 2344 of the adjacent switch SILB17.

Whenever the A-end tilt plate 2274 is on neutral, the indentation 2273 in the A-end response cam 2275 is engaged. When the A-end tilt plate 2274 is moved off neutral (in either direction) the tilt plate-on-neutral lever 2348 is moved out of the indentation 2273 up in the A-end response cam 2275 onto the cam surface. This upward movement of the tilt plate-on-neutral lever 2348 actuates the switch SILB15 through the switch plunger 2345.

*Differential lever and link*

The differential lever 2277 and the differential lever link 2338 are located in the gearbox 2284, as shown best in FIGS. 72, 78, 81, 90, and 92, and they function to transmit movement of the A-end response cam 2275 and the A-end tilt plate 2274 to the servo valve 2278 in the adjacent control valve block 2280, shown best in FIGS. 78, 90, and 91.

One end of the differential lever 2277 is pinned to the A-end response cam 2275. The integral cam follower 2291 on the other end of the differential lever 2277 rides in the helical groove 2289 on the control barrel cam 2290. A slotted guide 2380 in the gearbox 2284 supports the differential lever 2277 at the control barrel cam 2290, as shown best in FIG. 90. The center of the differential lever 2290 is connected to the servo valve 2278, at right angles, by the differential lever link 2338.

Movement of either or both the control barrel cam 2290 and the A-end response cam 2275 is transmitted to the servo valve 2278.

*Control valve block*

The control valve block 2280, shown best generally in FIG. 90, and in detail in FIGS. 78 and 91, is bolted to the forward wall of the gearbox 2284, as indicated in FIG. 90. It provides the hydraulic control for the loader power drive assembly to regulate servo and supercharge pressures of the hydraulic fluid; to set and release the loader power-off brake 2014, shown best in FIGS. 82, 83, and 87; and retract the Area 1 pilot rack stop 2317 with the power off and govern the setting of the transmission main relief valve, shown in FIG. 106A.

The control valve block 2280 is schematically shown in FIG. 91, together with the valves and pistons it contains. It contains the previously mentioned servo valve 2278, valves 2382, 2383, 2384, 2385, 2386, and 2387, and pistons 2388 and 2389, shown in FIGS. 78, 94, 95, 96, 98, 99, 100, and 101.

*Servo valve*

Servo valve 2278, shown in FIGS. 78, 91, 92, and 100, is a four-way valve, which is mechanically shifted, to provide control of the servo pressure fluid to a pair of stroking pistons 2396 and 2397, shown in FIGS. 78 and 92, to regulate the angle on the A-end tilt plate 2274.

The servo valve 2278, consists of a sleeve 2390 fastened in the valve block 2280 and a three-land plunger 2391 which can be moved back and forth inside the sleeve 2390. One end of the three-land plunger 2391 is linked to the differential lever 2277 in the gearbox 2284. It is the mechanical action of the differential lever 2277 which shifts this servo valve 2278. The other end of the servo valve 2278 is connected to an anchor pin 2392 through a tension coiled spring 2393 which has its other end pinned in the valve plunger 2391.

This tension coiled spring 2393 exerts a constant pull on the three-land plunger 2391 to prevent any free movement between the plunger 2391 and the differential lever link 2338 or the differential lever 2277. The spring 2393 also provides more accurate control at the neutral position of the servo valve 2278 and it helps prevent chatter thereof.

Servo valve 2278 is the largest valve in the control valve block 2280. As shown best in FIGS. 78 and 92, the servo valve 2278 establishes various hydraulic connections in the control valve block 2280. Shifting valve 2278, through the differential lever 2277 and differential lever link 2338, ports servo pressure fluid to one of the two stroking pistons 2396 or 2397 in the A-end 2263 of the transmission 2258. The direction in which servo valve 2278 is shifted determines which stroking piston 2396 or 2397 receives the servo pressure fluid to move the A-end tilt plate 2274 and this determines the rotation of the B-end shaft 2264. The other stroking piston 2396 or 2397 receives a fluid having variable hydraulic pressure which is between servo and tank pressure.

*Loader selector valves, pilot piston shutoff valve, and power-off valve*

The previously mentioned loader selector valve 2282, the pilot piston shutoff valve 2283, and the power-off valve 2284, as shown best in FIGS. 78, 91, 94, 95, and 96, are equally spaced near the top of the valve block 2280. Each valve 2382, 2383, and 2384 is separately solenoid operated from the solenoid housing 2309, shown best in FIGS. 5 and 90, mounted on the top of the valve block 2280.

Valves 2382 and 2383 are similar. As shown in FIGS. 95 and 96, each valve 2382 and 2383 is a three-land plunger type. Valve 2384 is similar to valves 2382 and 2383 but differs in that it has a single-land pilot plunger 2394 sliding inside a main plunger 2395. The pilot plunger 2394 is linked to a solenoid LCLB4 which shifts it, shunting hydraulic pressure fluid to move the main plunger 2395. A spring 2398 returns the pilot plunger 2394 to neutral when the solenoid LCLB4 is de-energized.

*Loader selector valve*

The loader selector valve 2382, of FIG. 96, is of two-way, solenoid-operated, spring-centered type. It controls the direction of the pilot rack piston 2323 for the pilot rack 2310. When loader selector valve 2382 is in its spring-centered neutral position, both sides of the pilot rack piston 2323 are open to tank.

*Pilot rack piston control valve*

The pilot rack piston control valve 2383, shown in FIG. 95, is a solenoid-operated, spring-returned valve. It opens and closes the hydraulic flow between loader selector valve 2382 and pilot rack piston 2323. This valve 2383 stops and hydraulically locks the position of the pilot rack 2310, thus stopping the loader 2002 in the event of failure of the electrical power of the system.

*Power-off valve*

The power-off valve 2384, shown in detail in FIG. 94, is a solenoid-operated, spring-returned valve for setting and releasing the power-off brake 2014 and bypassing the main transmission lines in the event of hydraulic pressure or current failure. It also connects the main relief valve 2272 to tank when shut down to retract the Area 1 pilot rack stop 2317. The pilot plunger 2394 of this power-off valve 2384 is positioned by the solenoid LCLB4. Servo pressure fluid then positions and maintains the main plunger 2395 of the power-off valve 2384 during operation thereof.

*Metering valve*

Metering valve 2385, shown in detail in FIG. 98, is a spring-operated governor valve which limits the rate of flow of hydraulic fluid from the stroking pistons 2396 and 2397, shown best in FIGS. 78 and 92.

The components of the metering valve 2385, as shown best in FIG. 98, include a sleeve 2400 having a plunger 2401 inside the sleeve 2400, a coiled spring 2402 located inside the plunger 2401, a spring guide 2403 and a plug 2404. The plug 2404 and plunger 2401 each have a small fixed orifice 2405 and 2406, respectively, which continue through the sleeve 2400. The left end of the plunger 2401 thereby acts as a variable orifice.

The pressure of the hydraulic fluid against the face of the plunger 2401 moves it away from the plug 2404, closing the variable orifice formed by the land of the plunger 2401 and a port 2407 in the sleeve 2400. As the pressure of the hydraulic fluid increases, this variable orifice is virtually closed. A fixed orifice 2408 in the sleeve 2400 allows additional hydraulic fluid to pass as the pressure increases. Together these two orifices 2407 and 2408 give a constant flow of hydraulic fluid regardless of the pressure.

*Servo relief valve*

The servo relief valve 2386, as shown in FIG. 101, is a spring-loaded valve for limiting the servo control pressure of the hydraulic fluid to 400 p.s.i. If the servo pressure of the hydraulic fluid exceeds 400 p.s.i., this valve 2386 opens, dumping the excess pressure fluid back to tank.

The servo relief valve 2386 is provided with a sleeve 2401 having a main plunger 2411 located therein sliding inside the sleeve 2410. It also contains a spring guide 2412, a coiled spring 2413 and a spring retainer 2414. One end of the main plunger 2411 of the servo relief valve 2386 is of hollow construction, while the other end is drilled to house the switch actuating plunger piston 2389. Switch actuating plunger piston 2389 is arranged to actuate switch SILB17 in the solenoid housing 2309 located thereabove, which indicates the servo pressure fluid in the system.

*Supercharge relief valve*

The supercharge relief valve 2387, as shown in detail in FIG. 99, is a spring-loaded valve for limiting supercharge pressure of the hydraulic fluid to 100 p.s.i. If the supercharge pressure of the hydraulic fluid develops beyond 100 p.s.i., the valve 2387 opens, and dumps the excess pressure fluid to tank.

The design of supercharge relief valve 2387 is similar to that of servo relief valve 2386. However, the supercharge relief valve 2387 differs from the servo relief valve 2386 of FIG. 101 in that the pressure indicator, in this case the supercharge pressure indicator piston 2388 is not an integral part of the assembly of the valve 2387. This piston 2388 is remotely located but connected hydraulically thereto.

Piston 2388 extends through a mounting plug 2416 to actuate switch SILB16 in the solenoid housing 2309 located thereabove to indicate the supercharge pressure of the hydraulic fluid in the system.

*Switch cams*

The switch cams 2311, 2312, and 2313, shown best in FIGS. 78 and 97, are contained in a cylindrical switch cam assembly 2340 mounted on the rear of the gearbox 2284, as shown in FIG. 5. The switch cams 2311, 2312, and 2313, are driven by the feedback of the response of the B-end 2265 through the inner differential shaft 2322, shown best in FIGS. 72, 78, 89A, and 97, to relate the position of the saddle cart 2006 of the loader 2002 between Area 2 and the launcher 5000.

The switch cam assembly 2340, as shown best in FIGS. 78 and 97, includes a camshaft 2418 and a gear train 2419, the three previously mentioned cams 2311, 2312, 2313, spring-loaded cam followers 2420, and switches SILB8, SILB12, and SILB13, all located within an aluminum protective cover. Cams 2311, 2312, and 2313 are adjustably mounted and arranged to rotate together upon camshaft 2418. These cams 2311, 2312, and 2313 operate their respective switches SILB13, SILB8, and SILB12, by means of the spring-loaded cam followers 2420. Gear train 2419 couples the camshaft 2418 to the response of the B-end 2265 from the gearbox 2284 as transmitted by differential shaft 2322.

As the B-end 2265 rotates, it rotates the switch cams 2311, 2312, and 2313 through the differential shaft 2322 in the gearbox 2284. Gear train 2419 allows the switch camshaft 2418 to rotate .9329 of a revolution for the travel distance of the saddle cart 2006 from Area 2 to the launcher 5000.

The switch SILB12 indicates that the saddle cart 2006 is forward of the flametight door 2028, shown in FIGS. 39, 40, and 41, while the switch SILB8 indicates that the saddle cart 2006 is located aft of the blast doors 4000. The switch SILB13 is used to indicate that the saddle cart 2006 is aft of where the weapon 400 would strike the blast doors 4000.

*Solenoid housing*

The loader control solenoid housing 2309, as shown best in FIGS. 5 and 90, is mounted on top of the control valve block 2280, with one end overhanging the gearbox 2284, as shown in FIG. 5. The solenoid housing 2309 provides the electrical control for the loader power drive assembly.

The components in the solenoid housing 2309, as shown in FIGS. 78 and 90, include the solenoids LCLB1, LCLB2, LCLB3, and LCLB4, and the switches SILB101, SILB102, SILB103, SILB104, SILB14, SILB15, SILB16, and SILB17. It also contains terminal boards and linkages between the solenoids and switches and components in the valve block and gearbox.

The solenoids LCLB1 and LBLC2 are linked to loader selector valve 2382 of FIG. 96. When solenoid LCLB1 is energized, servo pressure fluid moves the pilot rack 2310 for a load cycle, and switch SILB101 is actuated to energize solenoid LCLB2. When solenoid LCLB2 is energized, it shunts servo pressure fluid to move the pilot rack 2310 for a retract cycle, with switch SILB102 being actuated.

The solenoid LCLB3 is linked to the pilot piston shutoff valve 2383, shown in FIG. 95, to open the pilot rack piston 2323 to servo pressure fluid or to tank. When this solenoid LCLB3 is energized, switch SILB103 is actuated.

This solenoid LCLB4 is linked to the pilot plunger 2394 of the power-off valve 2384, shown in FIG. 94, and it actuates switch SILB104. When solenoid LCLB4 is energized, it shifts the pilot plunger 2394 of power-off valve 2384 to allow servo pressure to move the main plunger 2395 thereof, closing the tank lines and opening the servo pressure lines to release the power-off brake 2014, of FIGS. 82 and 83, extend the Area 1 pilot rack stop 2317 and maintain pressure on top of the main relief valve 2272. In the event of electric hydraulic failure, the power-off valve 2384 or main plunger 2395 provides a means of setting the power-off brake 2014.

The switches SILB14A and SILB14B, as shown in FIG. 90, are actuated when the control barrel cam 2290 in the gearbox 2284 is on neutral. One switch SILB14 or SILB14B gives a light indication on the EP3 panel, shown in FIG. 3, while the other switch gives a light indication at the loader local control station. This condition must exist in order to start the motor of the loader 2002.

Switch SILB15, shown in FIGS. 78 and 90, is actuated when the A-end response cam 2275 of the A-end 2263 is on neutral. This condition must exist in order to release the power-off brake 2014.

Switch SILB16, shown best in FIG. 90, is actuated when the supercharge pressure fluid is present in the control valve block 2280. It is actuated by the pressure indicator piston 2388, of FIG. 99. The switch SILB17, shown in FIG. 90, is actuated when servo pressure fluid is present in the control valve block 2280. It is actuated by the switch actuating plunger piston 2389, of FIG. 101.

*Area 1 pilot rack stop*

The Area 1 pilot rack stop 2317, shown best in FIGS. 72 and 78, and in detail in FIG. 102, is attached to the left-hand side of the sprocket and track housing 2036, with the right pilot rack cylinder 2327 extending through it, as shown best in FIG. 5. The Area 1 pilot rack stop 2317 provides a positive stop for the pilot rack 2310 to stop the signal input to the differential 2286, stopping the saddle cart 2006 in Area 1. It also releases the pilot rack 2310 for movement of the saddle cart 2006 to the launcher 5000. The Area 1 pilot rack stop 2317 also functions on the return cycle of the saddle cart 2006.

The major components of the Area 1 pilot rack stop 2317, illustrated in FIG. 102, includes a housing with a can-like cover 2422, a piston block 2423, a solenoid LCLB5, switches SILB6 and SILB7 (not shown for clarity), an Area 1 stop piston 2424 and connected lever 2425, and the stop components to be described.

FIG. 78 shows that the pilot rack cylinder 2327 passes through the Area 1 pilot rack stop 2317. It is also to be noted that the top of the cylinder 2327 therein is cutout to allow the stop lever 2334 to enter the right pilot rack cylinder 2327 and contact the perforated pilot rack guide 2332 to halt the movement of the pilot rack 2310.

The working components of the Area 1 pilot rack stop 2317, as shown in FIG. 102, include the stop lever 2334, one end of which moves in and out of the right pilot rack cylinder 2327, while the other end thereof is pinned to a fixed lever retainer (not shown). The stop lever 2334 is connected to a stop shaft 2426 by a clevis 2427. This stop shaft 2426 is threaded to a shaft link 2428. A spring 2429 fits over the shaft link 2428 and it is seated on the upper end of the stop shaft 2426. The top of the spring 2429 contacts a bracket 2430 which supports the upper half of the components of the Area 1 pilot rack stop 2317. The shaft link 2428 is connected to solenoid LCLB5 located thereabove by a second clevis 2431. The lower end of this clevis 2431 is also connected to a switch-actuator lever 2432.

As shown in FIG. 102, the Area 1 stop piston 2424 and an associated lever 2425 are located at right angles to the stop lever 2334. When the loader power drive electric motor 2038 is running and the power-off valve 2384 is shifted, servo pressure fluid and the force of spring 2429 on the stop shaft link 2428 overcome the force of a spring 2433 in back of piston 2424 so that the stop lever 2334 can extend.

Whenever the loader power drive electric motor 2038 is off, the pressure of the servo fluid to the front of piston 2424 is changed to the pressure of the tank fluid and the force of the spring 2433 behind piston 2424 maintains the stop lever 2334 in the retracted position. The reason for this is so any use of the manual power-off handcrank cannot drive the pilot rack 2310 into the stop lever 2334 and damage any of the parts.

Piston 2424 and its spring 2433 are located inside the small piston block 2423 secured to the main housing. A spring retainer cap 2434 is threaded into the end of the piston block 2423.

*Creepage control*

Creepage control arrangement is provided in order for the system to decelerate the loader power drive and control the saddle cart 2006 in its last short distance of travel. The creepage control arrangement is composed of the creepage piston 2093 and the creepage control valve 2092, both of which are shown best in FIGS. 72, 78, and 103. The creepage control piston 2093 will now be explained, while the creepage control valve 2092 was explained previously. The creepage control valve 2092 and creepage piston 2093 are connected hydraulically. Mechanical shifting of the creepage control valve 2092 ports servo pressure fluid to the remotely located creepage piston 2093.

*Creepage piston*

The creepage control piston 2093 is mounted on the end of the right pilot rack cylinder 2327, as shown in FIGS. 5, 72, and 78. The creepage piston 2093 stops the pilot rack 2310 near the end of the load travel and then permits it to travel the last short distance at a governed rate of speed.

This creepage control piston 2093, shown in detail in FIG. 103, is housed in a piston block 2436 which is secured to the end of the right pilot rack cylinder 2327.

A cover 2437 is bolted to the other end of this piston block 2436, which also mounts a switch SILB18, a switch actuator lever 2438 and an orifice plug 2439.

In standby condition, the left end of creepage control piston 2093, as viewed in FIG. 78, is connected to servo pressure PS and the right end to tank T through the creepage control valve 2092. After the pilot rack 2310 contacts creepage piston 2093, the loader 2002 decelerates until the cam roller 2114 of the creepage control valve 2092 enters the cam surface cutout links 2104 of the loader chain 2004. At this position, the creepage control valve 2092 releases the pressure fluid on the left side of creepage piston 2093 through the fixed orifice of orifice plug 2439 to tank T and the servo pressure fluid is then ported to the other side of creepage piston 2093, as shown in FIGS. 72, 78, and 103. The pilot rack 2310 and saddle cart 2006 continues to move forward the remaining short distance of travel with the fluid discharging orifice of orifice plug 2439 controlling the velocity thereof.

*Local control assembly*

The local control assembly, as illustrated in FIG. 105, originates in the loader local control station and extends to the gearbox 2284 on the power drive assembly. Local control is a mode of operation for the loader power drive 2010 other than automatic or manual power operation thereof. Local control combines a manual input signal with hydraulic operation, that is, the local control handcrank 2354 is used to control the loader power drive 2010. The saddle cart 2006 may be moved back and forth on the loader trunk 2003 in local control with or without a missile-booster combination 300 or weapon 400, depending upon the location in the system. As will be pointed out subsequently, weapons 400 can be returned from the launcher 5000 only in local control.

The components of local control assembly include the local control clutch 2315 mounted on the righthand side of the gearbox 2284, the handcrank 2354 located in the loader local control station, and a linkage 2440 of shafts, universal joints and gears, as required, which connect the handcrank 2354 and the clutch 2315, as shown best in FIGS. 78, 89A, and 105. Although the local control clutch 2315 is normally connected to local control, it also functions in automatic operation to set and lock the pilot rack 2310 through the differential 2286 whenever the saddle cart 2006 is in its normal stopping place in either Area 2, Area 1, or at the launcher 5000.

*Local control handcrank*

The local control handcrank 2354 is mounted to a plate 2355 at the local control panel EP6 or EP7, as shown best in FIG. 129. The A and B loader local control handcrank assemblies are functionally identical but since the location of the operators control stations and panels EP6 and EP7 vary with respect to the local control clutch 2315 on the gearbox 2284, the connecting components differ to adapt each assembly to its respective shipboard location.

Figure 5A:
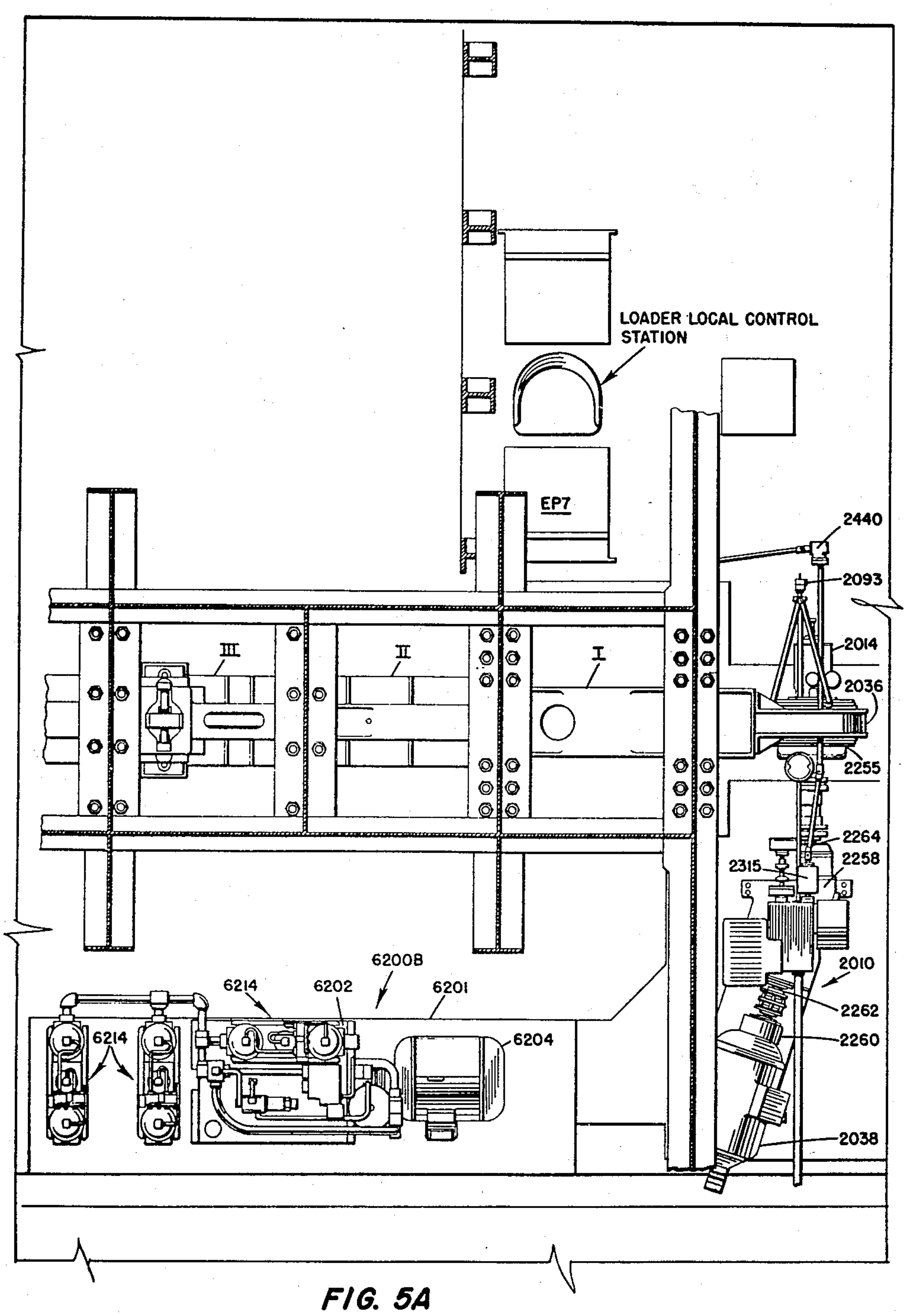
FIG. 5A is a continuation of the top plan view of FIG. 5, with parts removed, of a portion of the B-side loader, loader trunk, and loader power drive arrangement therefor.

The A-side local control handcrank 2354 and local control station and panel EP6, as shown best in FIGS. 5, 5A, and 129, are located on the same side of the loader trunk 2003, while the B-side local control handcrank 2354 and local control station and panel EP7 are located on the opposite side of the loader sprocket and track housing 2036 from the local control clutch 2315 and gearbox 2284, it is this local control assembly which is illustrated in FIG. 104.

The local control handcrank 2354 is mounted on the face of the plate 2355 directly beneath the local control panel EP7, which is located in the loader local control station, as shown in FIG. 104. This local control station is located ahead of the loader power drive 2010 over the ready service mechanism 500B. The local control handcrank 2354 is mounted to a circular handwheel 2361, as shown best in FIG. 105. The legends "LOAD" and "RETRACT," with directional arrows, are stamped on the handwheel 2361. The back plate 2355, to which the handwheel 2361 is mounted, has a switch SILB19 mounted to it. When the local control handcrank 2354 is stowed, as shown in FIG. 105, a spring-loaded plunger 2363 in the local control handcrank 2354 extends through a hole in the back plate 2355 to actuate switch SILB19 to show that the loader local control handcrank 2354 is stowed.

*Local control panel*

A local control panel is mounted in the loader local control station, the latter being shown schematically in FIG. 104. The local control panel is located vertically above and mounted to the plate 2355 for the local control handcrank 2354. It contains five indicating lights to indicate when the saddle cart 2006 and loader chain 2004 are in Area 2; when the saddle cart 2006 and loader chain 2004 are in Area 1; when the saddle cart 2006 and loader chain 2004 are at the launcher 5000; when the control cam is on neutral; and when the local control clutch 2315 is engaged.

When a switch on the local control panel is depressed, the indicator light for the local control clutch 2315 lights up. On releasing the local control handcrank 2354 by pulling the handle cap out and turning it one one-half turn, the switch SILB19 is deactuated. The local control handcrank 2354 is then rotated in the desired direction until the correct indicating lights on the local control panel are lit, and then it is stowed and switch SILB9 is released.

*Local control operation*

If desired, the loader power drive can be operated in local control when directed by the feeder captain. This is done by depressing a foot-operated local control switch to engage the local control clutch through the solenoid LCLB6, shown in FIG. 89. The solenoid LCLB6 actuates the switch SILB106 to energize solenoid LCLB3, thus shifting the pilot piston shutoff valve 2383 to unblock hydraulic lines connected to the pilot rack piston 2323, as shown in FIGS. 78, 89, and 91.

*Discussion of operation of loaders—General introduction*

A missile-booster combination 300 is moved from the ready service compartment 8012 of Area 2 to the wing and fin assembly compartment 8010 of Area 1 and thence to the launcher 5000 by several actions, namely, mechanical, hydraulic, and electrical. All of these actions are interlocked to operate in sequence.

The theory of operation of either loader 2002A or 2002B follows the movement of a missile-booster combination 300, with either S or W type missile 100S or 100W, respectively, from the time of its selection by the LDC operator and its indexing in the ready service tray 502, to the moment of the placement of the weapon 400 on the guide arm 5002 of the launcher 5000. The reverse cycles of operation of the loader are also included to complete the operation of the loaders 2002A or 2002B. One cycle of operation of the loader 2002 is described with the saddle cart 2006 empty, while the other cycle of operation of the loader 2002 is described in connection with the return of weapon 400 to the wing and fin assembly compartment 8010, and thence a missile-booster combination 300, after removal of the wings 102 and fins 104 of the missile 100 and fins 208 of the booster 200 to the ready service Area 2.

*Loader transfer*

The missile-booster combinations 300 are transferred from the center hoists 508 and 509 of the ready service mechanism 500A or 500B to Area 1 and thence as weapons 400 to the respective launcher guide arm 5002 of the launcher 5000 by the loader trunk 2003 (A- or B-side) and associated equipment.

The hydraulic units for the loaders 2002A and 2002B are operated by the hydraulic pressure fluid from the Area 1 accumulators 6000A and 6000B, respectively. This pressure fluid is delivered at 1400–1500 p.s.i. (PA pressure). The PA pressure fluid is delivered to selector valves, which, in turn, either open or close hydraulic lines to the components themselves. These components are divided into two groups, namely those of Area 1 or Area 2.

Each group of components of Area 1 or Area 2 is activated independently of the other group. When the loader 2002 is operating in one area, for example, Area 2, PA pressure fluid is made available to the hydraulic components in that area. Hydraulic components of the other area, for example, Area 1, are, on the other hand, put on standby.

The initial engagement and forward movement of a missile-booster combination 300 from Area 2 to Area 1 and subsequently a weapon 400 from Area 1 onto the guide arm 5002 of the launcher 5000 begins in Area 2 in the ready service compartment 8012. The components of the loader 2002 located in Area 2 move the missile-booster combination 300 from the center hoists 508 and 509 of the ready service mechanism 500 and move it into Area 1 in the wing and fin assembly compartment 8010.

Since the missile-booster combinations 300 are stored without wings 102 and fins 104 for the missile 100 and fins 208 for the booster 200 assembled thereto, and since some means of arming the missile 100 and applying a prefiring warmup of the missile 100 is required, the missile-booster combination 300 is stopped in the wing and fin assembly compartment 8010 of Area 1 prior to final transfer to the guide arm 5002 of the launcher 5000. The wings 102 and fins 104 and 208 are then installed on the missile-booster combination 300 to form the weapon 400, and external warmup power is applied to the missile 100 of the weapon 400 by the Area 1 warmup contactor 2021.

*Loader power drive*

The loader power drive 2010, as illustrated generally in FIGS. 3B, 5, and 5A, is a vital component of each loader 2002. Its function is to move the saddle cart 2006 and loader chain 2004 for each loader 2002, in either a load, unload, reverse, or exercise cycle. The loader power drive 2010, through the loader chain 2004, moves the saddle cart 2006 on the skid tracks 2048 and 2050 of the loader trunk 2003. The saddle cart 2006 makes physical contact with the upper aft booster shoe 204 of the booster 200 and its movement is in a horizontal plane parallel to the fore and aft centerline of the vessel or ship 8000, as illustrated generally in FIG. 8. The loader power drive 2010 is electrically and hydraulically interlocked, through the loader chain 2004, with the hydraulic components of the loader 2002.

The operation of the loader power drive 2010 depends on the hydraulic pistons and valves, electrical solenoids and interlock switches, which have been previously described and which will be explained more fully subsequently. These valves are mechanically, hydraulically, or electrically positioned. The pistons are moved by the hydraulic pressure fluid ported to them and regulated by the valves. The hydraulic fluid pressures used within the loader power drive 2010 are servo fluid pressure of 400 p.s.i., supercharge fluid pressure of 100 p.s.i., tank fluid pressure of 10 p.s.i., metered fluid pressure, and variable fluid pressure.

The hydraulic pressure fluid for operation of the loader power drive 2010 is supplied by the supply tank 2254 suspended over the left-hand side of the loader power drive 2010, as shown best in FIG. 3B. The hydraulic pressure fluid is pumped to the control valve block 2280 by the servo and supercharge gear pumps 2267 and 2268, respectively, on the electric drive motor 2038. The gears in both pumps 2267 and 2268 are identical in size and the servo (400 p.s.i.) and supercharge (100 p.s.i.) fluid pressures are obtained and regulated by valves in the control valve block 2280.

The loader power drive 2010 is a servo-mechanism composed of two groups of components, namely the power unit and the control unit 2270. It is a closed loop servo system, with feedback, which operates on error with an inherent characteristic of reducing the error.

The basic components within the loader servo system are the input device consisting of the pilot rack 2310 and local control handcrank 2354, the power amplifier consisting of the electric motor 2038 and hydraulic transmission 2258, the feedback including the responses of the A-end and B-end 2263 and 2265, respectively, and the error detector including the differential 2286. These components operate in conjunction with one another.

In a normal automatic load cycle, the loader power drive 2010 operates within fixed values or control limits that can be listed as follows, namely acceleration, constant velocity, travel distance, and deceleration.

The acceleration rate of the loader 2002 is determined by the rate at which the A-end tilt plate 2274 is rotated from neutral to full stroke, while the velocity of the loader 2002 (with the tilt plate 2274 on full stroke) is determined by the speed of the electric motor 2038, the relative displacement between the A-end 2263 and B-end 2265 of the hydraulic transmission 2258, and the drive ratio between the B-end 2265 and the sprocket 2039 for the loader chain 2004. These components are designed to load at a maximum velocity of twelve (12) feet per second.

The travel distances of the saddle cart 2006 and loader chain 2004 of the loader 2002 are determined by the pilot rack 2310. It feeds the input signal into the input element of the differential 2286, while the deceleration of the saddle cart 2006 and loader chain 2004 of the loader 2002 is determined by how long it takes the response of the B-end 2265 to wind the response element of the differential 2286 and control barrel cam 2290 to neutral, once the input signal from the pilot rack 2310 stops.

*Loader control*

Each loader 2002, as powered by its loader power drive 2010 and the Area 1 accumulator 6000, can be operated three different ways. In addition, an auxiliary method of control of the loader 2002 has been designed in the system for use in emergencies.

In the first way, referred to as "AUTOMATIC CONTROL," the LDC operator initiates the loading action by making a selection of a missile-booster combination 300, that is, 300S or 300W, at the LDC station in Weapons Control. Once this selection of the missile-booster combination 300S or 300W is made, all other actions of the loader 2002 are automatic, with the exception of the installation of the wings 102, and fins 104 and 208 to the missile-booster combination 300, and the arming mechanism 206 for the booster 200. This is the normal type of operation and may be carried out on either or both the A- or B-sides of the feeder system 2000 according to the situation.

In the second way, referred to as "STEP CONTROL," in this type of operation is used for starting, exercising, strikedown, or returning weapons from the launcher 5000 to Area 1, or missile-booster combinations 300 from Area 1 to the ready service compartment 8012 of Area 2 for checking and training purposes. In step control operation, each action is initiated by the appropriate switch on the control panel EP3, shown best in FIGS. 3 and 129.

The third way of operating the loader 2002 is by "LOCAL CONTROL." Local control is a form of step control. It uses the local control handcrank 2354 to operate the loader chain power drive 2010.

The primary purpose of local control is to return a weapon 400 from the guide arm 5002 of the launcher 5000 to Area 1, and the missile-booster combination 300 from Area 1 to the ready service compartment 8012 of Area 2. It can also be used to move the saddle cart 2006 forward or aft, loaded or empty, from any point of the loader 2002. The maximum velocity of the loader chain 2004 and saddle cart 2006 is approximately one (1) foot per second and it is proportional to the speed with which the local control handcrank 2354 is turned.

The auxiliary method of control of the loader 2002 is by the manual handcrank 2295. This type of operation is used only in extreme emergency when there is power failure, or other reasons make it impossible to operate the loader 2002 under power. It is not used for loading weapons 400 onto the guide arm 5002 of the launcher 5000, or moving missile-booster combinations 300 from Area 2 to Area 1 but for taking weapons 400 off the guide arm 5002 so that the blast doors 4000 may be closed. It may also be used for installation or checking of the system.

To crank the loader 2002 without power, it is necessary that the power be cut off and the Areas 1 and 2 positioners 2030 and 2016, respectively, be retracted. The manual handcrank 2295 is then connected to the power-off brake 2014 and then it is cranked.

*Automatic sequence introduction*

In this specification, it should be assumed that the guided missile launching system is manned by all personnel, all motors have been started and are running on a standby status. It should also be assumed that appropriate switches on the control panels have been positioned.

Under these conditions, the LDC operator in Weapons Control has selected the desired missile-booster combination, that is, either 300S or 300W, for both A- and B-sides of the feeder system 2000 and the type of loading desired. This is known as the "first load order." Switch SMX3 (panel EP3 shown in FIG. 3), is then turned to either the A-side, B-side, or both the A- and B-sides.

This discussion of operation will refer consistently to the B-side of the guided missile launching system. Both the A- and B-sides of the guided missile launching system are identical. Occasionally, figures of drawings will be referenced in which an A-side element or component, such as solenoid LCRA1, for example, is shown to illustrate its counterpart, a B-side solenoid LCRB1.

FIGS. 106, 106A, and 106B comprise a master schematic of the entire power drive mechanism and loader system in a neutral, motor-running condition and these figures will be referred to constantly.

*Automaic load cycle*

Once the Area 1 accumulator 6000 and chain power drive electric motor 2038 have been started, solenoid LCXB1 (LCXA1 in FIG. 126A) is energized, which, in turn, shifts the accumulator cutoff valve 6124. As a result, accumulator pressure fluid (PA) is made available to loader trunk hydraulic components, Area 1 and Area 2 interlock valves 2024 and 2026, respectively, the creepage control valve 2092, the Area 1 and Area 2 positioner pistons 2111 and 2110, respectively, the solenoid operated control valve 2117, the forward and aft floating tracks 2017 and 2018, respectively, as well as the flametight door 2028 and the blast doors 4000.

While the electric motor 2038 is running, the solenoid LCLB4, shown best in FIGS. 78 and 106A, is energized and it shifts the power-off brake piston 2305 through the power-off valve 2384 to release the power-off brake 2014. The Area 2 interlock valve 2026, shown best in FIGS. 19 and 106B, ports accumulator pressure fluid (PA) to the selector valve 2470 (FIG. 106B), of the Area 2 positioner 2016, the solenoid operated control valve 2117 for the rammer 2020 (FIG. 106B), and the solenoid operated control valve 2144 for the shoe engagement indicator 2094, and for the aft and forward floating tracks 2018 and 2017 (FIG. 106A), respectively. All hydraulic components of Area 2 are now ready for their part in the first load cycle of a missile-booster combination 300.

The Area 2 positioner 2016 and chain track flame seal 2096 are in extended positions. The chain track flame seal 2096 is hydraulically and electrically interlocked with the action of the Area 2 positioner 2016. Actuated by the same solenoid controlled positioner valve 2470, the Area 2 positioner 2016 and chain track flame seal 2096 extend and retract together. In a normal stowed-at-load position, at the end of a load cycle, or during shutdown of the loader 2002, the Area 2 positioner 2016 and the chain track flame seal 2096 remain in extended positions.

When the center hoists 508 and 509 of the ready service mechanism 500 are lowered and Area 2 has no missile-booster combination 300, with the saddle cart 2006 and loader chain 2004 retracted and the rammer 2020 and Area 2 positioner 2016 extended, an electrical signal is transmitted to energize the solenoid LCJB1, the solenoid control for extending the forward and aft floating tracks 2017 and 2018, respectively. The selector valve 2144 for the aft and forward floating tracks 2017 and 2018 is actuated and detented, causing a pair of latch valves 2372 to release their latches 2134, signalling solenoid LCJB1 to de-energize.

The floating track pilot pistons 2145 in the aft and forward floating tracks 2018 and 2017, respectively, extend the floating track servo valves 2126. Pressure fluid is then immediately ported to the top sides of the floating track servo lift pistons 2124. The aft and forward floating tracks 2018 and 2017, respectively, are now extended.

*Hydraulics of floating tracks*

Aside from the common solenoid-controlled selector valve 2144, each forward and aft floating track 2017 and 2018, respectively, is provided with a latch release valve 2472, the floating track pilot piston 2145, the floating track servo valve 2126, the floating track servo lift piston 2124, and the probe 2143, as shown best in FIG. 30. The floating track pilot piston 2145, the floating track servo valve 2126 and probe 2143 are assembled as one unit which serves three different functions.

As shown in FIG. 30, in the stowed position, the floating track servo piston 2124 is held in position by the latch 2134. An internal spring 2474 supports the floating track servo valve 2126 and floating track pilot piston 2145. A portion of the latch release valve block 2122 extends below the block and forms a cylinder 2476 for the floating track pilot piston 2145. In tracing the hydraulic circuit of FIG. 107, it will be noted that accumulator pressure fluid PA is ported to the center land 2478 of the three-land floating track servo valve 2126. The valve chambers 2480 on each side of the center land 2478 are arranged to be ported to the top and bottom sides of the floating track servo lift piston 2124. The two end lands 2479 control the connection to the header tank 6010.

In the power-off conditions of FIG. 107, the floating track servo valve 2126 is slightly off neutral with respect to the valve ports. This amounts to an opening of the valve lands of about 0.031 inch. As a result, the bottom side of the floating track servo lift piston 2124 is open to the pressure line and the top side of the piston 2124 is ported to the header tank 6010. This slight opening prevents a possible mechanical lock when the accumulator pressure fluid is open to the floating track servo lift piston 2124.

When the power is turned on, the pressure fluid is ported to the bottom side of the floating track servo lift piston 2124. The floating track servo lift piston 2124 is lifted until the floating track servo valve 2126 is in a neutral position. As the floating track servo lift piston 2124 raises, the load is removed from the latch 2134. When the power is turned on and the floating track servo lift piston 2124 is lowered, the full hydraulic load of the piston 2124 will be contained by the latch 2134.

When the solenoid LCJB1 is energized, pressure fluid is ported to the rear of the latch release valve 2472. This latch release valve 2472 moves to release the latch 2134. The pressure fluid is then ported to the top side of the floating track pilot piston 2145. It is to be noted that the bottom side of this floating track pilot piston 2145 is also connected to the accumulator pressure fluid source (PA) through a different line, as shown in FIG. 107.

Because of the area difference between the top and bottom of its floating track pilot piston 2145, the piston 2145 moves down at a rate controlled by an orifice 2481. The floating track pilot piston 2145 breaks the connection of the toggle link 2130 and the hanger frame 2128 is lowered until it rests on the chain tracks 2052 and 2054. The floating track pilot piston 2145 and the floating track servo valve 2126 continue to move until the probe 2143 contacts the hanger frame 2128. During the extension of the forward and aft floating tracks 2017 and 2018, respectively, the aft and forward motion pawls 2005 and 2007 of the saddle cart 2006 remain at track level.

*Raising center hoist*

The center hoists 508 and 509 of the ready service mechanism 500 must be raised next. When the forward and aft floating tracks 2017 and 2018, respectively, the rammer 2020 and tray lock cylinders 534, 535, 536, and 537, are extended and center hoist lock cylinders 654 retracted, solenoid LCGB1 is energized and the center hoists 508 and 509 are raised.

As the center hoists 508 and 509 raise, the forward and aft booster shoes 202 and 204, respectively, of the missile-booster combination 300 make contact with the forward and aft floating tracks 2017 and 2018. This action is relayed to a retract circuit for the rammer 2020.

When the hoists 508 and 509 are up, a signal is transmitted so that the solenoid LCKB1 of the rammer 2020 is energized. When solenoid LCKB1 is energized, the rammer latch valve 2120 is shifted through the solenoid operated control valve 2117, and rammer piston 2118 is retracted. Solenoid LCKB1 is then de-energized, and then valve 2117 spring-returns to neutral. A metering valve 2482 for the rammer 2020 meters pressure fluid to the header tank 6010 as the rammer piston 2118 retracts.

*Hydraulics of rammer*

Accumulator pressure fluid for the rammer piston 2118 is always directed to the solenoid operated control valve 2117. When the saddle cart 2006 is extended from its position in Area 2, the Area 2 interlock valve 2026 ports accumulator pressure fluid (PA) to the line for the header tank 6010. Both ends of the rammer latch valve 2120 and both sides of the rammer piston 2118 register the accumulator pressure.

Since both ends of the rammer latch valve 2120 have the same areas, a spring 2483 alone maintains a rammer latch 2484 in the latched position, as shown best in FIG. 106B. Each side of the rammer piston 2118, on the other hand, has an unequal area. The top side of the rammer piston 2118 is provided with the larger area so that accumulator pressure fluid in this area exerts a force to keep the rammer piston 2118 extended. When the rammer piston 2118 is raised, the aft and forward motion chain pawls 2005 and 2007 engage the aft booster shoe 204. When the rammer piston 2118 is lowered, the missile-booster combination 300 is rammed forward approximately four (4) inches so that the forward and aft booster shoes 202 and 204 engage the forward and aft floating tracks 2017 and 2018, respectively, of the loader track 2034.

As previously described, the rammer 2020 is provided with the solenoid-operated, spring-centered control selector valve 2117. The valve block also includes the metering valve 2482 for controlling the movement of the rammer piston 2118. As shown in FIGS. 106A and 106B, the rammer metering valve 2482 can regulate the velocity of flow of the fluid, thus maintaining control of the movement of the rammer piston 2118. Hydraulic fluid must then flow through the rammer metering valve 2482 before it is ported back to the supply tank. The rammer metering valve 2482 then allows a maximum flow of fluid which then controls the retract-extension action of the rammer 2020. It exerts no restricton on fluid flow if the flow is below this maximum.

Rammer latch 2484 and rammer latch release valve 2120 are attached to the rammer 2020, as best shown in FIG. 108A. When the rammer 2020 s retracted, it is essential that the flow of pressure fluid from the rammer control selector valve 2117 be sequenced to the bottom side of the rammer piston 2118. The pressure fluid of the Area 1 accumulator 6000 first lifts the rammer latch valve 2120, which, in turn, retracts the rammer latch 2484. The rammer control selector valve 2117 ports accumulator pressure fluid to the bottom side of the rammer piston 2118 after the rammer latch 2484 is released.

Shoe engagement indicator 2094, shown in FIG. 109*a*, is part of the operation of the rammer 2020. When the rammer 2020 is retracted, it is necessary to obtain an indication when the aft motion pawl 2005 has dropped down to engage the aft surface of the aft booster shoe 204.

A shoe engagement indicator piston 2486 is provided in the shoe engagement indicator 2094 and it is spring-loaded. The shoe engagement indicator piston 2486 has constant accumuplator pressure fluid existing in the smaller valve area (bottom), and, as a result, it remains in a normal raised position when not in operation. During load operation, the indicator 2094 rides the cam surface of the aft motion pawl 2005. As the pawl 2005 retracts and drops to engage the aft surface of the shoe 204, switch SIKB1 is contacted and the rammer 2020 is extended by energizing solenoid LCKB2.

*Transferring a missile-booster combination from tray*

With no missile-booster combination 300 in Area 2, the rammer 2020 retracted, the center hoists 508 and 509 raised, and the center hoist lock cylinders 654 retracted, a signal is given for unlatching the missile-booster combination 300 from its tray 502, in readiness for transfer from the tray 502 to the loader 2002. With the unlatching of the missile-booster combination 300 completed, the rammer extend solenoid LCKB2 is energized. Energizing solenoid LCKB2 actuates the rammer solenoid-operated control valve 2117 which then ports pressure fluid to extend the rammer 2020. The rammer metering valve 2482 then meters return fluid to tank 6002 as the rammer 2020 extends.

The extend motion of the rammer 2020 forces the missile-booster combination 300 forward four (4) inches. The aft booster shoe 204 then engages the shoe receptacle 2200, of FIG. 11, of the saddle cart 2006 which is supported by the floating tracks 2017 and 2018.

The rammer piston 2118 receives pressure fluid on the larger piston area thereof and it is extended. This de-energizes solenoid LCKB2 and rammer solenoid control valve 2117 spring-returns to neutral. Rammer latch valve 2120 then spring-returns to a latching position and rammer solenoid control valve 2117 ports accumulator pressure fluid (PA) to both sides thereof.

When the floating tracks 2017 and 2018 are raised, circuitry is established to lower the center hoists 508 and 509 of the ready service mechanism 500.

Provided that Area 2 is loaded with a missile-booster combination 300 and rammer 2020 is etxended, a signal is transmitted to energize the solenoid LCJB1. This causes the solenoid-operated control valve 2144 for the floating tracks 2017 and 2018 to be positioned and detented, with solenoid LCJB1 then being de-energized. Both floating track pilot pistons 2145 for the aft and forward tracks 2018 and 2017 start to retract their respective servo valves 2126.

Servo valves 2126 then release pressure fluid from the top sides of the servo lift pistons 2124 and port it to the bottom sides thereof. As the servo lift pistons 2124 reach their retracted position, each latch release valve 2472 for the forward and aft floating tracks 2017 and 2018 spring-returns to a latched position. As the forward and aft floating tracks 2017 and 2018 retract, the forward booster shoe 202 is then aligned with the skid tracks 2048 and 2050 along with the aft shoe 204, which is secured by the saddle cart 2006. With the condition assured of both A-side blast doors 4000A and 4000B closed, a solenoid LCMB1, shown in FIGS. 106A and 110, is then energized to open the flametight door 2028.

When solenoid LCMB1 is energized, a solenoid-operated selector valve 2490 for the flametight door 2028 is then actuated and detented wth solenoid LCMB1 being then de-energized. A latch valve 2491 for the flametight door 2028 is then actuated to release a flametight door latch 2492 and to port fluid to a velocity control valve 2493. Velocity control valve 2493 is cam-actuated to port fluid to a metering valve 2494. The metering valve 2494 works along with the variable orifice construction of valve 2493, causing a flametight door operating piston 2496 to retract and the flame tight door 2028 to open. The opening action of the flametight door 2028 and the retract action of the forward and aft floating tracks 2017 and 2018 occur simultaneously.

*Hydraulics of flametight door*

The flametight door operating piston 2496 operates the flametight door 2028. This piston 2496 is mounted to the door frame 2027 and it is connected to a door bracket 2497 through a self-aligning link 2498, as shown in FIGS. 40 and 41. This floating arrangement excludes the precise alignment necessary between the travel of the flametight door 2028 and the stroke of the piston 2496.

The flametight door 2028 is provided with a control valve block 2495, shown generally in FIG. 40 and in detail in FIGS. 106A and 110, which contains the solenoid-operated selector valve 2490, the metering valve 2494, the velocity control valve 2493, and the latch valve 2491. This assembly gives automatic control of the flametight door 2028 during a load cycle of a missile-booster combination 300 and weapon 400.

The velocity control valve 2493 is spring-loaded against a control cam 2499 which is attached to the flametight door 2028. The velocity control valve 2493 and control cam 2499 together move the flametight door 2028. Together with the metering valve 2494, the velocity control valve 2493 and the control cam 2499 control the flametight door operating piston 2496 which opens and closes the flametight door. The latch valve 2491 latches the flametight door 2028 in the closed position.

When the selector valve 2490 is shifted to open the flametight door 2028, the flametight door latch 2492 is then released before the accumulator pressure fluid (PA) is ported to the door operating piston 2496.

FIG. 110 shows the selector valve 2490 and latch valve 2491 in block form. The control cam 2499 is attached to a piston rod 2489 which carries the load. In closing the flametight door 2028, the selector valve 2490 ports accumulator pressure fluid (PA) to the metering valve 2494 and it is similar to the metering valve 2482 discussed previously in connection with the rammer 2020. The controlled fluid is then ported to the bottom side of the flametight door operating piston 2496.

As shown best in FIGS. 40, 106A, and 110, the velocity control valve 2493, which is attached to the control cam 2499, functions as a variable orifice in the flow path of the hydraulic fluid, while the metering valve 2494 maintains a constant pressure drop across this orifice. During the acceleration part of the operation, the opening of the orifice increases, and the opening of the orifice is controlled by the control cam 2499. Constant velocity for the flametight door 2028 is maintained across the flat portion of the control cam 2499. As the flametight door operating piston 2496 is decelerated, the control cam 2499 closes the orifice opening once more. The movement of the control cam 2499 is reversed during the return stroke of the flametight door operating piston 2496. The metering valve 2494 of the flametight door 2028 is spring-centered about the two lines leading to the valve before a cycle of operation is initiated.

At the beginning of a cycle of operation of the flametight door 2028, there is no resistance to the flow of hydraulic fluid in the system until the fluid reaches the variable orifice comprising velocity control valve 2493. This velocity control valve 2493 then builds up a back pressure of hydraulic fluid which is ported to the left side of the spring-centered metering valve 2494. This back pressure of the hydraulic fluid causes the metering valve 2499 to shift to the right and attempt to cut off the flow of hydraulic fluid to the orifice.

It will be noted that the opposite end of the metering valve 2494 is connected to the downstream side of the variable orifice. Because of the load on the piston rod 2489 and the flametight door operating piston 2496, the pressure of the hydraulic fluid in the line will build up. The building up of the hydraulic pressure in the line results in a constant pressure drop across the orifice. As the flow of the hydraulic fluid increases, the spring-centered metering valve 2494 will meter the added volume of hydraulic fluid to assure the same specific pressure drop.

A constant pressure drop is maintained across the variable orifice opening by the metering valve 2494 when the flametight door 2028 is cycled to open. The hydraulic line labelled T leading from the metering valve 2494 to the header tank 6010 is ported by the selector valve 2490. The pressure PA of the accumulator fluid moves the flametight door operating piston 2496 downwardly. This pressure PA of the accumulator fluid is constantly available on top of the flametight door operating piston 2496. The accumulator pressure fluid from the bottom side of the flametight door operating piston 2496 is regulated for desired flow characteristics as it passes through the control valve block 2495. The combination of the control cam 2499, the variable orifice or velocity control valve 2493 and the metering valve 2494 assure a smooth acceleration, constant velocity, and a uniform deceleration of the flametight door 2028 regardless of existing load conditions.

*Hydraulics of Area 2 positioner*

In FIGS. 111C and 112, there are illustrated schematic diagrams of the Area 2 positioner 2016 and its associated solenoid control selector valve 2470, shown only in FIG. 112. Accumulator pressure PA from the accumulator 6000 is constantly present on the rod side of the piston 2110 of the Area 2 positioner 2016. Hydraulic accumulator pressure fluid PA is ported to the pair of spring-loaded detents 2115, retaining them in a retracted position while the loader trunk assembly and its hydraulic components are in operation. Once the loader equipment is shut down and the accumulator pressure PA subsides, the detents 2115 of the Area 2 positioner 2016 extend and engage its piston 2110 at a spring pressure of 350 p.s.i. This action allows the detents 2115 to engage the Area 2 positioner piston 2110 before all the fluid pressure PA is gone.

Accumulator pressure PA fluid is available in the Area 2 positioner solenoid control selector valve 2470 only when the saddle cart 2006 is fully retracted into Area 2. On the other hand, accumulator pressure fluid PA is always available on the rod side of the Area 2 positioner piston 2110 to keep the Area 2 positioner 2016 retracted when the saddle cart 2006 is moved out of the area.

In the event the position of the saddle cart 2006 does not directly correspond to the position required to operate the hydraulic components in Areas 1 and 2, these units will not operate. Thus, locking the loader chain 2004 in the desired position insures against misoperations if a jumper of sneak circuit in the electrical system energizes one of the pilot valve solenoids. The loader chain 2004 can also be mispositioned manually after maintenance or checkout procedures.

The chain track flame seal 2096 is operated by the flame seal piston 2098 which has unequal piston Areas, as shown best in FIG. 113. The bottom of the flame seal piston 2098 is designed for the smaller area. This bottom area of the flame seal piston 2098 is open to accumulator pressure PA at all times. The top of the flame seal piston 2098, on the other hand, is designed for the larger area. The top side of the flame seal piston 2098 is connected to the selector valve 2470 of the Area 2 positioner 2016.

The Area 2 positioner 2016, as previously described, maintains contact with the loader chain 2004, holding it fast, until the missile-booster combination 300 is ready to be transferred into Area 1. When the Area 2 positioner 2016 engages the loader chain 2004, pressure fluid is ported to the top side of the flame seal operating piston 2098. Since the area on top of the flame seal operating piston 2098 is larger than the area on the bottom thereof, the seal 2096 closes the track guide 2037. The flame seal operating piston 2098 is provided with the toggle spring 2091 which detents the seal 2096 open or closed, as the case may be, when the power is off.

*Area 2 positioner retracts*

The Area 2 positioner 2016 must next be retracted to release the loader chain 2004 to allow forward movement of the saddle cart 2006, either loaded or unloaded with a missile-booster combination 300. With Area 2 loaded with a missile-booster combination 300 and the forward and aft floating tracks 2017 and 2018, respectively, retracted, a signal is passed to energize the solenoid LCHB1, shown best in FIGS. 20 and 106B, to retract the Area 2 positioner 2016. When solenoid LCHB1 is energized, it causes the selector valve 2470 for the Area 2 positioner 2016 to move and detent. Solenoid LCHB1 is then de-energized as the piston 2110 of the Area 2 positioner 2016 retracts. The chain track flame seal piston 2098 then retracts simultaneously with the Area 2 positioner 2016, both of which are shown in FIGS. 39, 40, 41, 106A and 106B.

*Release of loader chain*

When the Area 2 positioner 2016 and the chain track flame seal 2096 are retracted, the loader chain 2004 is released from its locked position and the components of the loader trunk assembly are clear for the transfer of a missile-booster combination from Area 2 into the wing and fin assembly compartment 8010 or Area 1 for assembly of the wings 102 and fins 104 to the missile 100 and the fins 208 to the booster 200 to obtain the previously mentioned weapon 400.

The conditions are now ready for transferring the missile-booster combination 300 into Area 1. The Area 2 interlock valve 2026, shown best in FIGS. 19, 20, 106B, and 111B, will retract when the loader chain 2004 moves forward and shuts off the pressure fluid to the Area 2 hydraulic components.

*Area 2 to Area 1 load operation*

An electrical circuit is now opened to the clutch solenoid LCLB6, shown in FIG. 89A, so that the loader power drive 2010 is ready to operate and move the missile-booster combination from Area 2 into Area 1. At the same time suitable move loader forward and release pilot rack electrical circuits are initiated.

Figure 114:
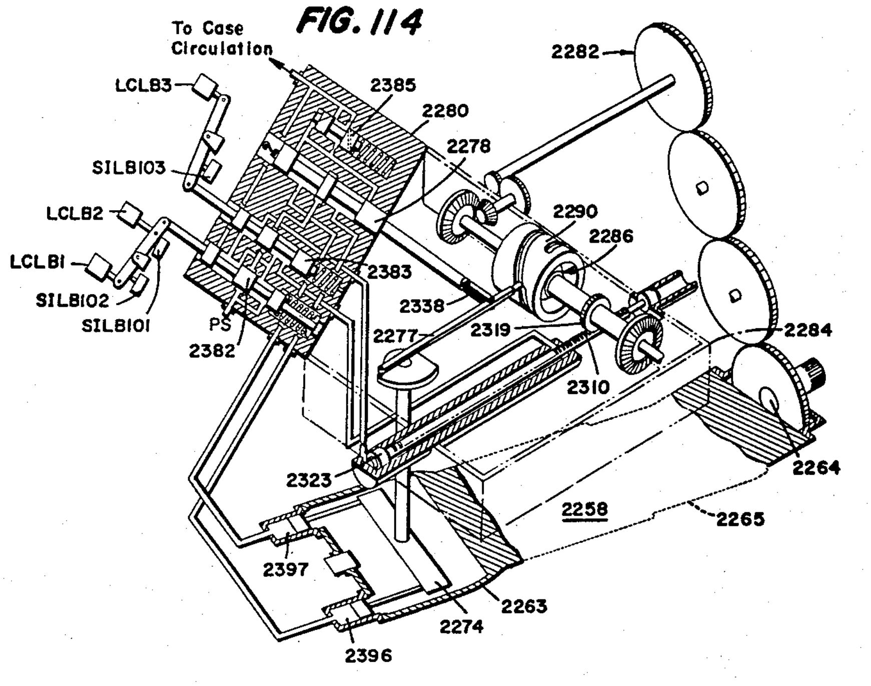

The energizing of solenoid LCLB1, shown best in FIGS. 78 and 106A, and FIGS. 114 through 124, shifts the loader selector valve 2382 to the position as shown in FIG. 114. The pilot rack solenoid LCLB3 is now energized by clutch solenoid LCLB1, through the switch SILB101. This moves the pilot rack piston 2323, shown in FIG. 115, as well as in FIG. 89. The pilot rack 2310 travels in a load direction, mechanically displacing the servo valve 2278, shown best in FIG. 115.

The loader selector valve 2382, illustrated in FIGS. 78 and 106A, determines the direction of travel of the pilot rack 2310 as well as the rotation of the power drive B-end shaft 2264 by opening both the servo hydraulic lines to the pilot piston shutoff valve 2383. The pilot piston shutoff valve 2383 now opens the hydraulic lines to the pilot rack piston 2323, with servo pressure fluid being ported through the valves 2382 and 2383 to both sides of the pilot rack piston 2323. Because of its differential area, the pilot rack piston 2323 moves in the load direction to the right in FIG. 114. With pilot rack piston 2323 moving in this direction, the loader power drive 2010 will move the saddle cart 2006 forward toward the launcher 5000.

Figure 115:
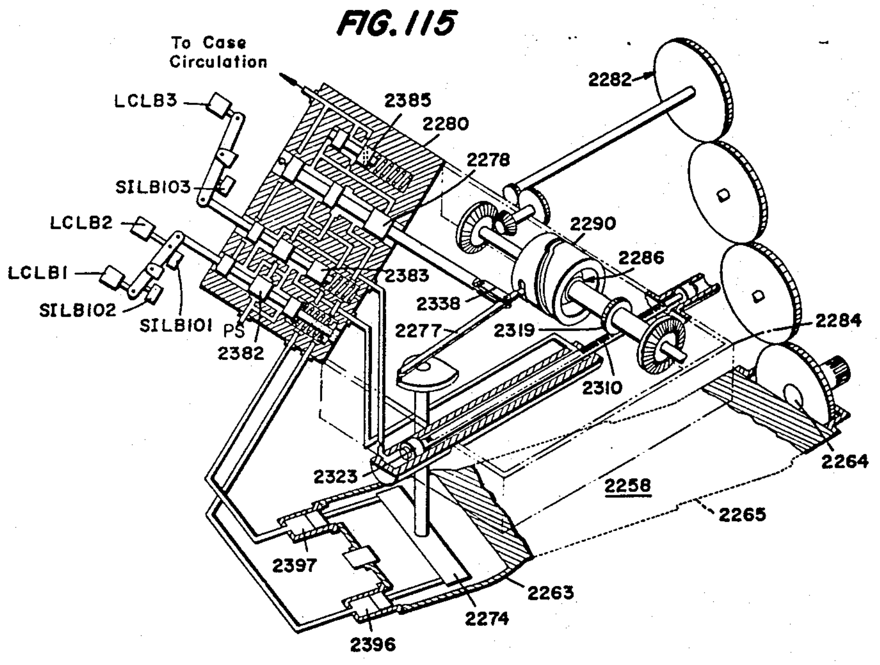

As pilot rack piston 2323 moves, as shown in FIG. 115, the pilot rack 2310 puts an input signal into the input element 2352, best shown in FIGS. 72 and 106B, of the differential 2286 in the gearbox 2284. This is accomplished by the teeth on the pilot rack 2310 meshing with the spur gear 2319 splined to the input element 2352 in the differential 2286, as shown in FIGS. 86, 106B, and 115. The spider 2351 in the differential 2286 rotates the control barrel cam 2290 off neutral. The control barrel cam 2290, in turn, shifts one end of the differential lever 2277, as shown in FIG. 115. The differential lever 2277, through the differential lever link 2338 shifts the servo valve 2278 in the control valve block 2280, as illustrated in FIG. 115.

Upon shifting the servo valve 2278 in the direction shown in FIG. 115, servo pressure fluid is ported to the stroking piston 2396, A-end 2263 of the hydraulic transmission 2258, and connects the stroking piston 2397 to the metering valve 2385 through the servo valve 2278. The metering valve 2385 in the control valve block 2280 now controls the flow of hydraulic fluid to cause circulation, as indicated in FIG. 115. This action puts the A-end tilt plate 2274 in the hydraulic transmission 2258, of FIGS. 5A, 72, and 92, on stroke to drive the B-end shaft 2264 which, in turn, rotates the chain or drive sprocket 2039 to move the loader chain 2004 and the saddle cart 2006.

By metering the tank fluid from the stroking piston 2397 through the metering valve 2385, the rate at which the A-end tilt plate 2274, through the stroking piston 2396, is put on stroke is determined. The metering of the fluid in this manner, in turn, determines the acceleration rate of the hydraulic transmission 2258 and its load.

Figure 116:
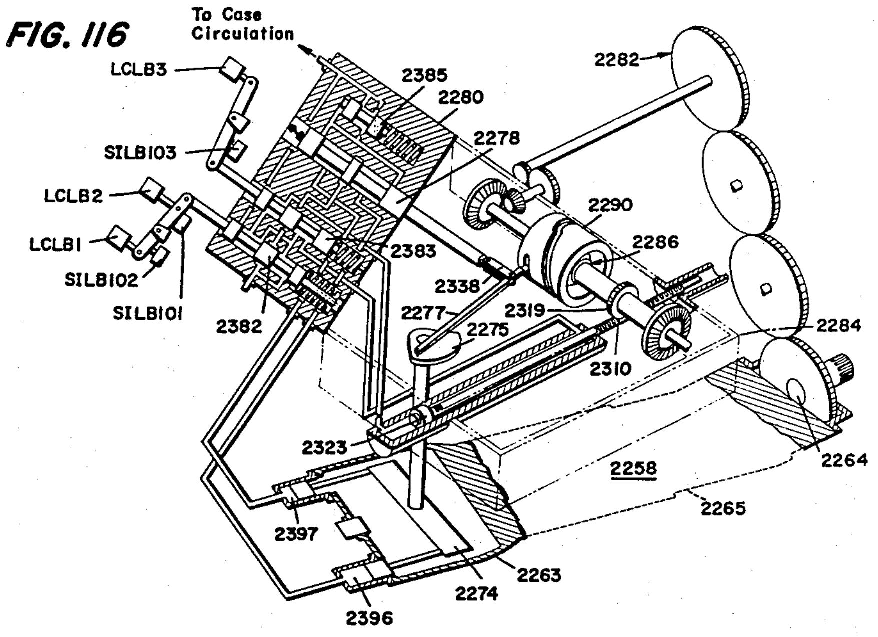

As the A-end tilt plate 2274 in the hydraulic transmission 2258 is moved on stroke, the A-end response cam 2275 moves with it, as shown in FIG. 92. As the A-end response cam 2275 turns, it also shifts one end of the differential lever 2277. The opposite end of the differential lever 2277 is shifted by the differential 2286 and the control barrel cam 2290 and it is shifted in the opposite direction. The movement of the A-end response cam 2275 on the differential lever 2277 moves the servo valve 2278 back to neutral, as indicated in FIG. 116. The A-end tilt plate 2274 remains on stroke, and it is held there by a variable pressure which is equal on both stroking pistons 2396 and 2397.

As the A-end tilt plate 2274 is put on stroke, the B-end shaft 2264 of the hydraulic transmission 2258 now rotates. The B-end output shaft 2264, which is coupled to the chain or drive sprocket 2039, now moves the loader chain 2004 and saddle cart 2006. The B-end response gearing assembly 2282, of FIGS. 78, 80, and 106B, which also meshes with the B-end output shaft 2264 rotates. The B-end response gear assembly 2282 is connected to the response element 2350 of the differential 2286 in the gearbox 2284, as shown in FIG. 116.

As the B-end 2265 rotates, its response gear train rotates the response element or gear 2350 in the differential 2286, shown in FIG. 106B. This response element 2350 in the differential 2286 is rotated in the opposite direction from the input element or gear 2352 rotated by the input signal of the pilot rack 2310. The output response of the B-end 2265 subtracts from the input signal of the pilot rack 2310 to determine the velocity of the saddle cart 2006.

It is to be pointed out that the input signal of the pilot rack 2310 leads the equivalent travel of the saddle cart 2006 of the loader 2002 by an amount which is proportional to the distance required to decelerate the saddle cart 2006 with its loader chain 2004 to a stop. While the saddle cart 2006 is traveling at constant velocity, the response input of the B-end matches or cancels out the signal input thereto.

Total travel of the pilot rack 2310 represents a signal equivalent to the total travel of the saddle cart 2006 and loader chain 2004 in moving from the ready service Area 2 to the launcher 5000. Since the missile-booster combination 300 must be stopped in Area 1 for wing and fin assembly, as previously pointed out, it is necessary to stop the motion of the pilot rack 2310 at the position which corresponds to the position of the saddle cart 2006 in Area 1. This is accomplished, as shown in FIG. 78, by the Area 1 pilot rack stop 2317. When the perforated guide 2332 on the pilot rack 2310 contacts the Area 1 pilot rack stop lever 2334, movement of the pilot rack 2310 is halted.

In this load cycle, with the saddle cart 2006 and its chain 2004 traveling at a constant velocity and approaching Area 1, the pilot rack piston 2323, continues to feed an input signal into the differential 2286 until it contacts the Area 1 pilot rack stop 2317 and its movement is halted. When the pilot rack piston 2323 stops, the deceleration cycle of the saddle cart 2006 and its chain 2004 begins.

Figure 117:
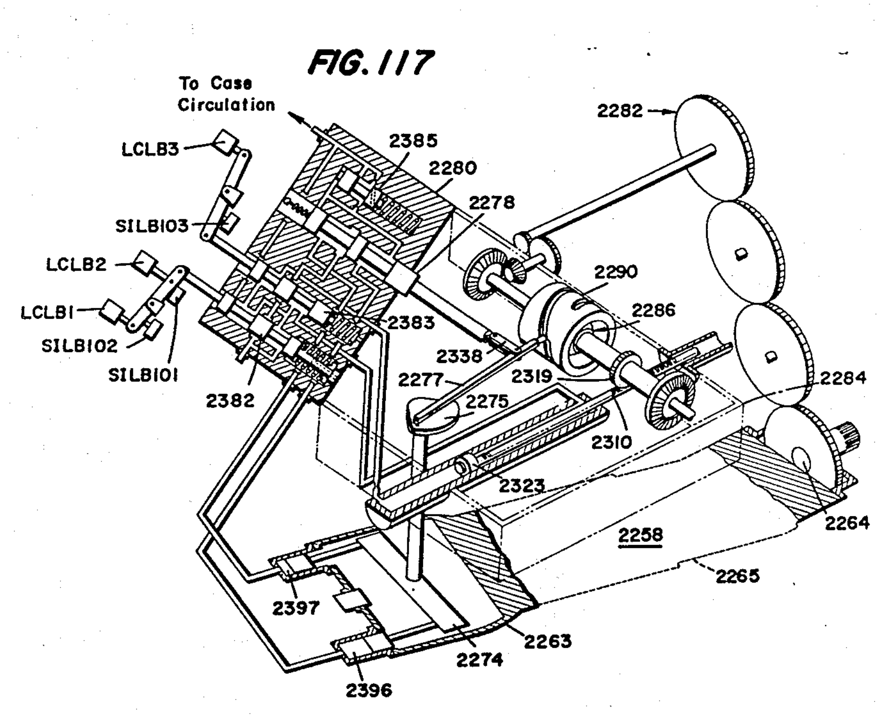

As the pilot rack 2310 stops, the response to the B-end 2265 continues to feed into the response element or gear 2350 of the differential 2286 to rotate the control barrel cam 2290 back to neutral, and it moves one end of the differential lever 2277 back. This action shifts the servo valve 2278, so that it ports servo pressure fluid to the stroking piston 2397 and connects the other stroking piston 2396 to case circulation through the metering valve 2385, as indicated in FIG. 117.

Figure 118:
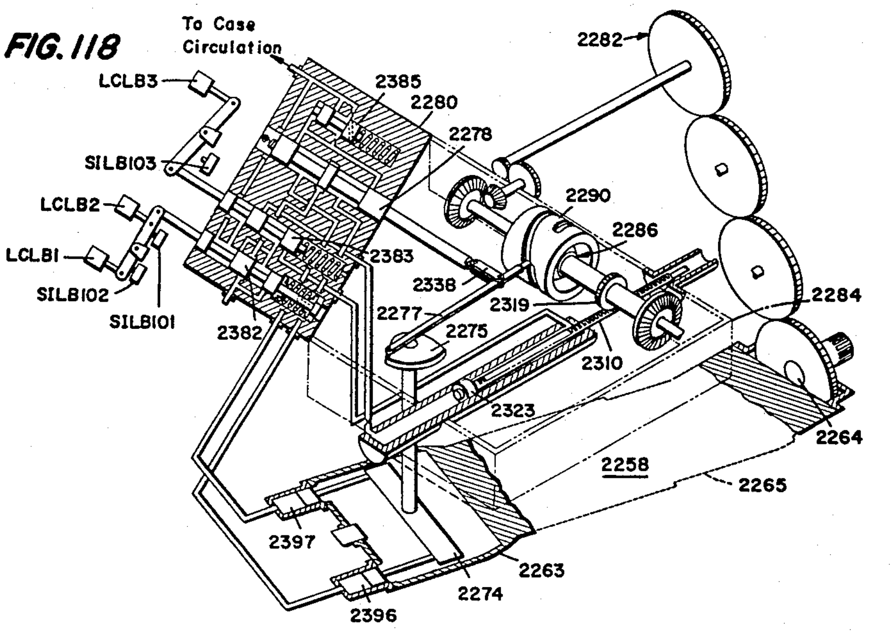

When stroking piston 2397 is moved, it rotates the A-end tilt plate 2274 back toward neutral. As the A-end tilt plate 2274 moves, the A-end response cam 2275 moves the other end of the differential lever 2277 in the opposite direction to the movement due to the control barrel cam 2290 so as to neutralize the servo valve 2278. These movements of the parts continue until the control barrel cam 2290, the A-end tilt plate 2274, and the servo valve 2278 are all on neutral and the hydraulic transmission 2258 has stopped with the chain 2004 and the saddle cart 2006 in the loaded position of Area 1, as indicated in FIG. 118.

When the saddle cart 2006 and its chain 2004 decelerates to a stop in Area 1, a circuit is closed to energize the solenoid LCLB6 to engage the local control clutch 2315, shown best in FIG. 106B. Another circuit opens to de-energize the solenoid LCLB1, shown in FIG. 106A. Loader selector valve 2382 then spring-returns to neutral. Solenoid LCLB3 is then de-energized by the movement of the solenoid LCLB1 and the pilot piston shutoff valve 2383 is spring-returned to neutral, with the loader power drive 2010 being now neutralized.

When the pilot rack 2310 contacts the Area 1 pilot rack stop lever 2334, the local control clutch 2315 is engaged before the hydraulic pressure is released from the pilot rack piston 2323 to lock the pilot rack 2310 and thereby prevent any bounce-back thereof.

*Saddle cart in Area 1*

Once the saddle cart 2006 and its chain 2004 are in the loaded position in Area 1, the Area 1 interlock cam follower roller 2045 hits the cutout in the cutout link 2104 of the loader chain 2004. This causes the Area 1 interlock valve 2024 to port accumulator pressure fluid to the Area 1 positioner solenoid controlled selector valve 2250, and the warmup contactor selector valve 2466, of FIGS. 106 and 110.

As a result, these selector valves 2250 and 2466, and allied components, are ready for their part in the automatic load cycle prior to the final transfer of the weapon 400 onto the guide arm 5002 of the launcher 5000.

*Hydraulics of the Area 1 and Area 2 interlock valves*

Areas 1 and 2 interlock valves 2024 and 2026, respectively, as previously explained, are mounted in the common valve block 2023 which is secured to the top of the sprocket and track housing 2036. Rollers 2045 are attached to the Areas 1 and 2 interlock valves 2024 and 2026 and they roll on the top edge of the loader chain links 2101, as shown in FIGS. 19 and 111B.

The top edge of the loader chain 2004 serves as a cam and the rollers 2045 as cam followers. Once the saddle cart 2006 is extended to the load position in Area 1, or retracted to the load position in Area 2, the notched or detented chain link 2101 moves correspondingly with the Area 2 interlock valve cam roller 2045. The spring-loaded roller 2045 then drops accordingly. As a result, the Area 2 interlock valve 2026 is extended. As shown in FIGS. 111, 111A, and 111B, this action will cause accumulator pressure fluid to be ported to the appropriate selector valves of the hydraulic components in that part of the loader assembly. When the loader chain 2004 is moved once again, either forward or aft, the roller 2045 rises out of the cutout of the cutout link 2104 causing the Area 1 or Area 2 interlock valves 2024 and 2026 to retract. This action cuts off the interlocked accumulator pressure fluid to the hydraulic components in that area.

*Operation of Area 1 hydraulic components*

With electrical circuitry assuring that the wing and fin assembly compartment 8010 of Area 1 is loaded with a missile-booster combination 300 in Area 1, and the saddle cart 2006 in Area 1, the Area 1 positioner extend control solenoid LCNB1 is then energized. When this occurs, accumulator pressure fluid PA is ported to the Area 1 positioner piston 2111 from the positioner solenoid controlled selector valve 2250, which is activated and detented. Pressure fluid is then ported to the top side of the Area 1 positioner piston 2111 to extend the Area 1 positioner 2030, with solenoid LCNB1 then being de-energized.

The Area 1 positioner 2030 is identical to the Area 2 positioner 2016, shown in FIG. 112, except for the shape of the switch actuator arms 2112 and 2113 protruding from their sides. Once the Area 1 positioner 2030 is extended, the loader chain 2004 is locked in the desired position for warmup, and assembly of the wings and fins to the missile-booster combination 300 to form a weapon 400.

A signal is now transmitted to the system and the solenoid LCMB2 is energized. This energizing of solenoid LCMB2 moves and detents the flametight door selector valve 2490, as shown in FIG. 110. Solenoid LCMB2 is then deenergized, and the metering valve 2494 is actuated. The velocity control valve 2493 is cam and spring actuated. Latch valve 2491 is held retracted by cam 2499 when the flametight door is open. As the flametight door operating piston 2496 is extended to close the flametight door 2028, the latch 2492 returns to a latched condition. The flametight door 2028 is then closed, and it seals off the wing and fin assembly compartment 8010 of Area 1 from the ready service compartment 8012 of Area 2.

Since the chain track flame seal 2096 operates independently of the flametight door 2028, it will remain open, and it will not close again until the loader chain 2004 and its saddle cart 2006 are retracted back into Area 2. With the assurance that the loader chain 2004 and saddle cart 2006 are in Area 1 and the Area 1 positioner 2030 is extended, a signal is passed to the solenoid LCOB1 which energizes and shifts the warmup contactor selector valve 2466. This valve 2466 causes the warmup contactor rack piston 2152 to shift and the Area 1 warmup contactor 2021 is extended. Solenoid LCOB1 is then de-energized, and the warmup contactor selector valve 2466 is detented. The contactor box 2148 is automatically aligned to the warmup contactor pad 106 of the weapon 400, as shown in FIG. 2. The Area 1 warmup contactor 2021 and the flametight door 2028 operate simultaneously in this sequence of operations.

*Hydraulics of Area 1 warmup contactor*

Area 1 warmup contactor 2021 is controlled by the previously mentioned solenoid-operated warmup contactor selector valve 2466, with that flow of accumulator pressure fluid being directed to either end of the warmup contactor rack piston 2152. As shown best in FIGS. 37, 42, and 43, the rack piston 2152 is in combination with a gear rack 2167. This gear rack 2167 engages a pinion 2168 and an extension of the pinion shaft 2169 which is coupled to the arm of the crank 2182. The connecting rod 2180, previously mentioned, is attached to the crank 2182. The connecting rod 2180 is linked to the electrical contactor box 2148. The contactor box 2148 is extended the required amount with a half turn rotation of the pinion shaft 2169 and the crank 2182. Sections of the loader chain tracks 2052 and 2054 are linked to the guide yoke 2154 and fold open when the contactor box 2148 extends.

In FIGS. 37 and 38, there is shown a schematic diagram of the warmup contactor 2021. The three-land warmup contactor selector valve 2466 directs accumulator pressure fluid to either end of the warmup contactor rack piston 2152. Orifices 2467 located in the separate hydraulic lines of the header tank 6010, control the flow of hydraulic fluid in the system. Both ends of the rack piston 2152 have hydraulic buffers 2170 that decelerate the warmup contactor rack piston 2152 to a stop. The motion of the warmup contactor piston or gear rack 2167 is almost at a constant velocity over the entire stroke. However, characteristics of the crank 2182 and connecting link 2180, in combination, give a certain harmonic motion to the movement of the contactor box 2148. In addition to the rotation described for the pinion shaft 2169 and crank 2182, there are four degrees of pretravel and four degrees of overtravel. This provides a locking feature of the Area 1 warmup contactor 2021 on either side of the common centerline. When the accumulator pressure fluid is off, the pressure-released spring-loaded pinion shaft detent 2153 engages a cam 2151 on the pinion shaft 2169 to prevent it from rotating. When the saddle cart 2006 is moved back into Area 2, the Area 1 interlock valve 2024 is retracted, and it shuts off accumulator pressure fluid necessary for operating the Area 1 warmup contactor 2021.

As previously mentioned, the contactor box 2148 is connected to the guide yoke 2154 through the universal alignment head 2155, with the guide yoke 2154 being attached to the end of a vertically mounted spindle 2171 through a semi-floating linkage. The spindle 2171 is vertically guided while the guide yoke 2154 slides in the gibs 2172 mounted on the trunk section VII, as shown in FIG. 43. The bottom end of the spindle 2171 is attached to the connecting rod 2180 through the overtravel spring 2184.

*Assembly of wings and fins in Area 1*

The wings 102 and fins 104 for the missile 100 and the fins 208 for the booster 200 are manually installed on the missile-booster combination 300 to complete the assembly of the weapon 400. As each assembly crewman completes his phase of assembling a wing 102 or fin 104 or 208, he depresses a foot or ready switch which energizes a signal light on control panel EP5, shown in FIG. 129. The switches are located at each station of the assembler 3000. An emergency bypass switch is also provided in the electrical system. When the assembly of the wings 102 and fins 104 and 208 are completed, the missile-booster combination 300 has been transformed into a weapon 400 ready for transfer to the launcher 5000 for target designation and firing thereof.

*Opening of blast doors*

After a short time delay, a circuit is operated to energize solenoid LCPB1 to open the lower blast door 4002, shown best in FIGS. 4A, 6A, and 8. The directional selector pilot valve for the lower blast door 4002 is shifted by solenoid LCPB1 and it detents. This action de-energizes the solenoid LCPB1. At the same time, the latches for the lower blast door 4002 are retracted and the valves therefor port pressure fluid to lower door directional valves. One directional valve ports pressure fluid to the small area sides of the two lower power pistons, while the other directional valve ports pressure fluid to a lower door metering valve. The metering valve ports a volume of pressure fluid to the large area sides of the lower blast door power pistons to open the lower blast door 4002.

An additional time delay circuit for the upper blast door 4004 is also satisfied when solenoid LCPB3 is energized, which opens the upper blast door 4004. When the solenoid LCPB3 is energized, it shifts the directional selector pilot valve for the upper blast door 4004. After actuating, this directional selector valve detents and solenoid LCPB3 is de-energized. The valve for the safety latch for the upper blast door 4004 is moved to port hydraulic pressure fluid to the guide arm latch tripping valve. This action releases the span track-guide arm latch. The upper door directional valves are also then actuated. One of the upper door directional valves ports pressure fluid to the small area sides of the upper blast door power pistons, while the other upper door directional valve then ports pressure fluid to the upper door metering valve. The metering valve then ports a volume of hydraulic fluid to the large area sides of the upper blast door power pistons. This action opens the upper blast door 4004.

After the upper blast door 4004 is opened, the guide arm latch tripping valve is mechanically shifted when the span track 4200 contacts the guide arm 5002 of the launcher 5000. This action ports pressure fluid to the large area side of the span track-guide arm latch piston. This span track-guide arm latch piston is then shifted to latch the span track 4001 to the guide arm 5002 of the launcher 5000.

When the upper blast door 4004 opens, the span track 4200, which is attached to the upper blast door 4004 engages the span track-loader latch located in the trunk section VIII. At the end of the opening movement of the upper blast door 4004, the latch secures the span track 4001, thus preventing any undesirable motion which would hinder the smooth transfer of the weapon 400 to the guide arm 5002 of the launcher 5000.

*Hydraulics of the span track-loader latch*

The span track-loader latch is linked to a latch piston which is spring-loaded in the extend direction. Hydraulic fluid tank pressure is constant on the latch piston. In a normal extended position, the latch piston is connected to the hydraulic fluid of the header tank 6010 of the accumulator 6000.

In a load cycle, the solenoid LCPB3 actuates the pilot valve which ports pressure fluid to the smaller area of the latch piston. As a result, the latch piston is retracted along with the downward moving pressure of the span track 4200 against the cam surface of the latch. The latch snaps back into place over the span track latch roller due to the action of a spring. At the end of a cycle, the accumulator pressure fluid must be ported out of the smaller end of the latch piston. This action signals the upper door power pistons and a closing action of the blast doors 4000 is begun. The blast doors 4000 will not close unless the span track-loader latch 4300 is retracted.

*Retracting of Area 1 components*

After the missile warmup solenoid LCOB2 is energized to shift the warmup contactor rack piston 2152 through the selector valve 2466, as shown in FIG. 106. Solenoid LCOB2 is then de-energized, and the warmup contactor selector valve 2466 is detented. This sequence of operation then retracts the Area 1 warmup contactor 2021.

Now, circuitry establishing that wing and fin assembly is complete and that Area 1 contactor 2021 is retracted, energizes solenoid LCNB2 and causes the Area 1 positioner piston 2111 to retract through the Area 1 positioner solenoid controlled selector valve 2250, as shown in FIG. 37. The Area 1 positioner 2030 is then retracted to release the loader chain 2004 from the Area 1 load position. Solenoid LCNB2 is then de-energized and the selector valve 2250 is detented.

*Loader power drive—Area 1 to launcher*

The operation of the loader power drive 2010 in moving a weapon 400 from Area 1 onto the launcher 5000 is much the same as moving a missile-booster combination 300 from Area 2 to Area 1, except different interlock circuits are involved. The retraction of the Area 1 positioner 2030, together with safety interlock conditions satisfied, the loader power drive 2010 is ready to operate and move the saddle cart 2006 and the loader chain 2004 from Area 1 onto the launcher 5000.

This signal circuitry de-energizes the loader clutch solenoid LCLB6 shown in FIG. 106B. It also initiates certain release Area 1 stop, move saddle cart forward, and release pilot rack circuits to energize the loader selector solenoid LCLB1 for forward movement of the saddle cart 2006 with its loader chain 2004.

When solenoid LCLB1 is energized, it shifts the loader selector valve 2382 in the arrowed direction shown in FIG. 114. The pilot rack release solenoid control LCLB3 is then energized by solenoid LCLB1 through the switch SILB101. This moves the pilot rack piston 2323. The pilot rack 2310 then travels in a load direction, mechanically displacing the servo valve 2278.

The loader selector valve 2382 is then shifted to open both hydraulic servo pressure lines to the pilot piston shutoff valve 2383. The direction in which the loader selector valve 2382 is shifted determines which direction the pilot rack 2310 and the saddle cart 2006 and its loader chain 2004 will travel. Pilot piston shutoff valve 2383 then shifts to open the hydraulic lines to the pilot rack piston 2323. Since servo pressure fluid is ported to both sides of the pilot rack piston 2323, it moves to the right, as shown in FIG. 114, because of the differential area of the piston.

As pilot rack piston 2323 moves, the pilot rack 2310 puts an input signal into the input element 2352 of the differential 2286 in the gearbox 2284. The spider in the differential 2286 rotates the control barrel cam 2290 off its neutral position. The control barrel cam 2290, in turn, shifts one end of the differential lever 2277, as shown in FIG. 115. The differential lever 2277, through the differential lever link 2338, shifts the servo valve 2278 in the control valve block 2280.

Upon shifting the servo valve 2278 in the direction indicated, servo pressure fluid is ported to the stroking piston 2396 of the A-end 2263 of the hydraulic transmission 2258 and it connects the stroking piston 2397 to the metering valve 2385 through the servo valve 2278. The metering valve 2385 in the control valve block 2280 controls the flow of hydraulic fluid to case circulation. The A-end tilt plate 2274 is then put on stroke to drive the shaft 2264 of the B-end 2265, which, in turn, rotates the chain or drive sprocket 2039 to move the loader chain 2004 and the saddle cart 2006.

Metering the hydraulic fluid from the stroking piston 2397 to tank, through the metering valve 2385, determines the rate at which the A-end tilt plate 2274 is put on stroke by the stroking piston 2396. This action controls the acceleration rate of the hydraulic transmission 2258 and its load.

As the A-end tilt plate 2274 is moved on stroke, it, in turn, moves the A-end response cam 2275 with it, as best shown in FIGS. 106A and 106B. As the A-end response cam 2275 turns, it also shifts one end of the differential lever 2277. The opposite end of differential lever 2277 is shifted by the control barrel cam 2290. The movement of the A-end response cam 2275 on the differential lever 2277 moves the servo valve 2278 back on neutral. This action leaves the A-end tilt plate 2274 on stroke with a variable pressure which is equal on both stroking pistons 2396 and 2397, and holds it there, as shown in FIG. 116.

As the A-end tilt plate 2274 is put on stroke, the B-end 2265 rotates. The output shaft 2264 of the B-end 2265 rotates the chain or drive sprocket 2039 to move the loader chain 2004 and the saddle cart 2006. The gearing assembly 2282 also turns to rotate the response element 2350 of the B-end in the differential 2286, as shown in FIG. 117. The response element 2350 is rotated in the opposite direction from the input element 2352 of the differential 2286 to determine the error. At constant velocity, the response matches or cancels out the input. Since travel distance is needed to decelerate the saddle cart 2006 and its loader chain 2004 to a stop, the input leads the response by an amount which is proportional to the travel required to decelerate to a stop at a rate determined by the contour of the barrel cam 2290.

To move a weapon 400 from Area 1 to the launcher 5000, the pilot rack 2310 travels 3.326 feet to 46 feet of travel of the loader chain 2004. When the pilot rack 2310 stops, the loader chain 2004 travels an additional eight (8) feet during the deceleration cycle of the saddle cart 2006 and the loader chain 2004. Therefore, the pilot rack 2310 leads the response of the B-end 2265 by an amount proportional to this eight (8) feet.

In this part of the load cycle, pilot rack piston 2323 moves the pilot rack 2310 until its leading end contacts the pressure-loaded creepage control piston 2093. Since the pilot rack 2310 is unable to move the creepage control piston 2093, it stops. When the pilot rack 2310 stops, there is no input signal going into the differential 2286. The response due to the rotation of the B-end 2265, through the response element 2350 of the differential 2286, winds the control barrel cam 2290 back toward neutral to begin the deceleration cycle of the saddle cart 2006 and its loader chain 2004.

As the control barrel cam 2290 rotates toward neutral, it shifts one end of the differential lever 2277 and the servo valve 2278 is moved so that servo pressure fluid is ported to the stroking piston 2397. The other stroking piston 2396 is connected to case circulation through the metering valve 2385 and the servo valve 2278. As stroking piston 2397 moves the A-end tilt plate 2274 back toward neutral, the A-end tilt plate 2274, in turn, rotates the A-end response cam 2275 so that the other end of the differential lever 2277 tends to neutralize the servo valve 2278, as shown in FIG. 118.

As the floating cam 2214 of the saddle cart 2006 hits the guide arm stopping bar 5111 and the saddle cart 2006 with its loader chain 2004 stops at the launcher 5000, electrical circuitry is then closed to energize the solenoid LCLB6 to engage the local control friction clutch 2364 and open a relay to de-energize the solenoid LCLB1. Loader selector valve 2382 then spring-returns to neutral. Solenoid LCLB3 is then de-energized by the movement of the solenoid LCLB1. The pilot piston shutoff valve 2383 spring-returns to neutral, with the loader power drive 2010 being now neutralized.

When the pilot rack 2310 reaches the end of its travel, the friction clutch 2364 is engaged by the solenoid LCLB6 before the hydraulic pressure fluid is released from the pilot rack piston 2323. This action locks the pilot rack 2310 to prevent any bounce-back thereof.

*Creepage control piston on guide arm*

The creepage control piston 2093 is contacted by the pilot rack piston 2323 at the end of its travel. Once the pilot rack piston 2323 contacts the creepage piston 2093, the loader chain 2004 and saddle cart 2006 decelerate until they are eight (8) inches from the end of travel. Pressure fluid is then released to the rear of the creepage piston 2093. The loader chain 2004, combined with the action of the pilot rack 2310, will creep forward at the required velocity during the last eight (8) inches of travel thereof. The orifice plug 2439 in the line from the rear of the creepage piston 2093 controls this rate of creepage. Piston pressure fluid is ported to the header tank 6010 of the accumulator 6000 through the creepage control valve 2092. This creepage control valve 2092 is actuated by the cam roller 2114 which maintains contact with the loader chain 2004 throughout its cycle of operation. The special chain cutout links 2104 are detented to actuate the cam roller 2114 at the required time.

*Transferring a weapon from the saddle cart to guide arm*

Electrical circuits are now satisfied to energize a solenoid to extend a reverse motion latch. As the reverse motion latch extends to latch the weapon 400 onto the launcher guide arm rail, this latch also raises the forward motion pawl 2007 of the saddle cart 2006 up over the aft booster shoe 204. This action allows for clearance and retraction of the saddle cart 2006 and its loader chain 2004 back into Area 1.

*Automatic reverse cycle—Saddle cart empty*

An automatic reverse cycle results from primarily two conditions, namely that of the reverse motion latch extended, and the saddle cart 2006 at the launcher 5000. Once the chain pawl 2007 has been freed from the aft booster shoe 204 by the action of extending the reverse motion latch, a control circuit signal is transmitted that all is in readiness for moving the saddle cart 2006 and its loader chain 2004 back into Area 1.

*Loader power drive—Launcher to Area 1*

Figure 119:
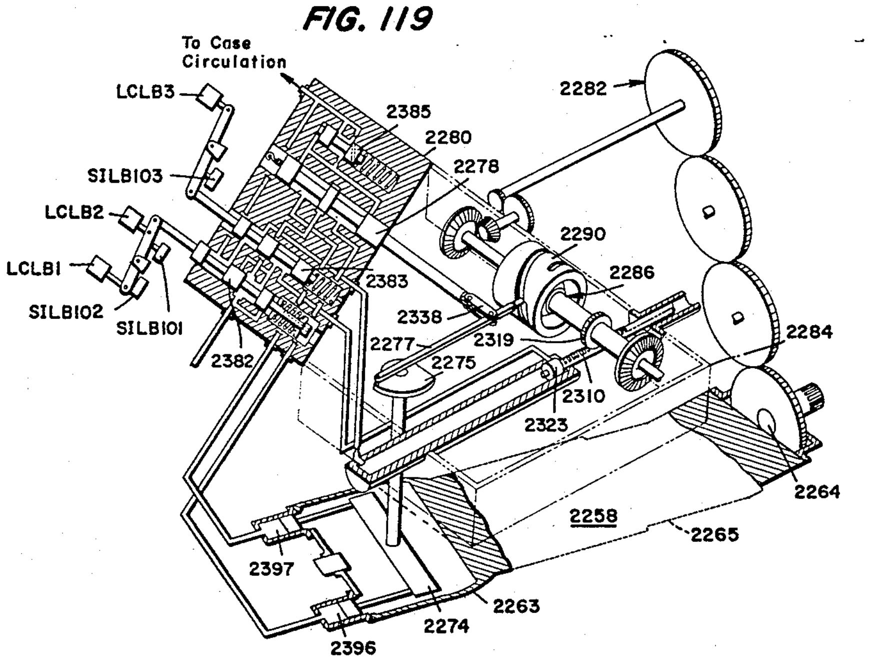

The clutch solenoid LCLB6 is thereby de-energized to release the friction clutch 2364. Retract saddle cart and release rack circuits are also initiated at this time by a relay. Upon energizing solenoid LCLB2, the loader selector valve 2382 is actuated, as shown in FIG. 119. The pilot rack release solenoid LCLB3 is then energized by solenoid LCLB2, through switch SILB102, with the pilot piston shutoff valve 2383 being actuated, as shown in FIG. 119.

The loader selector valve 2382 determines the direction of travel of the pilot rack 2310 and the rotation of the loader power drive 2010. With the loader selector valve 2382 in the position shown in FIG. 119, only one servo line is opened to the pilot piston shutoff valve 2383, with the other line being connected to tank. With valve 2383 actuated as shown in FIG. 119, both hydraulic lines to the pilot rack piston 2383 are opened. Because of the position of the selector valve 2382, servo pressure fluid is ported only to the rod side of the pilot rack piston 2323, and the other side is connected to tank through the valves 2383 and 2382. Therefore, the pilot rack 2310 travels to the left in "retract" in FIG. 119. With the rack piston 2323 moving in this direction, the loader power drive 2010 will move the saddle cart 2006 with its loader chain 2004 back into Area 1.

Figure 120:
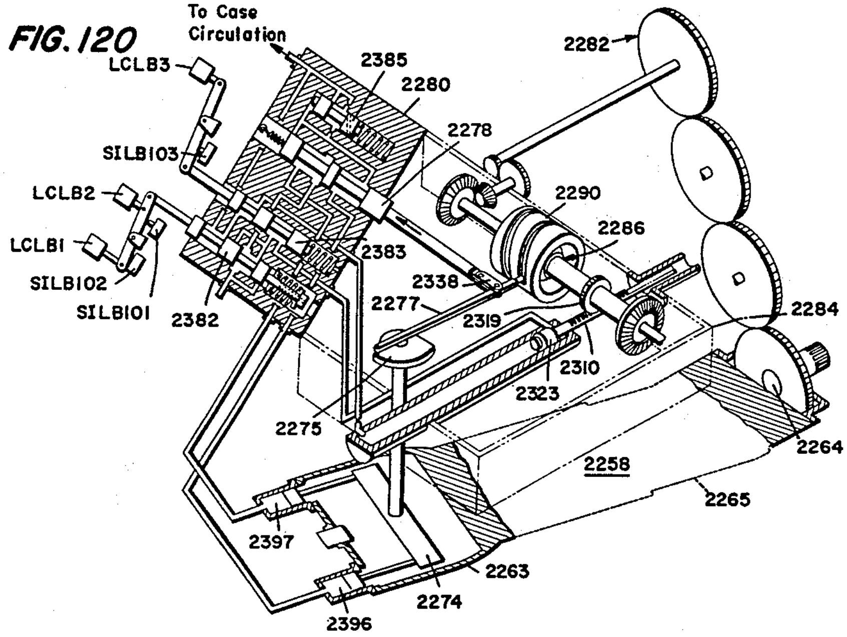

The pilot rack piston 2323 moves, the pilot rack 2310 feeds an input signal into the input element 2350 of the differential 2286. The differential 2286 then rotates the control barrel cam 2290 off of its neutral position. The control barrel cam 2290, in turn, shifts one end of the differential lever 2277, as shown in FIG. 120. The differential lever 2277, through the differential lever link 2338, actuates the servo valve 2278 in the control valve block 2280, also shown in FIG. 120.

Shifting the servo valve 2278 in the direction indicated in FIG. 120, servo pressure fluid is ported to the stroking piston 2397. The other stroking piston 2396 is connected to tank through the metering valve 2385. The metering valve 2385 is actuated to the position shown. This action puts the A-end tilt plate 2274 on stroke to drive the B-end 2265 which, in turn, rotates the chain or drive sprocket 2039 to move the saddle cart 2006 and its loader chain 2004 back into Area 1 from the launcher 5000.

Upon metering the tank fluid from the stroking piston 2396 through the metering valve 2385, the rate at which the A-end tilt plate 2274, through the stroking piston 2397, is put on stroke is determined. This action determines the acceleration rate of the hydraulic transmission 2258 and the loader chain 2004 with its saddle cart 2006. The components of the loader power drive 2010 are designed to move the empty saddle cart 2006 with the loader chain 2004 at fourteen (14) feet per second.

Figure 121:
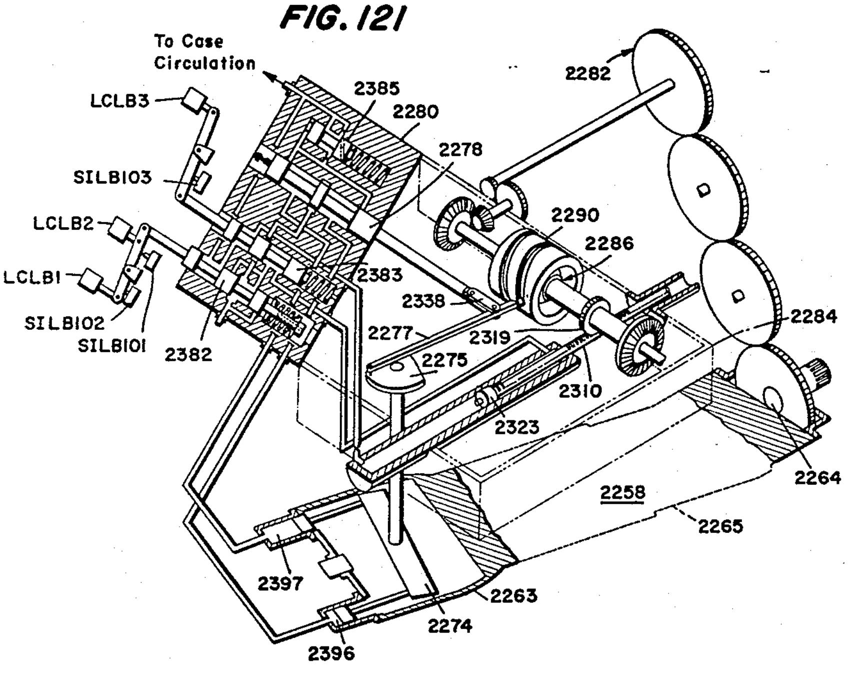

As the A-end tilt plate 2274 is moved on stroke, the A-end response cam 2275 moves with it, as shown in FIG. 121. As the A-end response cam 2275 turns, it also shifts one end of the differential lever 2277 to move the servo valve 2278 back on neutral. The A-end tilt plate 2274 remains on stroke, and it is held there by a variable pressure which is equal on both stroking pistons 2396 and 2397, as shown best in FIG. 121.

As the A-end tilt plate 2274 is put on stroke, the B-end 2265 rotates. The output shaft 2264 of the B-end 2265 moves the loader chain 2004 and the saddle cart 2006 through the chain or drive sprocket 2039. The B-end response gearing assembly 2282, which also meshes with the B-end output shaft 2264, then rotates. The other end of the B-end response gearing assembly 2282 is connected to the response element 2350 of the differential 2286, as shown in FIG. 106B.

As the B-end 2265 rotates, its response gearing assembly 2282 rotates the response element 2350 in the differential 2286 in the opposite direction from the input element 2352 which is rotated by the pilot rack 2310. Pilot rack piston 2323 continues to feed an input signal into the differential 2286 until it contacts the Area 1 stop lever 2334 and its movement is halted. When the rack piston 2323 stops, the deceleration cycle of the saddle cart 2006 and the loader chain 2004 begin.

As the input signal to the pilot rack 2310 stops, the response of the B-end 2265 continues to feed into the response element 2350 of the differential 2286 to rotate the control barrel cam 2290 back to neutral. As the control barrel cam 2290 rotates toward neutral, it moves one end of the defferential lever 2277. This action shifts the servo valve 2278 so that it ports servo pressure fluid to the stroking piston 2396 and connects the other stroking piston 2397 to tank through the metering valve 2385 shown in FIG. 122.

Figure 123:
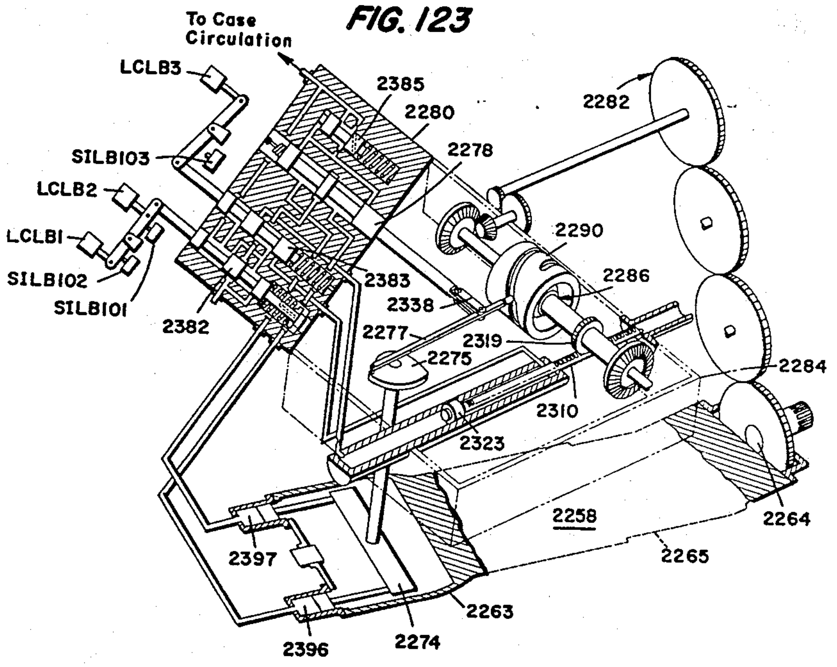

As the loader selector valve 2382 moves, it rotates the A-end tilt plate 2274 toward neutral. As the A-end tilt plate 2274 moves, it, in turn, rotates the A-end response cam 2275. The A-end response cam 2275 shifts the other end of the differential lever 2277 to neutralize the servo valve 2278. These movements continue until the control barrel cam 2290, A-end tilt plate 2274, and the servo valve 2278 are all on neutral and the hydraulic transmission 2258, that is, the output of the B-end 2265 has stopped with the saddle cart 2006 and the loader chain 2004 in Area 1. As the saddle cart 2006 and loader chain 2004 decelerate to a stop in Area 1, circuitry is completed to energize the solenoid LCLB6 to engage the friction clutch 2364 and to de-energize the selector solenoid LCLB2. Selector valve 2382 then spring-returns to neutral. Pilot valve solenoid LCLB3 is then de-energized by the movement of the solenoid LCLB2, through the switch SILB102. The pilot piston shutoff valve 2383 spring-returns to neutral, as shown in FIG. 123, with the loader power drive 2010 being now neutralized.

*Closing blast doors*

Interlock circuitry to assure that the launcher rail 5010 is empty and the blast doors 4000 are cleared energizes the solenoid LCPB4 to close the upper blast door 4004.

Upon energizing the solenoid LCPB4, the directional selector valve 4272 for the upper blast door 4004 is actuated. This action retracts the door open latch 4306 and ports hydraulic fluid to the larger valve area of the safety latch to tank, with the selector valve detenting and also releasing the span track-to-guide arm latch. Now, solenoid LCPB4 is then de-energized, with the door open latch piston being retracted to port hydraulic fluid to the upper door directional valves.

The upper door directional valves are then actuated in opposite directions. One of these valves ports hydraulic fluid to the small area sides of the upper door power pistons. These power pistons port hydraulic fluid at the larger area sides thereof through the upper door metering valve. The metering valve then ports this hydraulic fluid through the other upper door directional valve. This upper door directional valve, in turn, ports the hydraulic fluid to the header tank 6010 of the accumulator 6000. This action closes and latches the upper blast door 4004.

Interlock switch conditions are also satisfied to energize the solenoid LCPB2 to close the lower blast door 4002. When the solenoid LCPB2 is energized to close the lower blast door 4002, the directional selector pilot valve is actuated to retract the door open latch rollers and to port hydraulic fluid to the upper end of the door open latches. The pilot valve is then detented and solenoid LCPB2 is de-energized. The door open latches port hydraulic fluid to the lower door directional valves to actuate them in opposite directions.

One of the lower door directional valves then ports hydraulic fluid to the small area sides of the lower door power pistons. The lower door operating pistons, in turn, port hydraulic fluid from the large area sides to the lower door metering valve. This lower door metering valve ports hydraulic fluid through the lower door directional valve. The directional valve now ports the hydraulic fluid to the header tank 6010. This action closes and latches the lower blast door 4002.

During an automatic unload cycle of a weapon 400 or missile-booster combination 300, the loader power drive 2010 controls all deceleration of the loader chain 2004 and its saddle cart 2006. The creepage control valve 2092 remains inactive during the unload cycle. During all reverse or unload cycles, whether in "AUTOMATIC," "STEP," or "MANUAL," the chain track flame seal 2096, the Area 1 positioner 2030, and the Area 1 warmup contactor 2021 remain retracted in stowed-at-load positions.

*Opening of flametight door*

Now with electrical interlock circuitry signalling that the blast doors 4000 are closed and the saddle cart 2006, with its loader chain 2004, is in Area 1, solenoid LCMB1 is energized to open the flametight door 2028. As shown in FIG. 110, when solenoid LCMB1 is energized, the flametight door solenoid operated selector valve 2490 is actuated and detented with solenoid LCMB1 being then de-energized. Now the latch valve 2491 for the flametight door 2028 is actuated to release the latch 2492 and to port a return volume of hydraulic fluid to the velocity control valve 2493. Valve 2493 is actuated by the control cam 2499 to port a volume of hydraulic fluid to the metering valve 2494. The metering valve 2494, working along with the variable orifice effect of velocity control valve 2493, causes the flametight door operating piston 2496 to shift. The flametight door operating piston 2496 retracts and the flametight door 2028 is opened.

*Loader power drive Area 1 to Area 2*

Furthermore, Area 1 to Area 2 interlock circuitry is now energized and the loader power drive 2010 is ready to operate and bring the saddle cart 2006 and loader chain 2004 back from Area 1 into Area 2 by the release of the Area 1 stop lever 2334 through the solenoid LCLB5, shown best in FIG. 106B.

At the same time, the clutch solenoid LCLB6 is de-energized and the loader selector solenoid LCLB2 is actuated, as shown best in FIG. 106A. Upon energizing the solenoid LCLB2, the loader selector valve 2382 is actuated, as shown in FIG. 119. The pilot rack release solenoid LCLB3 is then energized by solenoid LCLB2, through the switch SILB102, and the pilot piston shutoff valve 2383 is actuated, as shown in FIG. 119. The loader selector valve 2382 determines the direction of travel of the pilot rack 2310 and the direction of rotation of the loader power drive 2010. With valve 2382 in the position shown in FIG. 119, only one servo line is opened to the pilot piston shutoff valve 2383, with the other side being connected to tank. With valve 2383 actuated, as shown in FIG. 119, both hydraulic lines to the pilot rack piston 2323 are opened. Because of the position of the valve 2382, servo pressure fluid is ported only to the rod side of the pilot rack piston 2323, with the other side thereof being connected to tank through the valves 2383 and 2382. Therefore, the pilot rack 2310 travels in the left or retract direction in FIG. 119. With piston 2323 moving in this direction, the loader power drive 2010 will move.

As piston 2323 moves, the pilot rack 2310 feeds an input signal into the input element 2350 of the differential 2286, as shown in FIG. 106B. The input element 2350 rotates the control barrel cam 2290 off of its neutral position. As the control barrel cam 2290 is rotated off neutral, it shifts one end of the differential lever 2277, as shown in FIG. 120. The differential lever 2277, through the differential lever link 2338 actuates the servo valve 2278 in the control valve block 2280.

Upon shifting the servo valve 2278 in the direction indicated in FIG. 120, servo pressure fluid is ported to the stroking piston 2397 and it connects the other stroking piston 2396 to tank, through the metering valve 2385. The metering valve 2385 is then actuated, as shown in FIG. 120. The A-end tilt plate 2274 remains on stroke and it is held thereby by a variable pressure which is equal on both stroking pistons 2396 and 2397.

Upon metering the tank fluid from the stroking piston 2396 through the metering valve 2395, the rate at which the A-end tilt plate 2274, through the piston 2397, is put on stroke is determined. This action determines the acceleration rate of the hydraulic transmission 2258 and the loader chain 2004 and its saddle cart 2006. The components of the loader power drive 2010 are designed to move the empty saddle cart 2006 and the loader chain 2004 at a maximum velocity of fourteen (14) feet per second, as previously pointed out.

As the A-end tilt plate 2274 is moved on stroke, the A-end response cam 2275 moves with it, as shown in FIG. 121. As the A-end response cam 2275 turns, it also shifts one end of the differential lever 2277 to move the servo valve 2278 back on neutral, as shown in FIG. 121. This action leaves the A-end tilt plate 2274 on stroke with a variable pressure which is equal on both stroking pistons 2396 and 2397 to hold it there, as shown in FIG. 121.

As the A-end tilt plate 2274 is put on stroke, the B-end 2265 rotates. The B-end output shaft 2264 moves the loader chain 2204, with its saddle cart 2006, through the chain or drive sprocket 2039. The B-end response gearing assembly 2282, which also meshes with the B-end output shaft 2264, rotates. The other end of the B-end response gearing assembly 2282 is connected to the response element 2350 of the differential 2286, as shown in FIGS. 106B and 121.

As the B-end 2265 rotates, its response gear assembly 2282 rotates the response element 2350 in the differential 2286, but in the opposite direction from the input element 2352 which is rotated by the pilot rack 2310. The pilot rack 2310 continues to feed an input signal into the differential 2286 until it contacts the end of its left pilot rack cylinder 2325 and its movement is halted. When the pilot rack 2310 and piston 2323 stop, the deceleration cycle for the saddle cart 2006 and loader chain 2004 begins.

Figure 122:
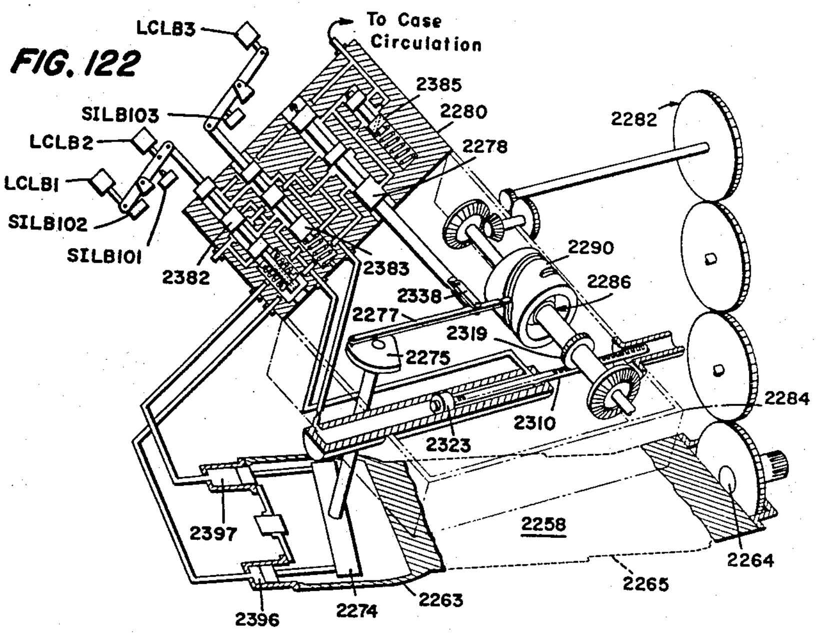

As the input signal stops (pilot rack), the response of the B-end 2265 continues feeding into the response element 2350 of the differential 2286 to rotate the control barrel cam 2290 back to neutral. As the control barrel cam 2290 rotates toward neutral, it moves one end of the differential lever 2277. This action shifts the servo valve 2278 to port servo pressure fluid to the stroking piston 2396 and it connects the other stroking piston 2397 to tank through the metering valve 2385, as shown in FIG. 122.

The movement of the loader selector valve 2382 rotates the A-end tilt plate 2274 toward neutral. The A-end tilt plate 2274 then rotates the A-end response cam 2275. The A-end response cam 2275 then shifts the other end of the differential lever 2277 to neutralize the servo valve 2278. This action continues until the control barrel cam 2290, the A-end tilt plate 2274, and the servo valve 2278 are all on neutral and the hydraulic transmission 2258, that is, the output of the B-end 2265, is stopped with the saddle cart 2006 and the loader chain 2004 in Area 2.

As the saddle cart 2006 and loader chain 2004 decelerate to a stop in Area 1, electrical circuitry closes to energize the solenoid LCLB6 to engage the friction clutch 2364 which, in turn, de-energizes the selector solenoid LCLB2. Loader selector valve 2382 then spring-returns to neutral with the shutoff solenoid LCLB3 being de-energized by the solenoid LCLB2, through the switch SILB102B. Valve 2383 then spring-returns to neutral, as shown in FIG. 123. The loader power drive 2010 is now neutralized.

*Saddle cart back in Area 2*

Upon stopping in Area 2, the saddle cart 2006 and loader chain 2004 are once again in a stowed-at-load position on the aft floating track 2018. At the same time the saddle cart 2006 stops, the cam roller 2045 of the Area 2 interlock valve 2026 hits the detent cutout 2104 in that part of the loader chain 2004, as best shown in FIG. 111B. This puts Area 2 hydraulic components on a ready basis for a second load order of a missile-booster combination 300.

Now with circuits indicating that the saddle cart 2006 and its loader chain 2004 are are retracted to Area 2, the center hoists 508 and 509 down and their locks extended, conditions are satisfied for the flametight door 2028 to close. As shown best in FIG. 110, solenoid LCMB2 is energized to close the flametight door 2028. Upon energizing the solenoid LCMB2, the flametight door selector valve 2490 is actuated and detented. Solenoid LCMB2 is then de-energized and the metering valve 2494 is actuated. Since the velocity control valve 2493 is cam and spring actuated, it actuates the latch valve 2491 for the flametight door 2028. As the flametight door operating piston 2496 is extended to close the flametight door 2028, the flametight door latch 2492 returns to a latch position.

Should another load order be in existence before the return of the saddle cart 2006 and its loader chain 2004 to Area 2, the flametight door 2028 will remain open. This is provided for in the door opening circuitry to indicate that the load is neither a missile-booster combination 300S or 300W. A new load would be one of these missile-booster combinations, that is, 300S or 300W. In that case, the flametight door closing circuit would not prevail and the flametight door 2028 would stay open.

With the flametight door 2028 closed or open, whether or not another load order exists, the Area 2 positioner 2016 and chain track flame seal 2096 must extend. Before the Area 2 positioner 2016 can extend to its normal stowed-at-load position, electrical interlock circuitry must be satisfied that the loader chain 2004 and saddle cart 2006 are back in Area 2 before a signal is given. As shown in FIG. 106B, this action lets accumulator pressure fluid port through the selector valve 2470 for the Area 2 positioner 2016 with solenoid LCHB2 being then de-energized. The Area 2 positioner piston 2110 is then moved to extend the Area 2 positioner 2016 between links 2101 of the loader chain 2004. Simultaneously, the chain track flame seal piston 2098, shown best in FIG. 106A, is shifted to close the chain track flame seal 2096. When the Area 2 positioner 2016 and the chain track flame seal 2096 have extended, the loader chain 2004 is locked in the desired position for the next load cycle of a missile-booster combination 300, if any.

*Local control unload*

Any one of a number of conditions could exist that would necessitate returning a weapon 400 from the launcher guide arm 5002 to the ready service tray 502. However, for this section in the Theory of Operation, assume that only one load order has been made for an unload cycle of an exercise weapon on the B-side. Let it be assumed further that the weapon 400 is at the B-side guide arm 5002B of the launcher 5000 and Weapons Control has ordered the ready service operator to man the power handcrank 2354 to retract the weapon 400 to the ready service tray 502.

In the "AUTOMATIC LOAD" cycle, it was described how the weapon 400 was transferred to the guide arm 5002. The reverse motion latch was extended, and the aft booster shoe 204 was freed from the saddle cart 2006. Assume that the aft booster shoe 204 is still secured by the saddle cart 2006. The reverse motion latch of the guide arm 5002 is retracted.

Figure 124:
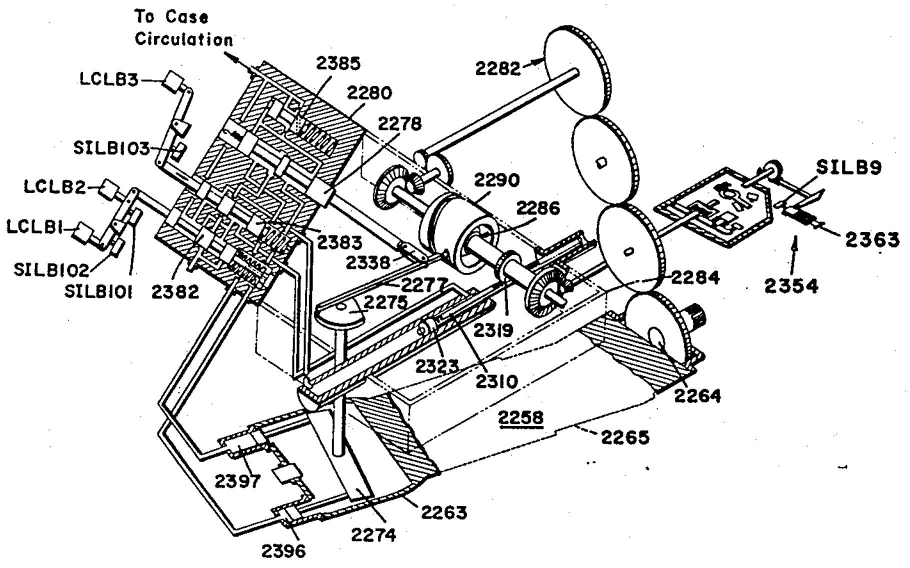

The switch SMX3, on the panel EP3, can be turned to either "A-SIDE," "B-SIDE," or "BOTH A-SIDE AND B-SIDE." In this case, it is turned only to "B-SIDE." Manual selector switch SMX1 is turned to "STEP" and switch SMX2 is turned to "UNLOAD." The ready service operator disengages plunger 2363 and depresses a foot switch to establish electrical connections and turns the handcrank 2354, shown in FIGS. 105 and 124.

*Launcher to Area 1—Loader power drive*

Local control combines a manual input signal with hydraulic operation. The handcrank 2354 is used to control the power drive from the transmission 2258. The local control handcrank 2354 should not be confused with the manual power-off handcrank 2295, shown in FIG. 106B, which is coupled to the loader power-off brake 2014 and is for emergency operation with no hydraulic power.

The local control handcrank 2354 connects to the clutch 2364 and operates the transmission 2258 by feeding a manual signal into the differential 2286. Since the pilot rack 2310 is moved in this operation, it is necessary to connect the hydraulic lines feeding piston 2323 to tank (case circulation). Solenoid LCLB6 remains energized and the local control clutch 2364 remains engaged during local control, as shown best in FIG. 124.

In this initial action, the loader selector valve 2382 and the solenoids LCLB1 and LCLB2 therefor were bypassed by the turning of the handcrank.

The pilot piston shutoff valve 2383 is opened by a control circuit through the handcrank 2354 and the hydraulic connections of piston 2323 are connected to tank (case circulation); piston 2323 then moves in the retract direction. The manual input signal into the differential 2286 rotates the control cam 2290, which, in turn, displaces servo valve 2278. Valve 2278 ports servo pressure to stroking piston 2397, as shown in FIG. 124. Stroking piston 2396 is connected to tank through servo valve 2278 and metering valve 2385. The A-end tilt plate 2274 is put on stroke; the A-end 2263 drives the B-end 2265 and the B-end output shaft 2264 turns the drive sprocket to retract the weapon back into Area 1 from the launcher guide arm.

As stated earlier, the Area 1 warmup contactor 2021, chain track flame seal 2096 and Area 1 positioner 2030 remain retracted in all reverse and unload cycles.

During the return of the saddle cart 2006 to Area 1 from the launcher, the local control handcrank 2354 is rotated in the direction marked "RETRACT" on the local control panel until the pilot rack 2310 hits the Area 1 stop lever 2334, shown in FIG. 106B, and then the cart is stopped in the Area 1 loaded position.

Should the ready service operator turn the handcrank further than required, the cam assembly 2340 will de-actuate switch SILB12 to break the circuit and disengage the local control clutch 2364.

With the handcrank 2354 stopped, or the clutch 2364 disengaged, the B-end response returns the control cam 2290 to neutral. The control cam shifts the differential lever 2277 to port servo pressure to the stroking piston 2396 through servo valve 2278. The other stroking piston 2397 is connected to tank through servo valve 2278 and metering valve 2385. This neutralizes the A-end tilt plate 2274. As the tilt plate 2274 rotates to neutral, it shifts the other end of the differential lever 2277 to neutralize servo valve 2278.

As the cart 2006 stops in Area 1, the control cam 2290, tilt plate 2274 and servo valve 2278 are all on neutral. The transmission 2258 is producing no output, and a light on the local control panel indicates that the control cam 2290 is on neutral. If the circuit was not broken by the cam switch SILB12 the clutch is disengaged by releasing the operator's foot switch. Solenoid LCLB3 is de-energized by stopping of the handcrank 2354. Pilot piston shutoff valve 2383 then spring-returns to neutral and the hydraulic lines to pilot rack piston 2323 are closed.

*Closing blast doors*

When the saddle cart 2006 is cleared into Area 1, and when electrical interlock conditions are satisfied, a cycle for closing the blast doors 4000 is automatically initiated.

*Turning handcrank*

The turning of the power handcrank 2354 in "LOCAL CONTROL" governs the rate of travel of the saddle cart and chain and the ratio is such that at a normal rate of turning, the velocity of the saddle cart will be approximately one foot per second.

*Disassembly in Area 1*

When the weapon 400 is stopped in Area 1, it is ready for removal of the wings 102 and fins 104 and 208. Foot switches are depressed and a signal is given by the crewmen to relay the completion of disassembly. Now the missile-booster combination 300 is ready to be retracted into Area 2 after the flametight door 2028 is opened.

*Opening flametight door*

The circuit conditions now are satisfied to energize solenoid LCMB1 to open the flametight door 2028. Once solenoid LCMB1, shown in FIG. 110, is energized, the selector valve 2490 for the flametight door, is actuated and detented. Solenoid LCMB1 is then de-energized. Now the flametight door latch valve 2491 is shifted to release the latch 2492 and to port a return volume of oil to the velocity control valve 2493. This valve 2493 is cam actuated to port a volume of oil to the metering valve 2494. The metering valve 2494 actuates and, working with the variable orifice effect of control valve 2493, causes the flametight door operating piston 2496 to retract and the door is opened. Once the flametight door 2028 is open, the ready service operator resumes turning the handcrank 2354.

*Area 1 to Area 2—Loader power drive*

The solenoid LCLB6 remains energized and the local control clutch 2364 stays engaged, as shown in FIG. 106B. Additionally circuitry operates through solenoid LCLB5 to release the Area 1 stop lever 2334. The pilot rack 2310 now is released, and operation of the elements is the same as previously described.

Just as in the beginning of the local control UNLOAD cycle, the handcrank 2354 is rotated in the direction marked "RETRACT" on the local control panel until the pilot rack piston 2323 comes to the end of travel in its cylinder and the saddle cart 2006 is stopped on the aft floating track 2018, as shown in FIG. 106A. An indication of this condition is given by a suitable warning light designated "LOADER AT AREA 2" visible to the operator.

As shown in FIG. 20, the positive chain stop 2108 located in the track housing 2036 holds the loader chain securely in the Area 2 position. Once the handcranking is stopped or the clutch 2364, shown in FIG. 124, is disengaged, the B-end response returns the control cam 2290 to neutral. This shifts the differential lever 2277 to port servo pressure to stroking piston 2396. Stroking piston 2396 is connected to tank through valves 2278 and 2385. This neutralizes the A-end tilt plate 2274. As the tilt plate 2274 rotates to neutral, the other end of the differential lever 2277 is shifted to neutralize servo valve 2278.

As the cart 2006 stops in Area 2, the control cam 2290, tilt plate 2274, and servo valve 2278 are all on neutral. An indicator light again indicates on the local control panel that the control cam 2290 is on neutral. The operator may disengage the clutch 2364 by releasing his foot switch. This also de-energizes solenoid LCLB3. The shutoff valve 2383 then spring returns to neutral.

*Back in Area 2*

When the cam roller 2045 of the Area 2 interlock valve 2026 drops into the cutout link 2104 of the loader chain 2004, Area 2 hydraulic components, shown in FIGS. 110, 111, 111A, and 111B, are put on a ready basis for a succeeding load cycle. Now with interlock circuitry assured that this saddle cart is clear of the flametight door, the solenoid LCMB2 is energized and the flametight door is closed. Energizing solenoid LCMB2 shifts and detents the flametight door selector valve 2490. Solenoid LCMB2 is then de-energized. The metering valve 2494 is actuated. The velocity control valve 2493 is cam and spring actuated and actuates the latch valve 2491. As the door operating piston 2496 is extended to close the door, the latch 2492 returns to the latched position, shown in FIG. 110.

To extend the Area 2 positioner 2016 the positioner selector valve 2470 is solenoid operated and detented. Accumulator pressure is released to the right hand hydraulic line in FIG. 111A. This leads, as shown in FIGS. 111 and 111C, to Area 2 positioner piston 2110 and the chain track flame seal piston 2098 and both pistons extend. The loader chain is now locked in the desired position in Area 2. As stated previously, the Area 2 positioner 2016 and chain track flame seal 2096 will remain in extended positions during shutdown.

*Transfer of missile back to center hoist*

The loader assembly is ready to make the final transfer of the missile-booster combination 300 back to the center hoists. The ready service operator has stopped turning the handcrank, the chain power drive has been neutralized and the saddle cart is in its normal stowed-at-load position on the aft floating track in Area 2. After solenoid LCGB3 is energized to retract the center hoist locking piston noses 766, the center hoists 508 and 509 are raised. After this, the solenoid LCGB3 is de-energized. Now the floating tracks must extend. This is accomplished by solenoid operated selector valve 2144 for the floating tracks 2017 and 2018, shown in FIG. 107. The latch release valves 2472 release the latches 2134 and the pilot pistons 2145 extend the servo valves 2126 in each floating tracks 2017 and 2018, shown in FIG. 107. The latch re- of the servo pistons 2145 and the forward and aft floating tracks 2017 and 2018 extend simultaneously. This energizes the solenoid control LCKB1 for retracting the rammer 2020, shown in FIG. 20. The rammer control valve 2117 shifts the latch valve 2120, releases the rammer 2020 and the rammer piston 2118 retracts. Solenoid LCKB1 is deenergized and control valve 2117 spring-returns to neutral.

The retracting rammer 2020, as it moves, forces the aft booster shoe 204 clear of the saddle cart 2006 as shown in FIGS. 26 and 27, but in reversed order. The forward booster shoe 202 rides clear of the skid tracks 2048 and 2050 as illustrated in FIG. 10. As a result, the missile-booster combination 300 is positioned in the tray 502 which is supported by the center hoists 508 and 509 and secured by the center hoist locks ready for lowering. The same aft movement also latches the lower aft booster shoe 205 within the aft shoe receptacle and latch 1203 of the ready service tray 502, shown in FIGS. 3*a* and 3*b*.

The tray-loaded switch SICB10, (not shown), is actuated by the presence of the missile-booster combination 300 causing the rammer 2020 to stop. Next, the hoist lock cylinders 654 retract and signal the center hoists 508 and 509 to lower the loaded tray 502. With the center hoists 508 and 509 down, a signal is produced to re-extend the hoist lock cylinders 654.

Now, with reference to FIG. 20, a signal is produced to energize solenoid LCKB2 which causes the rammer control valve 2117 to port fluid pressure to extend the rammer piston 2118. The rammer metering valve 2482 meters return fluid to tank as the rammer 2020 extends and latches in the extended position. Solenoid LCKB2 de-energizes and control valve 2117 spring-returns to neutral.

With the completion of this action, a signal now energizes solenoid LCJB2, as shown in FIG. 107. This causes the control valve 2144 for the floating tracks to be activated and detented. Solenoid LCJB2 is thereupon de-energized. Both pilot pistons 2145 for the aft and forward tracks 2017 and 2018 retract the servo valves 2126. The servo valves 2126 release pressure from the top sides of the servo pistons 2124 and port to the bottom sides. As the pistons 2124 retract, each latch valve 2472 for the floating tracks 2017 and 2018, spring-returns to a latch position. The aft and forward floating tracks are thus retracted.

Hydraulic components of Areas 1 and 2 are once more in stowed-at-load positions. This completes the weapon 400 unload cycle in Local Control.

AREA 1 ACCUMULATORS

*General Introduction*

A pair of accumulator units 6000 furnishes hydraulic pressure to components of the guided missile feeder system 2000. As shown best generally in FIGS. 3, 4A, 6A, and 8, the pair of accumulator units 6000 is located in Area 1, that is, in the wing and fin assembly compartment 8010, and supplies the hydraulic components of the blast doors 4000 and the hydraulic components of the A-side and B-side loaders 2002A and 2002B, respectively. Another pair of accumulator units 6200, as shown in FIGS. 3B, 5, 5A, 7A, and 7B, is located in Area 2 and it supplies the hydraulic components of the ready service mechanisms 500A and 500B, respectively.

*Area 1 accumulator units—General description*

The Area 1 accumulator units 6000, as illustrated best in FIGS. 3, 4A, 6A, and 8, furnish accumulator pressure (PA) to the various hydraulically operated components of the guided missile feeder system 2000. The A-side and the B-side accumulator units 6000A and 6000B, respectively, are identical in operation, each supplying hydraulic fluid under pressure to operate the hydraulic components of its respective loader 2002 and blast door 4000.

Each accumulator unit 6000, as shown in detail in FIGS. 125, 126, 126A, and 127, includes a main tank 6002, a header tank 6010, a motor 6006, a parallel piston pump 6008 coupled to the motor 6006, a plurality of accumulator flasks 6066, a filter assembly 6054, together with the necessary valves, electrical devices, and pipes associated with these major components.

The two accumulator units 6000A and 6000B are symmetrically located, forward in Area 1, outboard of the respective blast door, as shown best in FIG. 8. On both accumulator units 6000A and 6000B the motor 6006 is mounted inboard on the rectangular tank 6002, as illustrated in FIGS. 3, 6A, and 125, and the accumulator flasks 6066 are positioned outboard thereof, as shown best in FIGS. 3, 8, and 125. The filter assembly 6054, an accumulator control assembly 6090, and a pressure cutoff assembly 6114 are mounted forward on the main tank 6002 of both accumulator units 6000. The header tank 6010, however, as shown in FIG. 126, is suspended from the overhead 8005 of the aft deckhouse 8004, slightly aft of the accumulator unit 6000.

Should the power supply to the motor 6006 fail, an auxiliary motor-driven pump unit 6150, as shown best in FIG. 126A, may be used as an emergency source of accumulator pressure. The single auxiliary motor-driven pump unit 6150 serves either or both the A-side and B-side of the feeder 2000 and it is mounted on the deck 8002, forward in Area 1, near the centerline of the vessel 8000.

Since both the operation and components of the A-side and the B-side of the feeder 2000 are identical, this section of the application will be limited to the A-side accumulator unit 6000A. Whatever applies to the A-side accumulator unit 6000A will also apply to the B-side accumulator unit 6000B, except, of course, its location and position, as pointed out above and hereinafter.

*Detailed description—Main tank*

The Area 1 accumulator unit 6000 and its affiliated header tank 6010 and auxiliary motor-driven pump 6150 are located forward in Area 1, as shown in FIGS. 3, 4A, 6A, and 8. The A-side accumulator unit 6000A is illustrated in detail in FIGS. 125, 126, 126A, and 127, and it includes the previously mentioned main tank 6002, the header tank 6010, the motor 6006, a gear reducer 6004, the pump 6008, an adapter block assembly 6030, the filter assembly 6054, the control assembly 6090, the accumulator flasks 6066, and pressure cutoff assembly 6114, all connected together, as shown in FIGS. 126 and 126A. Although the auxiliary motor-driven pump unit 6150 is designated as a separate unit, it is directly associated with the Area 1 accumulator 6000 and is discussed in this section.

The main tank 6002 serves both as an oil reservoir and as a stand to support other components of the Area 1 accumulator unit 6000A. The main tank 6002 is a rectangular steel weldment secured to the main deck 8002 of the vessel 8000.

The main tank 6002, as illustrated in FIG. 126, has an opening in the top which is covered by the gear reducer 6004. This gear reducer 6004 supports the motor 6006 and the pump 6008. Another opening on the forward end of the main tank 6002 mounts the circular adapter block assembly 6030. Flanges and lugs for mounting the control assembly 6090, and the filter assembly 6054 are provided on the side of the main tank 6002.

*Header tank*

The header tank 6010 is suspended from the overhead 8005 of the aft deckhouse 8004, and it holds a reserve supply of hydraulic fluid for the Area 1 accumulator unit 6000 and it provides expansion space for fluid in the system. A conduit 6012 from the bottom of the header tank 6010, as shown in FIG. 126, leads to the main tank 6002. Two lines, not shown, which are connected to a T-manifold are attached to the bottom of the tank 6010, and then return hydraulic fluid from the components of the blast door 4000.

Tank 6010 holds a reserve quantity of hydraulic fluid and, in addition, it provides expansion space. The header tank 6010 is of substantially rectangular shape and it has a V-shaped bottom. A window 6014, located on the inboard side thereof, indicates the level of oil in the tank. A fill valve 6016 is located at the bottom of the header tank 6010 and it may be used to drain the header tank 6010, or to fill both the header tank 6010 and the main tank 6002. A porous-bronze air breather and standpipe 6018 extends internally above the oil level.

*Motor*

The motor 6006 for the accumulator unit 6000A is mounted vertically above the step down ratio gear reducer 6004, which is secured to the top of the main tank 6002. The motor 6006 drives a flexible coupling 6020, which, in turn, rotates the gear reducer 6004 within the main tank 6002.

*Pump and gear reducer*

The parallel piston pump 6008 is suspended from the gear reducer 6004 within the main tank 6002. Hydraulic fluid discharged by the pump 6008 passes through a check valve 6022 to the adapter block 6030. The check valve 6022, as illustrated in FIG. 126, prevents hydraulic pressure fluid from escaping back to the main tank 6002 when the auxiliary motor-driven pump 6150 is used. This check valve 6022 is located in the pump discharge line, within the main tank 6002, between the parallel piston pump 6008 and the adapter block assembly 6030.

*Check valve*

The check valve 6022 consists of a housing 6024, and a valve plunger 6026 and a spring 6028, located within the housing 6024. The check valve spring 6028 holds the valve plunger 6026 closed unless the parallel piston pump 6008 is operating. When the parallel piston pump 6008 is in operation, the discharge pressure of the pump 6008 opens the check valve 6022 so that discharge oil is passed in the hydraulic system.

*Adapter block assembly*

The adapter block assembly 6030, as shown best in FIGS. 126 and 127, includes an unloading valve 6032, a manual starting valve 6042, and a spiral groove mounted into a circular opening on the side of main tank 6002.

*Unloading valve*

The unloading valve 6032 allows the discharge from the pump 6008 to be dumped back to the main tank 6002 when the pressure of the system is at its maximum limit, that is, 1500 p.s.i. The unloading valve 6032 consists of a plunger 6034 and a spring 6036. The front of the plunger 6034 has a smaller diameter than its land section, and it terminates in an X-shaped guide 6038. The unloading valve 6032 opens directly to the main tank 6002 instead of through the conduits shown schematically in FIG. 126.

As shown in FIG. 126, the discharge fluid from the pump 6008 is ported through the adapter block assembly 6030, past the smaller diameter section of the plunger 6034, and out to the filter assembly 6054. Counter-balancing the pressure of the pump 6008, which acts against the plunger 6034 of the unloading valve 6032, are the valve spring 6036 and the hydraulic pressure ported to the rear of the plunger 6034 from an accumulator control valve 6100.

When the pressure in the system reaches the maximum limit 1500 p.s.i., the plunger 6102 of the accumulator control valve 6100 shifts, reducing the rear of the unloading valve 6032 to tank pressure. When this occurs, pressure from the pump 6008 will unseat the unloading valve 6032, thus causing discharge fluid of the pump 6008 to be dumped to tank at only enough pressure to compress the unloading valve spring 6036.

*Orifice*

The previously mentioned spiral groove orifice 6040, located in the line between the unloading valve 6032 and the control valve 6102, cushions both the opening and closing of the unloading valve 6032.

*Manual starting valve*

The manual starting valve 6042, shown in FIG. 127, is used to overcome starting difficulties after the accumulator unit 6000A is first installed, or has been overhauled, and the entire system is filled with air. The manual starting valve 6042 consists of a valve guide 6044, a plunger 6046 located within the valve guide 6044, a spring 6048, and a knurled cap 6050. The knurled cap 6050 is screwed to the guide 6044 and it protects the plunger 6046 from accidental movement. When the accumulator unit 6000A is assembled or reassembled, the line between the unloading valve 6032 and the control valve plunger 6102 may become filled with air. If this line contains air when the pump 6008 is started, the pressure generated to force oil through the filter assembly 6054 and into the system may unseat the unloading valve 6032 and bypass discharge fluid from the pump 6008 to the tank 6002. The unloading valve 6032 will open because the air in the line will be compressed.

To overcome this condition, the manual starting valve 6042 is provided. With the pump 6008 in operation and the knurled cap 6050 removed, depressing the starting valve plunger 6046 will admit pressure to the rear of the unloading valve 6032, and cause it to seat. With the unloading valve 6032 seated, the discharge fluid of the pump 6008 will pass into the system and the accumulator control valve 6100 will take over. The accumulator pressure fluid admitted by the starting valve 6042 to the line between valve 6032 and plunger 6102, is prevented from returning to tank by a check valve 6052, which is part of the control assembly 6090, as shown in FIG. 126.

*Filter assembly*

All hydraulic fluid supplied to the system must pass through the filter assembly 6054 which is in the form of a large sphere bolted to the forward side of the main tank 6002. As shown in FIG. 126, this filter assembly 6054 includes a plurality of filter elements 6056, a bypass valve 6058, a bleeder valve 6060, a check valve 6062, and a switch SIXA3.

The plurality of filter elements 6056 within the filter assembly 6054 are mounted in parallel between steel discs, not shown, for convenient replacement. With clean filter elements 6056, the total pressure drop thereacross is extremely low. As the filter elements 6056 become dirty or clogged, however, the pressure drop thereacross increases.

*Bypass valve and bleeder valve*

A spring tensioned bypass valve 6058 begins to open when the pressure drop across the clogged filter elements 6056 reaches a predetermined valve bypassing the accumulator pressure fluid around the filter elements 6056, and directly into the system. The upper section of the bypass valve 6058 operates the switch SIXA3. When the switch SIXA3 is actuated, a red lamp (not shown) is energized, warning that the clogged filter elements 6056 should be changed.

After the filter assembly 6054 has been drained and new filter elements 6056 installed, the filter assembly refilled with oil and bled through the fill pipe, air may still be trapped above the bypass valve 6058. Hydraulic pressure generated by the pump 6008 will force the bypass valve 6058 open, compressing this air, and pass the accumulator pressure fluid around the new filter elements 6056 directly into the system. To prevent this, the bleeder valve 6060 is provided to vent any trapped air.

*Check valve*

The spring-held check valve 6062 prevents the accumulator pressure fluid system from escaping to the tank 6002 when the system is charged to its maximum and the unloading valve 6032 is open. When closed, the pressure of the spring on the check valve 6052, plus the accumulator pressure, force the check valve 6052 to seat and prevent the escape of accumulator pressure fluid to tank. However, if the pump 6008 resumes charging (with the unloading valve 6032 closed), the discharge pressure of the pump will force the check valve 6052 open, and accumulator pressure fluid will enter the system.

*Accumulator flask assembly*

An accumulator flask assembly 6063 is provided, as shown in FIGS. 125, 126A, and 128, and it consists of a manifold 6064, the three accumulator flasks 6066, and a nitrogen valve block assembly 6068.

The manifold 6064, as shown in FIG. 125, is a T-shaped hollow steel weldment which is fastened to the top of the main tank 6002, outboard from the motor 6006. The three accumulator flasks 6066, as shown best in FIGS. 4A, 8, 125, 126A, and 128, are mounted on the manifold 6064, and the nitrogen valve block assembly 6068, located near the top of the flasks 6066, is attached to the flask supports.

*Accumulator flasks*

The three cylindrical accumulator flasks 6066 store accumulator pressure fluid between 1400 and 1500 p.s.i., and also cushion the hydraulic system for pulsations and surges. The major components of each accumulator flask 6066 are illustrated in FIG. 126A. Each flask 6066 includes a neoprene bladder 6070, a poppet valve 6072 located at the bottom of the flask 6066 in a flange mounting 6074, and a nitrogen filter 6076 located at the top of the flask 6066.

The flange 6074 is utilized to secure the assembly to the manifold 6064, shown in FIG. 125. The synthetic rubber bladder 6070 located within the cylinder of the flask 6066 is charged from the top thereof through the filter 6076 with compressed nitrogen. The filter 6076 is preferably of porous-bronze, and it is contained in an adapter 6078 which is attached to the top of the flask 6066. The filter 6076 filters the compressed nitrogen used to charge the bladder 6070. The spring-loaded poppet valve 6072 prevents the bladder 6070 from pushing out into the manifold 6064, of FIG. 125, when there is no hydraulic fluid in the flask 6066.

*Nitrogen valve block assembly*

The nitrogen valve block assembly 6068, as illustrated in FIGS. 126A and 128, is attached near the top of the accumulator flasks 6066. This nitrogen valve block assembly 6068 controls the compressed nitrogen contained in the flask bladders 6070. The nitrogen valve block assembly 6068 includes a valve 6080 for each flask bladder 6070, a bleeder valve 6082, a filter 6086, an adapter 6088, and a gage 6084, the latter being depicted in FIG. 125, all arranged as shown.

The bleeder valve 6082 controls the vent to atmosphere, while the valve 6080 control connections to the bladder 6070 in each of the three flasks 6066.

The gage 6084, mounted at the top of the nitrogen valve block assembly 6068, as shown in FIG. 125, is used to check the pressure of the nitrogen in the bladders 6070. The fill adapter 6088 is bolted to one end of the nitrogen valve block assembly 6068 and it contains the filter 6086.

*Accumulator control assembly*

The accumulator control assembly 6090, depicted best in FIG. 126, includes three valves, namely the previously mentioned accumulator control valve 6100 which consists of the plunger 6102 and a piston 6104, a manual unloading valve 6092, and the check valve 6052, arranged as shown. The accumulator control assembly 6090 is mounted on the aft side of the main tank 6002, above the filter assembly, as shown best in FIG. 125.

A release knob 6096 of the manually operated unloading valve 6092 projects from the accumulator control assembly 6090. This manually operated unloading valve 6092 dumps accumulator pressure fluid from the accumulator flasks 6066 and the hydraulic system back to the tank 6002 when the accumulator unit 6000 is shut down.

*Manual unloading valve*

The components of the manual unloading valve 6092 include a plunger 6094, the release knob 6096, and a spring 6098, arranged as shown in FIG. 126. The release knob 6096 is pinned to the plunger 6094 and it acts as a stop against the force of the spring 6098. The spring 6098 holds the plunger 6094 in the closed position until the release knob 6096 is pulled.

*Check valve*

Even though other lines of the system may become filled with air, the check valve 6052, of FIG. 126, retains oil in the line between itself and the unloading valve 6032. With this line filled with oil, the unloading valve 6032 will remain seated when the accumulator unit 6000 is activated, allowing the parallel piston pump 6008 to charge the hydraulic system with accumulator pressure fluid. The components of the check valve 6052 are similar to those for check valve 6022, previously described.

*Accumulator control valve*

The accumulator control valve 6100 which consists of the plunger 6102 and the piston 6104, maintains the pressure of the hydraulic system within an operating range of 1400 to 1500 p.s.i. The plunger 6102 and the piston 6104 act as a unit to control the unloading valve 6032. When the pressure of the accumulator unit 6000 is at the minimum limit of 1400 p.s.i., the accumulator control valve 6100 prevents the opening of the unloading valve 6032, thus allowing accumulator pressure fluid from the pump 6008 to charge the hydraulic system. When, however, the pressure of the accumulator unit 6000 has developed to its maximum limit of 1500 p.s.i., the unloading valve 6032 is allowed to open and bypass the discharge of the pump 6008 back to tank 6002.

The two-land plunger valve 6102 includes an adjustable pushrod 6106 and a valve spring 6108, arranged as shown in FIG. 126. The movement of the plunger 6102 is limited by the piston 6104 at one end and the pushrod 6106 at the other. The pushrod 6106 directs the force of the valve spring 6108 against both the plunger 6102 and the piston 6104.

The piston 6104 is positioned in a sleeve. A double shoulder space 6110 located in the accumulator control valve 6100 checks both the movements of the piston 6104 and the plunger 6102 within prescribed limits. A drilled hole 6112 in the accumulator control valve 6100 is arranged to communicate through the right hand land of plunger 6102 into the double shoulder space 6110 to apply hydraulic fluid between the plunger 6102 and the piston 6104.

*Pressure cutoff assembly*

The previously mentioned pressure cutoff assembly 6114, illustrated in FIG. 126A, controls the accumulator pressure fluid supplied to the hydraulic system and also indicates when accumulator pressure fluid is available. The pressure cutoff assembly 6114 is bolted to the side of the accumulator manifold 6064, as shown best in FIG. 125. An associated solenoid housing 6116 is attached to its inboard side, as shown in FIG. 125.

The pressure cutoff assembly 6114 includes a solenoid operated control valve 6118, a pressure cutoff valve 6124, switch valves 6140 and 6142, and manual shutoff valves 6132 and 6134, shown in FIG. 126A. The solenoid housing 6116 contains a solenoid LCXA1 and an interlock switch SIXA6.

*Control valve*

The solenoid-operated control valve 6118 is arranged to be shifted by the solenoid LCXA1. This valve 6118, acting as a pilot valve, operates a cutoff valve 6124. Valve 6118 is held by a spring 6119 and it is operated by a rod 6120. The upper end of the rod 6120 is pinned to a pivoted connecting link 6162 and it transmits the movement of the solenoid LCXA1 to the valve 6118.

When the solenoid LCXA1 is energized, the rod 6120 and the valve 6118 are shifted downwardly, against the pressure of the spring 6118. Accumulator pressure fluid from the accumulator unit 6000 is thus ported from the top of the cutoff valve 6124 and dumped to the tank 6002. When the solenoid LCXA1 is de-energized, tension of the spring 6119 pushes the valve 6118 and rod 6120 upwardly, returning the solenoid LCXA1 to its original position and again porting accumulator pressure fluid to the top of the cutoff valve 6124.

*Cutoff valve and solenoid*

The cutoff valve 6124, as shown in FIG. 126A, is the main pressure cutoff for the hydraulic system. This valve 6124 consists of a plunger 6126 and a spring 6128. When the solenoid LCXA1 is energized and the control valve 6118 is shifted, the accumulator pressure fluid acting against the top of the cutoff valve 6124 is dumped to tank 6002. With merely tank pressure above the cutoff valve 6124, accumulator pressure fluid is effective against the lower section of the cutoff valve 6124 and unseats it. With the cutoff valve 6124 open, accumulator pressure fluid is free to pass through the manual shutoff valves 6132 and 6134 hydraulic operating components of Areas 1 and 2, indicated in FIG. 126A.

When the solenoid LCXA1 is de-energized, the solenoid-operated control valve 6118 admits accumulator pressure fluid to the top of the cutoff valve 6124. The pressure of the accumulator fluid plus the forces of the cutoff valve spring 6128 will then seat the cutoff valve 6124 and accumulator pressure fluid is thus prevented from passing into the hydraulic system.

An orifice 6130 is located in the passage between the solenoid-operated control valve 6118 and the top of the cutoff valve 6124, and it limits the flow of accumulator pressure fluid. This orifice 6130 delays the action of the cutoff valve 6124, thereby allowing sufficient time for an operating hydraulic unit or component powered by the accumulator unit 6000 to complete its cycle in the event power to the solenoid LCXA1 should fail. The orifice 6130 also functions to cushion the opening and closing of the cutoff valve 6124.

*Manual shutoff valves*

The pair of manual shutoff valves 6132 and 6134 is located on the side of the pressure cutoff assembly 6114 below the solenoid housing 6116, as shown best in FIG. 126A. The shutoff valve 6132 control a conduit 6136 supplying accumulator pressure fluid to the hydraulic components of the blast doors 4000 and the span track assembly 4001, while valve 6134 controls a conduit 6138 supplying accumulator pressure fluid from accumulator unit 6000 to the hydraulic components of the loader 2002.

*Switch valves*

The two switch valves 6140 and 6142 are provided as shown in the pressure cutoff assembly and they act together to actuate the switch SIXA6. When accumulator pressure fluid is available in the pressure cutoff assembly 6114, switch valve 6140 shifts and ports pressure fluid to the switch valve 6142, which then operates the switch SIXA6.

The switch valve 6140 is of a two-land configuration, and its movement is limited by a pushrod 6144. This pushrod 6144 directs the force of a valve spring 6146 against the switch valve 6140. An adjustment screw 6148 is provided in connection with the switch valve 6140 to vary the compression of the spring 6146. By turning the adjustment screw 6148, the compresison thereof is varied to thus increase or decrease the force required to shift the switch valve 6140.

When a predetermined pressure is reached in the hydraulic system, switch valve 6140 shifts against spring 6146. Accumulator pressure fluid is then ported to the switch valve 6142, as shown in FIG. 126A. This switch valve 6142 then actuates the switch SIXA6. When actuated, this switch SIXA6 energizes an amber "Ready" lamp. When accumulator pressure fluid is no longer ported to switch valve 6142, the valve spring 6146 returns it to its proper position and a lamp associated therewith will go out.

*Auxiliary motor-driven pump*

In an emergency operation, the auxiliary motor-driven pump 6150, shown schematically in FIG. 126A, supplies a limited quantity of accumulator pressure fluid to either, or both, Area 1 accumulator units 6000A and/or 6000B. The auxiliary motor-driven pump unit 6150 is mounted on the deck 8002 behind the A-side blast door frame, near the centerline of the ship 8000.

Intake and discharge manifolds 6154 and 6152, respectively, are bolted to the auxiliary motor-driven pump 6150. The intake manifold 6154 communicates with the aft or intake side and the other manifold 6152 to the forward or discharge side of the auxiliary motor-driven pump 6150.

The intake manifold 6154, which is attached to the aft side of the pump 6150 contains two manual shutoff valves 6156 and 6158. The shutoff valve 6156 controls a supply line 6164 from the A-side accumulator tank 6002A, while the shutoff valve 6158 controls a supply line 6166 from the B-side accumulator tank 6002B.

The discharge manifold 6152, which is attached to the forward side of the auxiliary motor-driven pump 6150, also contains two manual shutoff valves 6160 and 6162. The shutoff valve 6160 controls the flow of fluid in the line 6168 carrying accumulator pressure fluid toward the A-side pump 6008A, while the valve 6162 controls a similar line 6170 leading toward the B-side pump 6008B. The accumulator pressure fluid from the auxiliary motor-driven pump flows to the adapter block assembly 6030, illustrated in FIG. 126, and through the filter assembly 6054 and on to the hydraulic system.

SEQUENCE OF OPERATION OF GUIDED MISSILE LAUNCHING SYSTEM

A sequence of operation of the guided missile launching system will now be given through the utilization of a series of illustrated schematic drawings, as shown in FIGS. 129 through 164. This sequence of operation of the guided missile launching system of the present invention is based on hydraulic actions for continuous load operation of the missile-booster combinations 300 or weapons 400 and it does not cover the electrical actions, nor does it tell how each of the actions in the sequence happens. More detailed coverage of the latter actions are discussed in the section of this patent application dealing with each particular part of the guided missile launching system.

Each of the drawings of FIGS. 129 through 164 consist generally of an over-all general arrangement of the area or particular part of the guided missile launching system involved, accompanied with insets or balloons to locate and accent the actions taking place.

Generally speaking, the cycles of the ready service mechanisms 500 are identical. But the second, third, and fourth cycles cannot be renumbered to match the first cycle, because actions on the loader 2002 are also numbered. These actions are mixed with the first cycle but are left out of the second cycle. Also, on the second cycle, the actions of the center hoists 508 and 509 do not occur.

As automatic loading of the guided missile launching system is initiated, actions begin in Area 2 on the ready service mechanisms 500. As the sequence of operation continues, actions occur on the loaders 2002 and then on the launcher 5000.

In this sequence of operation, the first selected missile types, say 100S, of the missile-booster combination 300S is one counterclockwise rotation from Station 1. When the ready service mechanisms 500 satisfies the first load order (hoisting of a misile-booster combination 300 to the loader 2002), the load order is cancelled at Weapons Control and a second load order is initiated.

As long as a load order exists, the ready service mechanism 500 continues to cycle until the tray 502 with the selected missile-booster type, that is, 300S or 300W, is in position, that is, at Station 1, for hoisting of the missile-booster combination 300S or 300W to the loader 2000.

The load orders in this sequence of operation are received by the guided missile launching system within a given time period. Therefore, as the first salvo of missile-booster combination 300S or 300W is moving along the loaders 2002 and the weapon 400S or 400W is fired from the launcher 5000, the ready service mechanisms 500 continue to cycle or operate to bring the second missile type selection in position for transfer onto the loaders 2002. It is assumed every other tray 500 is loaded with the selected missile type, that is, 100S or 100W, it is necessary for the ready service mechanism 500 to complete two cycles of operation to comply with the second load order.

The guided missile launching system is activated with the motors running and the appropriate switches, shown best in FIGS. 3, 3A, and 129, on the control panels, are positioned for "A" and "B" side automatic operation. Referring now to FIGS. 24 and 130(*b*), the loaders 2002A and 2002B are shown in normal stowed position with the guided missile launching system being shown ready for automatic continuous load operation.

In the sequence of operation, the ready service mechanism 500A and 500B are identically loaded with missiles 100S and 100W, alternately positioned, as shown in FIG. 131(*a*), with load orders being for salvos of missiles 100S.

As shown in FIG. 131(*a*) through 131(g), the ready service mechanisms 500A and 500B are in the normal stowed position. The location or position of the hydraulic components on the ready service mechanism 500A or 500B are as follows, that is, the center hoists 508 and 509 and the end hoists 516, 517, 518, and 519, are down, with the center frame tray lock cylinders 534, 535, 536, and 537, and center hoist lock cylinders 654 being extended, while the crosshead tray latch cylinders 922, 923, 924, and 925 are retracted.

The index cylinders 802 and 803 are hydraulically connected in parallel, while the missile unlatch cylinder 1130 (not shown) is retracted. The left and right hoist pawls 570 and 658, respectively, as well as the left and right tray snubbers 1146, are extended, while the left and right tray latching bars 1003 and 1004, respectively, are retracted.

As shown in connection with FIGS. 132(*a*) through 132(*e*), the ready service mechanism 500 automatically begins operation, with the LDC operator in Weapons Control selecting a salvo of missiles 100S (first load order). Automatic loading of the system occurs as the left tray snubber 1146L retracts, as shown in FIG. 132(*c*); the left tray latching bars 1003F and 1003H extend, as shown in FIG. 132(*d*); and the left hoist pawls 570F and 570H retract, as shown in FIG. 132(*e*).

Next the end hoists 516, 517, 518, and 519 and their pawls 568F and 568H, and 570F and 570H begin to raise, but the right hoists 516 and 517 only are loaded with a missile-booster combination 300W. The tray 502 with its missile-booster combination 300W at Station 4 is being raised to Station 3, as shown in FIG. 132(*b*).

Since the selected missile type, that is, 100S, or missile-booster combination 300S is not in Station 1, but is in the Stations 10 and 2 to either side, and the ready service mechanism 500 is in a clockwise position, a counterclockwise index is initiated. The selected missile-booster combination 300S in Station 2 will move into Station 1.

FIGS. 133(*a*) through 133(*g*) show the ready service mechanism 500, with the trays 502 in position for counterclockwise indexing. When the end hoists 516, 517, 518, and 519 are fully raised, as shown in FIG. 133(*b*), Station 3 becomes loaded with a missile-booster combination 300W and the left hoist pawls 570F and 570H extend, as shown in FIG. 133(*c*). The crosshead tray latch cylinders 922F, 922H, 923F, 923H, 924F, 924H, 925F, and 925H then extend, as illustrated in FIG. 133(*d*).

Next, the left tray snubber 1146L, shown in FIG. 133(*e*), extends, while the left tray latching bars 1003F and 1003H, shown in FIG. 133(*f*) retract. The center frame tray lock cylinders 534F and 534H, 535F, 535H, and 537F and 537H retract.

Since the right end hoist 516 and 517 went up loaded with a missile-booster combination 300W, Station 4 is left empty. The left end hoist 518 and 519 went up empty so Station 8 is loaded with a missile-booster combination 300W.

FIGS. 134(*a*) and 134(*b*) illustrate the ready service mechanism 500 indexing in a counterclockwise direction. The crossheads 542 and 544, as shown in FIG. 134(*b*), are shifting to place a tray 502 in each of the empty Stations 4 and 9 provided by raising of th eend hoists 516, 517, 518, and 519, with the upper tier of trays 502 moving leftward and the right tier of trays 502 rightward.

When the trays 502 are unlocked from the center frame 506 and become latched to the crossheads 542 and 544, the index cylinders 802 and 803 are hydraulically connected in series. The indexing mechanism then functions to cause the indexer arm 804F and 804H to rotate counterclockwise, with the upper crosshead 544 shifting the trays 502 leftward, and the lower crosshead 542 shifting the trays rightward.

FIGS. 135(*a*) through 135(*f*) illustrate that the indexing of the ready service mechanism 500 is complete. When the ready service mechanism 500 completes counterclockwise indexing the missile-booster combination 300S, which was formerly in Station 2, is now in Station 1 under the loader 2002, with the index cylinders 802 and 803 being hydraulically connected in parallel, as shown in FIG. 135(*b*).

The right tray snubber 1146R is then retracted, as shown in FIG. 135(*c*), while the right tray latching bars 1004F and 1004H extend to lock the tray 502 at Station 4. The center frame tray lock cylinders 534F and 534H, 535F and 535H, 536F and 536H, and 537F and 537H, as shown in FIG. 135(*e*), extend to lock trays 502 in Stations 10, 2, 7, and 5.

The floating tracks 2017 and 2018 of the loader 2002, as shown in FIG. 135(*f*) are then lowered. As shown in FIGS. 136(*a*) through 136(*e*), the ready service mechanism 500 is beginning to hoist a missile-booster combination 300S to the loader 2002. This selected missile-booster combination 300S is in the ready service center hoists 508 and 509 at Station 1 and it is beginning to be raised to the loader 2002.

When the floating tracks 2017 and 2018 of the loader 2002 are fully lowered, the center hoist lock cylinders 654F and 654H retract, as shown in FIG. 136(*c*). The crosshead tray latch cylinders 922F, 922H, 923F, 923H, 924F, 924H, 925F, and 925H, retract, as shown in FIG. 136(*d*), to free trays 502 in Stations 9 and 4, with the right hoist pawls 568F and 568H, as shown in FIG. 136(*e*) being retracted. The center hoists 508 and 509 then begin to raise to the loader 2002 with the missile-booster combination 300S. It is to be noted that when the center hoist lock cylinders 654F and 654H retract, the existing load order is cancelled in Weapons Control and a "next load order" period exists.

FIGS. 137(*a*) and 137(*b*) illustrate that the center hoists 508 and 509 of the ready service mechanism continue to raise the missile-booster combination 300S to the loader 2002. The center hoists 508 and 509 continue raising to the loader 2002, as shown in FIG. 137(*b*) as the end hoists 516, 517, 518, 519 start to lower with the index cylinders 802 and 803 being hydraulically connected in series.

The empty crossheads 542 and 544 (no reference number being assigned to rear crossheads) of the indexing mechanism begin to shift in a clockwise direction, as shown in FIG. 137(*b*). However, before the center hoists 508 and 509 reach the loader 2002, the end hoists 516, 517, 518, and 519 start down, with the missile-booster combination 300S in Station 9 being lowered to Station 8. The right end hoists 516 and 517 go down empty, since Station 4 is already loaded.

Center hoists 508 and 509 are raised to the loader 2002, as shown in FIGS. 138(*a*) through 138(*d*), when the center hoists 508 and 509 are fully raised to the loader 2002. At the end of the travel of the center hoist 508 and 509, the top pair of booster shoes 202 and 204 enter the forward and aft floating tracks 2017 and 2018, respectively, on the loader 2002. The center hoist lock cylinders 654F and 654H then extend, as illustrated in FIG. 138(*c*), while the rammer 2020 of the loader 2002 retracts, as shown in FIG. 138(*d*). The missile unlatch cylinder 1130, also shown in FIG. 138(*d*) extends, with the indication that the pawls have engaged the booster shoe.

As shown in FIGS. 139(*a*) through 139(c), the missile-booster combination 300S is transferred to the loader 2002. The crossheads 542 and 544, as shown in FIG. 139(*b*), complete their indexing movement and are in a clockwise position as the loader rammer 2020, of FIG. 139(*c*), extends, with the top forward and aft booster shoes 202 and 204 being engaged in the forward and aft floating tracks 2017 and 2018 of the loader 2002 and the bottom booster shoes 203 and 205 being disengaged from the tray 502, as illustrated best in FIGS. 139(*b*) and 139(*c*). The index cylinders 802 and 803 are hydraulically connected in parallel. The end hoists 516, 517, 518, and 519, as shown in FIG. 139(*b*), reach their down position and the tray 502, which was in Station 9, is now in Station 8.

As shown in FIGS. 140(*a*) through 140(*b*), the missile-booster combination 300S is now positioned in the loader 2002. When the top booster shoes 202 and 204 are positioned in the forward and aft floating tracks 2017 and 2018, the right hoist pawls 568F and 568H extend, as shown in FIG. 140(*c*), the forward and aft floating tracks 2017 and 2018 raise, as shown in FIG. 140(*e*), and the flametight door 2028, shown in FIG. 140(*a*), opens at this time only on the first loading of automatic continuous load. The unlatch cylinder 1130, of FIG. 140(*a*), retracts, and the center hoist lock cylinder 654F and 654H, of FIG. 140(*d*) then retract.

When the forward and aft floating tracks 2017 and 2018 raise the short distance to align on the loader 2002, the transfer of the missile-booster combination 300S from the ready service mechanism 500 to the loader 2002 is complete.

As shown in FIGS. 141(*a*) through 141(*d*), the center hoists 508 and 509 are lowered to Station 1. The LDC operator makes second missile type selection which is for a salvo of missile-booster combinations 300S at Station 4. The center hoists 508 and 509 begin to lower the empty tray 502 to Station 1 as the right tray snubber 1146R, shown in FIG. 141(*c*), extends, and the right tray latching bars 1004F and 1004H retract, as shown in FIG. 141(*d*). The center hoists 508 and 509, of FIG. 141(*b*), begin to lower, while the center hoists 508 and 509 begin to lower the empty tray 502 to Station 1.

FIGS. 142(*a*) to 142(*g*) illustrate the ready service mechanism 500 beginning its second cycle as the loaders 2002 prepare to move the first salvo of missile-booster combination 300S into Area 1. As shown in FIG. 142(*b*), Station 1 is empty and the ready service mechanism 500 begins its second cycle of operation. Before the center hoists 508 and 509 are completely down, the ready service mechanism 500 begins a second cycle as the left tray snubber 1146L retracts, as shown in FIG. 142(*c*), the left tray latching bars 1003F and 1003H extend, as shown in FIG. 142(*d*), the left hoist pawls 570F and 570H, retract, as shown in FIG. 142(*e*), and the end hoists 516, 517, 518, and 519 begin to raise, as shown in FIG. 142(*b*). The center hoist lock cylinders 654F and 654H extend, as shown in FIG. 142(*f*). This completes the first cycle of operation of the ready service mechanism 500. The Area 2 positioner 2016, shown in FIG. 142(*g*), then retracts, and the chain track flame seal 2096 is interlocked to open simultaneously therewith.

As shown in FIGS. 143(*a*) and 143(*b*), the loaders 2002 move the first salvo of missile-booster combinations 300S into Area 1. The ready service mechanism 500 continues the second cycle of operation and the end hoists 516, 517, 518, and 519 continue to raise as the loaders 2002 independently thereof move the missile-booster combinations 300S into Area 1, as shown in FIGS. 143(*b*) and 143(*a*), respectively.

Station 1 is shown empty, while the end hoists 516, 517, 518, and 519 are raising, as shown in FIG. 143(*b*). The left end hoists 518 and 519 are shown empty and the right end hoists 516 and 517 are raising the tray 502 from Station 4 to Station 3 with a missile-booster combination 300S.

As shown in FIGS. 144(*a*) through 144(*e*), the missile-booster combinations 300S are positioned in Area 1 when the end hoists 516, 517, 518, and 519, of FIG. 144(*b*) independently thereof, are in their fully raised position on the second ready service cycle of operation. The left hoist pawls 570F and 570H extend, as shown in FIG. 144(*c*), and the crosshead tray latching cylinders 922F, 922H, 923F, 923H, 924F, 924H, 925F, and 925H, of FIG. 144(*d*), extend to latch the trays 502 in Stations 10, 3, 8, and 5 to the upper and lower crossheads 544 and 542, respectively.

Area 1 is now loaded with missile-booster combinations 300S, with the blast doors 4000 having an opening time delay. The flametight doors 2028 and flametight seal 2096 now begin to close, as shown in FIGS. 144(*a*) and 144(*e*), and the Area 1 positioner 2030, of FIG. 144(*e*) extends.

The assembly of the wings 102 and fins 104 and 208 to the missile-booster combination 300S now begins in Area 1. As shown in FIG. 144(*b*), Station 1 is empty, while the end hoists 516, 517, 518, and 519 are up and the tray 502 from Station 4 is now in Station 3 with a missile-booster combination 300S.

FIGS. 145(*a*) to 145(*f*) illustrate the conditions of the system when the wings 102 and fins 104 and 208 are being installed on the missile-booster combinations 300 in Area 1. The flametight doors 2028 are closed. The Area 1 loaded blast door opening time delay continues, while the assembly of the wings 102 and fins 104 and 208 to the missile-booster combinations 300 continues to form the weapons 400. The ready service mechanism 500 continues its second cycle of operation as the left tray snubber 1146L extends, as illustrated in FIGS. 145(*b*) and 145(*c*).

The left tray latching bars 1003F and 1003H then retract, as shown in FIG. 145(*d*), while the Area 1 warmup contactor 2021 extends, as illustrated in FIG. 145(*f*). The center frame tray lock cylinders 534F, 534H, 535F, 535H, 536F, 536H, 537F, and 537H are in the positions shown in FIG. 145(*e*), while the index cylinders 802 and 803 are hydraulically connected in series, as shown in FIG. 145(*b*).

The indexing mechanism then begins to shift the crossheads 542F, 542H, 544F, and 544H and the trays 502 counterclockwise, as shown, with Station 1 being empty of a missile-booster combination 300 and with trays 502 being shifted in a counterclockwise direction.

As shown in FIGS. 146(*a*) through 146(*e*), the wings 102 and fins 104 and 208 are being installed to the missile-booster combinations 300, with the Area 1 loaded blast door opening time delay ending. The installation of the wings 102 and fins 104 and 208 continues, while the ready service mechanism 500 completes a counterclockwise cycle of operation as the index cylinders 802 and 803 are hydraulically connected in parallel, as shown in FIGS. 146(*a*) and 146(*b*).

The right tray snubber 1146R then retracts, as illustrated in FIG. 146(*c*), while the right tray latching bars 1004F and 1004H extends, as shown in FIG. 146(*d*). The center frame tray lock cylinders 534F, 534H, 535F, 535H, 536F, 536H, 537F, and 537H then extend, as illustrated best in FIG. 146(*e*), while the span tracks 4001 begin to raise, as shown in FIG. 146(*a*). It is to be noted that Station 10 has an empty tray 502. At the end of the indexing cycle, the empty tray 502 is moved from Station 1 into Station 10, with the selected missile-booster combination 300S being now positioned in Station 2, and another indexing cycle of operation is needed to move it into Station 1.

FIGS. 147(*a*) through 147(*d*) illustrate the complete installation of the wings 102 and fins 104 and 208 to the missile-booster combinations 300. The ready service mechanism 500 then continues the second cycle of operations and the span tracks 4001 latch to the guide arms 5002 as the crosshead tray latching cylinders 922F, 922H, 923F, 923H, 924F, 924H, 925F, and 925H retract, as best illustrated in FIGS. 147(*a*), 147(*b*), and 147(*c*). The right hoist pawls 568F and 568H then retract, as shown in FIG. 147(*d*), while the end hoists 516, 517, 518, and 519 begin lowering in their cycle of operations. The index cylinders 802 and 803 are hydraulically connected in series, while the empty crossheads 542 and 544 begin a clockwise cycle of operation, as viewed in FIG. 147(*d*).

As shown in FIG. 147(*b*), Station 10 has an empty tray 502. The end hoists 516, 517, 518, and 519 then begin to lower, with the right end hoists 516, 517 being empty of a tray 502 and the left end hoists 518, 519 containing a tray 502 at Station 9.

As shown in FIG. 148(*a*), the first salvo of weapons 400A and 400B is being loaded onto the launcher 5000. The crossheads 542 and 544, of FIG. 148(*b*), complete their indexing cycle, and are in a clockwise position. The end hoists 516, 517, 518 and 519 are down as the warmup contactors 2021 retract, as shown in FIG. 148(*a*) and FIG. 148(*f*).

The Area 1 positioners 2030 then retract, and the assembled weapons 400A and 400B are then moving onto the launcher guide arms 5002. The indexing mechanism cylinders 802 and 803 are hydraulically connected in parallel.

The right hoist pawls 568F and 568H, of FIG. 147(*d*), then extend; the right tray snubber 1146R also extends; and the right tray latching bars 1004F and 1004H then retract, as illustrated in FIGS. 148(*c*), 148(*d*), and 148(*e*), respectively. It is to be noted that Station 10 has an empty tray 502. The ready service mechanism 500 has completed a second cycle of operation. Since the selected missile-booster combination 300S is still one station away from Station 1 and the center hoist 508 and 509, the ready service mechanism 500 prepares to begin its third counterclockwise cycle of operation.

In FIGS. 149(*a*) through 149(*e*), the weapons 400 are positioned on the launcher 5000 as the ready service mechanism 500 begins its third cycle of operation. The ready service mechanism 500 begins its third cycle of operation as the left tray snubber 1146L retracts and the left tray latching bars 1003F and 1003H extend.

Next, the left hoist pawls 570F and 570H retract, as indicated in FIG. 149(*e*), as the end hoists 516, 517, 518 and 519 begin to raise, as shown in FIG. 149(*b*). The reverse motion latches 5160A and 5160B then extend, as do also the warmup contactors 5040A and 5040B of FIG. 149(*a*). The saddle carts 2006 are on the span tracks 4001 and move into Area 1.

As indicated in FIG. 149(*b*) Station 10 contains an empty tray 502. The selected missile tray for transfer to the loader 2002 is a missile-booster combination 300S in Station 2, so a counterclockwise cycle of operation is necessary. As the end hoists 516, 517, 518, and 519 raise, the tray 502 and the missile-booster combination 300W in Station 4 are hoisted to Station 3 as the left end hoists 518 and 519 go up empty of a tray 502.

As shown in FIG. 150(*a*), the launcher 5000 begins training and elevating to a firing position for the weapon 400. The end hoists 516, 617, 518, and 519 are now in fully raised positions, as shown in FIG. 150(*b*), and the loader saddle carts 2006 are in Area 1 as the span tracks 4001 lower, as indicated in FIG. 150(*a*). Next, the launcher 5000 unlatches, that is, the train and elevation securing latches retract, and the launcher 5000 then begins training and elevating to a firing position for the weapons 400.

Station 10 contains an empty tray 502. The end hoists 516, 517, 518, and 519 are in an up position and the loaded tray 502, which was in Station 4, is now in Station 3. The left end hoists 518 and 519 went up empty of a tray 502.

As shown in FIG. 151, the blast doors 4002 and 4004 are closed as the launcher 5000 continues to a firing position while the launcher 5000 is training and elevating to a firing position, the loader saddle carts 2006 stop in Area 1 at the flametight doors 2028, and the ready service mechanism 500 continues its third cycle of operation as the left hoist pawls 570F and 570H extend, as shown in FIG. 151(*c*). In addition, the crosshead tray latching cylinders 922F, 922H, 923F, 923H, 924F, 924H, 925F, and 925H also extend, as indicated in FIG. 151(*d*).

The lower blast doors 4002 then close, as shown in FIG. 151(*a*), the left tray snubber 1146L extends, as indicated in FIG. 151(*e*), while the left tray latching bars 1003F and 1003H retract, as further shown in FIG. 151(*f*). The center frame tray lock cylinders 534F, 534H, 535F, 535H, 536F, 536H, 537F, and 537H then retract to free trays 502 in Stations 10, 2, 5, and 7.

Station 10 has an empty tray 502, as shown in FIG. 151(*b*). The center frame tray lock cylinders 534F, 534H, 535F, 535H, 536F, 536H, and 537F and 537H now retract to free trays 502 in Stations 10, 2, 7, and 5, as also shown in FIGS. 151(*b*) and 151(*g*).

The launcher 5000 then continues to train and elevate to a firing position, as shown in FIGS. 152(*a*) and 152(*b*). As the launcher 5000 continues to train and elevate, the ready service mechanism 500 continues its third cycle of operation, with the index cylinders 802 and 803 being hydraulically connected in series. The flametight doors 2028 then open, and the indexing mechanism shifts the crossheads 542 and 544 and the rear end trays 502 counterclockwise.

Station 10 again has an empty tray 502. The upper crosshead 544 then moves trays 502 from Stations 10, 1, 2, and 3, one station to the left, that is, to Station 9. The lower crosshead 542 simultaneously moves trays 502 from Stations 8, 7, 6, and 5, one station to the right, to Station 4.

FIGS. 153(*a*) and 153(*b*) show the launcher guide 5002 synchronized to the director (not shown). Next the launcher 5000 reaches a firing position and the ready service mechanism 500 completes a counterclockwise index operation as the saddle carts 2006 enter Area 2 through the flametight doors 2028, as shown best in FIG. 153(*a*), in the operation of the guided missile launching system. Firing of the weapons 400 on the A-side and B-side of the guided missile launching system is then ordered and the launcher guide 5000 is fixed in space.

Index cylinders 802 and 803 at this time are hydraulically connected in parallel. Next, the A-side and B-side missile firing relays (not shown) energize, with time delay from A-side and B-side firing of the weapons 400 beginning.

Again it is to be observed that Station 9 has an empty tray 502, as shown in FIG. 153(*b*). When counterclockwise index of the ready service mechanism 500 is complete, the empty tray 502 from Station 10 is now in Station 9.

FIGS. 154(*a*) to FIG. 154(*e*) illustrate the actions of the system with weapons 400A and 400B on the launcher 5000 in preparation for firing thereof. The launcher guides 5002 are fixed in space, and the saddle carts 2006 continue to move back in Area 2 as the right tray snubber 1146R retracts, as shown in FIGS. 154(*a*) and 154(*c*). Next, the right tray latching bars 1004F and 1004H extend, and the center frame tray lock cylinders 534F, 534H, 535F, 535H, 536F, 536H, 537F, and 537H then extend, as indicated in FIGS. 154(*d*) and 154(*e*), respectively.

In this phase of operation of the guided missile launching system, the A-side gyroscope (not shown) uncages, the A-side hydraulic system as well as the servo system activate, and the A-side of the system is then switched to internal power, with the B-side gyroscope (not shown) also being uncaged. Next, the boosters 200A and 200B of the weapons 400A and 400B, respectively are armed, with the A-side missile ready relay being energized and the warmup contactor 5040A being retracted.

Also, with respect to FIG. 154(*b*) it is to be noted that Station 9 has an empty tray 502. A selected missile-booster combination 300S, which was in Station 2, is now in Station 1.

Referring now to FIGS. 155(*a*) to 155 (*d*), these figures show the actions of the system when the A-side weapon 400A is fired. The weapon 400A is prepared for firing and the ready service mechanism 500 continues its third cycle of operation as the crosshead tray latching cylinders 922F, 922H, 923F, 923H, 924F, 924H, 925F, and 925H retract, as best illustrated in FIG. 155(*c*). Next, the right hoist pawls 568F and 568H, as shown in FIG. 155(*d*), retract. Then, the A-side booster firing relay energizes, and the booster 200A of weapon 400A ignites so that the latter fires.

The upper booster shoes 202 and 204 of the weapon 400A then clear the launcher 5000 and the reverse motion latch 5160A retracts, as shown in FIG. 155(*a*). Station 9 now has an empty tray 502, as shown in FIG. 155(*b*). End hoists 516, 517, 518, and 519 in the ready service mechanism 500 are ready to lower as saddle carts 2006 reach the load position on the aft floating tracks 2018 of the loaders 2002.

FIGS. 156(*a*) to 156(*c*) illustrate the action of the guided missile launching system during a time interval which is taking place prior to firing of the second weapon 400B of the salvo of weapons 400A and 400B. In this phase of the operation of the system, weapon 400A is proceeding toward a target. The ready service mechanism 500 then continues its third cycle of operation as the end hoists 516, 517, 518, and 519 begin to lower, as shown in FIG. 156(b). Index cylinders 802 and 803, on the other hand, are hydraulically connected in series. Next the Area 2 positioner 2016, as shown in FIG. 156(c), extends and the chain track flame seal 2096 closes, with the B-side missile interval taking place in the operation of the system.

As indicated in FIG. 156(b), the left end hoists 518 and 519 have an empty tray 502. End hoists 516, 517, 518, and 519 then next begin to lower as the indexing mechanism of the ready service mechanism 500 prepares for a clockwise cycle of operation.

As next shown in FIG. 157(a) through 157(c), the weapon 400B is being readied for firing from the launcher 5000. The time interval for the weapon 400B then ends, and the ready service mechanism 500 then continues its third cycle of operation as the empty crossheads 542, 544, begin to move in a clockwise direction.

Next, in the operation of the system, floating tracks 2017A, 2017B, 2018A, and 2018B lower, and the B-side missile hydraulic system is activated. The operator then turns the B-side missile switches to internal power, with the B-side missile ready relay being energized. The left end hoist 518 and 519 now have an empty tray 502. Next, the end hoists 516, 517, 518, and 519 continue to lower in the ready service mechanism 500.

FIGS. 158(a) to 158(c) show firing of weapon 400B from the launcher 5000. As shown, weapon 400B is ready for firing and the ready service mechanism 500 continues its third cycle of operation as the center hoist locks 654F and 654H retract and the warmup contactor 5040B also retracts, as shown in FIGS. 158(a) and 158(c).

The center hoists 508 and 509 then begin to raise, as shown in FIG. 158(b). The firing relay for the booster 200B of the weapon 400B then energizes, and the booster 200B thereof ignites the weapon 400B.

The forward booster shoe 202 then clears the launcher 5000. The left end hoists 518, 519, as shown in FIG. 158(b), have an empty tray 502. The end hoists 516, 517, 518, and 519 then continue to lower in the ready service mechanism 500, and the crossheads 542 and 544 continue their clockwise index thereof of the system.

As shown in FIG.. 159(a), the weapon 400B then clears the launcher 5000. As the weapon 400B is developing thrust, the ready service mechanism 500 continues its third cycle of operation as the reverse motion latch 5160B of FIG. 159(a) retracts. In the meantime, weapon 400B clears the launcher 5000, with there being a minimum time delay for dissipation of the blast from the booster 200B of the weapon 400B. The launcher 5000 then begins to train and depress back to its load position, with the center hoist lock cylinders 654F and 654H being extended, as shown in FIG. 159(c).

The left end hoists 518 and 519 have an empty tray 502 thereon, as shown in FIG. 159(b). The end hoists 516, 517, 518, and 519 continue lowering, while the crossheads 542 and 544 complete the index movement of the ready service mechanism 500 and are in a clockwise position. Center hoists 508 and 509 are in up position.

As shown in FIG. 160(a), the launcher 5000 continues its return to a load position. Center hoists 508 and 509, in the meantime, are raised to loader 2002 as the index cylinders 802 and 803 are hydraulically connected in parallel. Next, the rammers 2020 of the loaders 2002 retract, and the right hoist pawls 568F and 568H extend, as shown in FIGS. 160(d) and 160(c), respectively. The missile unlatching piston 1130 then extends, as shown in FIG. 160(d). It is to be noted that in the ready service mechanism 500, Station 8 has an empty tray. End hoists 516, 517, 518, and 519, on the other hand, are down and the center hoists 508 and 509 are up, as shown in FIG. 160(b).

As shown in FIG. 161(a), the launcher 5000 continues its return to a load position. Loaders 2002, on the other hand, prepare to engage the booster shoes 202 and 204, as shown in FIG. 161(b) of a missile-booster combination 300, while the right tray snubber 1146R extends, as indicated in FIG. 161(c).

Next, in the operation of the guided missile launching system, the right tray latching bars 1004F and 1004H retract, as shown in FIG. 161(d) and the rammers 2020 of the loaders 2002 extend. As shown in FIG. 161(b), Station 8 has an empty tray 502. Centers hoists 508 and 509 are in an up position as the loader 2002 is completing transfer of the missile-booster combination 300S.

As shown in FIG. 162(a), the launcher 5000 continues its return to a load position. In the meantime, the loader 2002, of FIG. 162(b), has captured the booster shoes 202 and 204 of the booster 200 of the missile-booster combination 300S. Here, it is to be assumed that a new load order, that is, order No .3, is given for an "S" type missile 300S.

The floating tracks 2017 and 2018 of the loader 2002 are raised, as shown in FIG. 162(d), and the missile unlatching piston 1130 thereof is retracted. The center hoist lock cylinders 654F and 654H are then retracted, as indicated in FIG. 162(c). Center hoists 508 and 509, of FIG. 162(b), then begin to lower. It is to be noted here that Station 8, of FIG. 162(b), has an empty tray, while center hoists 508 and 509 are prepared to lower.

As shown in FIGS. 163(a) through 163(g), the loaders 2002 are prepared to move the second salvo of missile-booster combinations 300S in Area 1. The ready service mechanism 500 begins its fourth cycle of operation and completes its third cycle as the left tray snubber 1146L retracts, as shown best in FIG. 163(c). The left tray latches 1003F and 1003H then extend, while the left hoist pawls 570F and 570H then retract, as indicated in FIG. 163(e).

End hoists 516, 517, 518, and 519, on the other hand, begin raising, as shown in FIG. 163(b). Next the launcher 5000 then latches in a load position, with the train and elevation securing latches being extended.

The center hoist lock cylinders 654F and 654H then extend, while the Area 2 positioner 2016 retracts, as shown in FIGS. 163(f) and 163(g). The chain track flame seal 2096, of FIG. 163(g), is open. During this latter sequence of actions, Stations 8 and 1 each have an empty tray 502. Center hoists 508 and 509, on the other hand, are down. The ready service mechanism 500 then begins its new cycle of operation, with a new load order for a missile-booster combination 300S, which means two counterclockwise cycles of operation of the ready service mechanism 500 are necessary, with the crossheads 542 and 544 being now in a clockwise position, as shown in FIG. 163(b).

Finally, as shown in FIGS. 164(a) and 164(b), the loaders 2002A and 2002B are each moving missile-booster combinations 300 into Area 1. Stations 8 and 1, during these actions, each contain an empty tray 502, while the end hoists 516, 517, 518, and 519 continue raising in the ready service mechanisms 500.

Obviously many other modifications and variations of the present invention are possible in light of the above teachings. It is, therefore, to be understood that within the scope of the appended claims the invention may be practiced otherwise than as specifically described.

What is claimed is:

1. In a missile launching system, the combination of a missile launcher having a plurality of launching guide arms with a loader for transferring the missile from a ready service area to a floating track adapted to be connected to launcher guide arms comprising a link chain, track means extending from the floating track to a ready service area and beyond said area a distance equal to the distance from the ready service area to the floating track, said track means housing the link chain during its loading operation and its retracting operation, means engaging the chain links for driving the chain in either the loading operation or the retracting operation, means attached to the link chain to engage the missile, a feeder mechanism moving the missile from ready service area to a position to be engaged by the means attached to the chain to engage the missile, a hydraulically operated piston mounted adjacent the link chain and having a wedge-shaped head portion adapted to enter one link of the link chain to exactly position the loader longitudinally and to hold the loader stationary during the ramming operation, and a ramming means contacting the missile and moving the missile longitudinally from the feeder mechanism to engagement with the missile engaging means.

2. In a missile launching system, according to claim 1, the track means comprises a plurality of trunk sections securely supported and connected together, a loader rail supported by said connected trunk section for receiving and supporting the missile engaging means and the missile, and a chain housing extending beyond said trunk sections for housing the chain when in retracted position.

3. In a missile launching system, a loader according to claim 1 wherein the link chain includes certain links formed with sides having cam surfaces, cam followers engaging said surfaces, and switches and hydraulic valves disposed to be actuated by said cam followers to operate mechanisms controlling the sequential functioning.

4. In a missile launching system, a loader according to claim 1 wherein the driving means is a sprocket wheel for sequentially engaging the individual links of the chain, means for driving the sprocket wheel in either direction, and a chain decelerating means.

5. In a missile launching system, a loader according to claim 1 wherein the means attached to the link chain to engage the missile comprises a saddle cart formed with track engaging surfaces, missile engaging latching arms, and a connecting link joining the saddle cart to the end of the link chain.

6. In a missile launching system, a loader according to claim 1 and including means associated with the driving means to control the final movement of the means attached to the link chain engaging the missile prior to transferring the missile from the missile engaging means to the floating track.

7. In a missile launching system, a loader according to claim 1 and including a missile engagement indicator to insure engagement of the missile engaging means after the ramming operation.

References Cited by the Examiner

UNITED STATES PATENTS

| | | | |
|---|---|---|---|
| 1,570,035 | 1/26 | Bennington | 214—624 |
| 2,870,678 | 1/59 | Girouard et al. | 89—1.7 |
| 2,960,009 | 11/60 | Hereth et al. | 89—1.7 |
| 2,984,157 | 5/61 | Johnstone | 89—1.7 |
| 2,985,072 | 5/61 | Carlberg et al. | 89—1.7 |
| 2,997,682 | 8/61 | Grimes | 89—1.7 |
| 3,048,087 | 8/62 | Campbell | 89—1.7 |
| 2,054,330 | 9/62 | Carlberg | 89—1.7 |
| 3,072,019 | 1/62 | Wilson et al. | 89—1.7 |
| 3,089,925 | 5/63 | Landstrom et al. | 89—1.7 |
| 3,093,032 | 6/63 | Wilson | 89—1.7 |
| 3,095,780 | 7/63 | Bauer et al. | 89—1.7 |

FOREIGN PATENTS 10,849 AD/11 Great Britain.

BENJAMIN A. BORCHELT, *Primary Examiner.*

ARTHUR M. HORTON, SAMUEL BOYD, *Examiners.*